US012187491B2

(12) United States Patent
Squiers et al.

(10) Patent No.: US 12,187,491 B2
(45) Date of Patent: Jan. 7, 2025

(54) STORAGE DEVICE SYSTEM

(71) Applicants: Milwaukee Electric Tool Corporation, Brookfield, WI (US); Keter Plastic LTD., Herzelyia (IL)

(72) Inventors: Grant T. Squiers, Cudahy, WI (US); Matthew Vargo, Milwaukee, WI (US); Matthew W. Naiva, Wauwatosa, WI (US); George Barton, Mequon, WI (US); Christopher S. Hoppe, Midvale, UT (US); Scott Earl McKinster, Watertown, WI (US); Aaron S. Blumenthal, Shorewood, WI (US); Michael Stearns, Milwaukee, WI (US); Michael John Caelwaerts, Milwaukee, WI (US); Aaron M. Williams, Milwaukee, WI (US); Samuel A. Gould, West Allis, WI (US); Steven W. Hyma, Milwaukee, WI (US); Jason D. Thurner, Menomonee Falls, WI (US); Yaron Brunner, Kibbutz Gvat (IL)

(73) Assignees: Milwaukee Electric Tool Corporation, Brookfield, WI (US); Keter Plastic LTD, Herzelyia (IL)

( * ) Notice: Subject to any disclaimer, the term of this patent is extended or adjusted under 35 U.S.C. 154(b) by 0 days.

(21) Appl. No.: 18/632,971

(22) Filed: Apr. 11, 2024

(65) Prior Publication Data

US 2024/0253862 A1     Aug. 1, 2024

Related U.S. Application Data

(63) Continuation of application No. 16/777,181, filed on Jan. 30, 2020, which is a continuation of application No. PCT/US2018/044629, filed on Jul. 31, 2018.
(Continued)

(51) Int. Cl.
    *B25H 3/02*          (2006.01)
    *A45F 3/04*          (2006.01)
    (Continued)

(52) U.S. Cl.
    CPC ................ *B65D 25/20* (2013.01); *A45F 3/04* (2013.01); *A45F 3/14* (2013.01); *B25H 3/02* (2013.01);
    (Continued)

(58) Field of Classification Search
    CPC . A45C 7/0045; A45F 3/04; A45F 3/14; A45F 2003/144; A47F 5/0853;
    (Continued)

(56) References Cited

U.S. PATENT DOCUMENTS 1,112,943 A    10/1914   Stone
1,488,460 A     3/1924   Scheer
(Continued)

FOREIGN PATENT DOCUMENTS

| CA | 2562993 | 4/2007 |
| CN | 2608238 | 3/2004 |

(Continued)

OTHER PUBLICATIONS

"Blitz Box—Portable Storage Box / Shelf," The Green Head Finds Cool New Stuff, https://www.thegreenhead.com/2013/03/blitz-box-portable-storage-box-shelf.php, Per Wayback, website dates back to Feb. 15, 2015, 5 pages.
(Continued)

*Primary Examiner* — Gideon R Weinerth
(74) *Attorney, Agent, or Firm* — Reinhart Boerner Van Deuren s.c.

(57) ABSTRACT

A storage container with various aspects is described herein. The storage container may have cleats or cleat receptacles to interact with other storage containers and/or accessories.
(Continued)

The storage container may also include rails for attachment of various accessories. Some versions of the storage container may further include telescopic uprights connected to a handle. Many of the versions of the storage containers may further include wheels for transporting the storage containers and their contents.

15 Claims, 105 Drawing Sheets

Related U.S. Application Data

(60) Provisional application No. 62/634,537, filed on Feb. 23, 2018, provisional application No. 62/621,403, filed on Jan. 24, 2018, provisional application No. 62/613,263, filed on Jan. 3, 2018, provisional application No. 62/609,985, filed on Dec. 22, 2017, provisional application No. 62/608,302, filed on Dec. 20, 2017, provisional application No. 62/594,292, filed on Dec. 4, 2017, provisional application No. 62/538,860, filed on Jul. 31, 2017.

(51) Int. Cl.
*A45F 3/14* (2006.01)
*B62B 3/00* (2006.01)
*B65D 21/02* (2006.01)
*B65D 21/08* (2006.01)
*B65D 25/20* (2006.01)
*B62B 1/16* (2006.01)
*B62B 1/20* (2006.01)
*B62B 3/10* (2006.01)
*B62B 5/04* (2006.01)

(52) U.S. Cl.
CPC ...... *B65D 21/086* (2013.01); *A45F 2003/144* (2013.01); *B62B 1/16* (2013.01); *B62B 1/20* (2013.01); *B62B 3/005* (2013.01); *B62B 3/10* (2013.01); *B62B 3/102* (2013.01); *B62B 5/0433* (2013.01)

(58) Field of Classification Search
CPC ... B25H 1/12; B25H 1/08; B25H 3/02; B25H 3/04; B25H 3/028; B25H 3/00; B25H 3/06; B25H 3/027; B62B 1/16; B62B 1/20; B62B 3/005; B62B 3/10; B62B 3/102; B62B 5/0433; B62B 3/04; B62B 2202/48; B65D 21/0223; B65D 21/0204; B65D 21/023; B65D 21/086; B65D 25/20; Y10S 312/902
USPC ...... 182/119; 206/349, 373; 211/70.6, 94.01, 211/103, 126.1; 220/23.2, 23.4, 23.6, 220/23.8, 735; 224/629; 280/79.5, 280/47.35, 47.19; 312/902
See application file for complete search history.

(56) References Cited

U.S. PATENT DOCUMENTS

| | | | |
|---|---|---|---|
| 1,704,480 A | 3/1929 | Kicileski | |
| 2,042,387 A | 5/1936 | Cobb | |
| 2,100,036 A | 11/1937 | Michal | |
| 2,103,106 A | 12/1937 | Yurkovitch | |
| 2,210,235 A | 8/1940 | Filbert | |
| 2,386,343 A | 10/1945 | Regenhardt | |
| 2,430,200 A | 11/1947 | Wilson | |
| 2,558,126 A | 6/1951 | Davenport | |
| 2,588,009 A | 3/1952 | Jones | |
| 2,970,358 A | 2/1961 | Elsner | |
| 3,117,692 A | 1/1964 | Carpenter et al. | |
| 3,186,585 A | 6/1965 | Denny | |
| 3,225,865 A | 12/1965 | Downey | |
| 3,424,334 A | 1/1969 | Goltz | |
| 3,506,321 A | 4/1970 | Hampel | |
| 3,550,908 A | 12/1970 | Propst et al. | |
| 3,552,817 A | 1/1971 | Marcolongo | |
| 3,567,298 A | 3/1971 | Ambaum et al. | |
| 3,743,372 A | 7/1973 | Ruggerone | |
| 3,778,175 A * | 12/1973 | Zimmer | E06B 3/9684 52/645 |
| D232,798 S | 9/1974 | Roche et al. | |
| 3,851,936 A | 12/1974 | Muller | |
| 3,913,741 A | 10/1975 | Pirie | |
| 3,935,613 A | 2/1976 | Kaneko | |
| 3,974,898 A | 8/1976 | Tullis et al. | |
| 3,999,818 A | 12/1976 | Schankler | |
| 4,043,566 A | 8/1977 | Johnson | |
| 4,126,366 A * | 11/1978 | Handler | B25H 3/00 211/163 |
| 4,168,076 A | 9/1979 | Johnson | |
| 4,338,987 A * | 7/1982 | Miles | B25H 3/00 312/247 |
| 4,457,436 A * | 7/1984 | Kelley | A47B 95/008 312/246 |
| 4,467,925 A * | 8/1984 | Ratzloff | A47F 5/0838 248/214 |
| 4,491,231 A | 1/1985 | Heggeland et al. | |
| 4,524,985 A | 6/1985 | Drake | |
| 4,531,645 A * | 7/1985 | Tisbo | B25H 3/06 211/163 |
| 4,535,897 A * | 8/1985 | Remington | B25H 3/00 211/74 |
| 4,564,732 A | 1/1986 | Lancaster et al. | |
| 4,577,772 A | 3/1986 | Bigliardi | |
| D285,986 S | 10/1986 | Huang | |
| 4,639,005 A | 1/1987 | Birkley | |
| 4,643,494 A | 2/1987 | Marleau | |
| 4,660,725 A | 4/1987 | Fishman et al. | |
| 4,673,070 A | 6/1987 | Ambal | |
| 4,684,034 A | 8/1987 | Ono et al. | |
| 4,693,345 A | 9/1987 | Mittelmann | |
| 4,735,107 A | 4/1988 | Winkie | |
| 4,880,248 A * | 11/1989 | Elmer | B62B 1/10 280/47.35 |
| 4,971,201 A | 11/1990 | Sathre | |
| 5,035,389 A | 7/1991 | Wang | |
| 5,035,445 A | 7/1991 | Poulin | |
| D319,016 S | 8/1991 | Kahl | |
| 5,098,235 A | 3/1992 | Svetlik et al. | |
| D325,324 S | 4/1992 | Kahl | |
| 5,105,947 A | 4/1992 | Wise | |
| D326,815 S | 6/1992 | Meisner et al. | |
| 5,154,291 A | 10/1992 | Sur | |
| 5,219,446 A * | 6/1993 | Klepac | B25H 3/02 362/154 |
| 5,240,264 A | 8/1993 | Williams | |
| D340,167 S | 10/1993 | Kahl | |
| 5,263,576 A * | 11/1993 | Boreen | B65D 43/20 220/345.2 |
| 5,301,829 A | 4/1994 | Chrisco | |
| D352,208 S | 11/1994 | Brookshire | |
| 5,386,959 A * | 2/1995 | Laughlin | H02G 3/125 248/200.1 |
| 5,407,170 A * | 4/1995 | Slivon | B25H 3/06 211/70.1 |
| 5,429,260 A | 7/1995 | Vollers | |
| D361,511 S | 8/1995 | Dickinson et al. | |
| 5,437,502 A * | 8/1995 | Warnick | B25H 3/04 312/249.11 |
| 5,454,634 A | 10/1995 | Herbst et al. | |
| 5,538,213 A | 7/1996 | Brown | |
| 5,595,228 A | 1/1997 | Meisner et al. | |
| 5,608,603 A | 3/1997 | Su | |
| 5,628,443 A | 5/1997 | Deutsch | |
| 5,664,292 A | 9/1997 | Chen | |
| D395,533 S | 6/1998 | Morison et al. | |
| 5,797,617 A | 8/1998 | Lin | |

(56) References Cited

U.S. PATENT DOCUMENTS

| | | |
|---|---|---|
| 5,890,613 A | 4/1999 | Williams |
| 5,906,381 A * | 5/1999 | Hovatter ................ B25H 3/028 |
| | | 280/47.27 |
| 5,951,037 A | 9/1999 | Hsieh |
| D415,393 S | 10/1999 | Kei |
| 5,988,473 A | 11/1999 | Hagan et al. |
| D420,860 S | 2/2000 | Golichowski et al. |
| 6,036,071 A | 3/2000 | Hartmann et al. |
| 6,050,660 A | 4/2000 | Gurley |
| 6,059,135 A * | 5/2000 | James ...................... E05C 1/04 |
| | | 220/244 |
| 6,085,925 A | 7/2000 | Chung |
| 6,109,627 A | 8/2000 | Be |
| 6,123,344 A | 9/2000 | Clegg |
| 6,131,926 A | 10/2000 | Harlan |
| 6,176,558 B1 | 1/2001 | Hlade et al. |
| 6,176,559 B1 | 1/2001 | Tiramani et al. |
| D437,484 S | 2/2001 | Tiramani et al. |
| D437,669 S | 2/2001 | Blason et al. |
| 6,305,498 B1 | 10/2001 | Itzkovitch |
| 6,311,881 B1 | 11/2001 | Kamiya |
| 6,347,847 B1 | 2/2002 | Tiramani et al. |
| 6,354,759 B1 | 3/2002 | Leicht |
| 6,367,631 B1 | 4/2002 | Steigerwald |
| 6,371,320 B2 | 4/2002 | Sagol |
| 6,371,321 B1 | 4/2002 | Lee |
| D456,972 S | 5/2002 | Blason et al. |
| 6,431,580 B1 | 8/2002 | Kady |
| 6,435,357 B1 * | 8/2002 | Lee .......................... B25H 3/04 |
| | | 211/94.01 |
| 6,497,395 B1 | 12/2002 | Croker |
| 6,547,347 B2 | 4/2003 | Saito |
| 6,601,930 B2 | 8/2003 | Tiramani et al. |
| 6,619,772 B2 | 9/2003 | Dierbeck |
| 6,637,707 B1 | 10/2003 | Gates |
| 6,641,013 B2 | 11/2003 | Oise |
| 6,945,546 B2 | 9/2005 | Guirlinger |
| 6,948,691 B2 | 9/2005 | Brock et al. |
| 6,983,946 B2 | 1/2006 | Sullivan et al. |
| 7,007,903 B2 | 3/2006 | Turner |
| 7,044,484 B2 | 5/2006 | Wang |
| 7,066,475 B2 | 6/2006 | Barnes |
| D525,789 S | 8/2006 | Hosking |
| D527,225 S | 8/2006 | Krieger et al. |
| 7,083,061 B2 | 8/2006 | Spindel |
| 7,121,417 B2 | 10/2006 | Magnusson et al. |
| 7,147,243 B2 | 12/2006 | Kady |
| 7,152,752 B2 | 12/2006 | Kurtenbach |
| D536,580 S | 2/2007 | Krieger et al. |
| 7,263,742 B2 | 9/2007 | Valentini |
| 7,350,648 B2 | 4/2008 | Gerstner et al. |
| 7,367,571 B1 | 5/2008 | Nichols |
| 7,431,313 B1 * | 10/2008 | Torres ..................... B25H 3/00 |
| | | 280/47.24 |
| 7,448,115 B2 | 11/2008 | Howell et al. |
| 7,490,800 B2 | 2/2009 | Tu |
| 7,503,569 B2 | 3/2009 | Duvigneau |
| 7,658,887 B2 | 2/2010 | Hovatter |
| 7,690,856 B2 | 4/2010 | Mortensen |
| 7,757,913 B2 | 7/2010 | Fichera |
| 7,779,764 B2 | 8/2010 | Naidu et al. |
| 7,780,026 B1 | 8/2010 | Zuckerman |
| 7,841,144 B2 | 11/2010 | Pervan |
| 7,845,501 B1 * | 12/2010 | Fosburg .................. B25H 3/04 |
| | | 211/70.6 |
| D630,851 S | 1/2011 | Landau et al. |
| D632,043 S * | 2/2011 | Rouillard ...................... D34/21 |
| 8,028,845 B2 | 10/2011 | Himes |
| D649,350 S | 11/2011 | Shitrit |
| D649,783 S | 12/2011 | Brunner |
| D653,832 S | 2/2012 | Vilkomirski et al. |
| 8,132,819 B2 | 3/2012 | Landau |
| 8,177,463 B2 | 5/2012 | Walker |
| D661,858 S | 6/2012 | Lifshitz et al. |
| 8,191,910 B2 | 6/2012 | Landau et al. |
| D663,952 S | 7/2012 | Crevling et al. |
| D664,354 S | 7/2012 | Crevling et al. |
| D668,869 S | 10/2012 | Yamamoto et al. |
| D674,605 S | 1/2013 | Vilkomirski et al. |
| 8,453,796 B2 * | 6/2013 | Astor ........................ E06C 7/00 |
| | | 182/119 |
| 8,454,033 B2 | 6/2013 | Tsai |
| 8,459,495 B2 | 6/2013 | Koenig |
| 8,505,729 B2 | 8/2013 | Sosnovsky et al. |
| 8,567,796 B2 | 10/2013 | Bar-Erez et al. |
| 8,657,307 B2 | 2/2014 | Lifshitz et al. |
| 8,677,661 B2 | 3/2014 | Michels |
| D701,696 S | 4/2014 | Shitrit et al. |
| 8,689,396 B2 | 4/2014 | Wolfe |
| 8,714,355 B2 | 5/2014 | Huang |
| 8,740,010 B1 | 6/2014 | Page |
| 8,813,960 B2 | 8/2014 | Fjelland |
| 8,875,888 B2 | 11/2014 | Koenig |
| 8,894,160 B1 | 11/2014 | Christensen |
| 8,967,379 B2 * | 3/2015 | Kinskey ................ B25H 3/023 |
| | | 190/110 |
| 8,979,100 B2 | 3/2015 | Bensman et al. |
| 8,985,922 B2 | 3/2015 | Neumann |
| D738,105 S | 9/2015 | Shitrit |
| D738,106 S | 9/2015 | Shitrit |
| 9,126,329 B2 * | 9/2015 | Kao ..................... F16M 13/022 |
| 9,132,543 B2 | 9/2015 | Bar-Erez |
| 9,216,751 B2 * | 12/2015 | Adams ................... B62B 3/005 |
| 9,254,856 B2 * | 2/2016 | Oachs ...................... B25H 3/00 |
| D753,394 S | 4/2016 | Brunner |
| D753,395 S | 4/2016 | Brunner |
| D753,396 S | 4/2016 | Brunner |
| 9,375,835 B1 | 6/2016 | Lin |
| D765,974 S | 9/2016 | Tonelli et al. |
| D770,179 S | 11/2016 | Menirom |
| 9,506,489 B2 | 11/2016 | Ko |
| 9,511,491 B2 | 12/2016 | Brunner |
| D777,426 S | 1/2017 | Dahl |
| 9,566,990 B2 | 2/2017 | Bar-Erez |
| D784,089 S | 4/2017 | Furneaux et al. |
| 9,616,562 B2 | 4/2017 | Hoppe |
| 9,643,629 B2 | 5/2017 | Bar-Erez et al. |
| D790,221 S | 6/2017 | Yahav et al. |
| 9,701,443 B2 | 7/2017 | Wang |
| 9,725,209 B1 | 8/2017 | Ben-Gigi |
| D803,631 S | 11/2017 | Min et al. |
| D806,483 S | 1/2018 | Stanford et al. |
| 9,872,562 B2 | 1/2018 | Brunner |
| D814,187 S | 4/2018 | Caglar |
| D815,434 S * | 4/2018 | Bowen ......................... D3/289 |
| D815,831 S | 4/2018 | Tonelli |
| D816,334 S | 5/2018 | Brunner |
| 10,017,134 B2 | 7/2018 | Pickens et al. |
| D826,510 S | 8/2018 | Brunner |
| RE47,022 E | 9/2018 | Sosnovsky et al. |
| D828,671 S | 9/2018 | Cope et al. |
| D831,352 S | 10/2018 | Brunner |
| 10,106,180 B2 | 10/2018 | Bar-Erez et al. |
| D833,744 S | 11/2018 | Yahav et al. |
| D836,995 S | 1/2019 | Carey et al. |
| D839,681 S | 2/2019 | Evron et al. |
| D837,515 S | 4/2019 | Shpitzer |
| D845,080 S | 4/2019 | Jacobsen |
| D845,081 S | 4/2019 | Jacobsen |
| 10,246,116 B2 * | 4/2019 | Oltman ...................... B62B 5/06 |
| 10,286,542 B2 | 5/2019 | Wolle et al. |
| 10,336,359 B1 | 7/2019 | Asbille |
| D857,387 S | 8/2019 | Shpitzer |
| 10,406,387 B2 | 9/2019 | Krepel et al. |
| 10,434,638 B1 | 10/2019 | Tsai |
| 10,434,639 B1 * | 10/2019 | Chen ........................ B25H 3/04 |
| D871,013 S | 12/2019 | Liu |
| D873,085 S | 1/2020 | DeFrancia |
| D876,833 S | 3/2020 | Brunner et al. |
| 10,583,962 B2 | 3/2020 | Brunner et al. |
| 10,593,962 B2 | 3/2020 | Herchen et al. |
| D880,252 S | 4/2020 | Jacobsen |
| D880,951 S | 4/2020 | Jacobsen |

(56) References Cited

U.S. PATENT DOCUMENTS

| | | |
|---|---|---|
| D883,752 S | 5/2020 | Carey et al. |
| D887,788 S | 6/2020 | Meda et al. |
| D888,422 S | 6/2020 | Yang |
| D888,503 S | 6/2020 | Meda et al. |
| D891,193 S | 6/2020 | Stanford et al. |
| D891,195 S | 7/2020 | Zhou |
| D891,875 S | 8/2020 | Olson |
| D892,565 S | 8/2020 | Astle et al. |
| 10,750,833 B2 | 8/2020 | Burchia |
| D895,375 S | 9/2020 | Hurley, Jr. |
| D896,517 S | 9/2020 | Brunner |
| D898,320 S | 10/2020 | Brunner et al. |
| 10,793,172 B2 | 10/2020 | Brunner |
| 10,829,268 B2 | 11/2020 | Sommer |
| D917,977 S | 5/2021 | Brunner et al. |
| D918,584 S | 5/2021 | Brunner et al. |
| D919,296 S | 5/2021 | Brunner et al. |
| 11,008,136 B2 | 5/2021 | Brunner et al. |
| D920,671 S | 6/2021 | Brunner et al. |
| 11,066,089 B2 | 7/2021 | Brunner |
| D932,186 S | 10/2021 | Brunner et al. |
| 11,155,382 B1 | 10/2021 | Cai |
| D936,030 S | 11/2021 | Lee et al. |
| D941,020 S | 1/2022 | Brunner et al. |
| 11,230,410 B2 | 1/2022 | Brunner |
| 11,283,117 B2 | 3/2022 | Polakowski et al. |
| 11,426,859 B2* | 8/2022 | Squiers .................. A45F 3/047 |
| 11,486,547 B1* | 11/2022 | Charles ................ F17C 13/084 |
| 11,554,898 B2* | 1/2023 | Brunner ............ B65D 21/0202 |
| 11,612,998 B1* | 3/2023 | Byington ............... B25H 3/028 |
| | | 211/126.1 |
| 11,638,992 B2* | 5/2023 | Jessop ..................... B25H 3/04 |
| | | 211/69.8 |
| 11,667,029 B1* | 6/2023 | Hsieh ..................... B25H 3/04 |
| | | 206/372 |
| 11,840,269 B2* | 12/2023 | Brunner .................. B62B 1/002 |
| 11,964,632 B2* | 4/2024 | Rutman ............... B60P 7/0815 |
| 2002/0000440 A1 | 1/2002 | Sagal et al. |
| 2002/0020729 A1* | 2/2002 | Alter ....................... A45C 5/02 |
| | | 224/629 |
| 2002/0030425 A1 | 3/2002 | Tiramani et al. |
| 2002/0122691 A1* | 9/2002 | Wood ................... F16B 5/0685 |
| | | 403/381 |
| 2002/0125072 A1 | 9/2002 | Levy |
| 2002/0171228 A1 | 11/2002 | Kady |
| 2003/0075468 A1 | 4/2003 | Story et al. |
| 2003/0094393 A1 | 5/2003 | Sahm, III |
| 2003/0115715 A1 | 6/2003 | Valentini |
| 2003/0139080 A1 | 7/2003 | Lafragette et al. |
| 2003/0146589 A1 | 8/2003 | Jarko et al. |
| 2003/0184034 A1 | 10/2003 | Pfeiffer |
| 2003/0205877 A1 | 11/2003 | Verna et al. |
| 2004/0074725 A1 | 4/2004 | Shih |
| 2004/0103494 A1 | 6/2004 | Valentini |
| 2004/0134818 A1* | 7/2004 | Cunningham ......... B25H 3/023 |
| | | 206/373 |
| 2004/0149754 A1 | 8/2004 | Diamant |
| 2004/0195793 A1 | 10/2004 | Sullivan et al. |
| 2004/0206656 A1 | 10/2004 | Dubois et al. |
| 2004/0256529 A1 | 12/2004 | Richter |
| 2005/0062244 A1 | 3/2005 | Guirlinger |
| 2005/0082775 A1 | 4/2005 | Slager |
| 2005/0104308 A1 | 5/2005 | Barnes |
| 2005/0139745 A1 | 6/2005 | Liao |
| 2005/0247653 A1* | 11/2005 | Brooks ................. A47F 5/0846 |
| | | 211/94.01 |
| 2005/0280228 A1* | 12/2005 | Fernandes ................ B25H 1/00 |
| | | 280/47.35 |
| 2006/0006770 A1 | 1/2006 | Valentini |
| 2006/0027475 A1 | 2/2006 | Gleason et al. |
| 2006/0038367 A9 | 2/2006 | Ferraro |
| 2006/0119060 A1 | 6/2006 | Sullivan et al. |
| 2006/0165482 A1 | 7/2006 | Olberding |
| 2006/0186624 A1 | 8/2006 | Kady |
| 2006/0254946 A1 | 11/2006 | Becklin |
| 2007/0006542 A1 | 1/2007 | Duke |
| 2007/0012694 A1 | 1/2007 | Duvigneau |
| 2007/0045505 A1 | 3/2007 | Chen |
| 2007/0068757 A1 | 3/2007 | Tan |
| 2007/0090616 A1 | 4/2007 | Tompkins |
| 2007/0138041 A1 | 6/2007 | Welsh |
| 2007/0145700 A1 | 6/2007 | Ambrose et al. |
| 2007/0194543 A1 | 8/2007 | Duvigneau |
| 2007/0200309 A1* | 8/2007 | Coppedge ................ B25H 3/04 |
| | | 280/47.26 |
| 2007/0256996 A1* | 11/2007 | Jackle ................... A47F 5/0846 |
| | | 211/94.01 |
| 2007/0273114 A1 | 11/2007 | Katz |
| 2008/0104921 A1 | 5/2008 | Pervan |
| 2008/0115312 A1 | 5/2008 | DiPasquale et al. |
| 2008/0121547 A1 | 5/2008 | Dur et al. |
| 2008/0134607 A1 | 6/2008 | Pervan |
| 2008/0136133 A1 | 6/2008 | Takahashi |
| 2008/0169739 A1 | 7/2008 | Goldenberg |
| 2008/0271280 A1 | 11/2008 | Tiede et al. |
| 2008/0277221 A1 | 11/2008 | Josefson |
| 2008/0280523 A1 | 11/2008 | Bishop |
| 2008/0308369 A1 | 12/2008 | Louis |
| 2009/0026901 A1 | 1/2009 | Nies, III et al. |
| 2009/0071990 A1 | 3/2009 | Jardine et al. |
| 2009/0120947 A1* | 5/2009 | Davis ..................... B65D 25/20 |
| | | 220/735 |
| 2009/0127146 A1* | 5/2009 | Krebs ...................... B25H 3/04 |
| | | 206/478 |
| 2009/0145790 A1 | 6/2009 | Panosian |
| 2009/0145866 A1 | 6/2009 | Panosian et al. |
| 2009/0145913 A1 | 6/2009 | Panosian et al. |
| 2009/0178946 A1 | 7/2009 | Patstone et al. |
| 2009/0236482 A1 | 9/2009 | Winig et al. |
| 2009/0288970 A1 | 11/2009 | Katz et al. |
| 2010/0052276 A1 | 3/2010 | Brunner |
| 2010/0133213 A1* | 6/2010 | Kao ....................... A47F 7/0028 |
| | | 211/70.6 |
| 2010/0139566 A1 | 6/2010 | Lopuszanski |
| 2010/0147642 A1 | 6/2010 | Andochick |
| 2010/0219193 A1 | 9/2010 | Becklin |
| 2010/0290877 A1 | 11/2010 | Landau et al. |
| 2011/0068562 A1* | 3/2011 | Keffeler ................ A61G 12/001 |
| | | 280/651 |
| 2011/0073516 A1 | 3/2011 | Zelinskiy |
| 2011/0139665 A1 | 6/2011 | Madsen |
| 2011/0155613 A1 | 6/2011 | Koenig et al. |
| 2011/0174939 A1 | 7/2011 | Taylor |
| 2011/0181008 A1 | 7/2011 | Bensman |
| 2011/0187248 A1* | 8/2011 | Kao ......................... A47B 81/00 |
| | | 312/280 |
| 2011/0192810 A1* | 8/2011 | Kao ........................ B25H 3/028 |
| | | 211/70.6 |
| 2011/0220531 A1 | 9/2011 | Meether et al. |
| 2011/0233160 A1* | 9/2011 | Chen ........................ B25H 3/06 |
| | | 211/70.6 |
| 2011/0260588 A1 | 10/2011 | Lin |
| 2012/0061930 A1* | 3/2012 | Lin ........................... B25H 3/04 |
| | | 280/47.35 |
| 2012/0073995 A1 | 3/2012 | Parker |
| 2012/0152800 A1 | 6/2012 | Parzy et al. |
| 2012/0160886 A1 | 6/2012 | Henny et al. |
| 2012/0180250 A1 | 7/2012 | Ricklefsen et al. |
| 2012/0207571 A1 | 8/2012 | Scott |
| 2012/0292213 A1 | 11/2012 | Brunner |
| 2012/0292870 A1* | 11/2012 | Cowie ...................... B25H 3/02 |
| | | 248/224.8 |
| 2012/0326406 A1 | 12/2012 | Lifshitz |
| 2013/0024468 A1 | 1/2013 | Kocsis |
| 2013/0031731 A1 | 2/2013 | Hess |
| 2013/0031732 A1 | 2/2013 | Hess et al. |
| 2013/0068903 A1 | 3/2013 | O'Keene |
| 2013/0121783 A1 | 5/2013 | Kelly |
| 2013/0127129 A1 | 5/2013 | Bensman et al. |
| 2013/0146551 A1 | 6/2013 | Simpson et al. |
| 2013/0154218 A1 | 6/2013 | Tiilikainen |
| 2013/0206139 A1 | 8/2013 | Krepel et al. |

(56) References Cited

U.S. PATENT DOCUMENTS

| | | |
|---|---|---|
| 2013/0223971 A1 | 8/2013 | Grace, IV |
| 2014/0062042 A1 | 3/2014 | Wagner et al. |
| 2014/0076759 A1 | 3/2014 | Roehm et al. |
| 2014/0161518 A1 | 6/2014 | Ko |
| 2014/0166516 A1 | 6/2014 | Martinez |
| 2014/0197059 A1 | 7/2014 | Evans et al. |
| 2014/0265440 A1* | 9/2014 | Chen ................ B62B 3/005 296/186.1 |
| 2015/0034515 A1 | 2/2015 | Monyak et al. |
| 2015/0115786 A1* | 4/2015 | Manalang ............ A47B 31/00 312/294 |
| 2015/0151427 A1 | 6/2015 | Ben-Gigi |
| 2015/0274362 A1 | 10/2015 | Christopher et al. |
| 2015/0376917 A1 | 12/2015 | Brunner |
| 2016/0023349 A1 | 1/2016 | Hoppe et al. |
| 2016/0130034 A1 | 5/2016 | Kuhls |
| 2016/0144500 A1 | 5/2016 | Chen |
| 2016/0168880 A1 | 6/2016 | Phelan |
| 2016/0213115 A1 | 7/2016 | Gonitianer et al. |
| 2016/0221177 A1 | 8/2016 | Reinhart |
| 2016/0244209 A1* | 8/2016 | Hain ................ A45C 11/20 |
| 2017/0001655 A1* | 1/2017 | Huang ............... B62B 3/005 |
| 2017/0049250 A1* | 2/2017 | Oren ................ A47B 96/1433 |
| 2017/0065355 A1 | 3/2017 | Ross et al. |
| 2017/0121056 A1 | 5/2017 | Wang |
| 2017/0138382 A1 | 5/2017 | Ko |
| 2017/0158216 A1 | 6/2017 | Yahav et al. |
| 2017/0165828 A1 | 6/2017 | Fleischmann |
| 2017/0166352 A1 | 6/2017 | Hoppe |
| 2017/0174392 A1 | 6/2017 | De Loynes |
| 2017/0217464 A1 | 8/2017 | Bar-Erez et al. |
| 2017/0223864 A1* | 8/2017 | Jost ................ A47B 88/43 |
| 2017/0239808 A1 | 8/2017 | Hoppe |
| 2017/0257958 A1 | 9/2017 | Sabbag et al. |
| 2017/0266804 A1 | 9/2017 | Kinskey |
| 2017/0318927 A1 | 11/2017 | Kraus et al. |
| 2017/0349013 A1 | 12/2017 | Gronholm |
| 2018/0000234 A1 | 1/2018 | White |
| 2018/0044059 A1 | 2/2018 | Brunner |
| 2018/0099405 A1 | 4/2018 | Reinhart |
| 2018/0141718 A1* | 5/2018 | Ahlström ........... B65D 81/3813 |
| 2018/0153312 A1 | 6/2018 | Buck et al. |
| 2018/0161975 A1 | 6/2018 | Brunner |
| 2018/0186513 A1 | 7/2018 | Brunner |
| 2018/0201289 A1* | 7/2018 | Sakakibara ........... B62B 3/005 |
| 2018/0220758 A1 | 8/2018 | Burchia |
| 2018/0290288 A1 | 10/2018 | Brunner |
| 2018/0306487 A1* | 10/2018 | Huish ................ B65D 81/3813 |
| 2019/0002004 A1 | 1/2019 | Brunner |
| 2019/0031222 A1 | 1/2019 | Takyar et al. |
| 2019/0039781 A1 | 2/2019 | Kogel |
| 2019/0106244 A1 | 4/2019 | Brunner et al. |
| 2019/0111956 A1* | 4/2019 | Phillips ............ B62B 5/0461 |
| 2019/0225371 A1 | 7/2019 | Hoppe et al. |
| 2019/0225374 A1 | 7/2019 | McCrea et al. |
| 2019/0247995 A1* | 8/2019 | Hocine ............ B65D 21/0204 |
| 2020/0039553 A1* | 2/2020 | Abohammdan ........ B62B 5/061 |
| 2020/0055534 A1 | 2/2020 | Hassell |
| 2020/0078929 A1 | 3/2020 | Liu |
| 2020/0079408 A1* | 3/2020 | Christie ................ B62B 3/10 |
| 2020/0147781 A1 | 5/2020 | Squiers |
| 2020/0165036 A1* | 5/2020 | Squiers ................ B65D 25/20 |
| 2020/0178686 A1* | 6/2020 | Hermann ................ B25H 1/16 |
| 2020/0243925 A1 | 7/2020 | Polakowski et al. |
| 2020/0284425 A1* | 9/2020 | Plato ................ B25H 3/02 |
| 2020/0299027 A1 | 9/2020 | Brunner et al. |
| 2020/0346819 A1 | 11/2020 | Kogel et al. |
| 2020/0360741 A1* | 11/2020 | Liu ................ B32B 13/045 |
| 2021/0031975 A1 | 2/2021 | Brunner et al. |
| 2021/0039831 A1 | 2/2021 | Brunner et al. |
| 2021/0094600 A1 | 4/2021 | Brunner et al. |
| 2021/0104909 A1 | 4/2021 | Mantych |
| 2021/0154824 A1* | 5/2021 | Barton ................ B25H 3/028 |
| 2021/0177134 A1* | 6/2021 | Adams ............... A47B 23/044 |
| 2021/0205979 A1* | 7/2021 | Jessop ................ F16B 2/22 |
| 2021/0221561 A1 | 7/2021 | Davidian et al. |
| 2021/0245226 A1* | 8/2021 | Woidasky ............ B21D 5/0254 |
| 2021/0300447 A1* | 9/2021 | Brunner ................ B62B 1/002 |
| 2021/0305824 A1* | 9/2021 | Shirazi ............ H02M 3/33507 |
| 2021/0316909 A1 | 10/2021 | Vargo et al. |
| 2022/0016799 A1* | 1/2022 | Westbrook ............ B62B 3/022 |
| 2022/0144326 A1* | 5/2022 | Williams ................ B25H 3/02 |
| 2022/0322828 A1* | 10/2022 | Barton ................ A47B 97/00 |
| 2022/0402113 A1* | 12/2022 | Brunner ................ B25H 1/06 |
| 2023/0020398 A1* | 1/2023 | Sutton ................ B65D 25/20 |
| 2023/0150725 A1* | 5/2023 | Baron ................ B65D 21/023 206/509 |
| 2023/0202025 A1* | 6/2023 | Chen ................ B25H 3/02 206/503 |
| 2023/0234212 A1* | 7/2023 | Lownik ................ F16M 13/02 |
| 2023/0257163 A1* | 8/2023 | Fleherty ................ B65D 81/38 220/592.2 |
| 2023/0301429 A1* | 9/2023 | Braun ................ A47F 5/08 |
| 2023/0411975 A1* | 12/2023 | Roberts ................ H01M 10/46 |
| 2024/0010390 A1* | 1/2024 | Braun ................ A47B 57/10 |
| 2024/0025204 A1* | 1/2024 | Goodwin ................ B44D 3/14 |
| 2024/0149934 A1* | 5/2024 | Panosian ................ B25H 3/021 |
| 2024/0150071 A1* | 5/2024 | Panosian ............ B65D 21/0213 |
| 2024/0150079 A1* | 5/2024 | Panosian ............ B65D 21/0223 |
| 2024/0150094 A1* | 5/2024 | Panosian ............ B65D 21/0213 |
| 2024/0190612 A1* | 6/2024 | Christopher ............ B62B 1/04 |
| 2024/0200561 A1* | 6/2024 | Ran ................ F04D 25/166 |
| 2024/0208040 A1* | 6/2024 | Coons ................ B25H 3/023 |
| 2024/0246724 A1* | 7/2024 | Hoppe ............ B65D 21/0216 |
| 2024/0253207 A1* | 8/2024 | Baruch ............ B65D 21/0202 |

FOREIGN PATENT DOCUMENTS

| | | |
|---|---|---|
| CN | 2782508 | 5/2006 |
| CN | 200947356 | 9/2007 |
| CN | 101068661 | 11/2007 |
| CN | 101362464 | 2/2009 |
| CN | 101821148 | 9/2010 |
| CN | 101837854 | 9/2010 |
| CN | 102042354 | 5/2011 |
| CN | 102137795 | 7/2011 |
| CN | 102186714 | 9/2011 |
| CN | 102248523 | 11/2011 |
| CN | 102469899 | 5/2012 |
| CN | 202264971 | 6/2012 |
| CN | 102608238 | 7/2012 |
| CN | 102834035 | 12/2012 |
| CN | 302371147 | 3/2013 |
| CN | 103118578 | 5/2013 |
| CN | 103659777 | 3/2014 |
| CN | 204161752 | 2/2015 |
| CN | 107249378 | 10/2017 |
| CN | 107428436 | 12/2017 |
| DE | 3510307 | 9/1986 |
| DE | 9313802 | 12/1993 |
| DE | 4415638 | 11/1995 |
| DE | 29708343 | 7/1997 |
| DE | 19750543 | 5/1999 |
| DE | 20218996 | 3/2003 |
| DE | 102004057870 | 6/2006 |
| DE | 202011002617 | 4/2011 |
| DE | 102010003754 | 10/2011 |
| DE | 102010003756 | 10/2011 |
| DE | 102012106482 | 1/2014 |
| DE | 102012220837 | 5/2014 |
| DE | 202014103695 | 10/2014 |
| DE | 102013008630 | 11/2014 |
| DE | 202015105053 | 10/2016 |
| DE | 202015005752 | 11/2016 |
| DE | 102015112204 | 2/2017 |
| DE | 102015013053 | 4/2017 |
| DE | 402018201520 | 5/2018 |
| EM | 000705231-0001 | 4/2007 |
| EM | 002419283-0001 | 3/2014 |
| EP | 0916302 | 5/1999 |
| EP | 1018473 | 7/2000 |
| EP | 1321247 | 6/2003 |
| EP | 1428764 | 6/2004 |
| EP | 1724069 A2 | 11/2006 |

(56) References Cited

FOREIGN PATENT DOCUMENTS

| | | |
|---|---|---|
| EP | 1819487 | 8/2007 |
| EP | 1925406 | 5/2008 |
| EP | 2289671 | 3/2011 |
| EP | 2346741 | 7/2011 |
| EP | 2456341 | 5/2012 |
| EP | 2543297 | 1/2013 |
| EP | 2555660 | 2/2013 |
| EP | 2555661 | 2/2013 |
| EP | 2537641 B1 | 9/2016 |
| EP | 2338650 B1 | 10/2016 |
| EP | 2805799 | 11/2016 |
| EP | 3141354 | 3/2017 |
| FR | 3043970 | 5/2017 |
| GB | 694707 | 7/1953 |
| GB | 2047181 B | 2/1983 |
| GB | 2110076 | 6/1983 |
| GB | 2211486 | 7/1989 |
| GB | 2330521 | 4/1999 |
| GB | 2406331 | 3/2005 |
| GB | 2413265 | 10/2005 |
| GB | 2449934 | 12/2008 |
| JP | 2003194020 A | 7/2003 |
| JP | D1180963 | 8/2003 |
| JP | 1276744 | 7/2006 |
| JP | D1395115 | 8/2010 |
| JP | D1395116 | 8/2010 |
| JP | D1455321 | 11/2012 |
| JP | 2013022972 | 2/2013 |
| JP | 2013022976 | 2/2013 |
| JP | 1477050 | 8/2013 |
| JP | 2014-117961 | 6/2014 |
| JP | D1503434 | 7/2014 |
| JP | D1625407 | 2/2019 |
| JP | D1665028 | 8/2020 |
| KR | 30-0271616 | 2/2000 |
| KR | 30-0320243 | 6/2002 |
| KR | 3008066040000 | 7/2015 |
| KR | 3008422360000 | 3/2016 |
| KR | 3008496000000 | 4/2016 |
| KR | 3008599650000 | 6/2016 |
| KR | 3008812960000 | 11/2016 |
| KR | 3009995990000 | 3/2019 |
| TW | 206875 | 5/1993 |
| TW | I324578 | 5/2010 |
| TW | 135074 | 6/2010 |
| TW | 168686 | 7/2015 |
| TW | 174412 | 3/2016 |
| TW | D192092 | 8/2018 |
| WO | WO2005/045886 | 5/2005 |
| WO | WO2006/099638 | 9/2006 |
| WO | WO2007/121746 | 11/2007 |
| WO | WO07121745 | 11/2007 |
| WO | WO07121746 | 11/2007 |
| WO | WO2007121745 A1 | 11/2007 |
| WO | WO2008/090546 | 7/2008 |
| WO | WO2009/140965 | 11/2009 |
| WO | WO09140965 | 11/2009 |
| WO | WO2011/000387 | 1/2011 |
| WO | WO2011/009480 | 1/2011 |
| WO | WO11009480 | 1/2011 |
| WO | WO2011/032568 | 3/2011 |
| WO | WO2011/131213 | 10/2011 |
| WO | WO2012/000497 | 1/2012 |
| WO | WO2013/026084 | 2/2013 |
| WO | WO13026084 | 2/2013 |
| WO | WO2014/125484 | 8/2014 |
| WO | WO2014/125488 | 8/2014 |
| WO | WO14125488 | 8/2014 |
| WO | WO2016142935 | 9/2016 |
| WO | WO2016/187652 | 12/2016 |
| WO | WO2017028845 | 2/2017 |
| WO | WO2017/098513 | 6/2017 |
| WO | WO2017191628 | 11/2017 |
| WO | WO2017/212840 | 12/2017 |
| WO | WO17212840 | 12/2017 |
| WO | WO2018/010859 | 1/2018 |
| WO | WO2018/213560 | 11/2018 |
| WO | WO2019/028041 | 2/2019 |

OTHER PUBLICATIONS

"BluCave Universal Storage System," Batavia Tools to Build, https://batavia.eu/blucave-storage-system/, believed to be available at least as early as Nov. 29, 2017, 5 pages.

"Dewalt TSTAK Carrier Trolley," ITS, https://www.its.co.uk/pd/171229-Dewalt-TSTAK-Carrier-Trolley-_DEW171229.htm, Per Wayback, website dates back to May 2, 2015, 2 pages.

"DeWalt TSTAK Vac Rack (Suits DW DWV902M & DWV900L) DWV9500-XJ," Get Tools Direct, https://www.gettoolsdirect.com.au/dewalt-tstak-vac-rack-suits-dwv902m-and-dwv900l-dwv9500-xj.html, believed to be available at least as early as Nov. 29, 2017, 4 pages.

"Hopkins FloTool 91002 Rhino Box with Mount," Amazon.com, https://www.amazon.com/exec/obidos/ASIN/B003K15F31/20140000-20, believed to be available at least as early as Nov. 29, 2017, 7 pages.

"Tool Skool, TSTAK Phase 2 Upgrades | TSTAK Carts—First Look—Tool Skool," YouTube, Sep. 7, 2013, https://www.youtube.com/watch?v=jb06y6J1dr4&feature=youtu.be&t=197, 1 page.

Batavia Gmbh, BluCave Storage System, https://protect-us.mimecast.com/s/5XIGCR6KypcgJnIKi9EDoim?domain=batavia.eu, believed to be available at least as early as Nov. 29, 2017, 7 pages.

BluCave Video, https://www.youtube.com/watch?v=Sw7fQQPwoOtY&feature=youtu.be&t=32, believed to be available at least as early as Nov. 29, 2017.

International Search Report and Written Opinion for International Application No. PCT/IL2019/050689, dated Aug. 23, 2019, 21 pages.

International Search Report and Written Opinion for International Application No. PCT/US2018/033161, dated Aug. 6, 2018, 14 pages.

International Search Report and Written Opinion for International Application No. PCT/US2018/044629, dated Jan. 9, 2019, 22 pages.

International Search Report and Written Opinion for International Application No. PCT/US2019/014940, dated Jul. 26, 2019, 7 pages.

Sortimo Logistix, "Mobile Sortimente", brochure, believed to be available at least as early as Nov. 29, 2017, 17 pages.

Stuart, "Ryobi ToolBlox Tool Cabinet System!," TOOLGUYD, Sep. 18, 2014, https://toolguyd.com/ryobi-toolblox-cabinets/, 23 pages.

Stuart, "Sys-Cart Base, a Systainer Mounting Platform," TOOLGUYD, Jul. 28, 2014, https://toolguyd.com/systainer-sys-cart-mounting-base/, 11 pages.

Vertak, https://www.alibaba.com/product-detail/Vertak-global-patented-multi-funciton-portable_60217794260.html, believed to be available at least as early as Nov. 29, 2017.

Non-Final Rejection issued Apr. 12, 2018, in United States U.S. Appl. No. 15/826,201. (16 Pages).

International Search Report and Written Opinion for International Application No. PCT/IL2020/050433, dated Jun. 21, 2020, 14 pages.

Extended European search Report for Application No. 18892505.1 dated Sep. 17, 2021 (7 pages).

Inter Partes Review No. 2021-00373, "Petition for Inter Partes Review of U.S. Pat. No. 10,583,962" Filed Jan. 5, 2021, 198 pages.

Exhibit 1001 in Petition for Inter Partes Review of U.S. Pat. No. 10,583,962, filed Jan. 5, 2021, 64 Pages.

Exhibit 1002 in Petition for Inter Partes Review of U.S. Pat. No. 10,583,962, filed Jan. 5, 2021, 75 Pages.

Exhibit 1003 in Petition for Inter Partes Review of U.S. Pat. No. 10,583,962, filed Jan. 5, 2021, 13 Pages.

Exhibit 1004 in Petition for Inter Partes Review of U.S. Pat. No. 10,583,962, filed Jan. 5, 2021, 18 Pages.

Exhibit 1005 in Petition for Inter Partes Review of U.S. Pat. No. 10,583,962, filed Jan. 5, 2021, 9 Pages.

Exhibit 1006 in Petition for Inter Partes Review of U.S. Pat. No. 10,583,962, filed Jan. 5, 2021, 176 Pages.

(56) References Cited

OTHER PUBLICATIONS

Exhibit 1007 in Petition for Inter Partes Review of U.S. Pat. No. 10,583,962, filed Jan. 5, 2021, 22 Pages.
Exhibit 1008 in Petition for Inter Partes Review of U.S. Pat. No. 10,583,962, filed Jan. 5, 2021, 6 Pages.
Exhibit 1009 in Petition for Inter Partes Review of U.S. Pat. No. 10,583,962, filed Jan. 5, 2021, 24 Pages.
Exhibit 1010 in Petition for Inter Partes Review of U.S. Pat. No. 10,583,962, filed Jan. 5, 2021, 19 Pages.
Exhibit 1011 in Petition for Inter Partes Review of U.S. Pat. No. 10,583,962, filed Jan. 5, 2021, 26 Pages.
Exhibit 1012 in Petition for Inter Partes Review of U.S. Pat. No. 10,583,962, filed Jan. 5, 2021, 3 Pages.
Exhibit 1013 in Petition for Inter Partes Review of U.S. Pat. No. 10,583,962, filed Jan. 5, 2021, 168 Pages.
Exhibit 1014 in Petition for Inter Partes Review of U.S. Pat. No. 10,583,962, filed Jan. 5, 2021, 481 Pages.
Exhibit 1015 in Petition for Inter Partes Review of U.S. Pat. No. 10,583,962, filed Jan. 5, 2021, 6 Pages.
Exhibit 1016 in Petition for Inter Partes Review of U.S. Pat. No. 10,583,962, filed Jan. 5, 2021, 242 Pages.
Exhibit 1017 in Petition for Inter Partes Review of U.S. Pat. No. 10,583,962, filed Jan. 5, 2021, 6 Pages.
Exhibit 1018 in Petition for Inter Partes Review of U.S. Pat. No. 10,583,962, filed Jan. 5, 2021, 250 Pages.
Exhibit 1019 in Petition for Inter Partes Review of U.S. Pat. No. 10,583,962, filed Jan. 5, 2021, 44 Pages.
Exhibit 1020 in Petition for Inter Partes Review of U.S. Pat. No. 10,583,962, filed Jan. 5, 2021, 5 Pages.
Exhibit 1021 in Petition for Inter Partes Review of U.S. Pat. No. 10,583,962, filed Jan. 5, 2021, 1 Pages.
Exhibit 1022 in Petition for Inter Partes Review of U.S. Pat. No. 10,583,962, filed Jan. 5, 2021, 1 Pages.
Exhibit 1023 in Petition for Inter Partes Review of U.S. Pat. No. 10,583,962, filed Jan. 5, 2021, 24 Pages.
Exhibit 1024 in Petition for Inter Partes Review of U.S. Pat. No. 10,583,962, filed Jan. 5, 2021, 28 Pages.
Non-Final Rejection issued Jan. 24, 2019, in U.S. Appl. No. 16/216,724.
Final Rejection issued Nov. 28, 2018, in U.S. Appl. No. 15/826,232, 14 pages.
Inter Partes Review No. 2024-01400, "Petition for Inter Partes Review of U.S. Pat. No. 11,365,026" Filed Sep. 17, 2024, 147 pages.
Exhibit 1001 in Petition for Inter Partes Review of U.S. Pat. No. 11,365,026 Filed Sep. 17, 2024, 66 pages.
Exhibit 1002 in Petition for Inter Partes Review of U.S. Pat. No. 11,365,026 Filed Sep. 17, 2024, 324 pages.
Exhibit 1003 in Petition for Inter Partes Review of U.S. Pat. No. 11,365,026 Filed Sep. 17, 2024, 139 pages.
Exhibit 1004 in Petition for Inter Partes Review of U.S. Pat. No. 11,365,026 Filed Sep. 17, 2024, 17 pages.
Exhibit 1005 in Petition for Inter Partes Review of U.S. Pat. No. 11,365,026 Filed Sep. 17, 2024, 9 pages.
Exhibit 1006 in Petition for Inter Partes Review of U.S. Pat. No. 11,365,026 Filed Sep. 17, 2024, 21 pages.
Exhibit 1007 in Petition for Inter Partes Review of U.S. Pat. No. 11,365,026 Filed Sep. 17, 2024, 16 pages.
Exhibit 1008 in Petition for Inter Partes Review of U.S. Pat. No. 11,365,026 Filed Sep. 17, 2024, 31 pages.
Exhibit 1009 in Petition for Inter Partes Review of U.S. Pat. No. 11,365,026 Filed Sep. 17, 2024, 6 pages.
Exhibit 1010 in Petition for Inter Partes Review of U.S. Pat. No. 11,365,026 Filed Sep. 17, 2024, 4 pages.
Exhibit 1011 in Petition for Inter Partes Review of U.S. Pat. No. 11,365,026 Filed Sep. 17, 2024, 16 pages.
Exhibit 1012 in Petition for Inter Partes Review of U.S. Pat. No. 11,365,026 Filed Sep. 17, 2024, 8 pages.
Exhibit 1013 in Petition for Inter Partes Review of U.S. Pat. No. 11,365,026 Filed Sep. 17, 2024, 19 pages.
Exhibit 1014 in Petition for Inter Partes Review of U.S. Pat. No. 11,365,026 Filed Sep. 17, 2024, 35 pages.
Exhibit 1015 in Petition for Inter Partes Review of U.S. Pat. No. 11,365,026 Filed Sep. 17, 2024, 11 pages.
Exhibit 1016 in Petition for Inter Partes Review of U.S. Pat. No. 11,365,026 Filed Sep. 17, 2024, 193 pages.
Exhibit 1017 in Petition for Inter Partes Review of U.S. Pat. No. 11,365,026 Filed Sep. 17, 2024, 29 pages.
Exhibit 1018 in Petition for Inter Partes Review of U.S. Pat. No. 11,365,026 Filed Sep. 17, 2024, 15 pages.
Exhibit 1019 in Petition for Inter Partes Review of U.S. Pat. No. 11,365,026 Filed Sep. 17, 2024, 19 pages.
Exhibit 1020 in Petition for Inter Partes Review of U.S. Pat. No. 11,365,026 Filed Sep. 17, 2024, 18 pages.
Exhibit 1021 in Petition for Inter Partes Review of U.S. Pat. No. 11,365,026 Filed Sep. 17, 2024, 313 pages.
Exhibit 1030 in Petition for Inter Partes Review of U.S. Pat. No. 11,365,026 Filed Sep. 17, 2024, 95 pages.
Exhibit 1031 in Petition for Inter Partes Review of U.S. Pat. No. 11,365,026 Filed Sep. 17, 2024, 5 pages.
Exhibit 1032 in Petition for Inter Partes Review of U.S. Pat. No. 11,365,026 Filed Sep. 17, 2024, 19 pages.
Inter Partes Review No. 2024-01401, "Petition for Inter Partes Review of U.S. Pat. No. 11,794,952" Filed Sep. 17, 2024, 165 pages.
Exhibit 1001 in Petition for Inter Partes Review of U.S. Pat. No. 11,794,952 Filed Sep. 17, 2024, 67 pages.
Exhibit 1002 Part 1 in Petition for Inter Partes Review of U.S. Pat. No. 11,794,952 Filed Sep. 17, 2024, 227 pages.
Exhibit 1002 Part 2 in Petition for Inter Partes Review of U.S. Pat. No. 11,794,952 Filed Sep. 17, 2024, 278 pages.
Exhibit 1003 in Petition for Inter Partes Review of U.S. Pat. No. 11,794,952 Filed Sep. 17, 2024, 168 pages.
Exhibit 1004 in Petition for Inter Partes Review of U.S. Pat. No. 11,794,952 Filed Sep. 17, 2024, 17 pages.
Exhibit 1005 in Petition for Inter Partes Review of U.S. Pat. No. 11,794,952 Filed Sep. 17, 2024, 9 pages.
Exhibit 1006 in Petition for Inter Partes Review of U.S. Pat. No. 11,794,952 Filed Sep. 17, 2024, 21 pages.
Exhibit 1007 in Petition for Inter Partes Review of U.S. Pat. No. 11,794,952 Filed Sep. 17, 2024, 16 pages.
Exhibit 1008 in Petition for Inter Partes Review of U.S. Pat. No. 11,794,952 Filed Sep. 17, 2024, 31 pages.
Exhibit 1009 in Petition for Inter Partes Review of U.S. Pat. No. 11,794,952 Filed Sep. 17, 2024, 6 pages.
Exhibit 1010 in Petition for Inter Partes Review of U.S. Pat. No. 11,794,952 Filed Sep. 17, 2024, 4 pages.
Exhibit 1011 in Petition for Inter Partes Review of U.S. Pat. No. 11,794,952 Filed Sep. 17, 2024, 16 pages.
Exhibit 1012 in Petition for Inter Partes Review of U.S. Pat. No. 11,794,952 Filed Sep. 17, 2024, 8 pages.
Exhibit 1013 in Petition for Inter Partes Review of U.S. Pat. No. 11,794,952 Filed Sep. 17, 2024, 19 pages.
Exhibit 1014 in Petition for Inter Partes Review of U.S. Pat. No. 11,794,952 Filed Sep. 17, 2024, 35 pages.
Exhibit 1015 in Petition for Inter Partes Review of U.S. Pat. No. 11,794,952 Filed Sep. 17, 2024, 11 pages.
Exhibit 1016 in Petition for Inter Partes Review of U.S. Pat. No. 11,794,952 Filed Sep. 17, 2024, 193 pages.
Exhibit 1017 in Petition for Inter Partes Review of U.S. Pat. No. 11,794,952 Filed Sep. 17, 2024, 29 pages.
Exhibit 1018 in Petition for Inter Partes Review of U.S. Pat. No. 11,794,952 Filed Sep. 17, 2024, 15 pages.
Exhibit 1019 in Petition for Inter Partes Review of U.S. Pat. No. 11,794,952 Filed Sep. 17, 2024, 19 pages.
Exhibit 1020 in Petition for Inter Partes Review of U.S. Pat. No. 11,794,952 Filed Sep. 17, 2024, 18 pages.
Exhibit 1021 in Petition for Inter Partes Review of U.S. Pat. No. 11,794,952 Filed Sep. 17, 2024, 313 pages.
Exhibit 1022 in Petition for Inter Partes Review of U.S. Pat. No. 11,794,952 Filed Sep. 17, 2024, 324 pages.
Exhibit 1023 in Petition for Inter Partes Review of U.S. Pat. No. 11,794,952 Filed Sep. 17, 2024, 5 pages.

(56) References Cited

OTHER PUBLICATIONS

Exhibit 1024 in Petition for Inter Partes Review of U.S. Pat. No. 11,794,952 Filed Sep. 17, 2024, 7 pages.
Exhibit 1025 in Petition for Inter Partes Review of U.S. Pat. No. 11,794,952 Filed Sep. 17, 2024, 15 pages.
Exhibit 1026 in Petition for Inter Partes Review of U.S. Pat. No. 11,794,952 Filed Sep. 17, 2024, 37 pages.
Exhibit 1027 in Petition for Inter Partes Review of U.S. Pat. No. 11,794,952 Filed Sep. 17, 2024, 7 pages.
Exhibit 1028 in Petition for Inter Partes Review of U.S. Pat. No. 11,794,952 Filed Sep. 17, 2024, 33 pages.
Exhibit 1030 in Petition for Inter Partes Review of U.S. Pat. No. 11,794,952 Filed Sep. 17, 2024, 95 pages.
Exhibit 1031 in Petition for Inter Partes Review of U.S. Pat. No. 11,794,952 Filed Sep. 17, 2024, 5 pages.
Exhibit 1032 in Petition for Inter Partes Review of U.S. Pat. No. 11,794,952 Filed Sep. 17, 2024, 60 pages.
Respondent's Notice of Prior Art, Investigation No. 337-TA-1409, dated Oct. 29, 2024, 11 pages.

\* cited by examiner

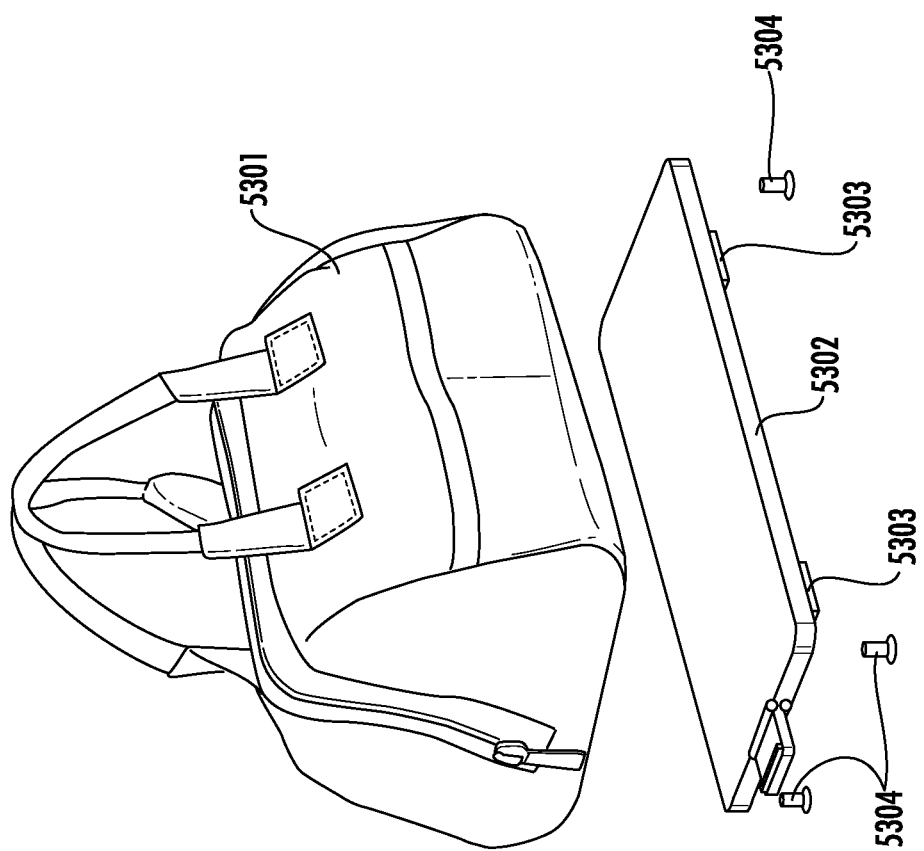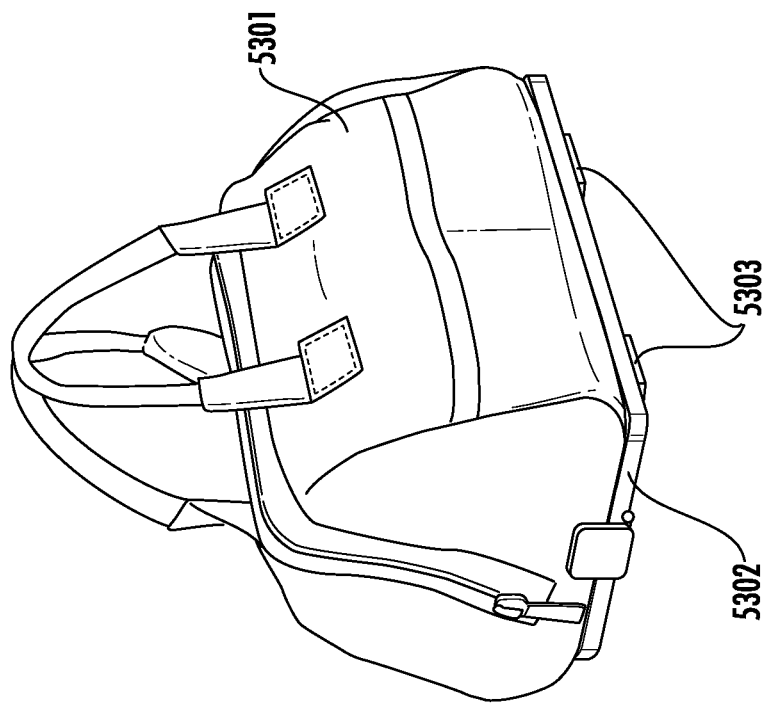
FIG. 53

STORAGE DEVICE SYSTEM

CROSS-REFERENCE TO RELATED PATENT APPLICATIONS

This application is a continuation of U.S. application Ser. No. 16/777,181, filed Jan. 30, 2020, which is a continuation of International Application No. PCT/US2018/044629, filed Jul. 31, 2018, which claims priority to U.S. Provisional Patent Application No. 62/538,860, filed Jul. 31, 2017, and to U.S. Provisional Patent Application No. 62/594,292, filed Dec. 4, 2017, and to U.S. Provisional Patent Application No. 62/608,302, filed Dec. 20, 2017, and to U.S. Provisional Patent Application No. 62/609,985, filed Dec. 22, 2017, and to U.S. Provisional Patent Application No. 62/613,263, filed Jan. 3, 2018, and to U.S. Provisional Patent Application No. 62/621,403, filed Jan. 24, 2018, and to U.S. Provisional Patent Application No. 62/634,537, filed Feb. 23, 2018, the entire contents of each of which are hereby incorporated by reference in there entireties.

BACKGROUND

The present invention relates to storage devices, including bags, storage totes, tool boxes and organizers.

Tool storage devices are often used to transport tools and accessories. Tool storage devices include soft-sided storage devices such as a tool bags, and rigid storage devices such as tool boxes and organizers. Soft-sided storage devices include walls made of flexible material and typically have a bottom made of a rigid material. Rigid storage devices include a rigid base and a rigid cover coupled thereto. The rigid base may include dividers and storage compartments for storing and organizing tools and accessories.

BRIEF DESCRIPTION OF THE DRAWINGS

FIG. 53 illustrates soft storage bags (e.g., totes or tool bags) having a hard (plastic) plate on the bottom that allows the soft bag to be secured to the systems described above.

FIG. 55 illustrates that in another embodiment, a surface with retractable/foldable legs has cleat receptacles that can be used to snap a tool box having a cleat to.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION OF EMBODIMENTS

Figure 1:
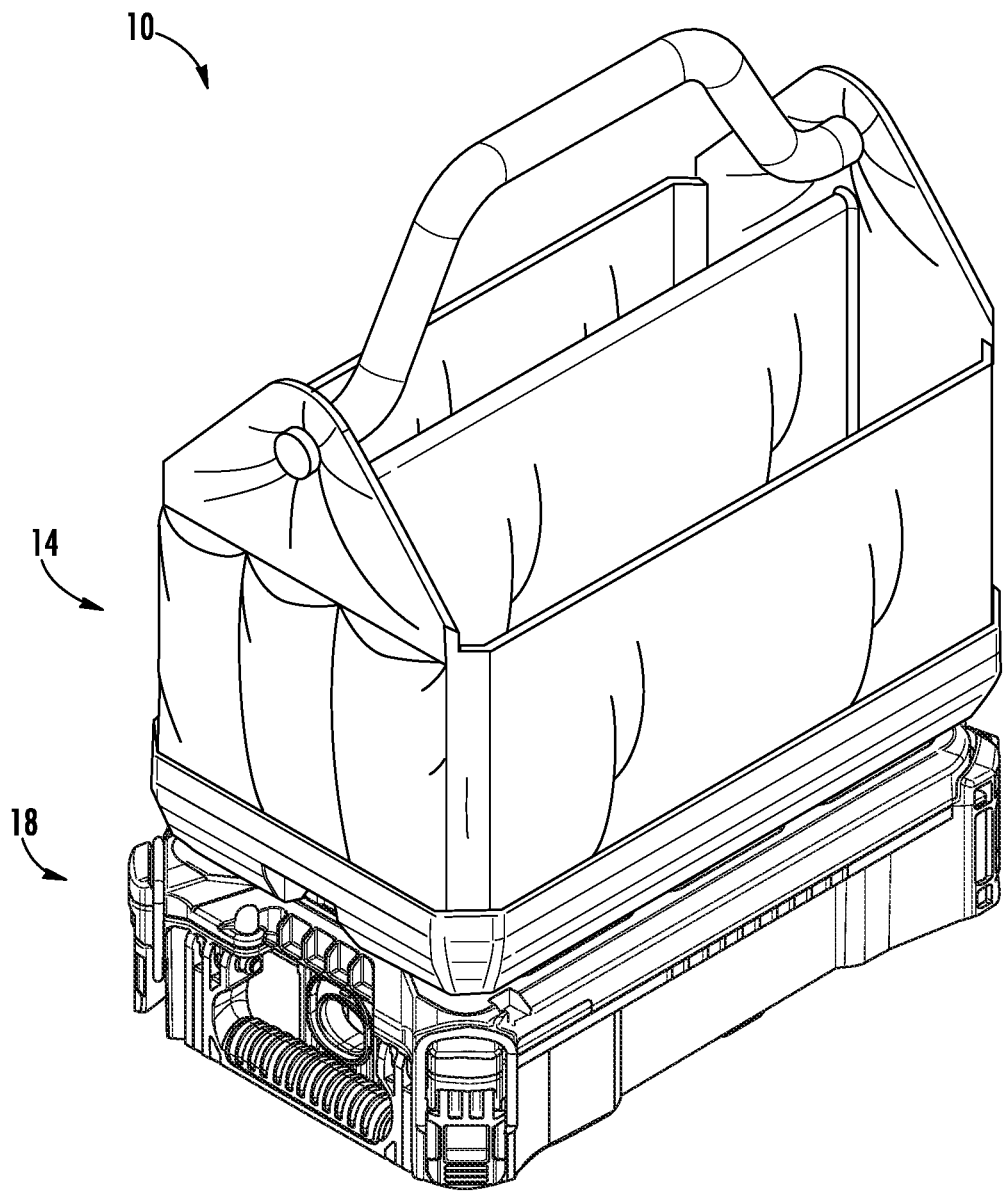
FIG. 1 is a perspective view of a storage device system including a soft-sided storage device coupled to a rigid storage device.

FIG. 1 illustrates a storage device system 10 including a soft-sided storage device 14, such as soft-sided bag, removably coupled to a hard-sided or rigid storage device 18, such as a rigid storage case (e.g., a rigid tool box or organizer).

Figure 2:
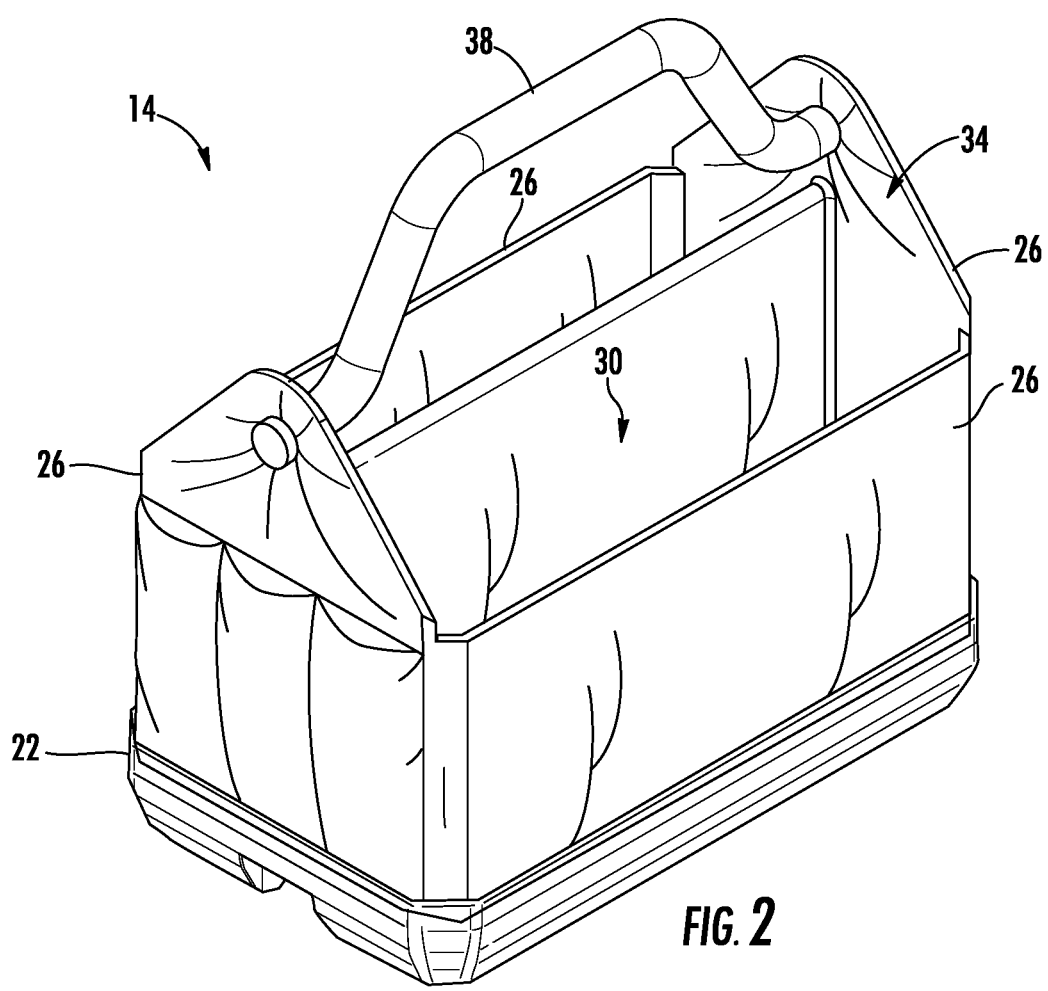
FIG. 2 is a perspective view of the soft-sided storage device of FIG. 1.
Figure 3:
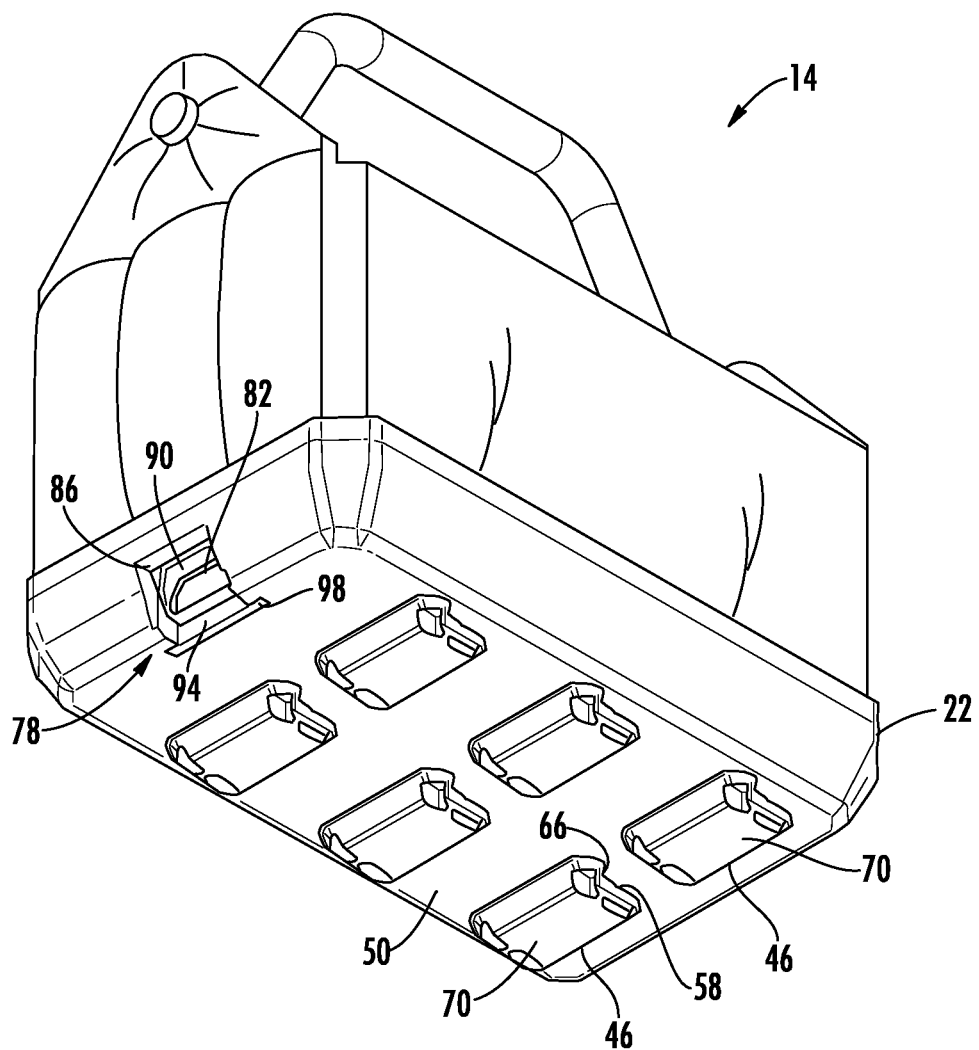
FIG. 3 is a bottom perspective view of the soft-sided storage device of FIG. 2.
Figure 4:
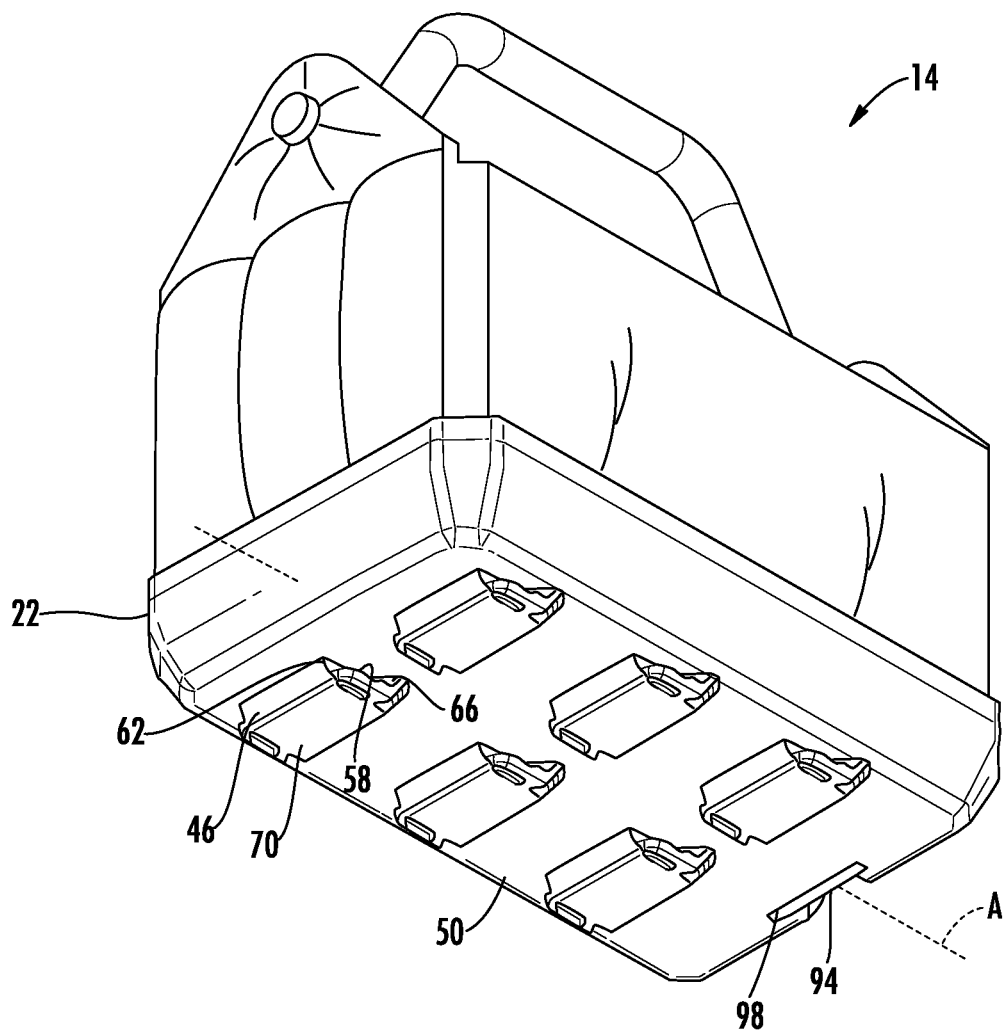
FIG. 4 is another bottom perspective view of the soft-sided storage device of FIG. 2.

With reference to FIGS. 2-4, the bag 14 includes a rigid or hard bottom member 22 (e.g., thermoform plastic, injection molded, etc.) and flexible sidewalls 26 cooperating to define a storage compartment 30. The sidewalls 26 define an open top 34 for access to the storage compartment 30. A handle 38 is connected between opposite sidewalls 26 and is engageable by a user to carry the bag 14.

One or more interface or connection projections 46 are provided on the bottom member 22. In the illustrated embodiment, each projection 46 extends from a bottom surface 50 of the bottom member 22 and is configured to cooperate with a connection recess 54 (FIGS. 5-6) on the storage case 18 to interface and connect the bag 14 to the storage case 18. In the illustrated embodiment, each projection 46 is formed integrally with the bottom member 22, for example, in a thermoforming process. Each projection 46 has a channel 58 on each side of the projection 46 extending parallel to a longitudinal axis A of the bottom member 22, as best shown in FIG. 4. Each channel 58 has a front, open end 62 and a back, closed end 66 along the axis A. Each projection 46 has a planar surface 70 with a generally rectangular shape. In other embodiments, the planar surface 70 may be another shape, e.g., circular, triangular, etc. In the illustrated embodiment, there are six projections 46 arranged in three rows of two along the axis A. In other embodiments, the bag 14 may include fewer or more projections 46, and/or the projections 46 may be arranged in different patterns. The projections 46 are arranged such that the bag 14 can be supported on a surface by the projections 46 through contact with the planar surfaces 70.

Figure 9:
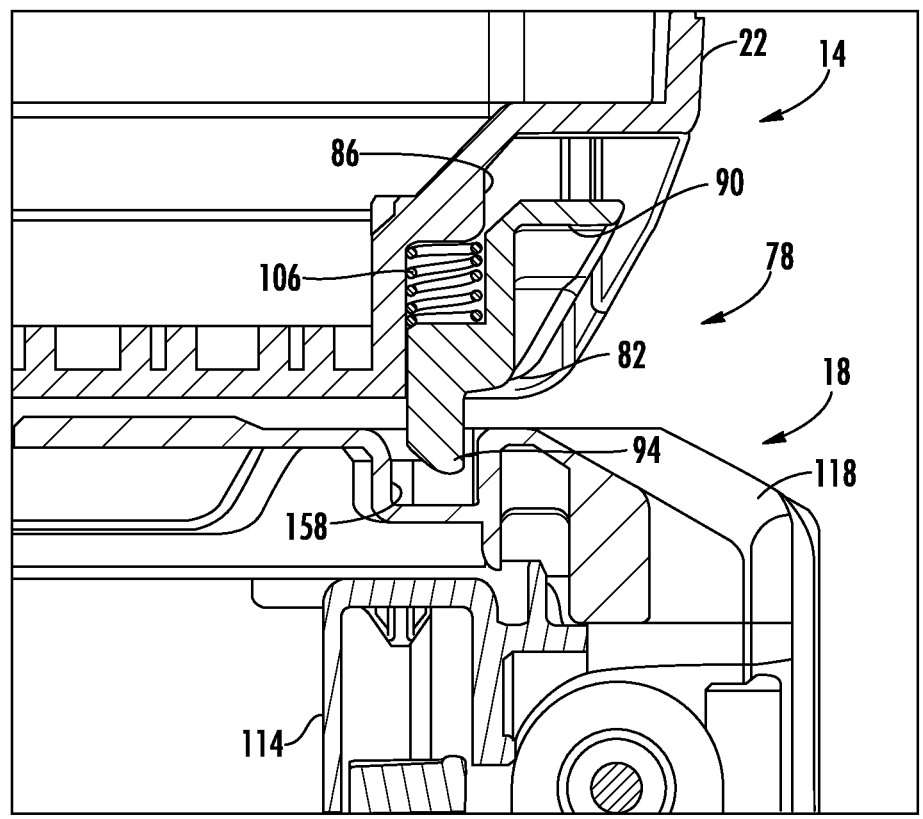
FIG. 9 is an enlarged cross-sectional view of a portion of the storage device system of FIG. 1, illustrating a latch assembly in a locking position.
Figure 10:
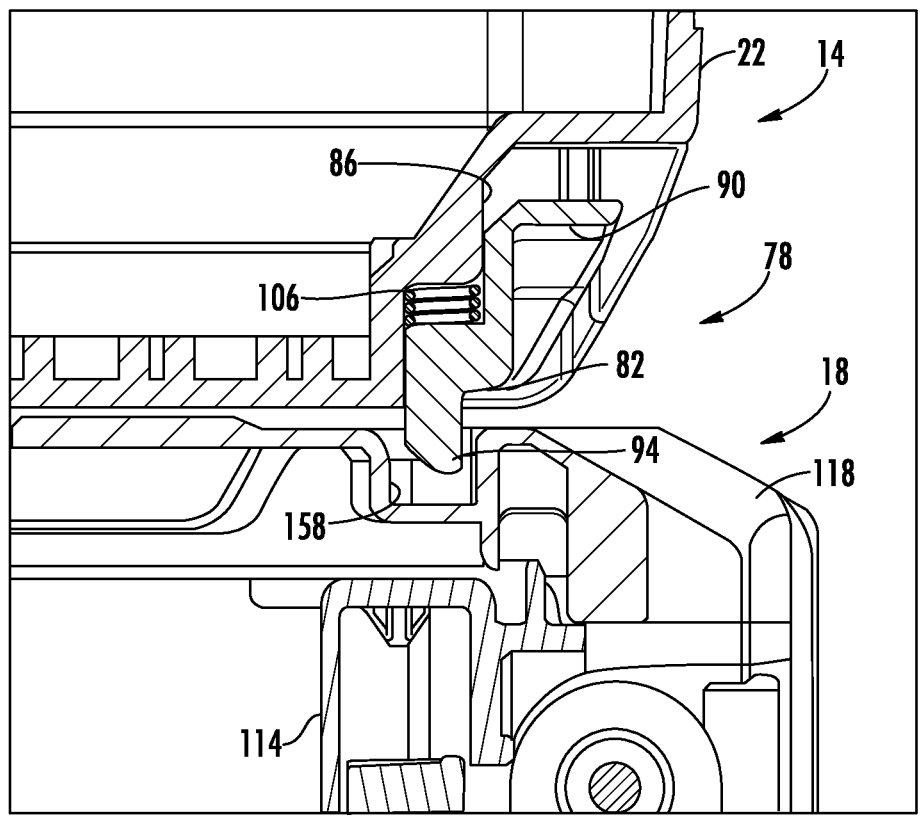
FIG. 10 is an enlarged cross-sectional view of the portion of the storage device system shown in FIG. 9, illustrating the latch assembly in an unlocking position.

The bag 14 further includes a latch assembly 78 including a latch member 82, as shown in FIG. 3. The latch assembly 78 is supported by the bottom member 22 within a latch passage 86 defined in the bottom member 22. The latch member 82 includes a grip portion 90 and an interference portion 94. The latch member 82 is slidingly movable along an axis perpendicular to the longitudinal axis A of the bottom member 22 within the latch passage 86. The interference portion 94 selectively protrudes from the latch passage 86 through a slot 98 defined in the bottom surface 50 of the bottom member 22. The interference portion 94 has a tapered surface 102 (FIG. 7) at a distal end thereof. The latch member 82 is movable between a first or locking position (FIG. 9) in which the interference portion 94 extends through the slot 98, and a second or unlocking position (FIG. 10) in which the interference portion 94 is retracted into the latch passage 86 and does not extend through the slot 98. The latch assembly 78 further includes a biasing member 106 (e.g., a compression spring) arranged to bias the latch member 82 into the locking position (FIG. 9). The latch member 82 may be urged against the biasing member 106 to the unlocking position (FIG. 10) by pushing on the grip portion 90. In the locking position, the interference portion 94 does not extend beyond the planar surfaces 70 of the projections 46.

Figure 5:
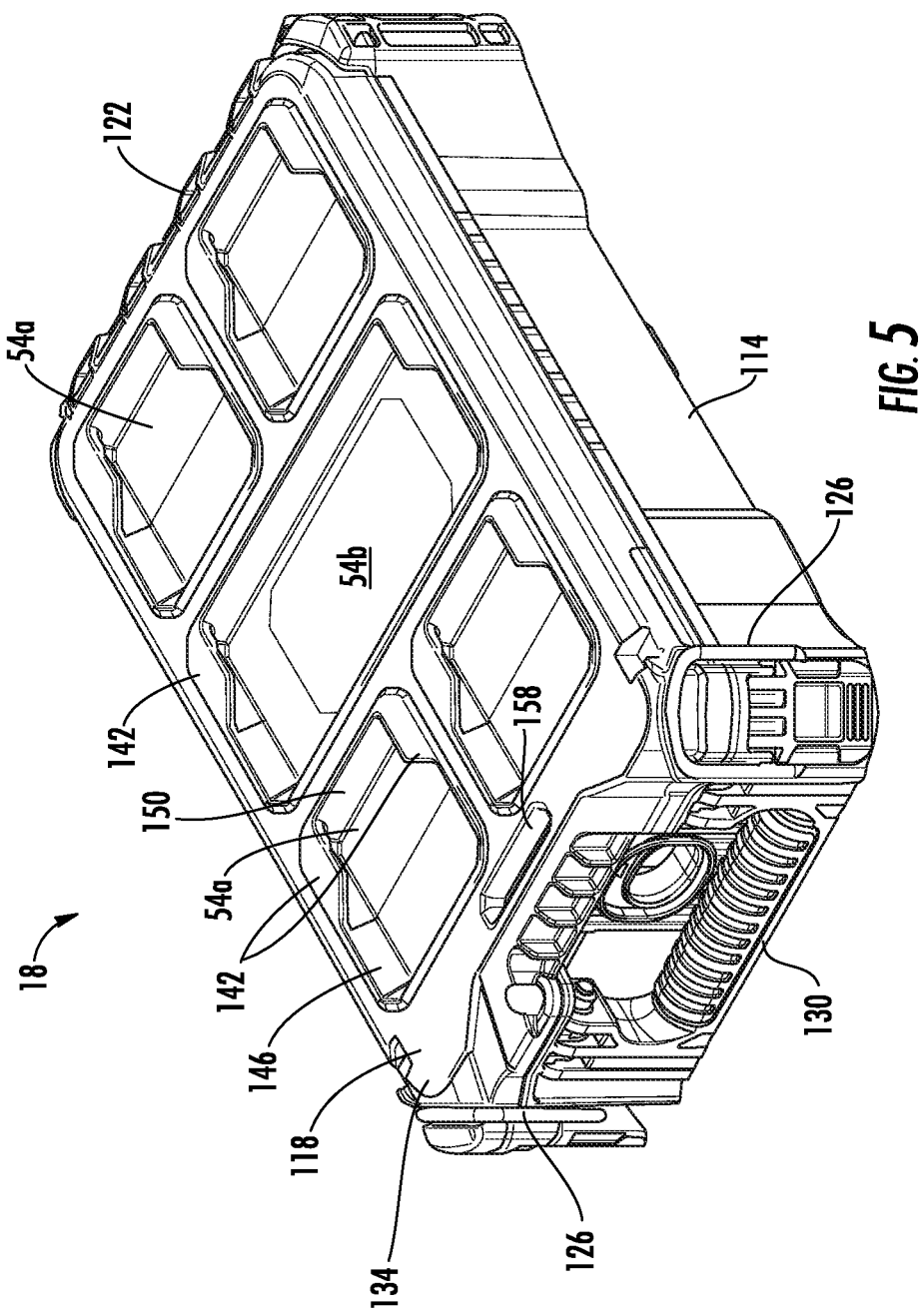
FIG. 5 is a top perspective view of the rigid storage device of FIG. 1.
Figure 6:
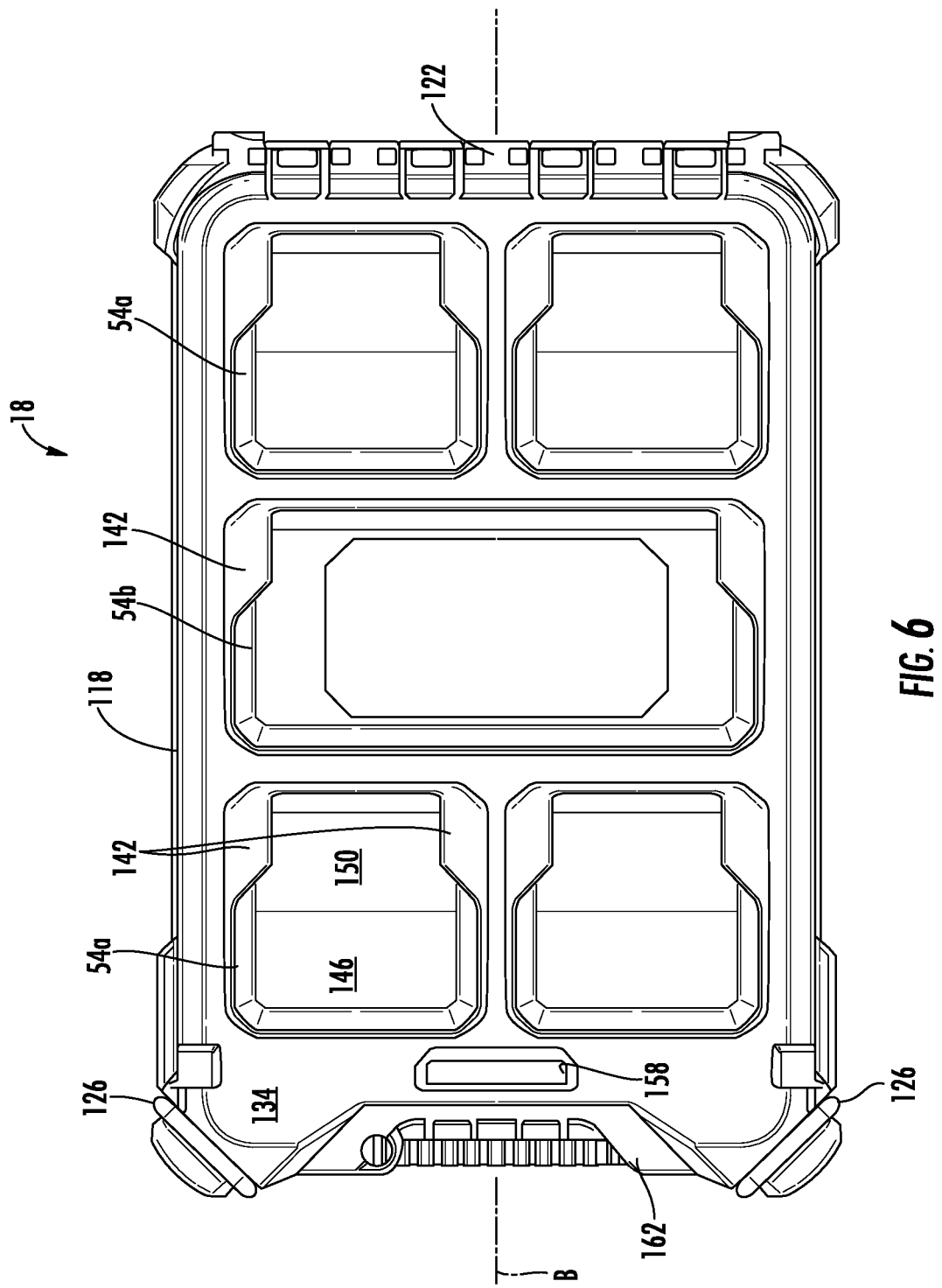
FIG. 6 is a top view of the rigid storage device of FIG. 5.
Figure 11:
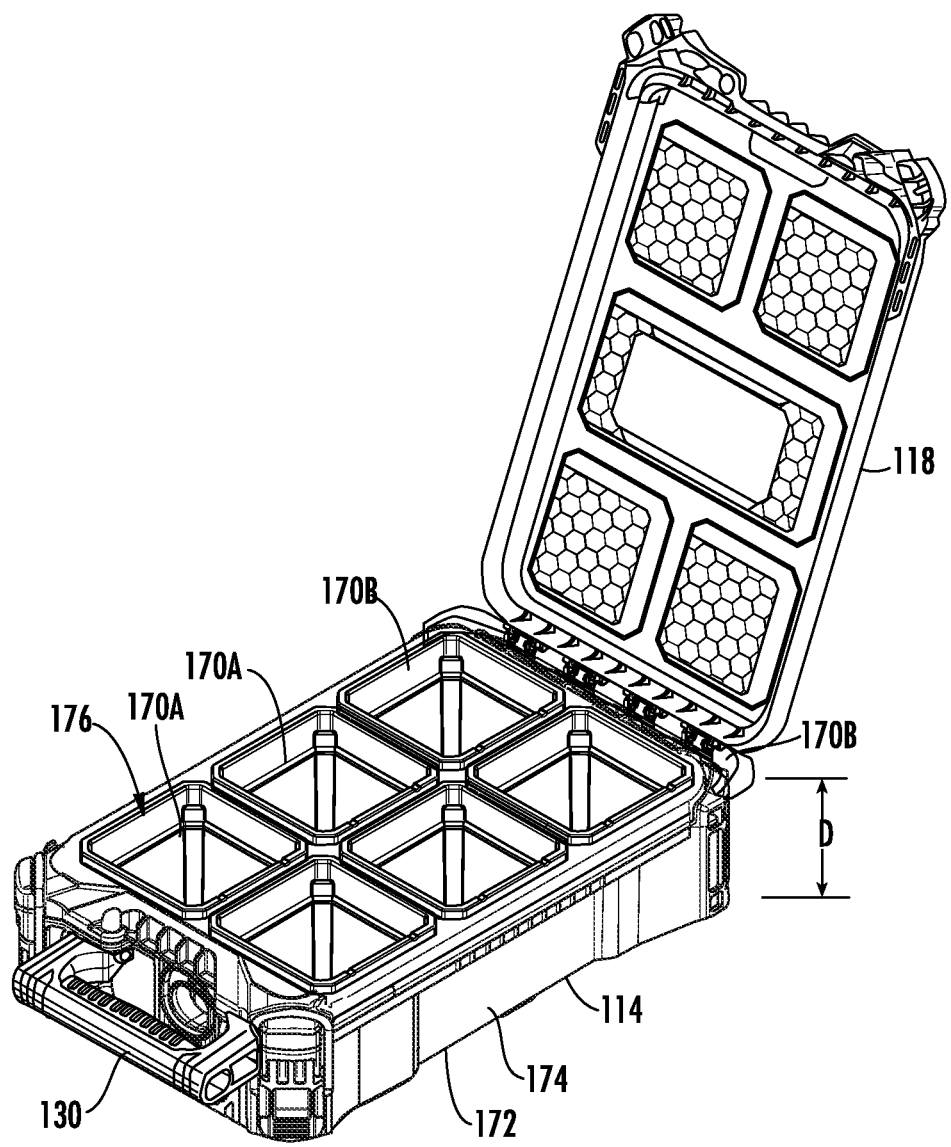
FIG. 11 is a perspective view of the rigid storage device of FIG. 5, illustrating a cover in an open position.
Figure 12:
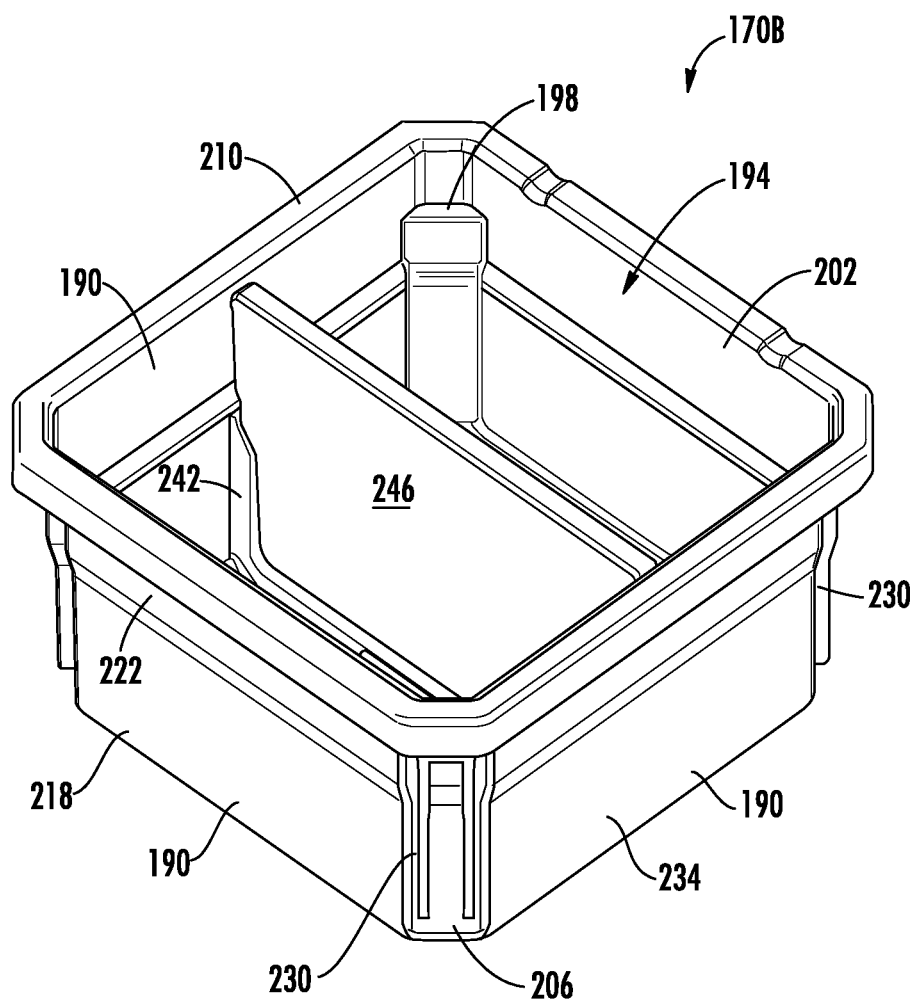
FIG. 12 is a top perspective view of a bin for use with the storage case.

With reference to FIGS. 5 and 6, the storage case 18 includes a base 114 and a top or cover 118. The cover 118 is movably coupled to the base 114 between a closed position (FIG. 5) and an open position (FIG. 11). In the illustrated embodiment, the cover 118 is pivotally coupled to the base 114 by a hinge 122. The cover 118 includes cover latches 126 to releasably secure the cover 118 in the closed position. The storage case 18 also includes a side handle 130 to facilitate independently carrying the storage case 18.

With continued reference to FIGS. 5 and 6, a top surface 134 of the cover 118 defines the connection recesses 54 that receive and cooperate with the projections 46. In the illustrated embodiment, the connection recesses 54 include two rows of two small recesses 54a corresponding to two rows of two projections 46 and one large recess 54b corresponding to a row of two projections 46. In other embodiments, the cover 118 may include different numbers of patterns of recesses 54, depending on the arrangement of the projections 46 on the bag 14. When the projections 46 are received in the connection recesses 54, the bottom surface 50 of the bottom member 22 is arranged to contact and be supported by the top surface 134 of the cover 118.

Figure 7:
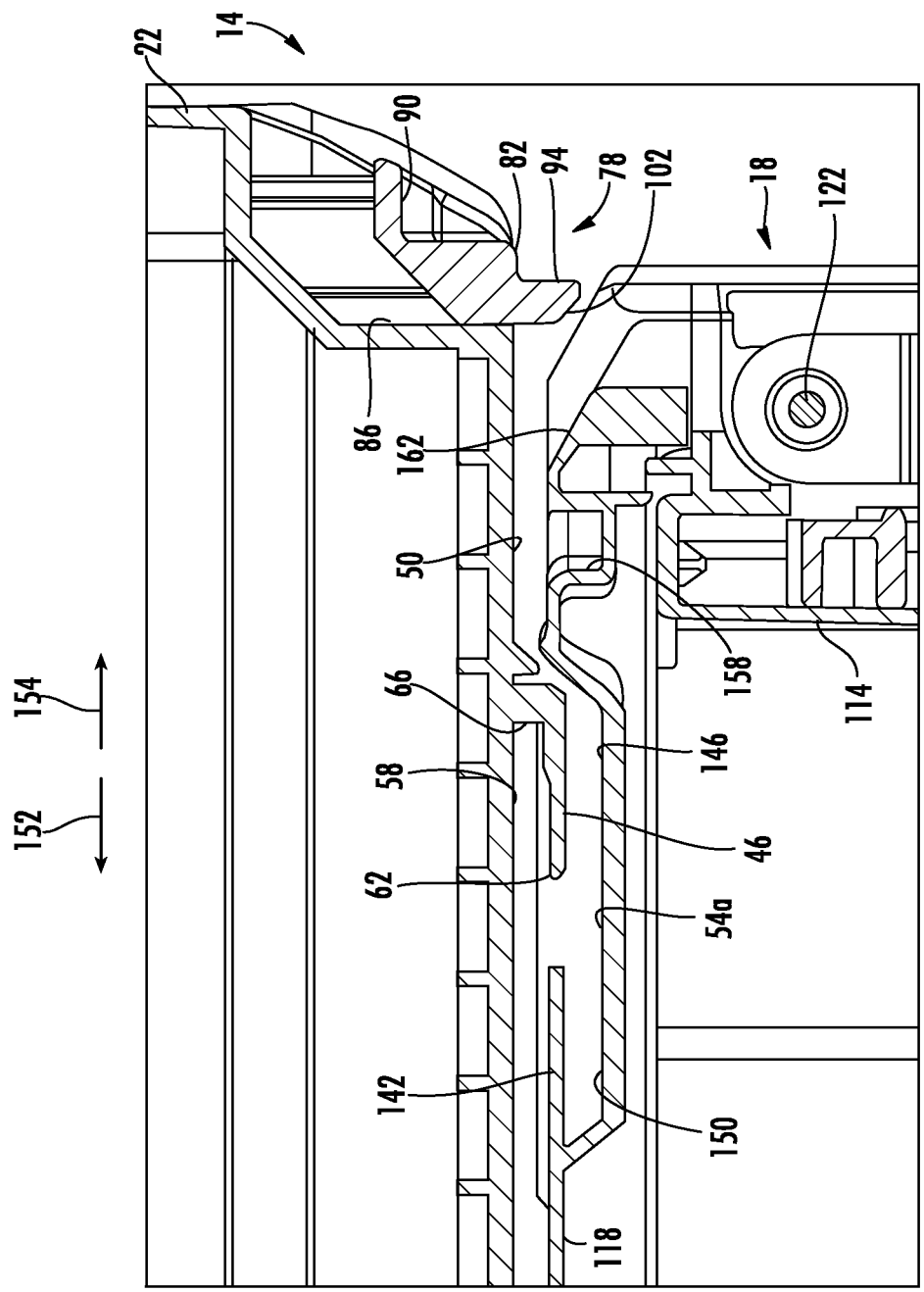
FIG. 7 is an enlarged cross-sectional view of a portion of the storage device system of FIG. 1, illustrating a bottom of the soft-sided storage device disengaged from a top of the rigid storage device.
Figure 8:
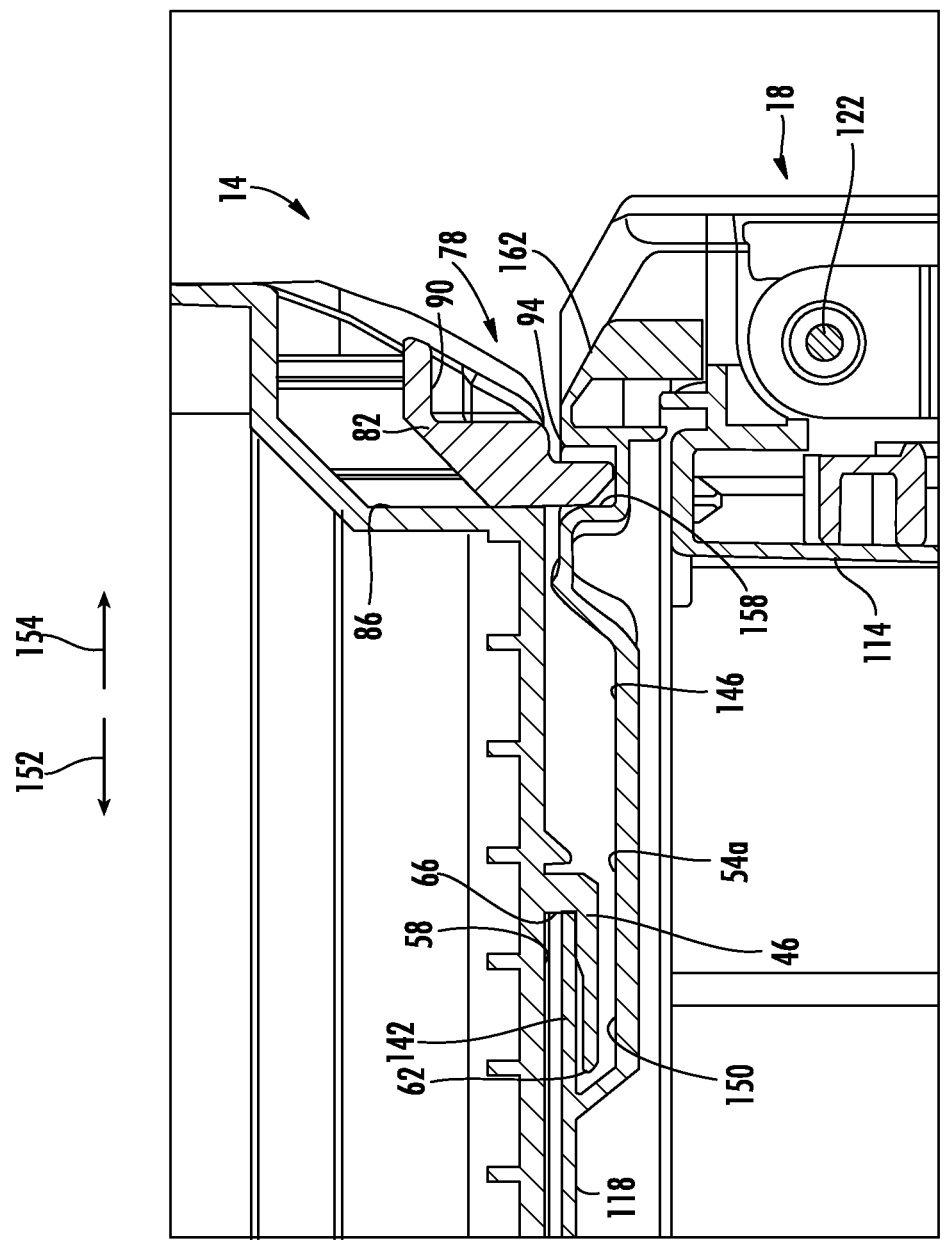
FIG. 8 is an enlarged cross-sectional view of the portion of the storage device system shown in FIG. 7, illustrating the bottom of the soft-sided storage device engaged with the top of the rigid storage device.

An interference projection or wing 142 extends into each connection recess 54 parallel to a longitudinal axis B of the cover 118 on opposite sides of the connection recess 54 from one end of the connection recess 54. Each of the wings 142 corresponds to and is configured to cooperate with a corresponding one of the channels 58 of the projection 46 received by the respective connection recess 54. Each of the wings 142 has a length that extends approximately half the connection recess 54 to define a first portion 146 of the connection recess 54 and a second portion 150 opposite the wings 142, which remains open. In some embodiments, each of the wings 142 has a length that extends less than half the connection recess 54. The second portion 150 of each connection recess 54 is sized to receive one of the projections 46 generally perpendicular to the longitudinal axis B into a first, disconnected position (FIG. 7). In the disconnected position, the projections 46 are oriented within the connection recesses 54 such that the open ends 62 of the channels 58 are nearer to the wings 142 than the closed ends 66. Once in the disconnected position, the bottom member 22 may be slid relative to the cover 118 parallel the longitudinal axes A, B in a first direction 152 toward the wings 142 such that the wings 142 are received within the channels 58 in a second, interfaced or connected position (FIG. 8). The wings 142 and the projections 46 engage within the connection recesses 54 to interface and connect the bottom member 22 with the cover 118 and prevent disconnection of the bottom member 22 from the cover 118, except in a second direction 154 opposite the first direction 152 and generally parallel to the longitudinal axes A, B. The wings 142 and the channels 58 engage one another perpendicular to the longitudinal axes A, B (i.e., perpendicular to the top surface 134 of the cover 118 and the bottom surface 50 of the bottom member 22) when carrying the bag 14 and the storage case 18 as a single unit via the handle 38 of the bag 14 (see FIG. 1).

With continued reference to FIGS. 5 and 6, the top surface 134 of the cover 118 further defines an interference or locking aperture 158. In the illustrated embodiment, the locking aperture 158 is located at one end of the cover 118. The end of the cover 118 has a sloped surface 162 adjacent the locking aperture 158. The locking aperture 158 is elongate and extends transverse to the longitudinal axis B of the cover 118 parallel to a short side of the cover 118. The locking aperture 158 is located such that when the bottom member 22 and the cover 118 are in the connected position, the locking aperture 158 is aligned with the interference portion 94 of the latch member 82. The locking aperture 158 is sized to receive and engage the interference portion 94 when the latch member 82 is in the locking position (FIG. 9). When the interference portion 94 is engaged with the locking aperture 158 in the locking position, the latch member 82 obstructs movement of the bottom member 22 relative to the cover 118 from the connected position to the disconnected position in the second direction 154, thereby inhibiting disconnection of the bag 14 from the storage case 18. In particular, the interference portion 94 interferes with the cover 118 within the locking aperture 158 such that the wings 142 cannot be removed from the channels 58 of the projections 46 in the second direction 154.

A user may couple the soft-sided bag 14 to the rigid storage case 18 to carry as a coupled unit by first, inserting the connection projections 46 of the bottom member 22 in a direction perpendicular to the cover 118 and into the second portion 150 of the connection recesses 54 of the cover 118 such that the cover 118 supports the bag 14 in the disconnected position (FIG. 7). The bottom member 22 and the cover 118 are oriented such their longitudinal axes A, B are parallel, and the latch assembly 78 is nearest the end of the cover 118 defining the locking aperture 158. The bag 14 (i.e., the bottom member 22) is then manually slid in the first direction 152 such that the wings 142 are received in the channels 58 through the open end 62 of the channels 58 until the wings 142 abut the closed end 66 of the channels 58 in the connected position (FIG. 8). As the bottom member 22 slides relative to the cover 118 from the disconnected position to the connected position, the latch member 82, which is biased into the locking position (FIGS. 7 and 9) by the biasing member 106, is urged into the unlocking position (FIG. 8) by the sloped surface 162 of the cover 118 until aligned with the locking aperture 158 when in the connected position. The biasing member 106 then automatically biases the latch member 82 back into the locking position (FIG. 9) in which the interference portion 94 is received in and engages the locking aperture 158. Alternatively, a user may urge the latch member 82 into the unlocking position (FIG. 10) by pushing on the grip portion 90 upwardly against the biasing force of the biasing member 106. The user holds the latch member 82 in the unlocking position while sliding the bag 14 in the first direction 152 from the disconnected position to the connected position. Once in the connected position (FIG. 10), the user may release the latch member 82, thereby allowing the latch member 82 to be biased into the locking position where the interference portion 94 is received in and engages the locking aperture 158. The interference portion 94 of the latch member 82 extends into the locking aperture, thereby inhibiting relative movement of the bag 14 and the storage case 18 in the second direction 154 parallel to the longitudinal axes A, B. Accordingly, the latch assembly 78 and the locking aperture 158 cooperate to secure the softsided bag 14 and the rigid storage case 18 in the connected position as a unit to be carried by the handle 38 of the bag 14. The handle 38 is positioned such that when the bag 14 and the storage case 18 are coupled as a unit, the handle 38 is above a center of gravity of the coupled unit.

When the soft-sided bag 14 and the rigid storage case 18 are coupled together, the user may quickly decouple them to carry or access each of the storage devices 14, 18 separately. The user first urges the latch member 82 into the unlocking position (FIG. 10) by pushing on the grip portion 90 upwardly against the biasing force of the biasing member 106. While holding the latch member 82 in the unlocking position, the user then slides the bag 14 relative to the cover 118 in the second direction 154 along the longitudinal axes A, B from the connected position (FIG. 8) to the disconnected position (FIG. 7). The wings 142 disengage from the channels 58 and the projections 46 are moved into the second portion 150 of the connection recesses 54, allowing the bag 14 to be disconnected in a direction away from and perpendicular to the top surface 134 of the cover 118.

The latch assembly 78 is dimensioned and constructed to be movable between the locking and unlocking positions to couple the bag 14 to the cover 118. The latch assembly 78 does not interfere with opening the storage case 18 so that the storage case 18 on the bottom will still be able to be opened with the soft-sided bag 14 attached to the cover 118.

It should be understood that, in other constructions, multiple latch assemblies 78 and corresponding locking apertures 158 may be provided on the bag 14 and the storage case 18. Such an arrangement may, for example, provide an increased connection between the storage devices 14, 18, balance or reduce the load on a given latch assembly, etc.

It should also be understood that, in other constructions, the latch assembly 78 and the locking aperture 158 may be reversed (e.g., the movable latch member 82 and the biasing member 106 may be supported on the cover 118 or the base 114 of the storage case 18, and the locking aperture 158 may be defined by the bottom member 22 of the bag 14). Additionally or alternatively, the relative locations of the projections 46 and the recesses 54 may be reversed (e.g., the projections 46 may extend from the cover 118 of the storage case 18, and the recesses 54 may be formed in the bottom member 22 of the soft-sided bag 14).

As shown in FIG. 1, the storage devices 14, 18 have approximately the same perimeter dimensions. There is one pair of latch assembly 78 and locking aperture 158 at one end of the storage devices 14, 18. However, in alternate embodiments, the storage devices 14, 18 may have different perimeter dimensions (e.g., the bag 14 is shorter than the storage case 18). In such embodiments, the bag 14 may have fewer projections 46 arranged such that the bag 14 may be connected to the storage case 18 in substantially the same manner as described above, except where one or more of the connection recesses 54 in the cover 118 does not receive a projection 46. Additionally or alternatively, in some embodiments multiple soft-sided bags 14 having smaller dimensions than the storage case 18 may be simultaneously connected to the storage case 18.

Figure 13:
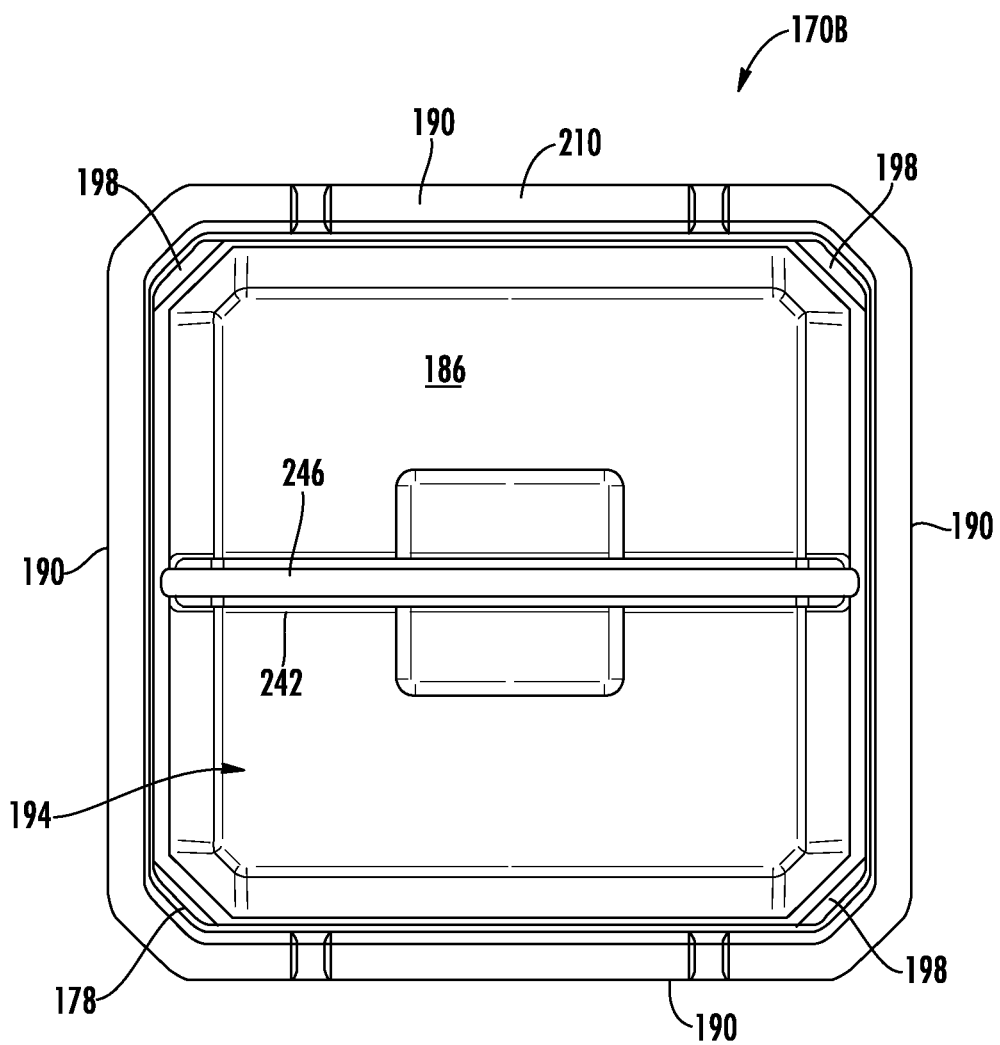
FIG. 13 is a top view of the bin of FIG. 12.

As shown in FIG. 11, a plurality of bins 170A, 170B, or inserts, are positioned within the base 114. The base 114 includes a bottom wall 172 and sidewalls 174 extending from the bottom wall defining an interior 176 with a depth D. The bins 170A, 170B are independently removable from the storage case 18 when the storage case 18 is open (i.e., the cover 118 is in the open position), as shown in FIG. 11. The bins 170A, 170B include relatively tall, or deep, bins 170A (FIG. 18) and relatively short, or shallow, bins 170B (FIGS. 12-17). The illustrated bins 170A, 170B are generally composed of plastic, but may alternatively be made of other materials. Each of the illustrated bins 170A, 170B is generally square in shape when viewed from above (FIG. 13). In other embodiments, the bins 170A, 170B may have other shapes (e.g., triangular, octagonal, circular, etc.). In the illustrated embodiment, the bins 170A, 170B are arranged within the base 114 as a grid of six (i.e., three rows of two). In other embodiments, the base 114 may be shaped and sized to receive a larger or smaller number of bins, and/or the bins 170A, 170B may be arranged within the base 114 in other patterns.

Figure 14:
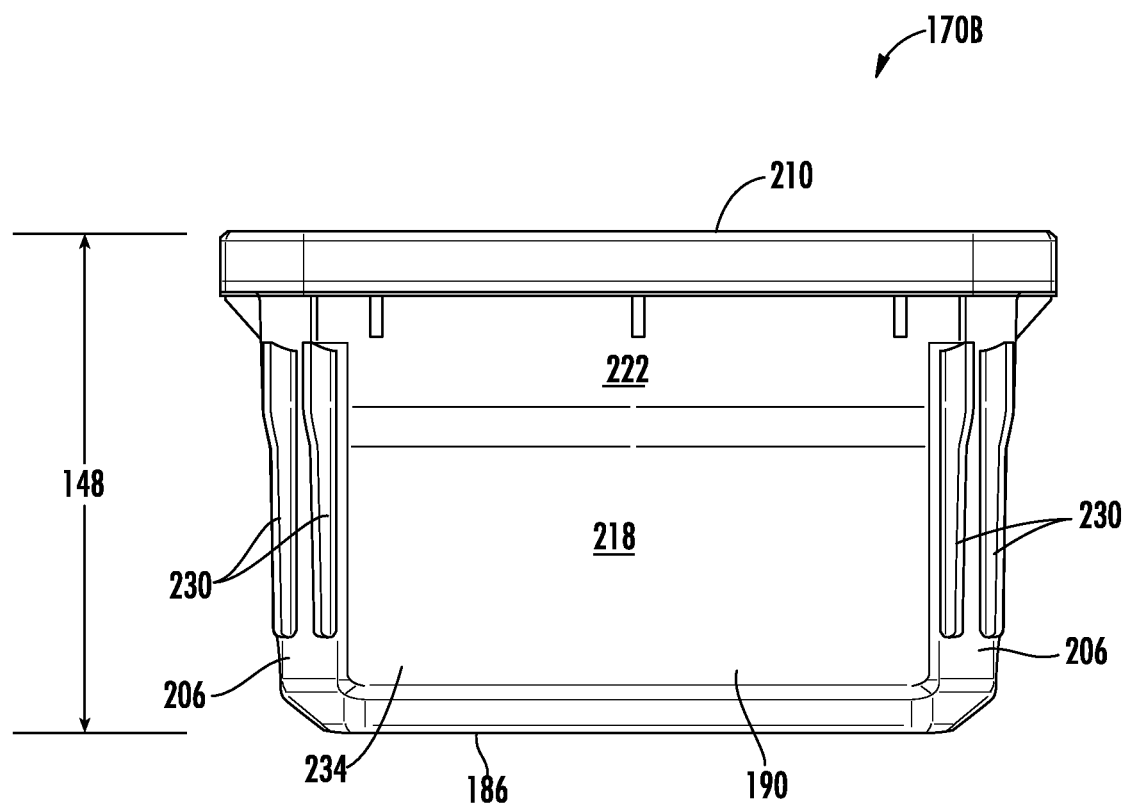
FIG. 14 is a side view of the bin of FIG. 12.
Figure 15:
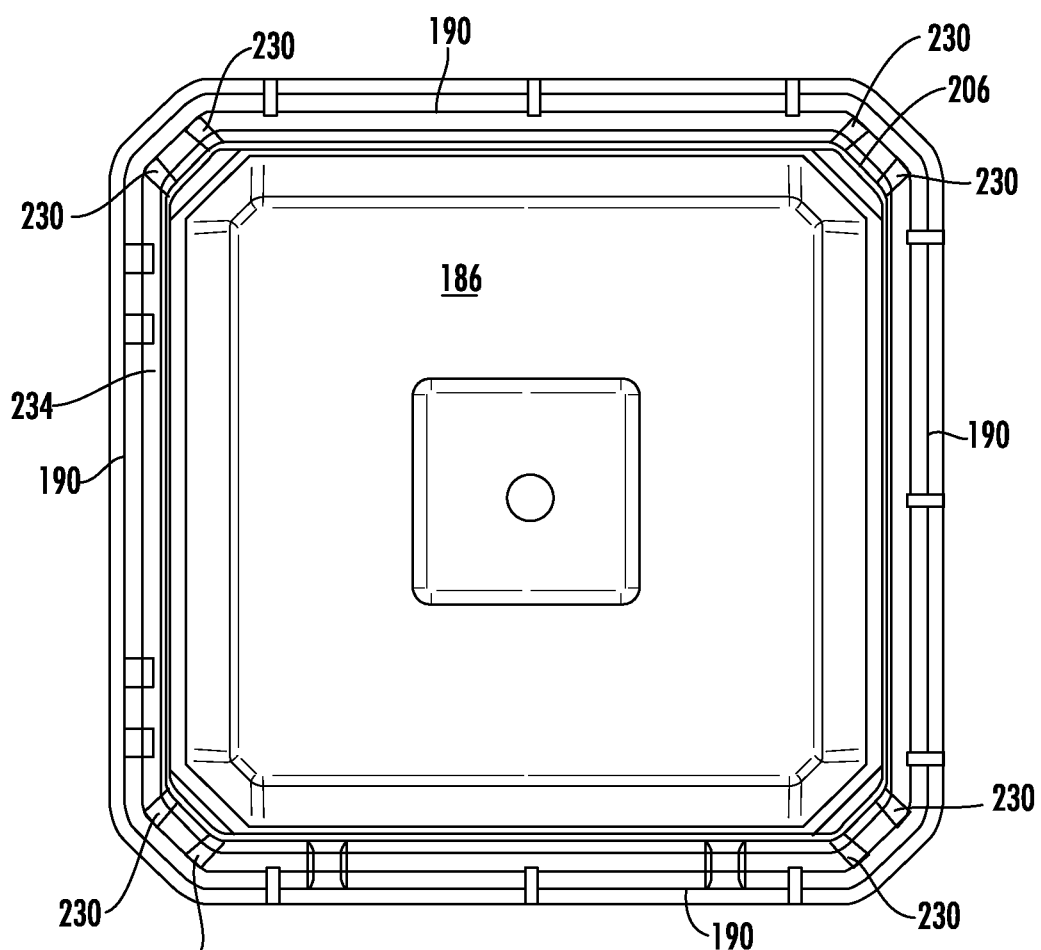
FIG. 15 is a bottom view of the bin of FIG. 12.

FIGS. 12-16 illustrate one of the relatively short bins 170B in detail. The bin 170B includes a bottom wall 186 and four sidewalls 190 extending generally perpendicularly from the bottom wall 186. The bottom wall 186 and the sidewalls 190 define a storage recess or space 194. Each of the relatively short bins 170B has a height HB (FIG. 14).

Figure 17:
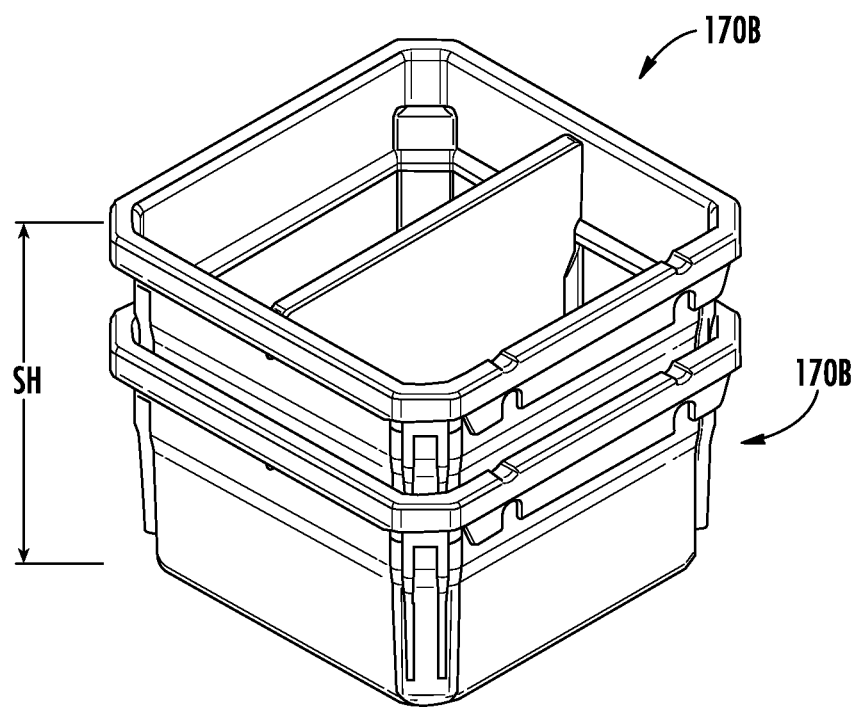
FIG. 17 illustrates two relatively short bins stacked on top of one another.

The bin 170B also includes ledges 198 formed on an inner surface 202 of the bin 170B at each corner 206 between adjacent sidewalls 190. The ledges 198 are positioned at a depth below a top edge 210 of the sidewalls 190 and a height above the bottom wall 186. In the illustrated embodiment, the ledges 198 are located at a depth that is approximately a quarter of the height HB below the top edge 210. In some embodiments the ledge 198 may extend around the perimeter of the sidewalls 190. The ledges 198 are configured to engage and support another bin when, for example, two relatively short bins 170B are stacked together, as best shown in FIG. 17. The bottom wall 186 at each corner 206 of the upper bin 170B is supported on each ledge 198 of the lower bin 170B. Each of the sidewalls 190 includes a lower, first portion 218 and an upper, second portion 222 that are stepped such that the first portion 218 has a smaller outer dimension than the second portion 222. As such, the sidewalls 190 of the upper bin 170B are partially received in the storage space 194 of the lower bin 170B up to the ledges 198 of the lower bin 170B. When stacked, the two relatively short bins 170B have a stacked height SH (FIG. 17). In other embodiments, more than two bins 170B may be stacked. Due to the top bin 170B being partially received in the bottom bin 170B, the stacked height SH is less than the total height of the two bins 170B (i.e., two times the height HB of the bins 170B).

The bin 170B further includes ribs 230 formed on an outer surface 234 of the bin 170B at the corners 206 between adjacent sidewalls 190. Each of the ribs 230 protrudes outwardly from the outer surface 234 and extends down from the top edge 210 toward the bottom wall 186. In the illustrated embodiment, each of the corners 206 has two ribs 230. In some embodiments, ribs may be formed on the sidewalls 190 between the corners 206 in addition to or in place of the ribs 230 formed at the corners 206.

Figure 19:
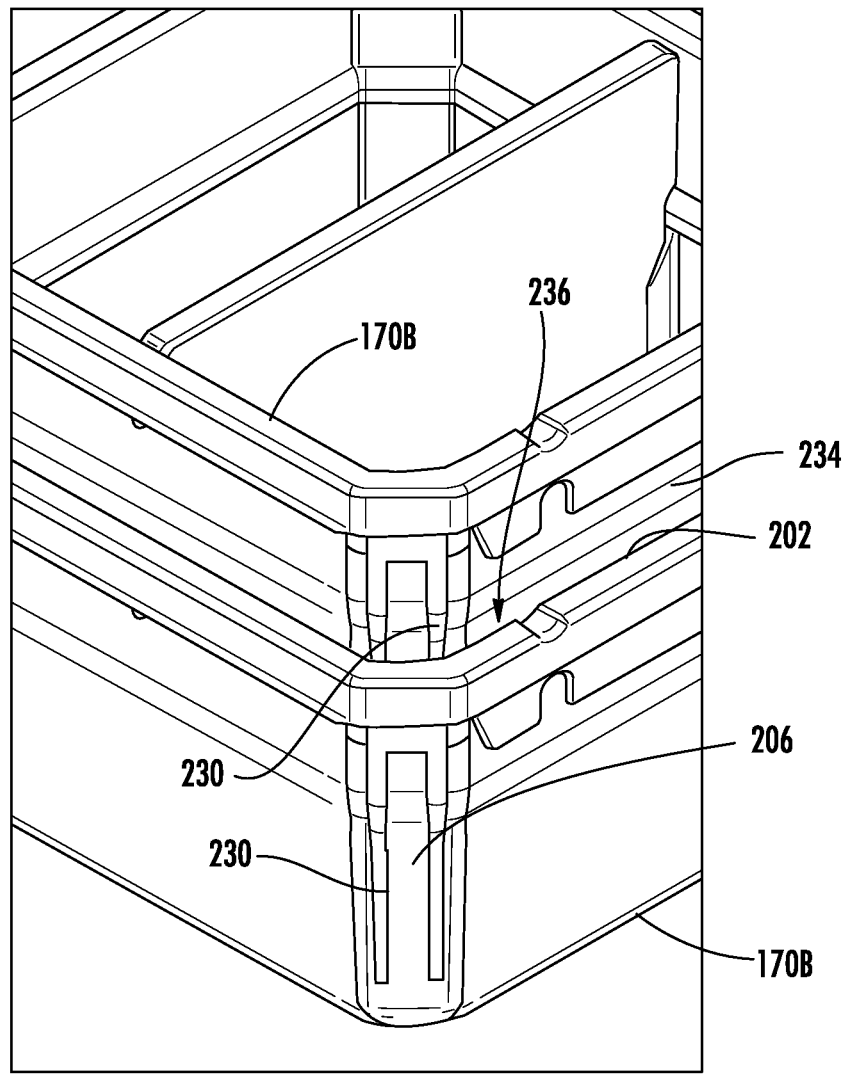
FIG. 19 is an enlarged view of portions of the two relatively short bins of FIG. 17 stacked together.

As best shown in FIG. 19, when two or more bins 170B are stacked, the ribs 230 protrude from the outer surface 234 of the upper bin 170B to contact and engage the inner surface 202 of the lower bin 170B to space apart the sidewalls 190 of the stacked bins 170B. Accordingly, the ribs 230 help maintain a space or gap 238 between the stacked bins 170B for airflow, thereby inhibiting the stacked bins 170B from getting stuck together due to vacuum effects. In other words, the gap 238 provides fluid communication between a cavity formed between the inner surface 202 of the lower bin 170B and the outer surface 234 of the bin 170B below the ledge 198 of the lower bin 170B and atmosphere, thereby inhibiting a vacuum from forming when the bins 170B are stacked.

Figure 16:
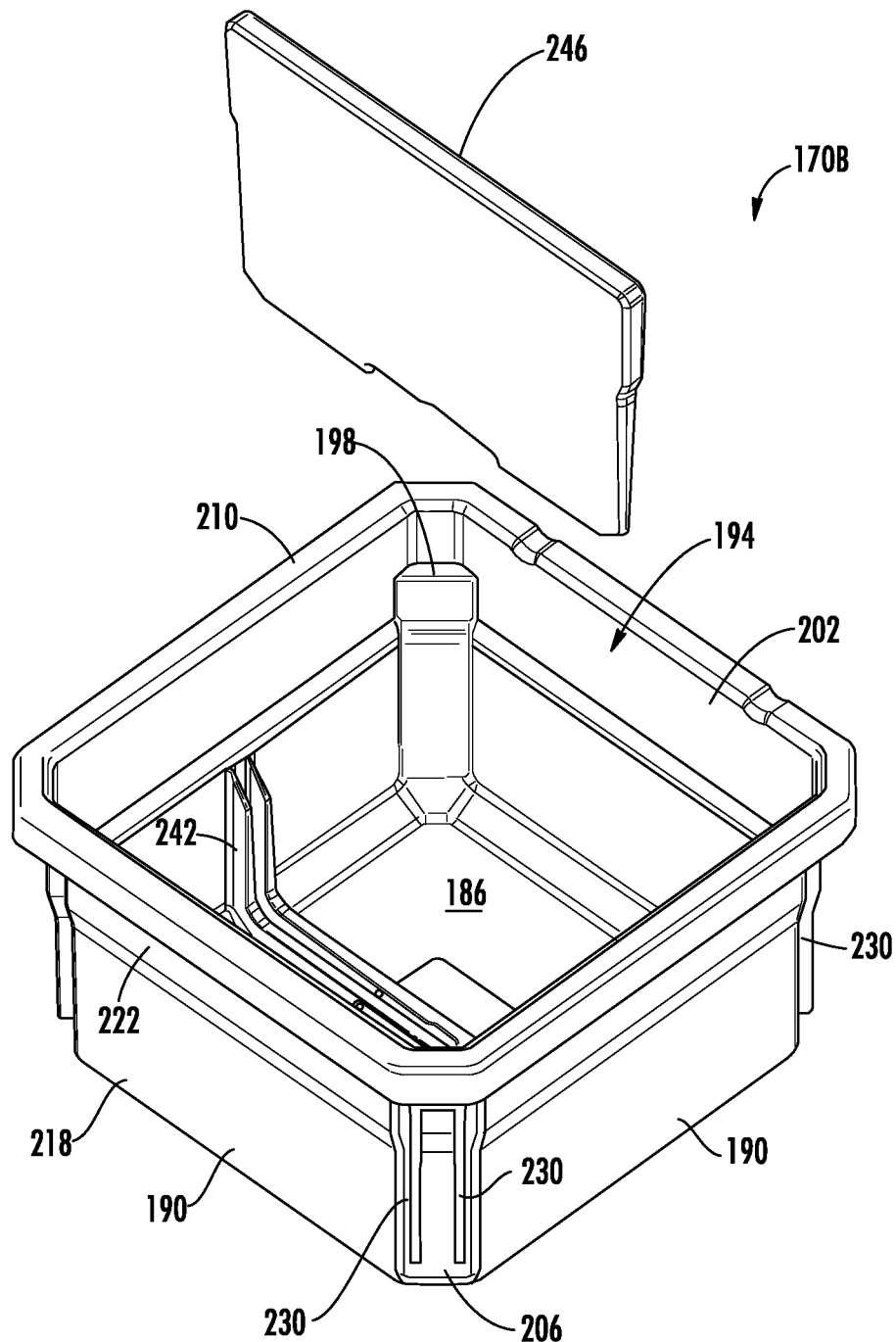
FIG. 16 is an exploded perspective view of the bin of FIG. 12.

In some embodiments, such as the illustrated embodiment, the bin 170B includes a track 242 formed on the inner surface 202 of the bin 170B, as best shown in FIG. 16. The track 242 extends partially along two opposing sidewalls 190 and along the bottom wall 186. The track 242 is configured to removably receive a dividing wall 246, or partition, for dividing the storage space 194 into separate compartments. The illustrated dividing wall 246 splits the storage space 194 in half. In other embodiments, the track 242 and the dividing wall 246 may be positioned to split the storage space 194 into unequally sized compartments, or the bin 170B may include multiple tracks for receiving multiple dividing walls. In some embodiments, the track 242 and the dividing wall 246 may be omitted. In the illustrated embodiment, the height of the dividing wall 246 inhibits a bin 170B from being stacked on a bin 170B with a dividing wall 246. In other embodiments, the dividing wall 246 may have a height that does not interfere with stacking the bins 170B.

Figure 18:
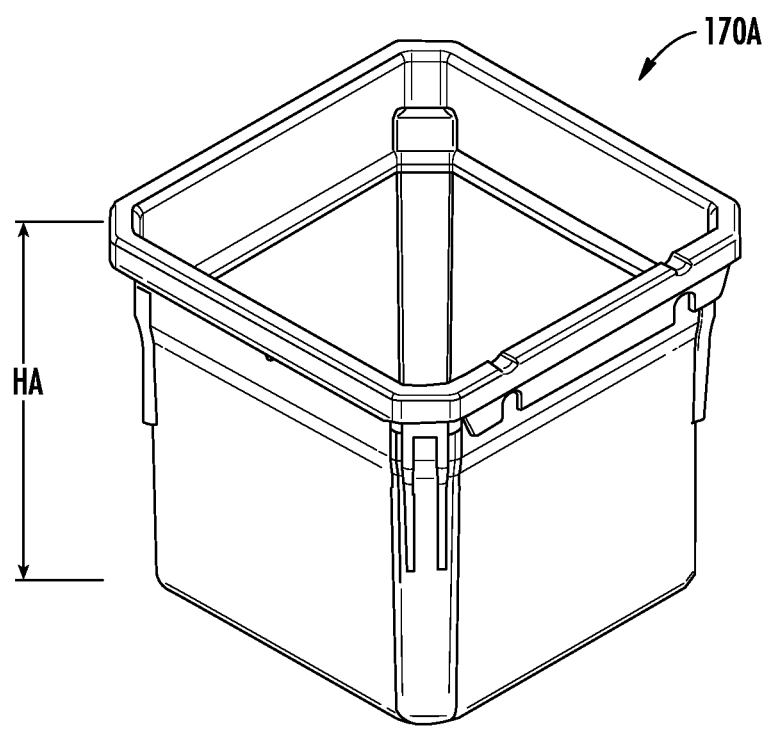
FIG. 18 illustrates a relatively tall bin.

FIG. 18 illustrates one of the relatively tall bins 170A. The relatively tall bin 170A is substantially similar to the relatively short bins 170B. However, the relatively tall bin 170A has a height HA greater than the height HB of the relatively short bin 170B. The stacked height SH of two relatively short bins 170B, when stacked together, is generally equal to the height HA of the relatively tall bin 170A. In addition, the height HB of the one relatively tall bin 170A and the stacked height SH of two relatively short bins 170B stacked together are each generally equal to the height or depth D of the base 114 of the storage device 18.

Figure 20:
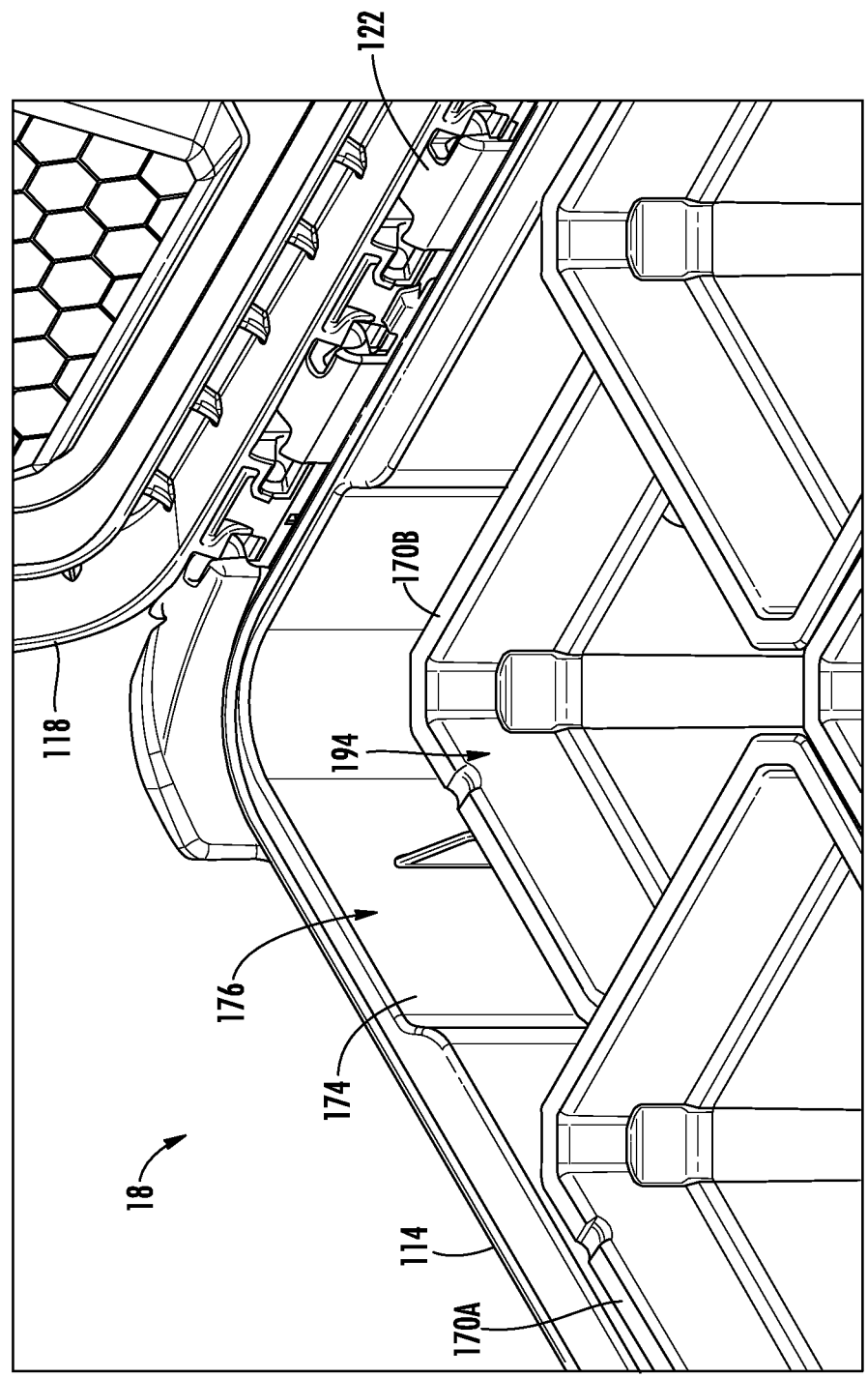
FIG. 20 is an enlarged view of a portion of the storage case in the open position.

As best shown in FIG. 20, a user may remove an upper bin of two stacked relatively short bins 170B within the base 114 of the storage case 18 to allow access to the storage space 194 of the lower bin 170B. Accordingly, the stacked bins 170B within the storage device 18 provide additional storage and organizing space that can be easily reconfigured and arranged as necessary.

Figure 21:
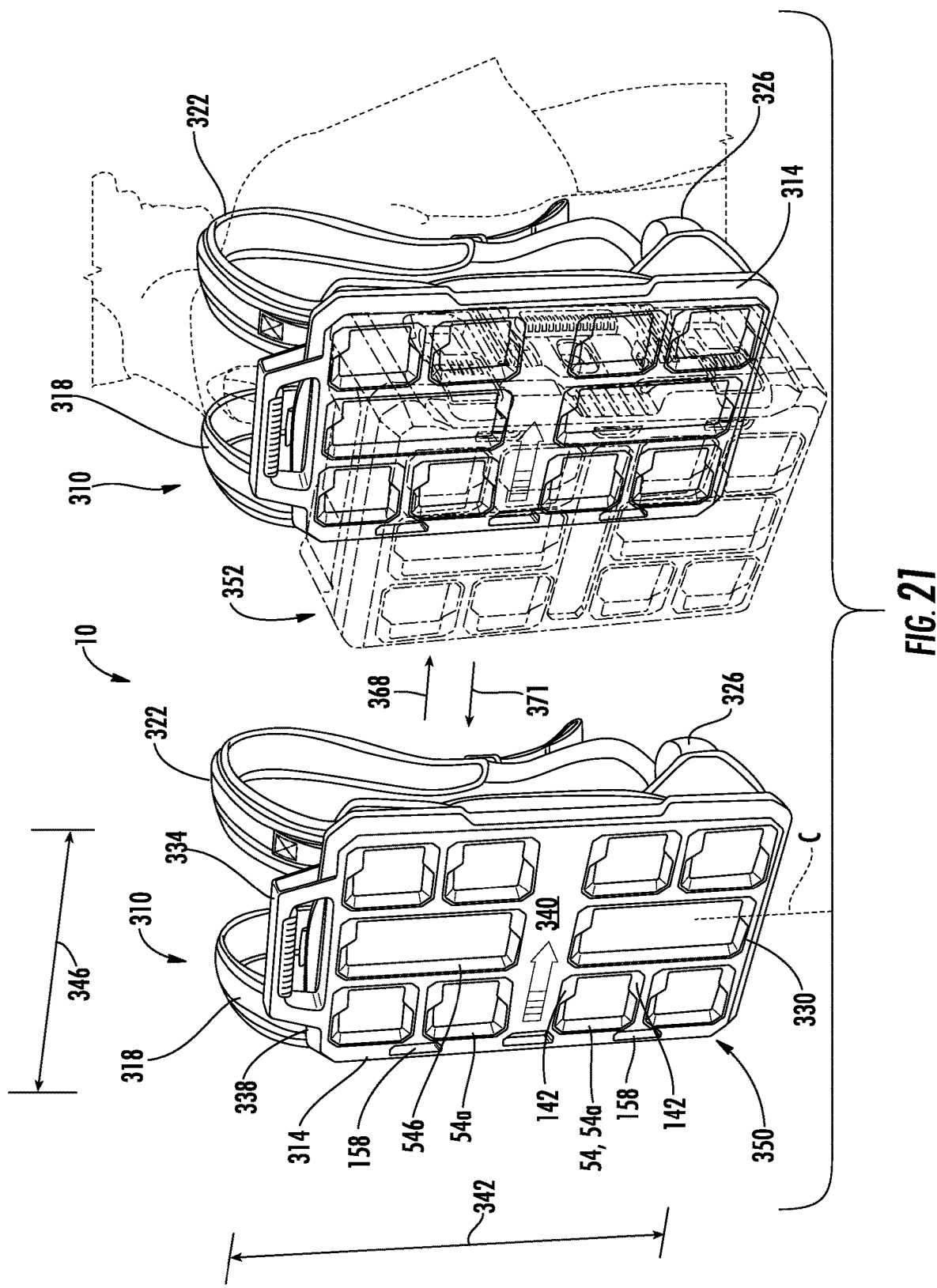
FIG. 21 is a perspective view of a backpack of the storage device system.

Referring to FIG. 21, in some embodiments, the storage device system 10 further includes a backpack 310 with a rigid base 314 and first and second flexible shoulder straps 318, 322 coupled to the base 314. The base 310 is configured to extend along a user's back when the shoulder straps 318, 322 extend over the user's shoulders. The length of each shoulder strap 318, 322 is preferably adjustable to allow the user to position the base 314 in a comfortable position along the user's back. In the illustrated embodiment, the backpack 310 also includes waist belt 326 coupled to the base 314 proximate a bottom end 330 of the base 314 and a handle 334 extending from a top end 338 of the base 314.

With continued reference to FIG. 21, a generally planar face 340 defines a rear surface of the base 314 that is oriented rearward when the backpack 310 is worn by the user. The base 314 defines a longitudinal axis C extending centrally through the top and bottom ends 338, 330. The illustrated base 314 is rectangular and includes a length 342 measured parallel to the longitudinal axis C and a width 346 measured perpendicular to the axis C. The length 342 is longer than the width 346 so as to generally correspond with the shape of the user's back.

Figure 25:
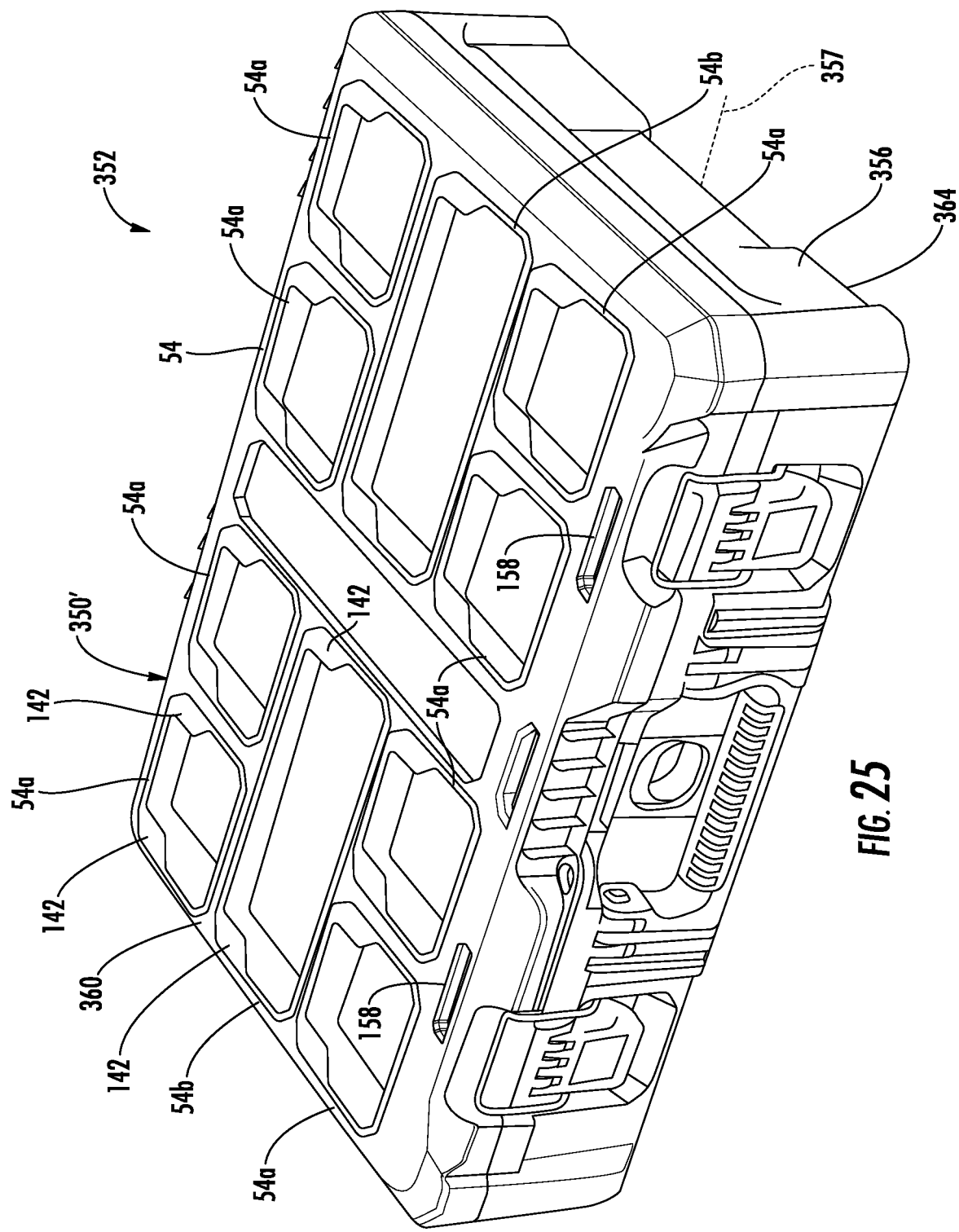
FIG. 25 is a perspective view of a tool storage container according to another embodiment.

The base 314 further includes an attachment interface 350 for receiving and removably coupling a tool storage container 352 to the base 314. Referring to FIG. 25, the illustrated tool storage container 352 includes a rigid body 356 defining a longitudinal axis 356 and a rigid lid 360 pivotally coupled to the body 356 (e.g., by a hinge). The illustrated attachment interface 350 also allows other tool storage containers of the storage device system 10 to be removably and interchangeably coupled to the base 314. For example, the bag 14 and the storage case 18 may be coupled to the base 314. The configuration of the base 314 advantageously allows the backpack 310 to be used to interchangeably carry a variety of different tool storage containers in a hands-free manner.

The attachment interface 350 on the base 314 includes a plurality of connection recesses 54—including small connection recesses 54a and large connection recesses 54b—like those on the cover 118 of the storage case 18 described above with reference to FIGS. 5 and 6. An interference projection or wing 142 extends into each connection recess 54 parallel to a longitudinal axis C of the base 314 on opposite sides of the connection recess 54 at one end of the connection recess 54. The attachment interface 350 further includes a plurality of locking apertures 158. In the illustrated embodiment, the attachment interface 350 includes two locking apertures 158 spaced in the length direction of the base 314.

The tool storage container 352 includes projections on a bottom surface 364 (FIG. 25) of the body 356, which are like the projections 46 described above with reference to FIGS. 3 and 4. The projections on the tool storage container 352 are receivable within the connection recesses 54 on the base 314, and each of the wings 142 corresponds to and is configured to cooperate with a channel 58 (FIG. 4) of the projection 46 received by the respective connection recess 54. The tool storage container 352 also includes a latch assembly like the latch assembly 78 described above with reference to FIGS. 7-10, with one or more interference portion(s) 94 that are receivable within the locking aperture(s) 158 on the base 314. In the illustrated embodiment, the lid 360 of the tool storage container 352 includes an attachment interface 350' that is substantially identical to the attachment interface 350 on the base 314 (FIG. 25). As such, one or more additional tool storage containers (not shown) can be coupled to the lid 360, such that the one or more additional tool storage containers can also be carried using the backpack 310.

In use, to couple the tool storage container 352 to the backpack 310, the user positions the bottom surface 364 the tool storage container 352 adjacent the rear surface 340 of the base 314 and aligns the projections 46 (FIG. 4) with the recesses 54 (FIG. 21) on the base 314. The user then slides the tool storage container 352 relative to the base 314 in a first direction 368, which is perpendicular to the longitudinal axis C and parallel with the width 346, to attach the tool storage container 352 to the base 314 generally in the manner described above for attaching the bag 14 to the case 18. Likewise, to decouple and remove the tool storage container 352 from the backpack 310, the user disengages the latch assembly 78 by moving the interference portion(s) 94 to the unlocking position in the manner described above. The user then slides the tool storage container 352 relative to the base 314 in a second direction 372 opposite the first direction 368. Once the projections 46 clear the recesses 54, the tool storage container 352 can be freely removed from the backpack 310.

Figure 22:
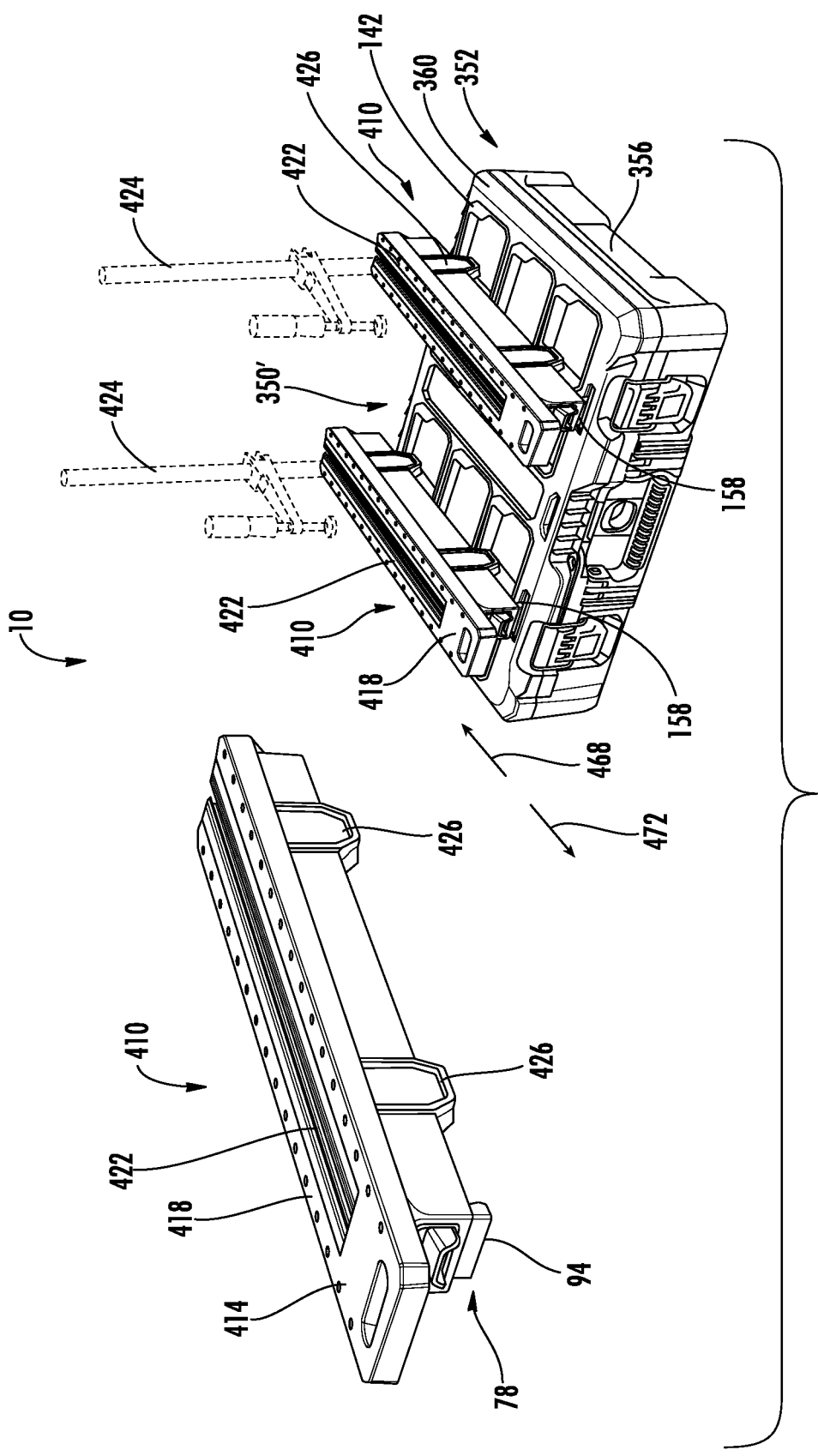
FIG. 22 illustrates an accessory rail usable with the storage device system.

Referring to FIG. 22, in some embodiments, the storage device system 10 further includes an accessory rail 410 configured for attachment to the attachment interface 350' on the lid 360 of the tool storage container 352 (or any other tool storage container of the system 10 that includes a similar attachment interface). The accessory rail 410 includes a latch assembly 78 with an interference portion 94 that is engageable with any of the locking apertures 158 on the tool storage container 352.

The accessory rail 410 includes a top side 414 defining a planar clamping surface 418 and a longitudinally-extending slot 422. A variety of different accessories can be coupled to the slot 422. For example, in the illustrated embodiment, a bar clamp 424 is coupled to the slot 422. The bar clamp 424 can thus be used to clamp a workpiece against the clamping surface 418 of the accessory rail 410. A pair of mounting brackets 426 extends downward from the bottom of the accessory rail 410. Each of the mounting brackets 426 is configured to receive one of the wings 142 on the attachment interface 350' when the accessory rail 410 is coupled to the lid 360.

In use, to couple the accessory rail 410 to the lid 360 of the tool storage container 352, the user aligns the mounting brackets 426 with the wings 142. The user then slides the accessory rail 410 relative to the base lid 360 in a first direction 468 and engages the interference portion 94 with one of the locking apertures 158. Likewise, to decouple and remove the accessory rail 410 from the lid 360, the user disengages the latch assembly 78 by moving the interference portion 94 to the unlocking position. The user then slides the accessory rail 410 relative to the lid 360 in a second direction 472 opposite the first direction 468. Once the mounting brackets 426 clear the wings 142, the rail 410 can be freely removed from the lid 410. The attachment interface 350' allows multiple accessory rails 410 to be attached to the lid 360 at the same time. The tool storage container 352 and accessory rails 410 can thus provide a portable workpiece support system.

Figure 23:
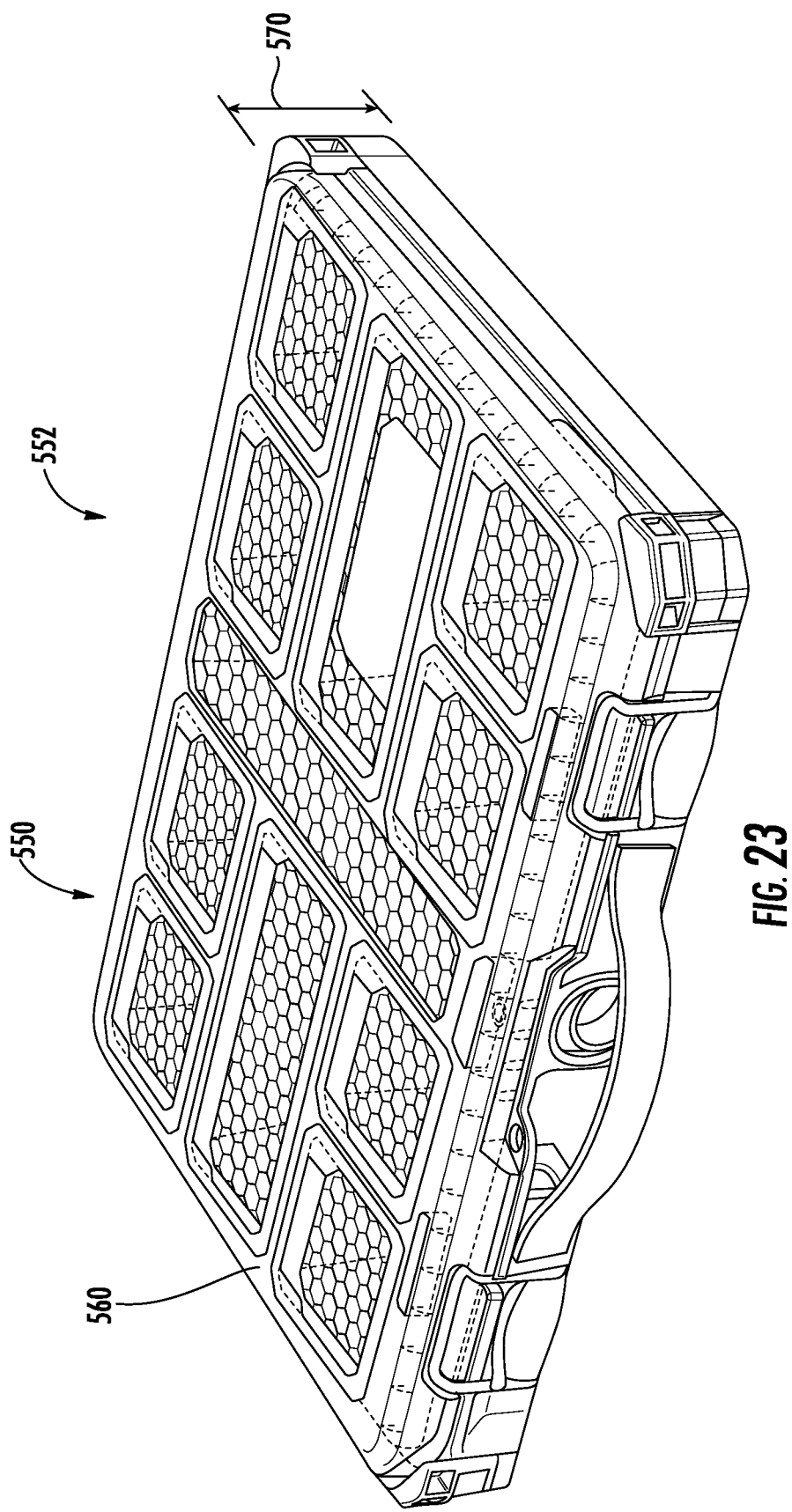
FIG. 23 is a perspective view of a tool storage container according to another embodiment.

FIG. 23 illustrates a tool storage container 552 according to another embodiment and that is usable with the storage device system 10. Like the tool storage container 352 described above, the tool storage container 552 includes a lid 560 provided with an attachment interface 550. The tool storage container 552 is thinner than the tool storage container 352. In some embodiments, for example, the tool storage container 552 is approximately half the thickness of the tool storage container 352. In some embodiments, the tool storage container 552 defines an overall thickness 570 between about 60 mm and about 70 mm.

Figure 24:
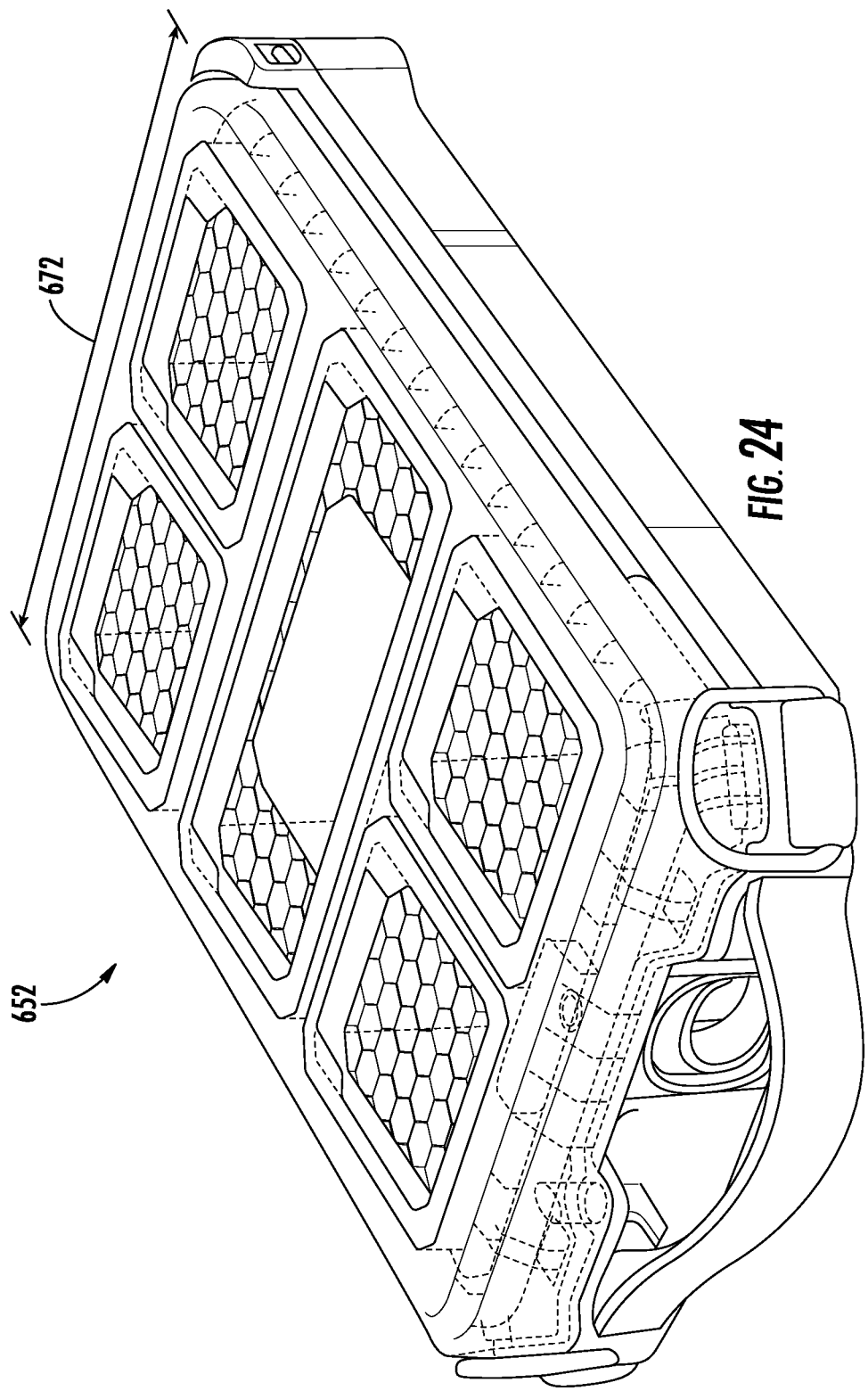
FIG. 24 is a perspective view of a tool storage container according to another embodiment.

FIG. 24 illustrates a tool storage container 652 according to another embodiment and that is usable with the storage device system 10. The tool storage container 652 is similar to the tool storage container 552 but is approximately half the width of the tool storage container 552. In some embodiments, the tool storage container 652 defines an overall width 672 between about 200 mm and about 300 mm.

Figure 26:
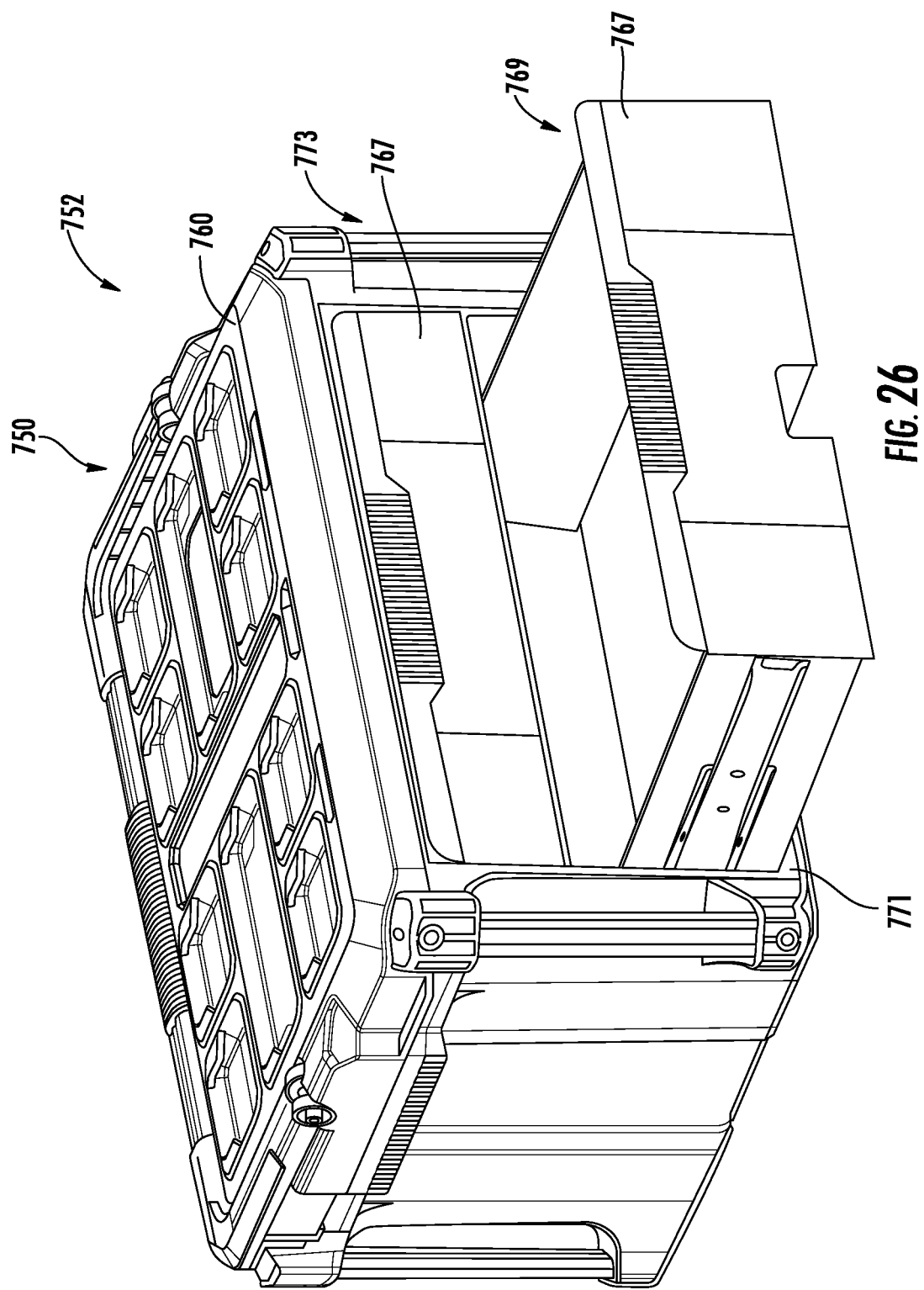
FIG. 26 is a perspective view of a tool storage container according to another embodiment.

FIG. 26 illustrates a tool storage container 752 according to another embodiment and that is usable with the storage device system 10. Like the tool storage container 352 described above, the tool storage container includes a lid 760 provided with an attachment interface 750. The tool storage container 752 further includes a plurality of drawers 767 that are slidable between an open position 769 projecting from a front side 771 of the storage container 752 and a closed position 773 in which the drawers 767 are generally flush with the front side 771 of the storage container 752. The drawers 767 provide convenient access to the contents of the tool storage container 752, even while other components of the storage device system 10 (e.g., an accessory rail 410, one or more other tool storage containers, etc.) are coupled to the attachment interface 750.

Figure 27:
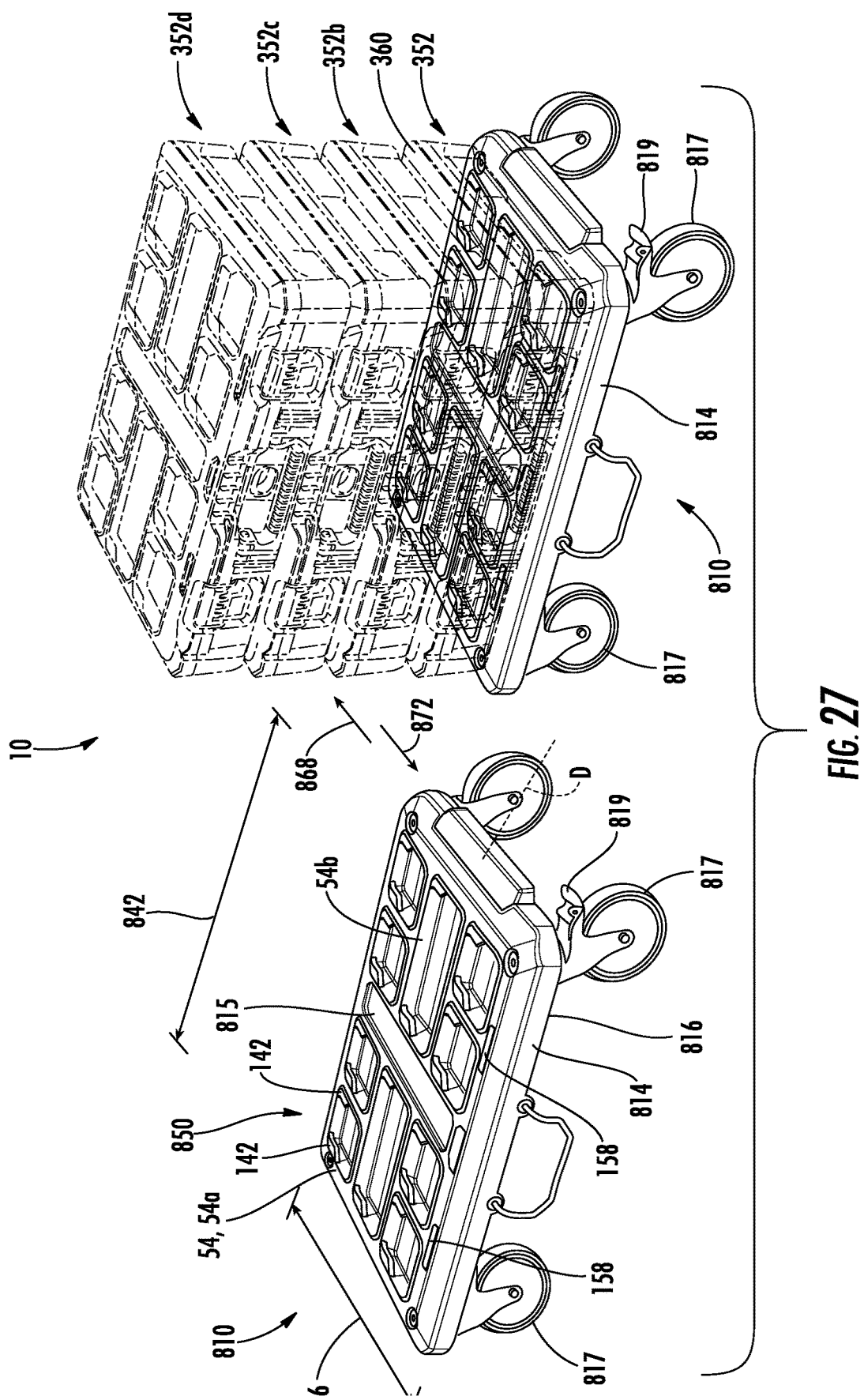
FIG. 27 is a perspective view of a tool cart of the storage device system.

Referring to FIG. 27, in some embodiments, the storage device system 10 further includes a tool cart 810 with a rigid base 814 having a top side 815 and a bottom side 816 opposite the top side 815. The base 814 is supported on a plurality of wheels 817 adjacent the bottom side 816. The illustrated wheels 817 are rotatable casters coupled to the base 814 proximate each of the four corners of the base 814. A brake 819 is coupled to one of the wheels 817 to secure the tool cart 810 in a desired position. In some embodiments, multiple brakes 819 may be provided for additional security. In addition, other types of wheels 817 may be used, and the wheels 817 may be arranged in any configuration suitable for supporting the base 814 in a stable manner.

The illustrated base 814 includes a length 842 and a width 846 measured perpendicular to the length 842. The base 814 defines a longitudinal axis D extending centrally through the base 814 in the length direction. The length 842 is longer than the width 846 such that the base 814 has a rectangular shape. The base 814 further includes an attachment interface 850 for receiving and removably coupling a tool storage container (e.g., the tool storage container 352) to the base 814. The illustrated attachment interface 850 also allows other tool storage containers of the storage device system 10 to be removably and interchangeably coupled to the base 814. The configuration of the base 814 advantageously allows the cart 810 to be used to interchangeably support and transport a variety of different tool storage containers.

The attachment interface 850 includes a plurality of connection recesses 54—including small connection recesses 54a and large connection recesses 54b—like those on the cover 118 of the storage case 18 described above with reference to FIGS. 5 and 6. An interference projection or wing 142 extends into each connection recess 54 parallel to the longitudinal axis D of the base 814 on opposite sides of the connection recess 54 at one end of the connection recess 54. The attachment interface 850 further includes a plurality of locking apertures 158. In the illustrated embodiment, the attachment interface 850 includes two locking apertures 158 spaced in the length direction of the base 814. As described above, the projections on the bottom surface 364 (FIG. 25) of the tool storage container 352 and latch assembly 78 cooperate with the attachment interface 850 to removably couple the tool storage container 352 to the base 814.

In use, to couple the tool storage container 352 to the tool cart 810, the user first engages the brake 819 to secure the cart 810. Next, the user positions the bottom surface 364 the tool storage container 352 adjacent the top side 815 of the base 814 and aligns the projections 46 (FIG. 4) with the recesses 54 (FIG. 27) on the base 814. The user then slides the tool storage container 352 relative to the base 814 in a first direction 868, which is perpendicular to the longitudinal axis D and generally parallel to the top side 815, to attach the tool storage container 352 to the base 814 generally in the manner described above for attaching the bag 14 to the case 18. The brake 819 inhibits the tool cart 810 from rolling under the force of the user attaching the container 352 to the base 814. Once the container 352 is attached, the user disengages the brake 819 and can then transport the tool storage container 352 by rolling the tool cart 810 along a surface (e.g., the ground).

Likewise, to decouple and remove the tool storage container 352 from the tool cart 810, the user engages the brake 819, then disengages the latch assembly 78 by moving the interference portion(s) 94 to the unlocking position in the manner described above. The user then slides the tool storage container 352 relative to the base 814 in a second direction 872 opposite the first direction 868. Once the projections 46 clear the recesses 54, the tool storage container 352 can be freely removed from the tool cart 810.

The cart 810 may be a particularly convenient means for transporting multiple storage containers at the same time. In the illustrated embodiment, a second tool storage container 352b can be coupled to the lid 360 of the tool storage container 352 in the same manner as described above. In particular, the second tool storage container 352b can be slid in the first direction 868 relative to the tool storage container 352 to attach the second tool storage container 352b to the lid 360 of the tool storage container 352, and the second tool storage container 352b can be slid in the second direction 872 relative to the tool storage container 352 to remove the second tool storage container 352b. Additional tool storage containers 352c, 352d can be further stacked in this manner and securely transported together on the tool cart 810.

Figure 28:
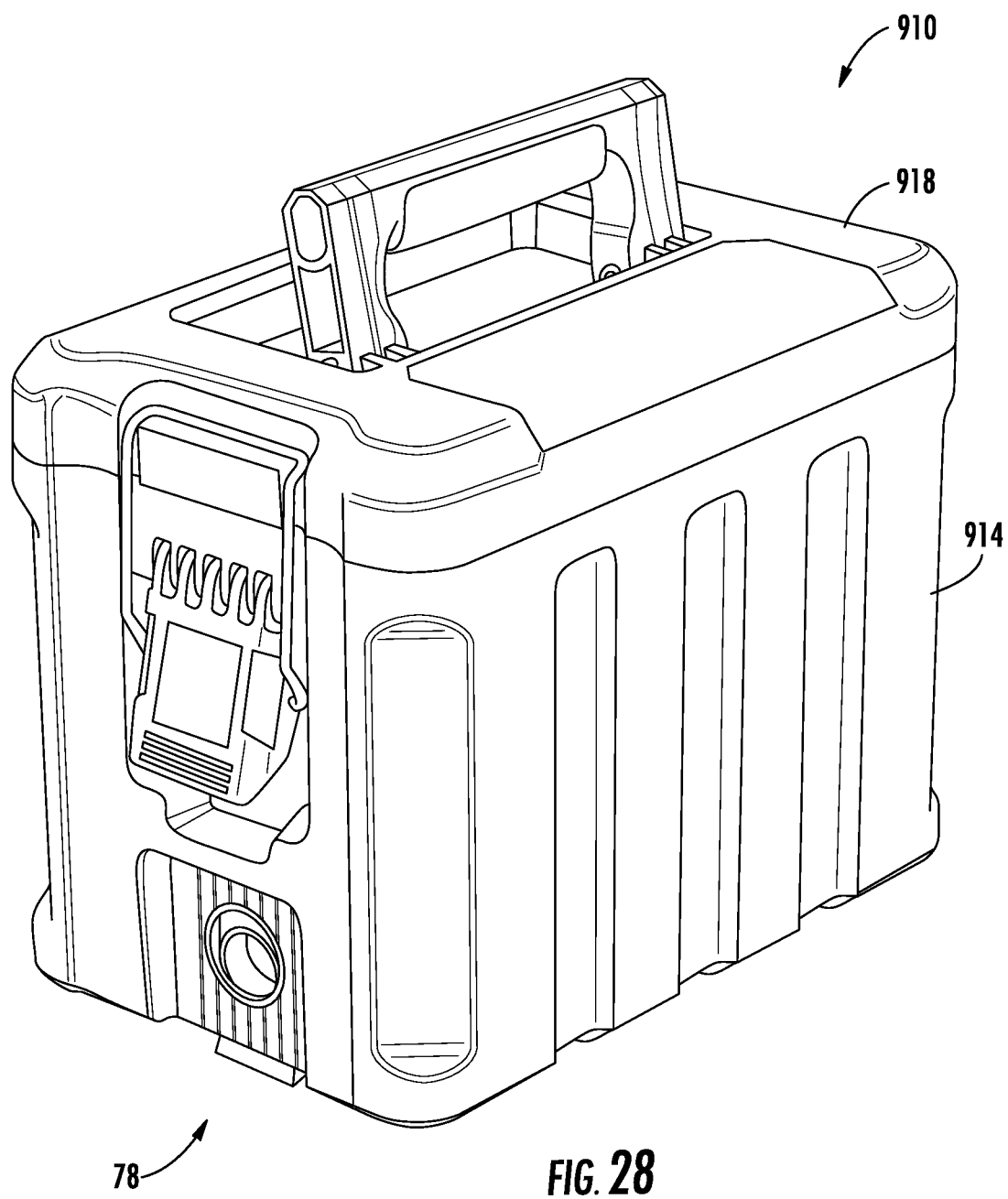
FIG. 28 is a perspective view of a cooler according to one embodiment.

FIG. 28 illustrates a cooler 910 according that is usable with the storage device system 10. The cooler includes a rigid body 914 and a rigid lid 918 coupled to the body 914. The body 914 and the lid 918 are insulated or are made of an insulating material. The lid 918 may be pivotally coupled to the body 914 in some embodiments or alternatively may be removably coupled to the body 914. The cooler 910 includes a plurality of projections (not shown) like the projections 46 described above that allow the cooler 910 to be removably coupled to other components of the storage device system 10. Likewise, the cooler 910 also includes a latch assembly 78.

Figure 29:
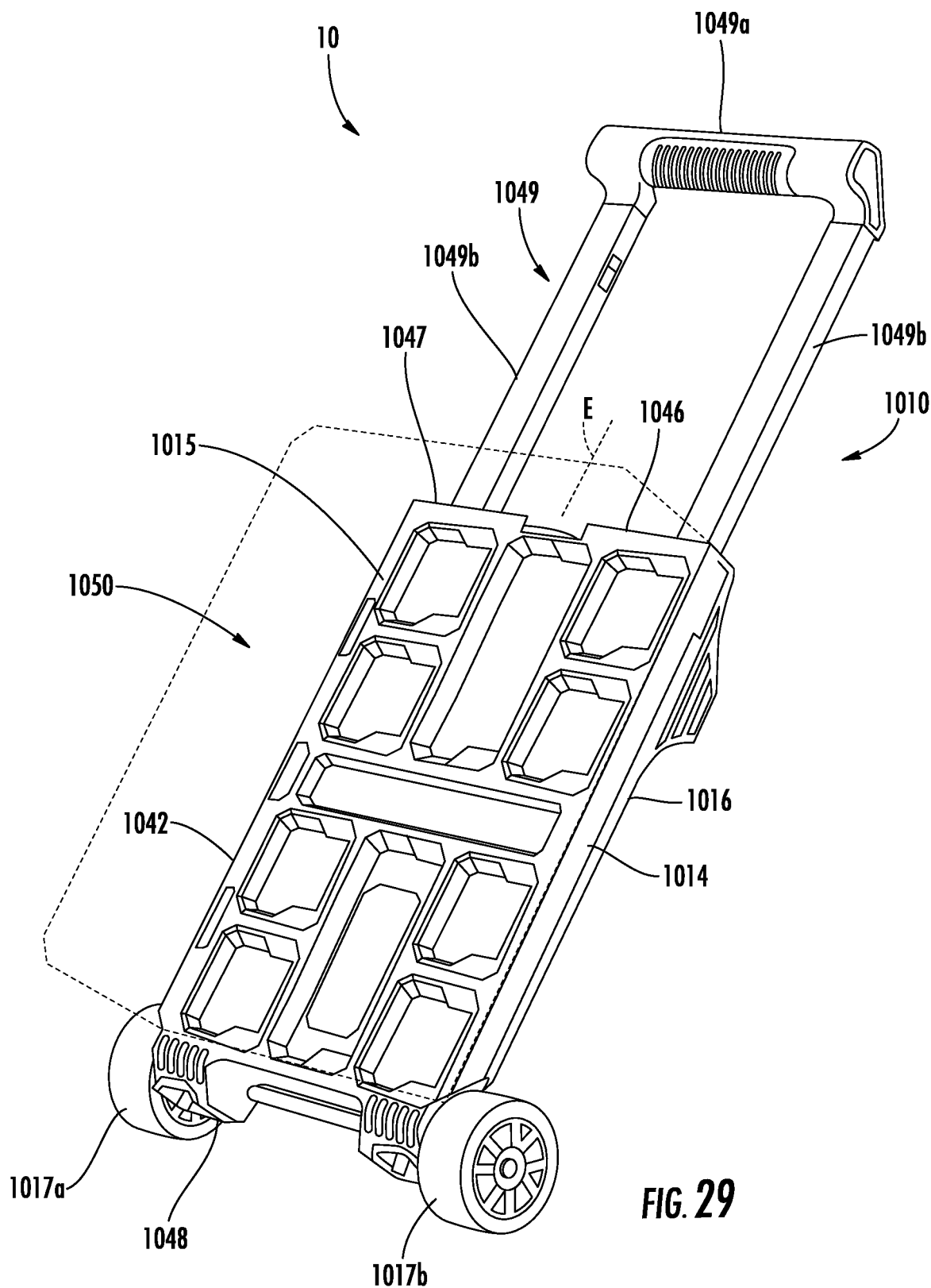
FIG. 29 is a perspective view of a tool cart of the storage device system according to another embodiment.

Referring to FIG. 29, in some embodiments, the storage device system 10 further includes a tool cart 1010 with a rigid base 1014 having a top side 1015 and a bottom side 1016 opposite the top side 1015. The illustrated base 1014 includes a length 1042 and a width 1046 measured perpendicular to the length 1042. The length 1042 is longer than the width 1046 such that the base 1014 has a rectangular shape. A first end 1047 of the base 1014 extends between the top side 1015 and the bottom side 1016 in the width direction, and a second end 1048 of the base 1014 extends between the top side 1015 and the bottom side 1016 opposite the first end 1047. The base 1014 defines a longitudinal axis E extending centrally through the base 1014 in the length direction, through the first and second ends 1047, 1048.

In the illustrated embodiment, the base 1014 is supported on first and second wheels 1017a, 1017b adjacent the second end 1048. The cart 1010 includes a handle 1049 extending from the first end 1047. The illustrated handle 1049 is generally U-shaped and includes a grip portion 1049a spanning between two leg portions 1049b. The handle 1049 may be slidable relative to the base 1014 in order to extend or retract the handle 1049.

The base 1014 further includes an attachment interface 1050 for receiving and removably coupling a tool storage container (e.g., the tool storage container 352) or multiple tool storage containers to the base 1014 generally in the same manner as described above with respect to the tool cart 810 illustrated in FIG. 27.

Figure 30:
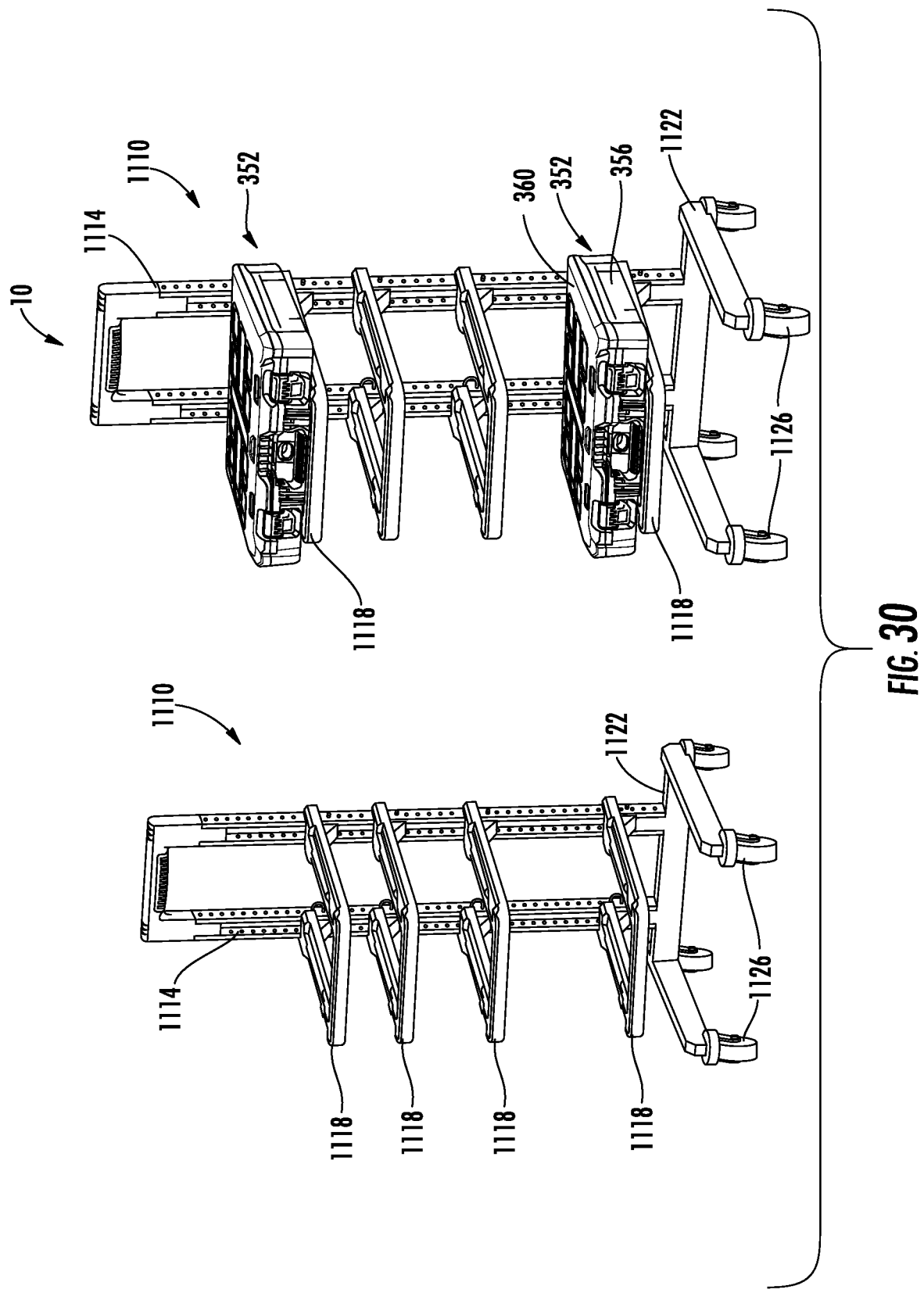
FIG. 30 is a perspective view of a shelf unit of the storage device system.

Referring to FIG. 30, in some embodiments, the storage device system 10 further includes an adjustable shelf unit 1110. The adjustable shelf unit 1110 includes a frame 1114 and a plurality of shelves 1118 movably coupled to the frame 1114. The shelves 1118 can thus be positioned on the frame 1114 at a variety of different spacings. In the illustrated embodiment, the frame 1114 includes a bottom portion 1122 with a plurality of wheels 1126 (e.g., casters) that support the frame 1114. As such, the frame 1114 is mobile and can be conveniently moved about a job site. In other embodiments, the frame 1114 may be secured to a wall, the interior of a vehicle, or other fixed structures, for example.

Figure 31:
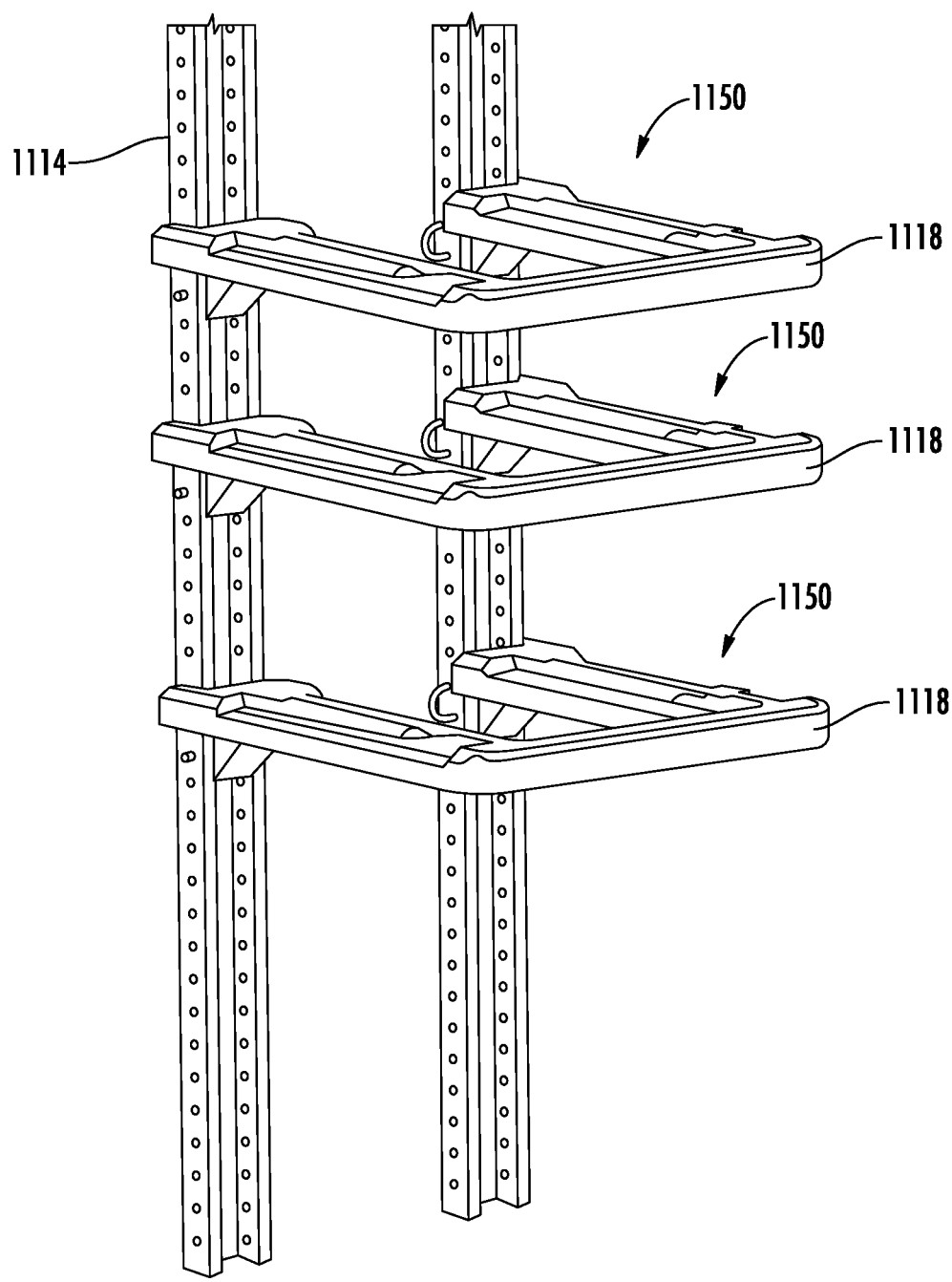
FIG. 31 is an enlarged perspective view of a portion of the shelf unit of FIG. 30.

Referring to FIG. 31, each of the shelves 1118 includes an attachment interface 1150 that is compatible with any of the storage containers of the storage device system 10. Thus, as illustrated in FIG. 30, the tool storage container 352 or any other tool storage container of the system 10 can be removably coupled to any of the shelves 1118. In addition, the shelves 1118 can be spaced such that the lid 360 of the container 352 is openable even while the body 356 of the container 352 remains coupled to the shelf 1118.

Figure 32:
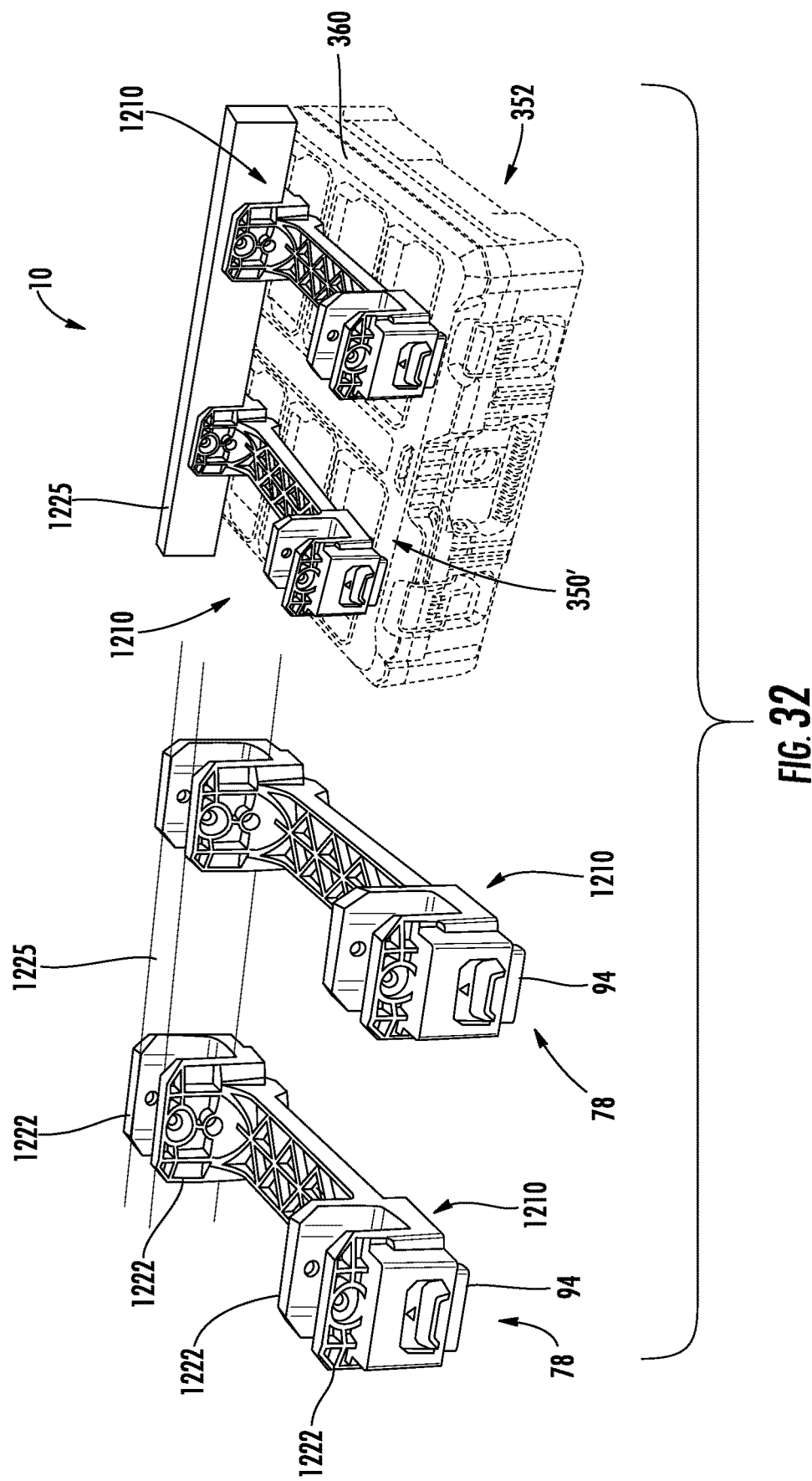
FIG. 32 illustrates a clamping rail usable with the storage device system.
Figure 33A:
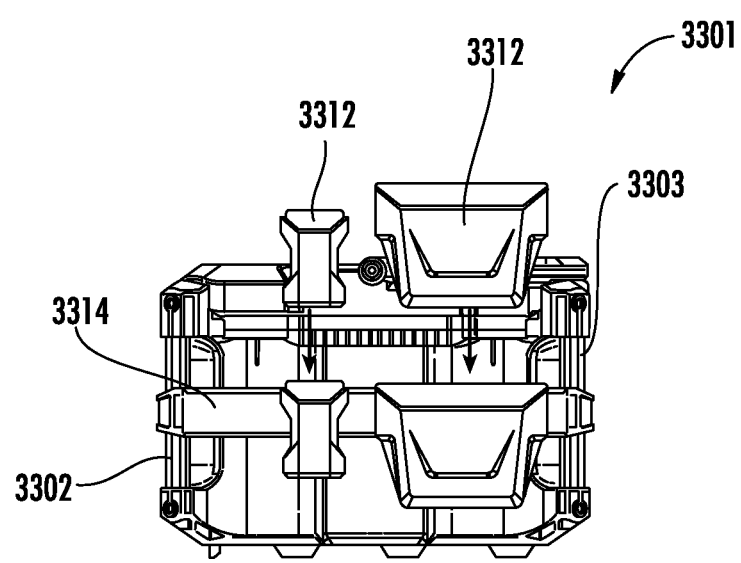
FIGS. 33A-33F illustrate a tool storage container according to another embodiment.
Figure 33B:
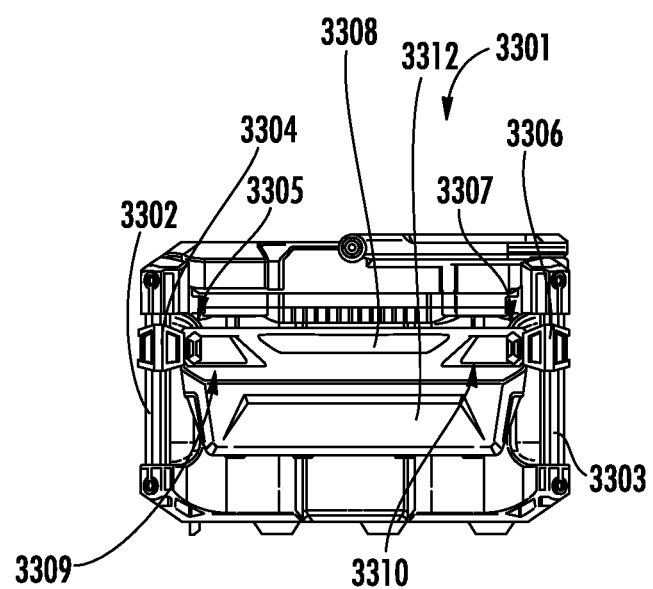
Figure 33C:
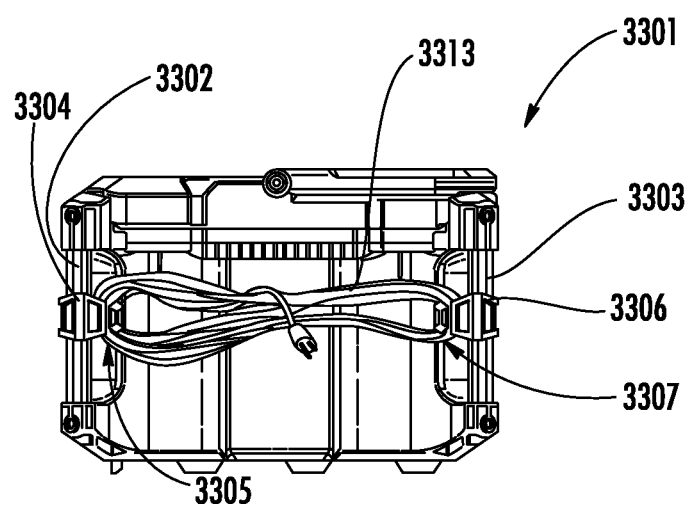
Figure 33D:
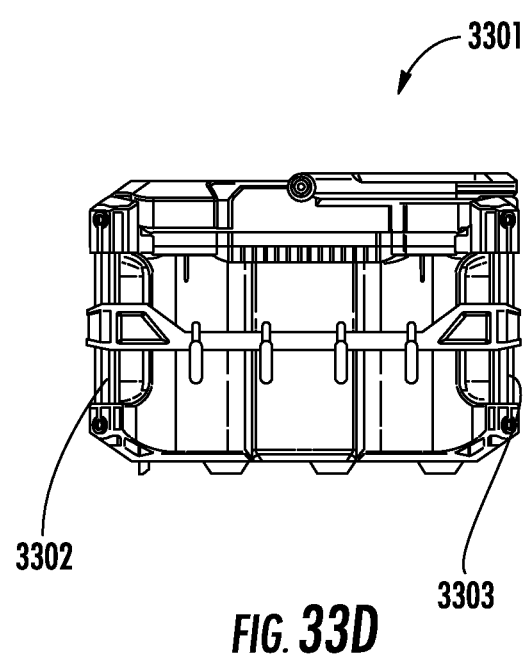
Figure 33E:
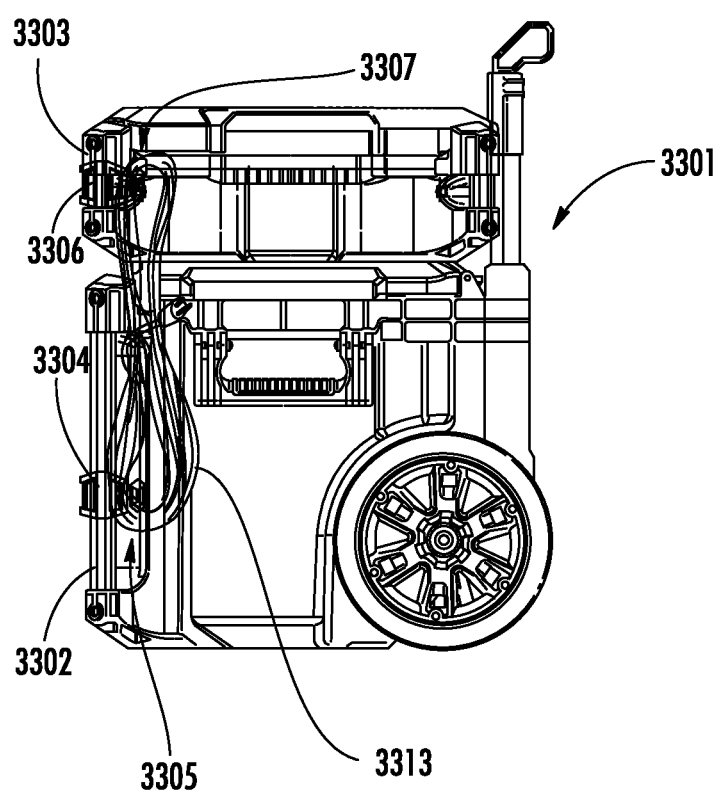
Figure 33F:
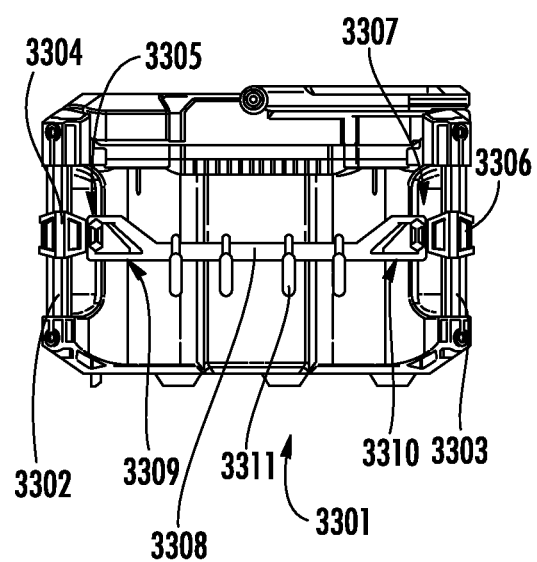

Referring to FIG. 32, in some embodiments, the storage device system 10 further includes two clamp rails 1210 configured for attachment to the attachment interface 350' on the lid 360 of the tool storage container 352 (or any other tool storage container of the system 10 that includes a similar attachment interface). Each clamp rail 1210 includes a latch assembly 78 with an interference portion 94 that is engageable with any of the locking apertures 158 (FIG. 25) on the tool storage container 352.

Each clamp rail 1210 includes first and second pairs of clamping jaws 1222 located at opposite ends of the clamp rail 410. Each set of clamping jaws 1222 may be adjustable to vary a distance between the individual jaws 1222, or the individual jaws 1222 may be spaced at a fixed spacing. In some embodiments, the individual jaws 1222 may be resiliently deformable to apply a resilient clamping force on a workpiece 1225 (e.g., a 2×4). The clamping jaws 1222 are configured to support the workpiece 1225 above the lid 360 of the container 352. The tool storage container 352 and clamping rails 1210 can thus provide a portable workpiece support system.

FIGS. 33A-33F illustrate a tool storage container system 3301. The tool storage container system 3301 may include a first mounting rail 3302 and a second mounting rail 3303. In some embodiments, the mounting rails 3302, 3303 may be on a single storage container. In other embodiments, the mounting rails 3302, 3303 may be on separate storage containers. The second mounting rail 3303 may be spaced apart from the first mounting rail 3302. A first clip 3304 may be removably mounted to the first mounting rail 3302. The first clip 3304 may include a first accessory hook 3305. A second clip 3306 may be removably mounted to the second mounting rail 3303. The second clip 3306 may include a second accessory hook 3307. The first and second accessory hooks 3305, 3307 may be facing outwardly from the storage container 3301 to receive an accessory 3308. The accessory 3308 may include a first loop 3309 and a second loop 3310. In such embodiments, the first accessory hook 3305 may be received in the first loop 3309, and the second accessory hook 3307 may be received in the second loop 3310. Some embodiments include the accessory 3308 having a plurality of hooks 3311 for hanging items. The hooks 3311 may be disposed between the mounting rails 3302, 3303 and may also be integrally formed with the loops 3309, 3310 of the accessory 3308. Other embodiments include the accessory 3308 having a storage bin 3312. The storage bin 3312 may be disposed between the mounting rails 3302, 3303 and may also be integrally formed with the loops 3309, 3310 of the accessory 3308. In many embodiments, the first clip 3304 may be resiliently snapped onto the first mounting rail 3302, and the second clip 3306 may be resiliently snapped onto the second mounting rail 3303. The clips 3304, 3306 can be used to attach an extension cord, power cord, or some other length of cord 3313 to the container 3301. The rails can be used to attach other organizers to the tool storage system. The tool storage container system 3301 may include, in some embodiments, a mount 3314 resiliently snapped onto the first and second mounting rails 3302, 3303. In such embodiments, the bin 3312 may be slidably and removably disposed on the mount 3314.

Figure 34:
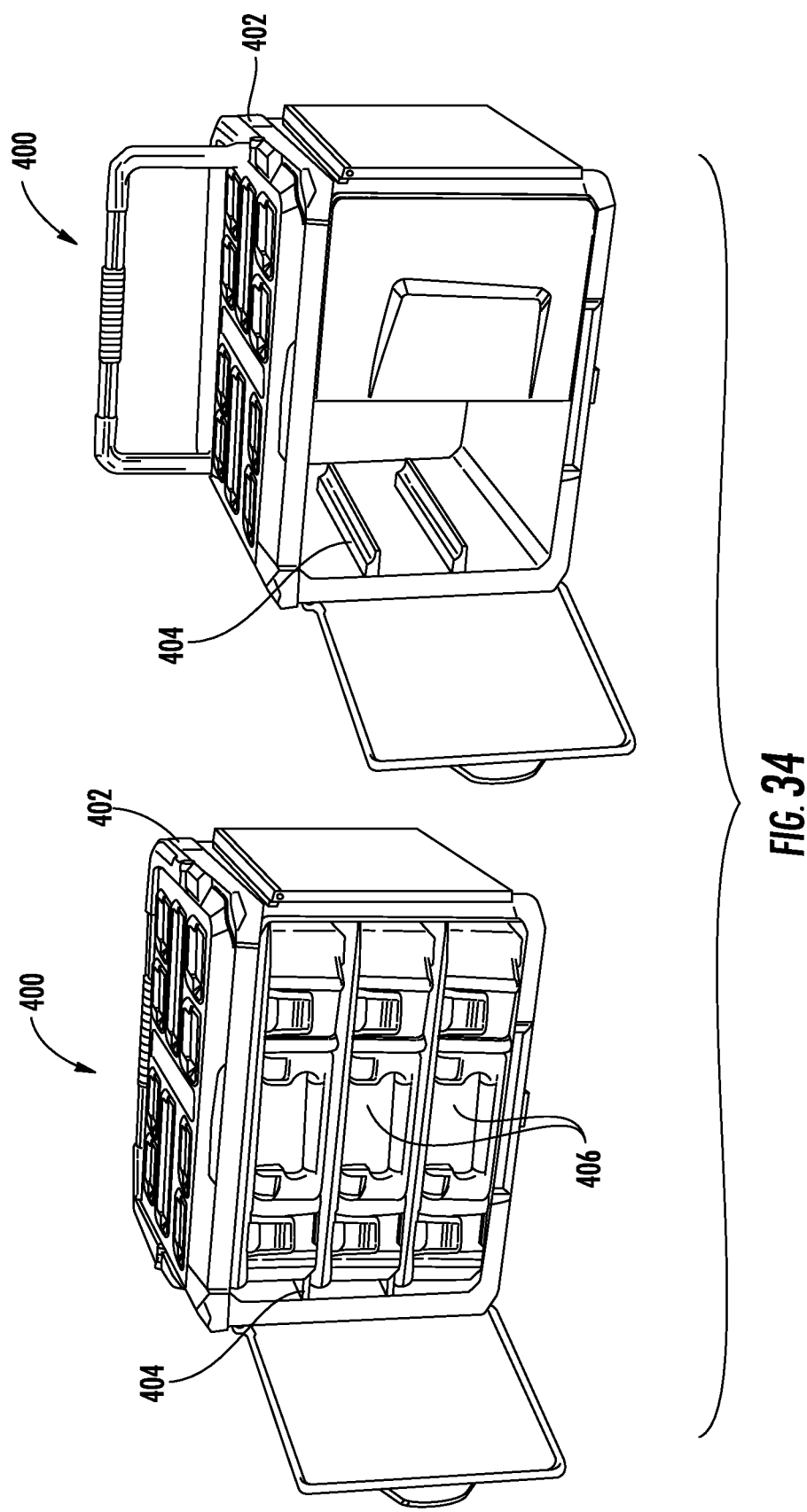
FIG. 34 illustrates a tool storage container according to another embodiment.

FIG. 34 illustrates a tool storage container 400. The container 400 includes a cabinet 402 that functions as a bulk storage compartment. The cabinet 402 has small shelves or ledges 404 on the side walls will allow users to stack in other organizers 406. The small shelves/ledges 404 will allow users to add their own full width shelving as needed.

Figure 35:
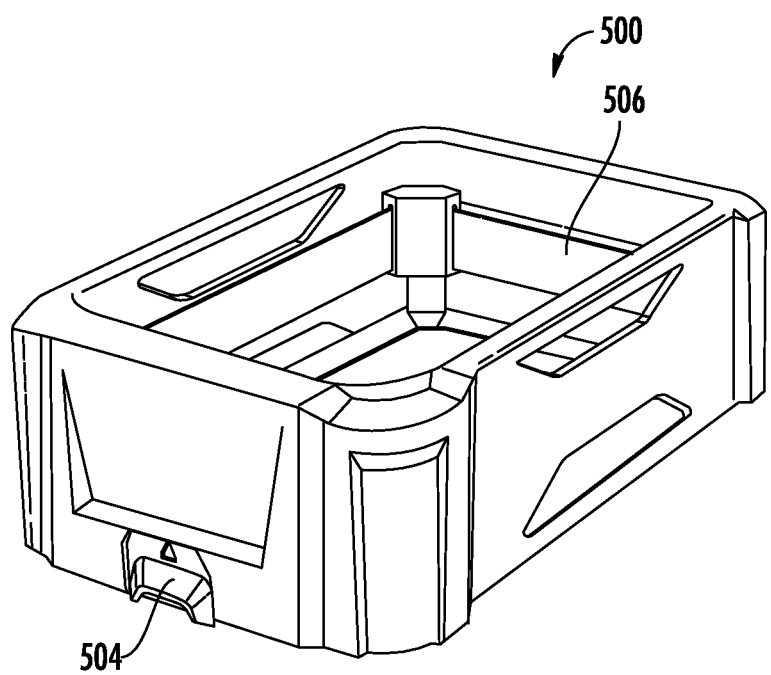
FIG. 35 illustrates a tool storage container according to another embodiment.
Figure 36:
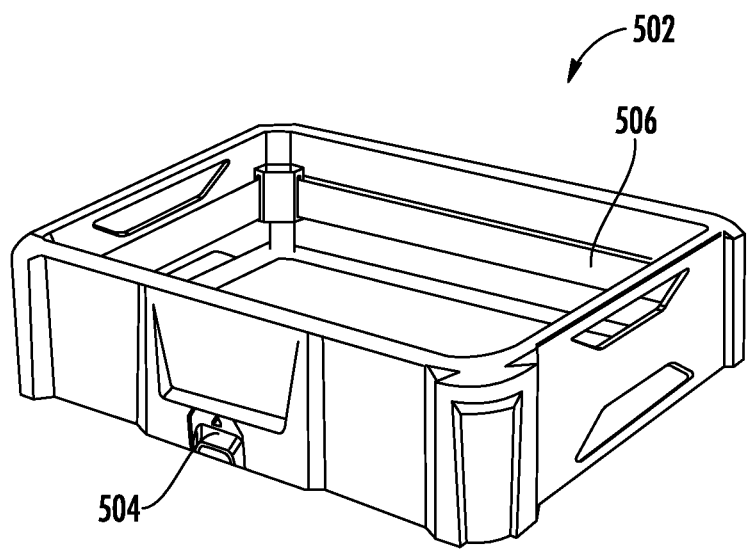
FIG. 36 illustrates a tool storage container according to another embodiment.

FIGS. 35 and 36 illustrate open cases 500 and 502 that are attachable to the top of the container 300 (FIGS. 33A-33F) via clips 504 and allow users bulk storage. An interior ring of elastic or stretchy material 506 allows users to secure items inside of the open case 500, 502.

Figure 37:
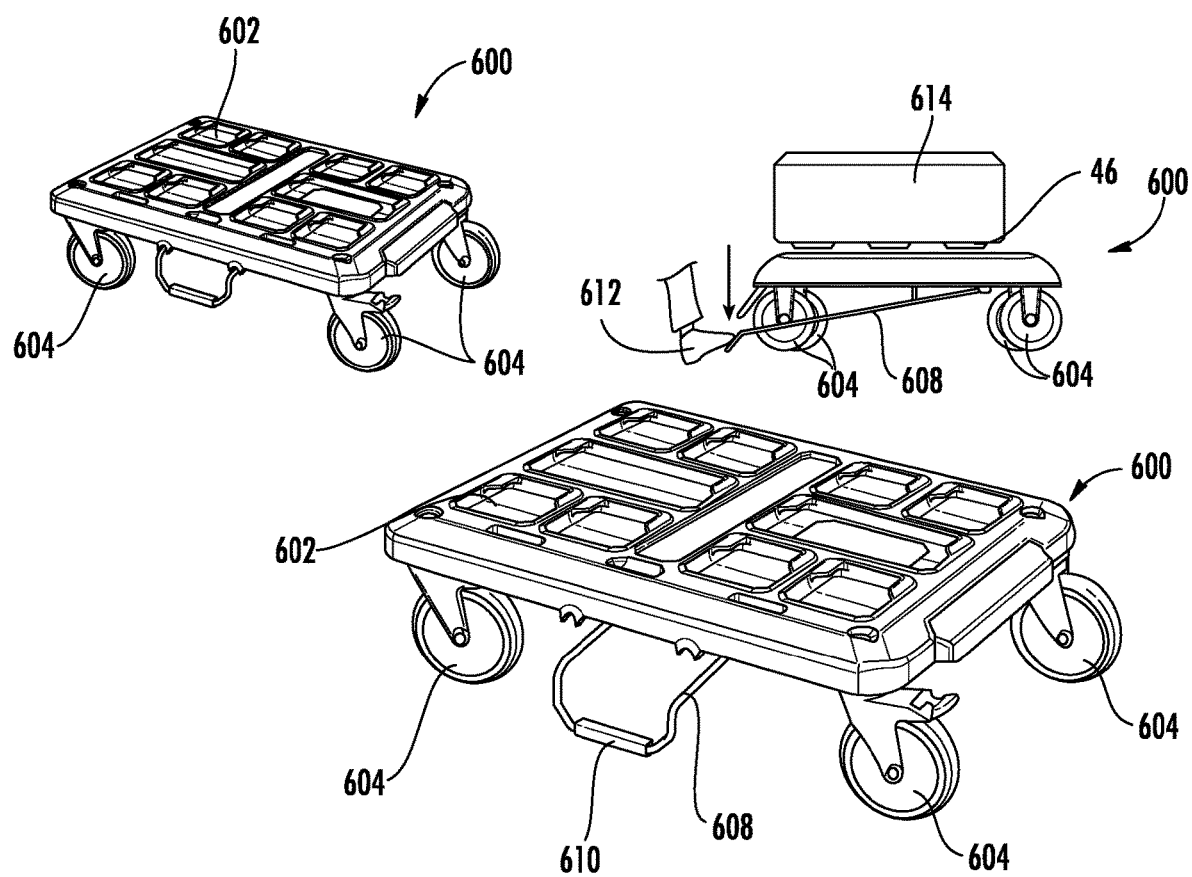
FIG. 37 illustrates a cart for use with tool storage containers.
Figure 38:
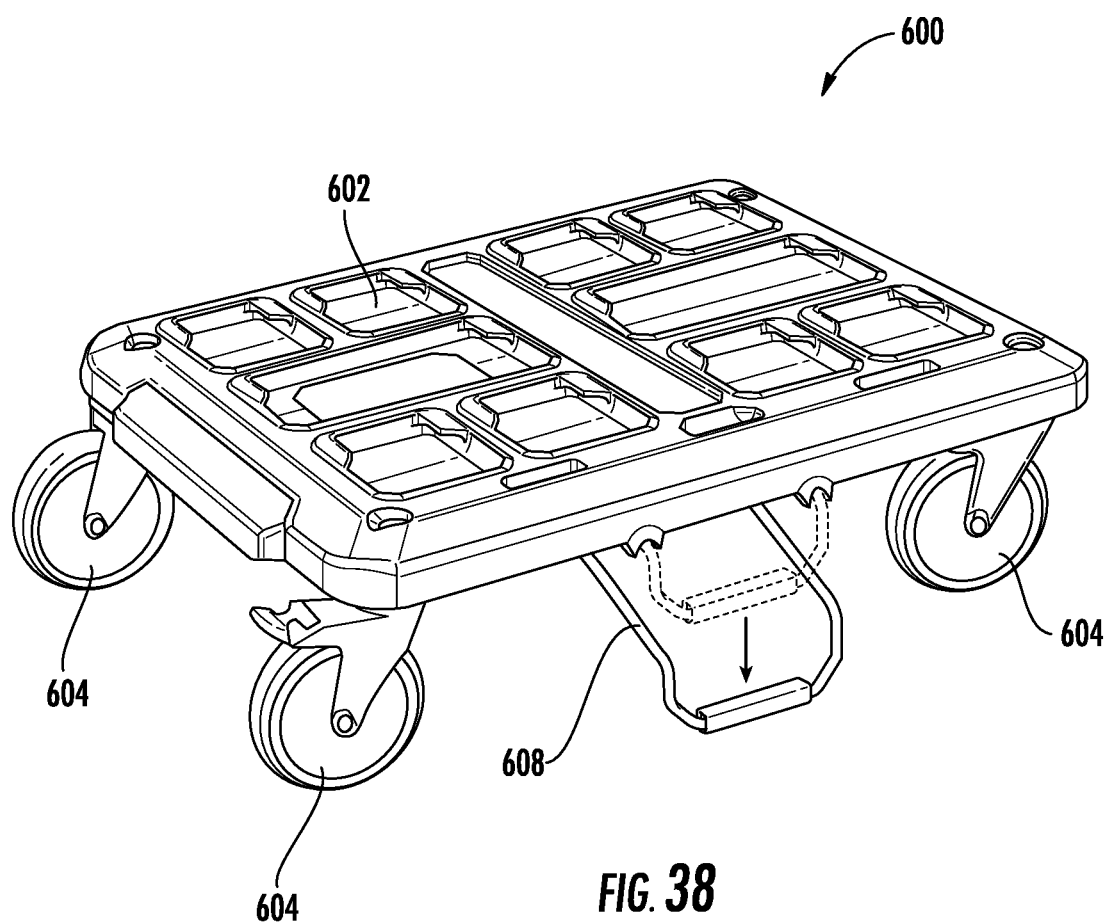
FIG. 38 is an alternative view of the cart of FIG. 37.

FIGS. 37 and 38 illustrate a rolling trolley or cart 600 that interact and connect to modular storage system described above. For example, the cart 600 includes recesses 602 that are sized to receive projects 46 (described above) so that the tool storage device 614 is held in position on the cart 600. The cart includes wheels 604 and a brake 608 that is on a lever. The brake 608 includes a rubber like substance 610 that grips the floor. When the user steps on the brake 608 with their foot 612, the trolley 600 is prevented from moving so that the tool storage device 614 can be pushed into place.

Figure 39:
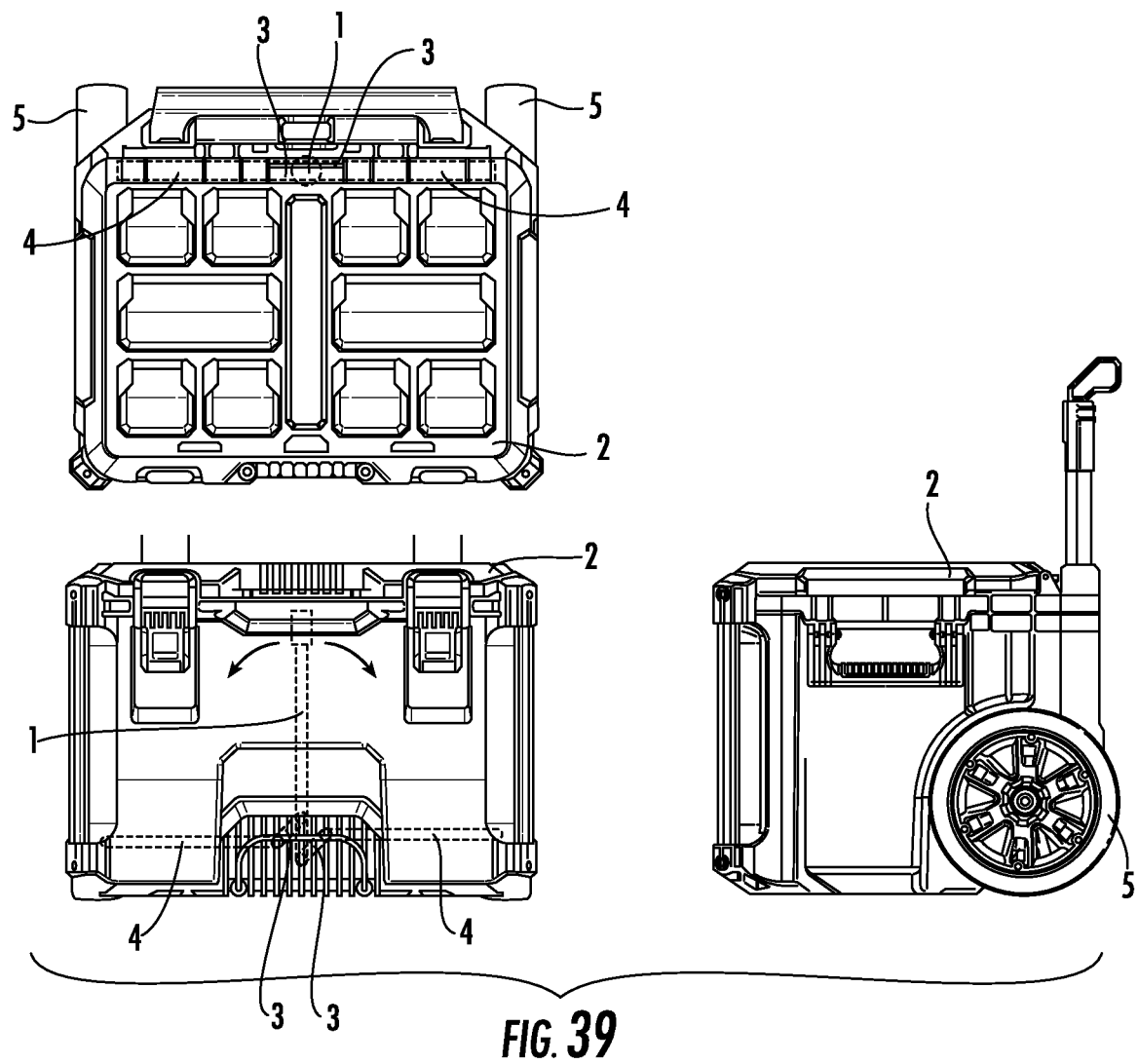
FIG. 39 illustrates an embodiment of a tool storage container having a wheel lock.

FIG. 39 illustrates a tool storage container having a wheel lock. The wheel lock includes a lever 1 that is only accessible when a housing lid 2 is open. The housing lid 2 may include a lock that inhibits access within the housing without a key, key pad entry or the like. Lateral movement of lever 1 causes linkages 3 to move bolt(s) 4 horizontally along their major axis. When lever 1 is laterally moved to one extreme bolt(s) 4 are fully retracted and wheels 5 are free to rotate. When lever 1 is laterally moved to the other extreme bolt(s) 4 are fully extended and engage wheel(s) 5 preventing them from rotating. Preventing the wheel(s) 5 from rotating may provide theft protection and a workplace safety enhancement.

Figure 40:
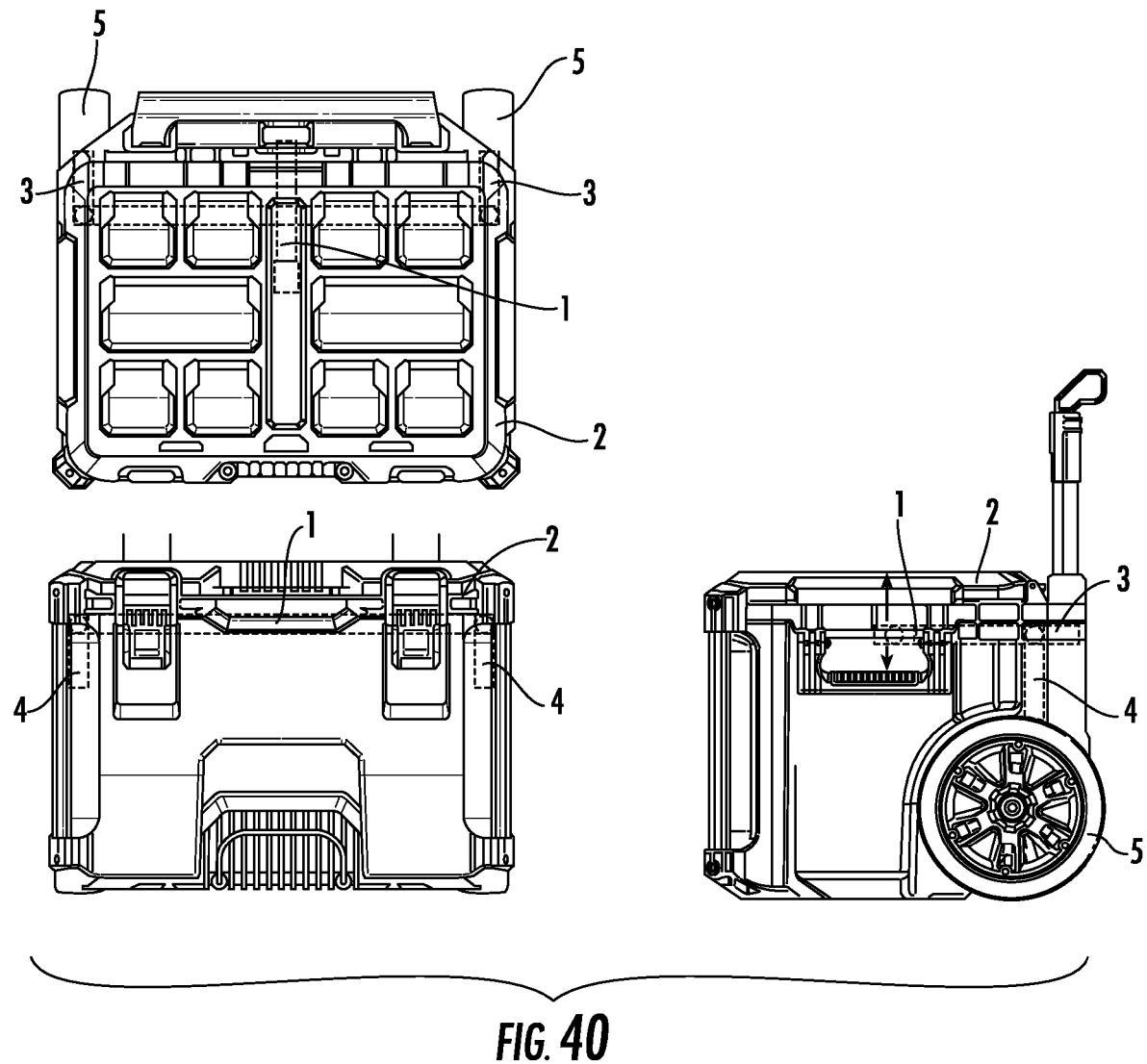
FIG. 40 illustrates an alternative embodiment of a tool storage container having a wheel lock.

FIG. 40 illustrates an alternative embodiment of a tool storage container having a wheel lock. In the embodiment of FIG. 40, the Lever 1 is only accessible when housing lid 2 is open. Vertical movement of lever 1 causes linkages 3 to move bolt(s) 4 vertically along their major axis. When lever 1 is moved vertically to one extreme bolt(s) 4 are fully retracted and wheels 5 are free to rotate. When lever 1 is moved vertically to the other extreme bolt(s) 4 are fully extended and engage wheel(s) 5 preventing them from rotating. Preventing the wheel(s) 5 from rotating may provide theft protection and a workplace safety enhancement. In other embodiments, the activation mechanism (e.g., lever 1) is placed in other locations within the housing, or allow external access to lever 1, or functionally similar device, can be envisioned and are included in this disclosure.

Figure 41:
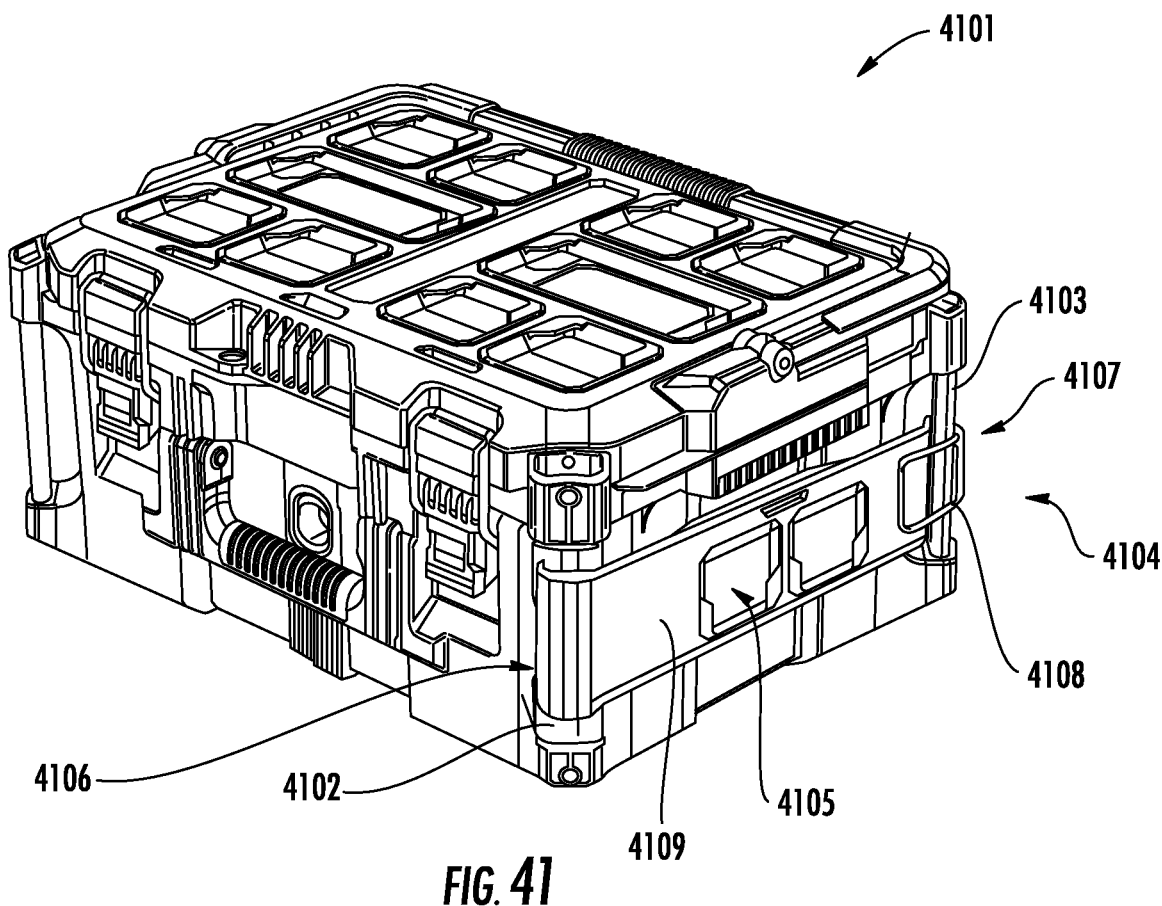
FIG. 41 illustrates a side mounted cleat for a modular storage box.

FIG. 41 illustrates a side mounted cleat for a modular storage box. The side mounted cleat includes cleat receptacles and detachable mounts. The detachable mounts removably couple the cleat to mounting rails of the storage box. The cleat receptacles received corresponding feet or cleats to couple compatible items to the side mounted clean and the storage box. The detachable mount can be a clip, a strap, a snap, snapped on, etc. The side mounted cleats allow items compatible with the modular storage to be mounted onto the sides of boxes. The storage container 4101 may include a first mounting rail 4102 and a second mounting rail 4103. The second mounting rail may be spaced apart from the first mounting rail. A mount 4104 may be detachably connected to the first mounting rail and the second mounting rail. The mount may include at least one cleat receptacle 4105 defined therein. In some embodiments, the first and second mounting rails 4102, 4103 may be located at respective corners of the storage container 4101. In such embodiments, the mount 4104 may span across an entire side of the storage container. The mount may include a first mount end 4106 and a second mount end 4107. At least one of the first and second mount ends 4106, 4107 may include a closure latch 4108. In some embodiments, the mount 4104 may be configured to resiliently snap on and off of the first and second mounting rails 4102, 4103. In many embodiments, the cleat receptacle 4105 may be defined in a rigid plate member 4109 of the mount 4104.

Figure 42:
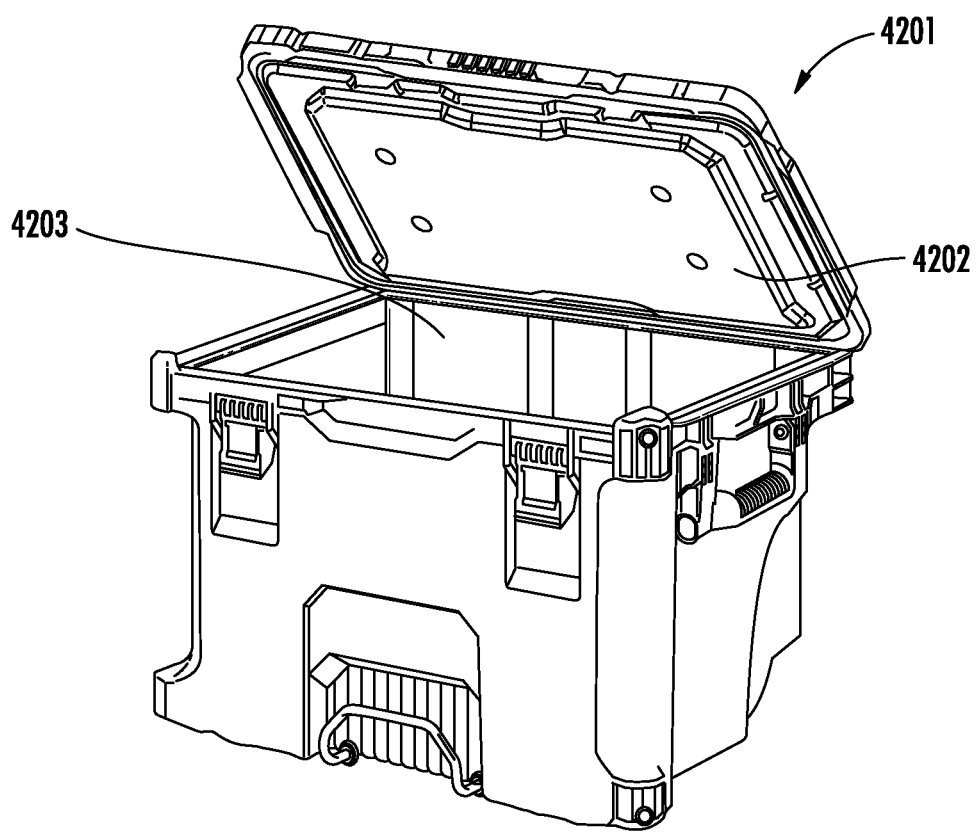
FIG. 42 illustrates toolbox or tool storage container that can be converted to a cooler.

FIG. 42 illustrates toolbox 4201 or tool storage container that can be converted to a cooler. An insulated lid insert 4202 may be removable such that the insulated lid insert is used when the toolbox is to be used as a cooler, but removed when the toolbox is to be used for storage of tools. The cooler insert 4203 is molded to fit securely inside the tool box and is insulated (e.g., with foam) to convert the toolbox into a cooler. The cooler insert may be removed.

Figure 43:
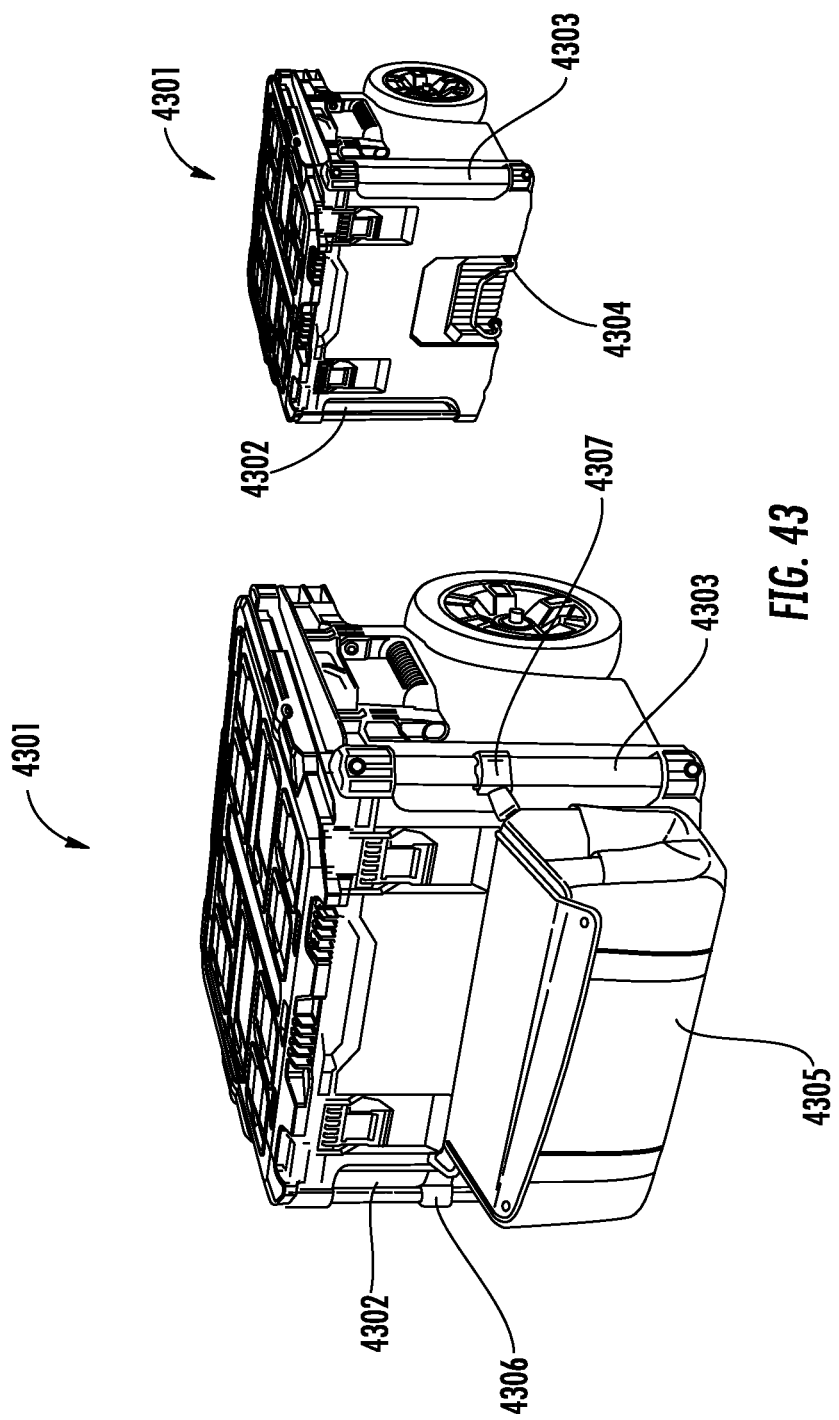
FIG. 43 illustrates a soft sided back that can be mounted to a side (e.g., front side) of a storage box or tool storage container.

FIG. 43 illustrates a soft sided back that can be mounted to a side (e.g., front side) of a storage box or tool storage container. A soft-sided bag (or other storage device) is mounted to the front of the modular storage box via mounting clips that mount to the mounting rails. Any suitable fastener can be used such as snaps, clips, hook-and-loop fasteners, etc. The back of the soft bag includes a receiving sleeve that slips over the tiedown rail on the modular storage box. This allows the soft bag (or other storage device) to be securely but removably mounted to the front of the storage box to add functionality and modularity to the storage box. The storage container 4301 may include a first mounting rail 4302 and a second mounting rail 4303 spaced apart from the first mounting rail. A tiedown rail 4304 may be disposed between the first and second mounting rails 4302, 4303. An auxiliary storage container 4305 may be mounted to the first and second mounting rails 4302, 4303. The auxiliary storage container 4305 may include a receiving sleeve, and the tiedown rail 4304 may be disposed in the receiving sleeve. In many embodiments, the auxiliary storage container 4305 may include a soft-sided bag. The auxiliary storage container 4305 may be removably connected to each of the first mounting rail 4302, the second mounting rail 4303, and the tiedown rail 4304. To attach to the first and second mounting rails 4302, 4303, many embodiments include the auxiliary storage container 4305 having a first resilient mounting clip 4306 removably connected to the first mounting rail and a second resilient mounting clip 4307 removably connected to the second mounting rail.

Figure 44:
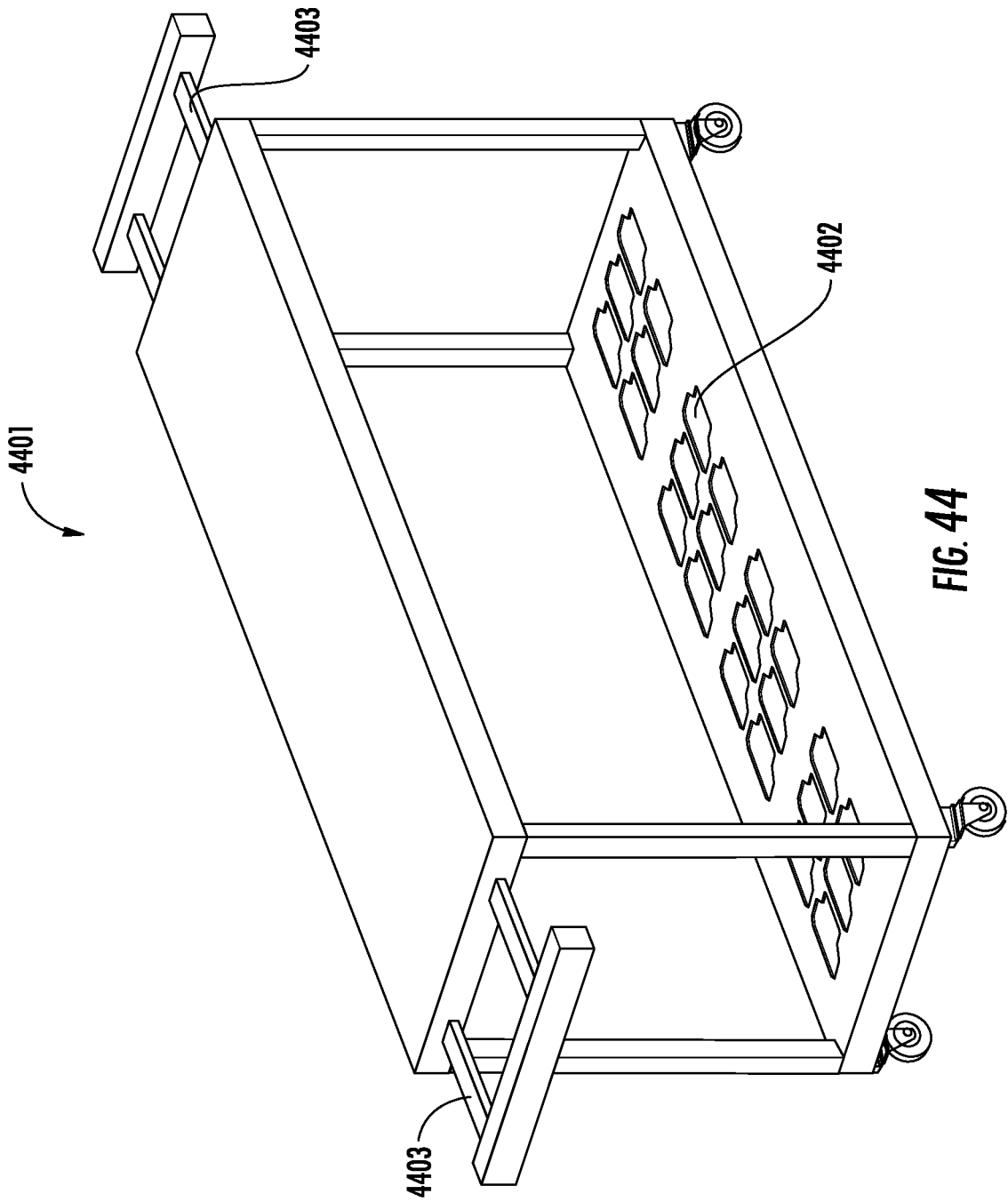
FIG. 44 illustrates a workstation for use with tool storage devices.

FIG. 44 illustrates a workstation 4401 for use with tool storage devices. The workstation (e.g., a cart, a wheeled work bench, a stationary bench), etc. includes modular attachment cleats 4402 that the pieces of the modular storage system secures to. The attachment cleats may be similar to the cleat receptacles illustrated in FIG. 41. The work station may include extendable table arms 4403.

Figure 45:
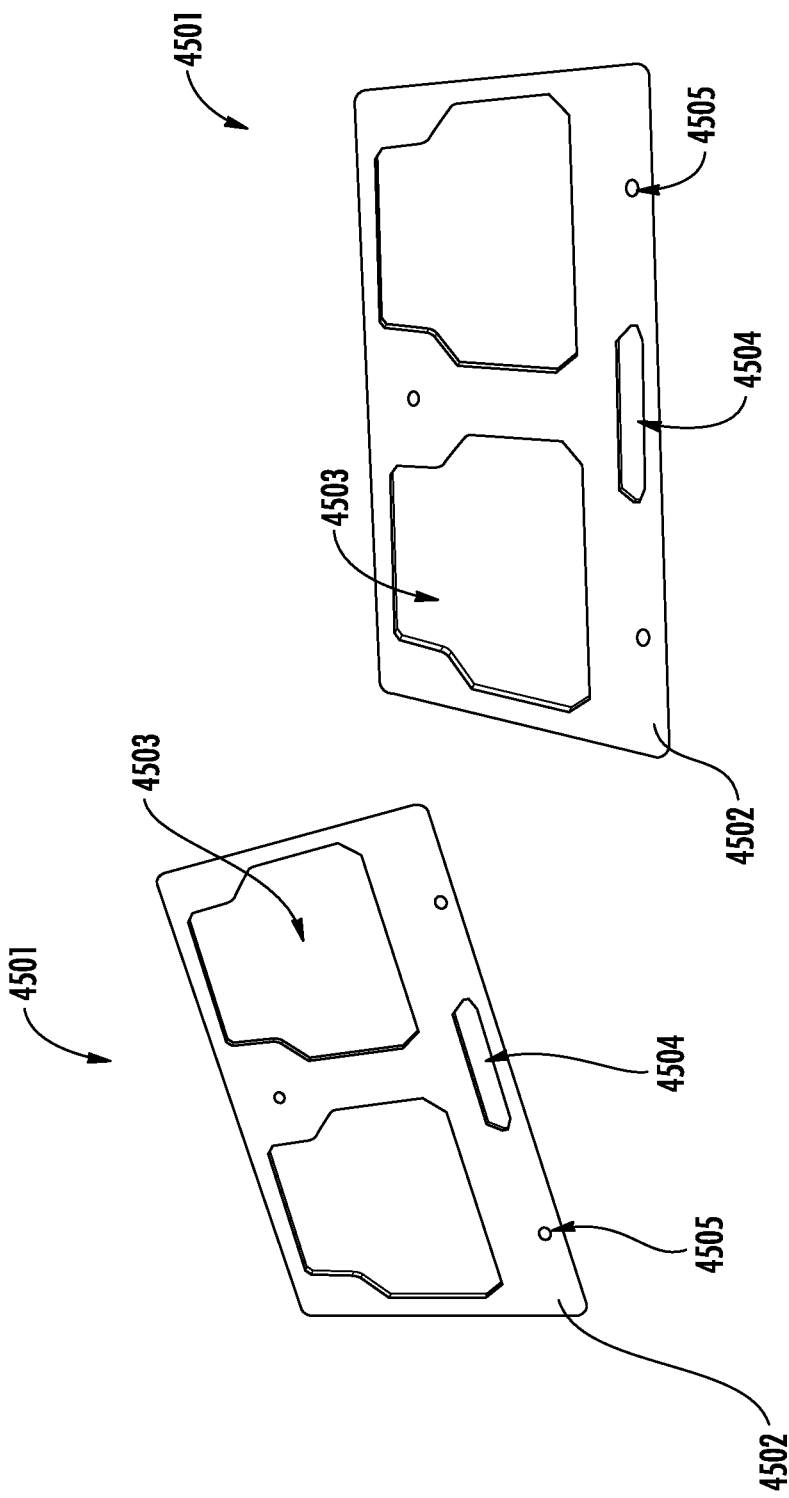
FIG. 45 illustrates a plate that includes cleat receptacles and a latch receptacle.

FIG. 45 illustrates a modular attachment plate 4501 that includes a plate body 4502, at least one cleat receptacle opening 4503 defined in the plate body, and a latch receptacle 4504 defined in the plate body. The plate includes a receptacle for a cleat of a tool storage device. In this embodiment, there are two cleat receptacles and one latch receptacle. In alternative embodiments, only one cleat receptacle may be used, the latch receptacle may not be used, and/or more than two cleat receptacles may be used. The plate may be mounted such that a cleat inserted into the cleat receptacle has space behind the plate to move into. In many embodiments including a storage container connected to the modular attachment plate 4501, the storage container may include a recess disposed adjacent the at least one cleat receptacle opening 4503. In some embodiments, such as in soft storage bags (e.g., a backpack), the plate may be mounted to a storage container including a fabric or flexible material (e.g., neoprene) that allows the cleat to be inserted into the cleat receptacle. The flexible material may be connected to the plate body 4502 of the modular attachment plate 4501 and the flexible material may flex away from the at least one cleat receptacle opening 4503 to form a recess. In one embodiment, the flexible material is mounted to the back of the plate body 4502. For example, the flexible material may be in a plane parallel to a plane of the plate body 4502. In such an example, when a cleat is inserted into one or more of the cleat receptacle openings 4503, the flexible material deforms to allow the cleat to pass through and rest behind the plate body 4502. The modular attachment plate 4051 may further include one or more attachment openings 4505 defined in the plate body 4502 to receive fasteners such as rivets, bolts, screws, thread, etc. to connect the modular attachment plate to a surface.

Figure 46:
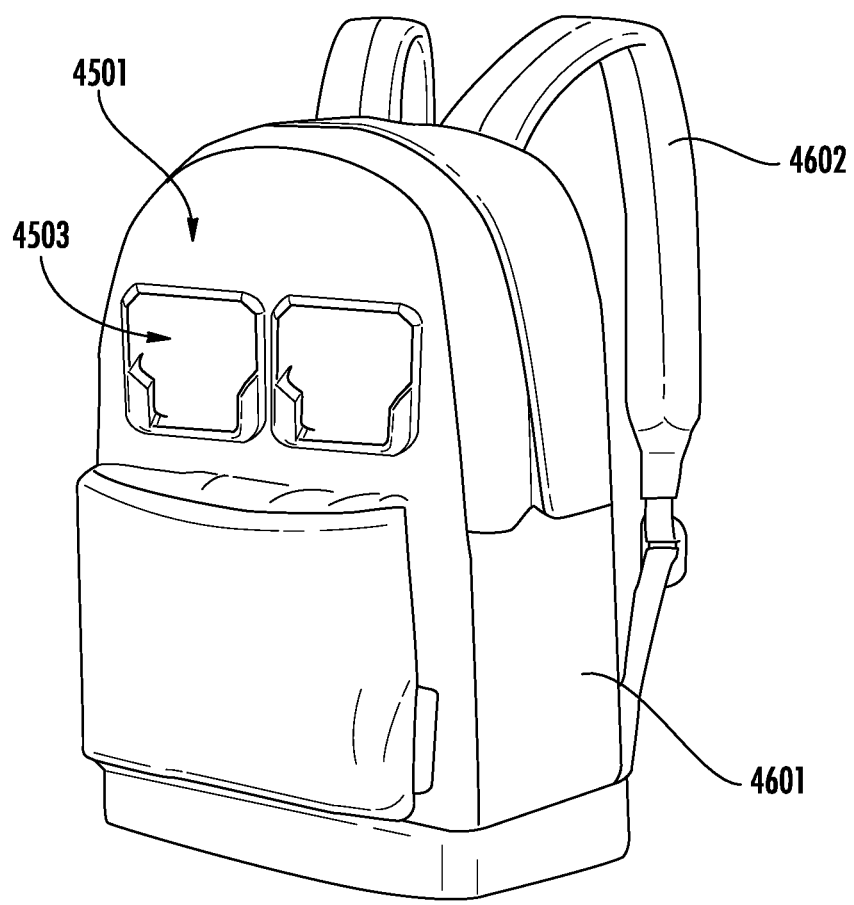
FIG. 46 illustrates the plate of FIG. 45 attached to a backpack.

FIG. 46 illustrates the plate of FIG. 45 attached to a storage container 4601. In some embodiments, the storage container 4601 may include a backpack. The backpack 4601 may include at least one carrying strap 4602.

Figure 47:
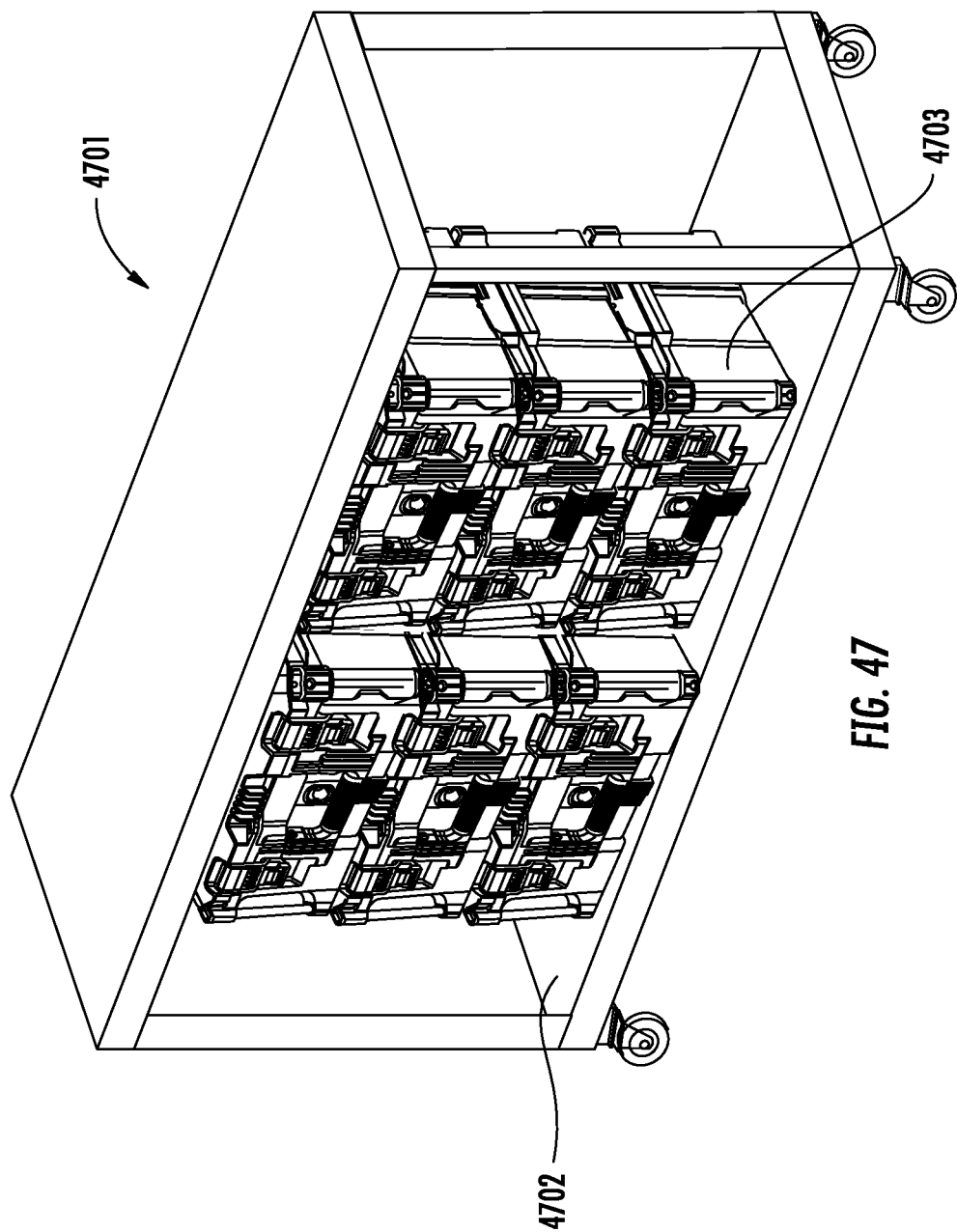
FIG. 47 illustrates a storage cart/work space that includes plates having cleat receptacles, similar to the cleat receptacles of the plate in FIG. 45.

FIG. 47 illustrates a storage cart/work space 4701 that includes plates having cleat receptacles, similar to the cleat receptacles of the plate in FIG. 45. Container compatibility can be incorporated into steel storage (e.g., mobile work stations, steel tool boxes, etc.). In the embodiment above, a shelf 4702 includes the cleat receptacles of FIG. 45 that allow compatible tool storage boxes 4703 or devices to be secured in place on the steel storage. The shelf may be on a roller device that allows the shelf to be pulled out.

Figure 48:
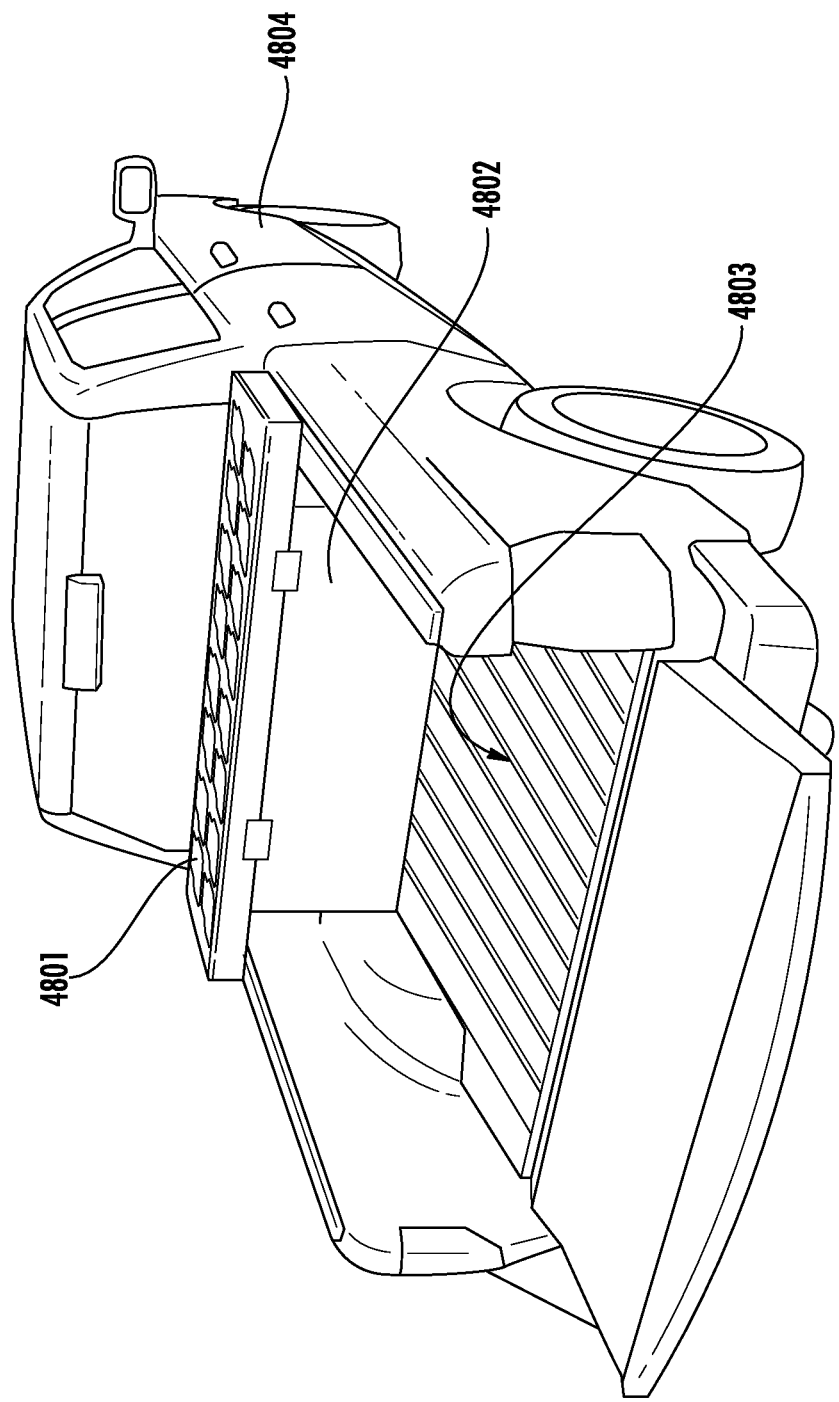
FIG. 48 illustrates the cleat receptacles of FIG. 45 integrated with a truck tool box.

FIG. 48 illustrates the cleat receptacles 4801 of FIG. 45 integrated with a truck tool box 4802. A tool box is mounted in the bed 4803 of the truck 4804 and includes cleat receptacles on a top surface of the lid (or on a side wall surface). The cleat receptacles allow compatible tool storage boxes or devices to be secured in place.

Figure 49:
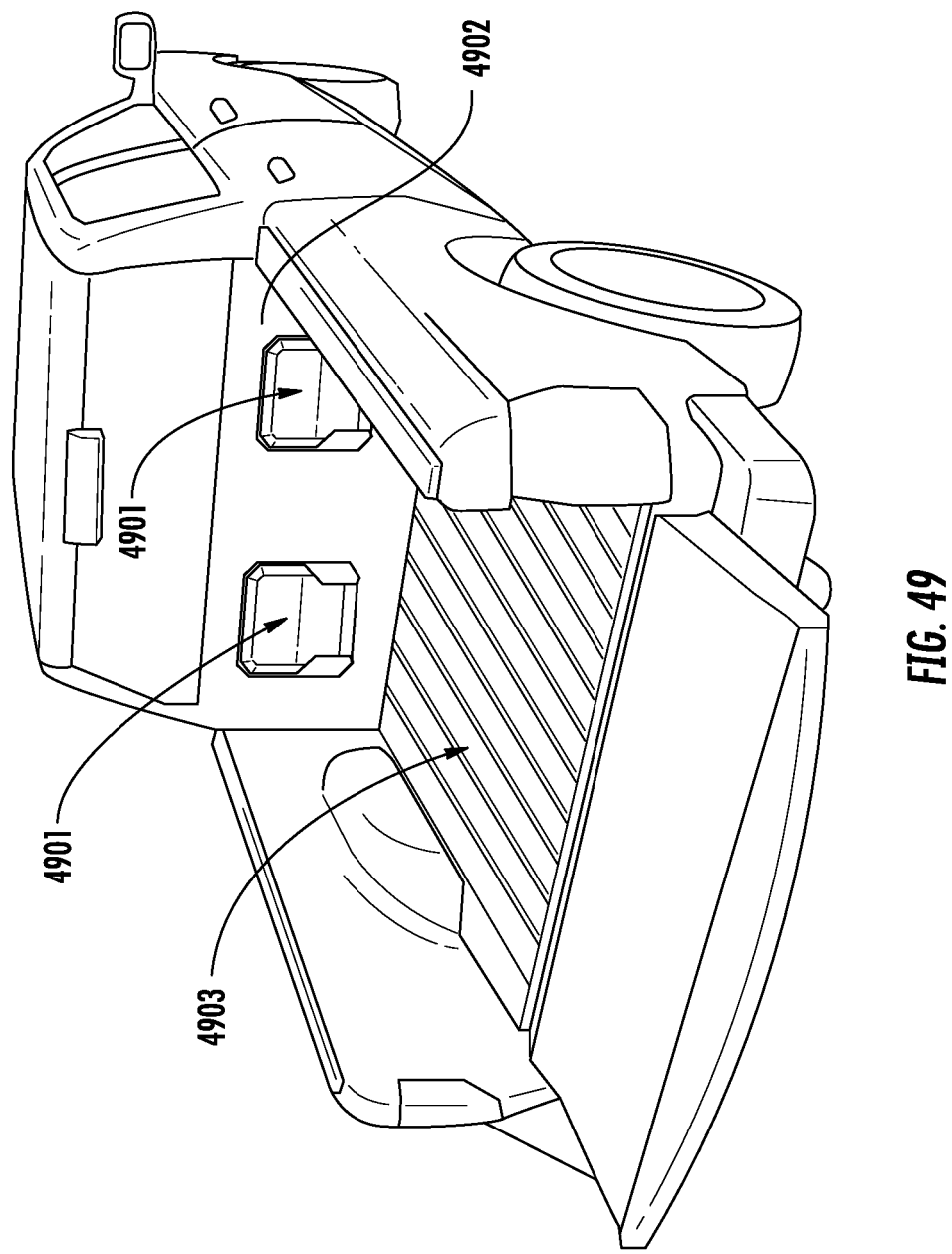
FIG. 49 illustrates the cleat receptacles of FIG. 45 mounted on a wall of the truck bed.

FIG. 49 illustrates the cleat receptacles 4901 of FIG. 45 mounted on a wall 4902 of the truck bed 4903. The cleat receptacles allow compatible tool storage boxes or devices to be secured in place.

Figure 50:
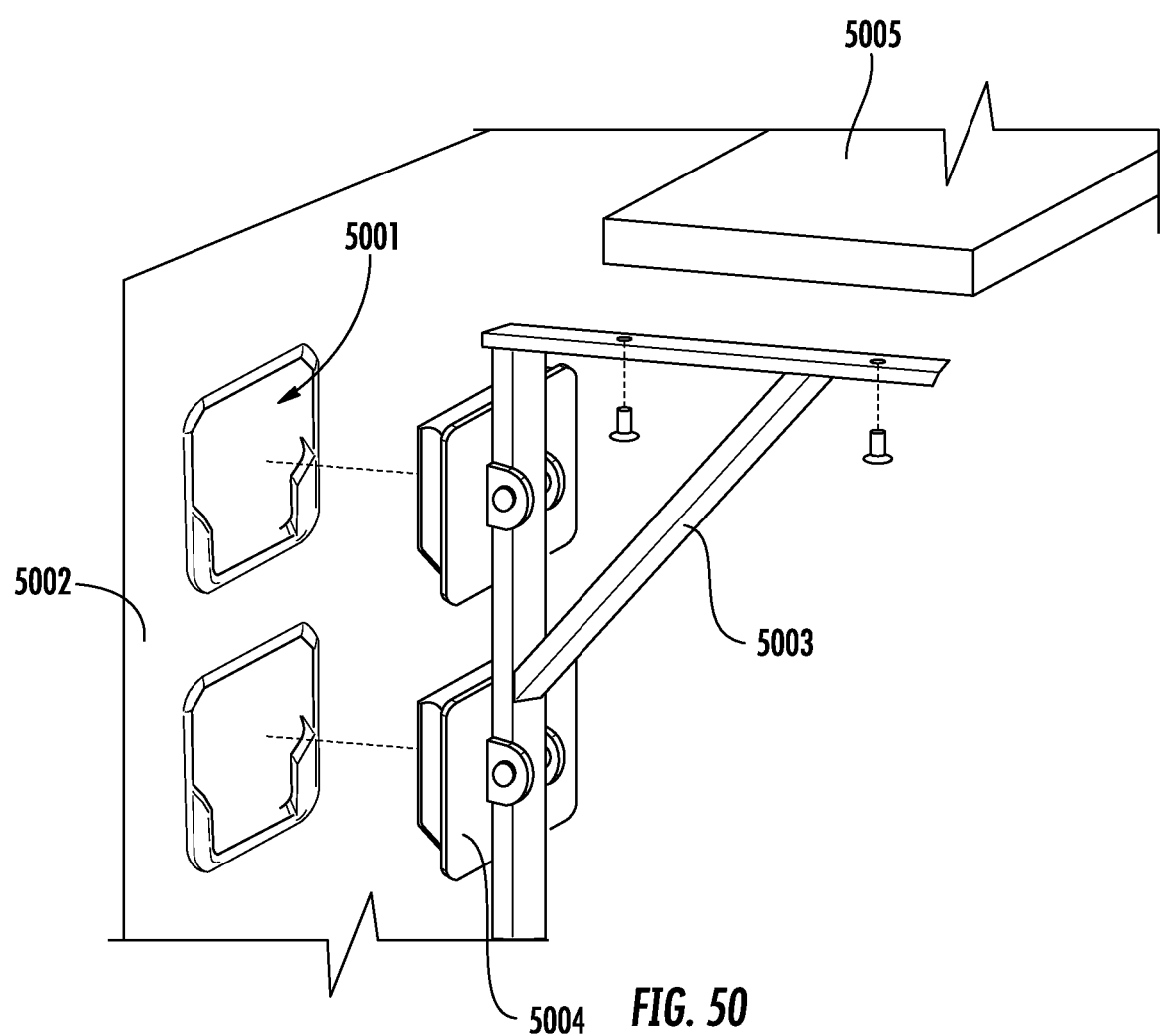
FIG. 50 illustrates the cleat receptacles of the cleat plate of FIG. 45 mounted to a floor or wall.

FIG. 50 illustrates the cleat receptacles 5001 of the cleat plate of FIG. 45 mounted to a floor or wall 5002. A bracket 5003 with the cleats 5004 is received in the cleat receptacles to mount the bracket to the floor or wall. A shelf 5005 is attached to the bracket to mount the shelf to the floor or wall.

Figure 51:
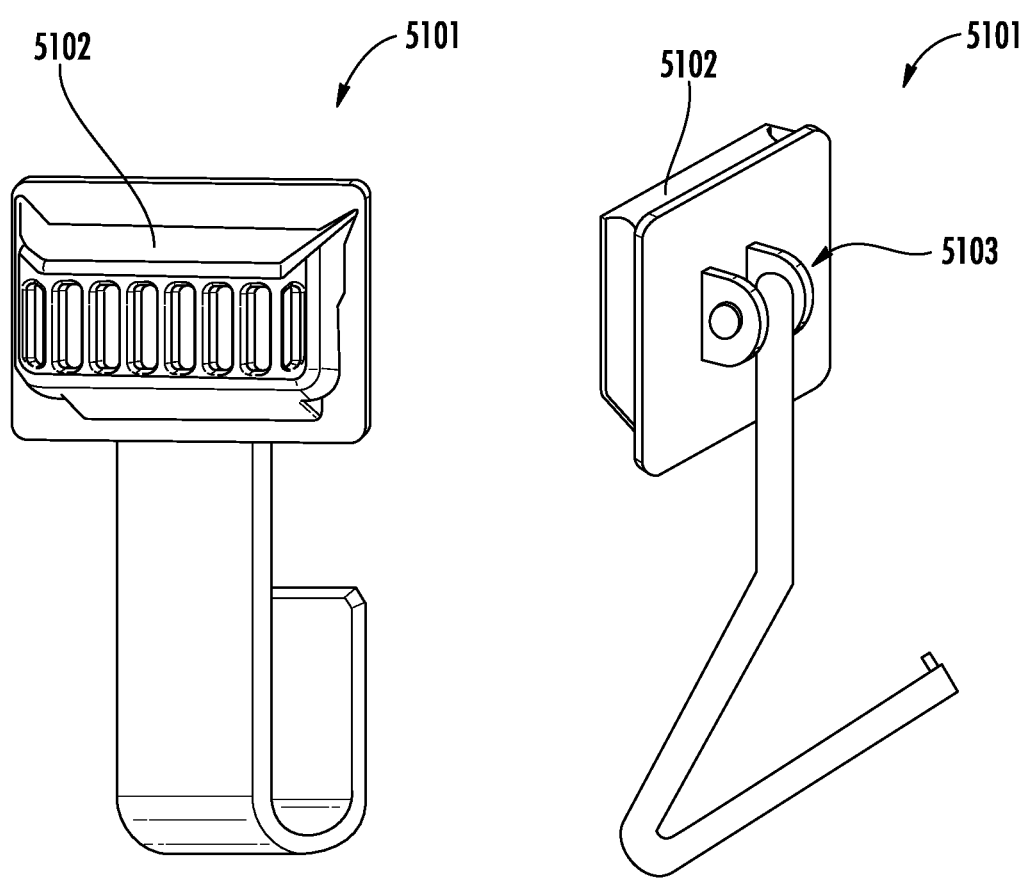
FIG. 51 illustrates a hook having a cleat.

FIG. 51 illustrates a hook 5101 having a cleat 5102. The cleat can be attached to the cleat receptacles described above to attach the hook to a device having the cleat receptacles. In one embodiment the hook can include a pivot 5103.

Figure 52:
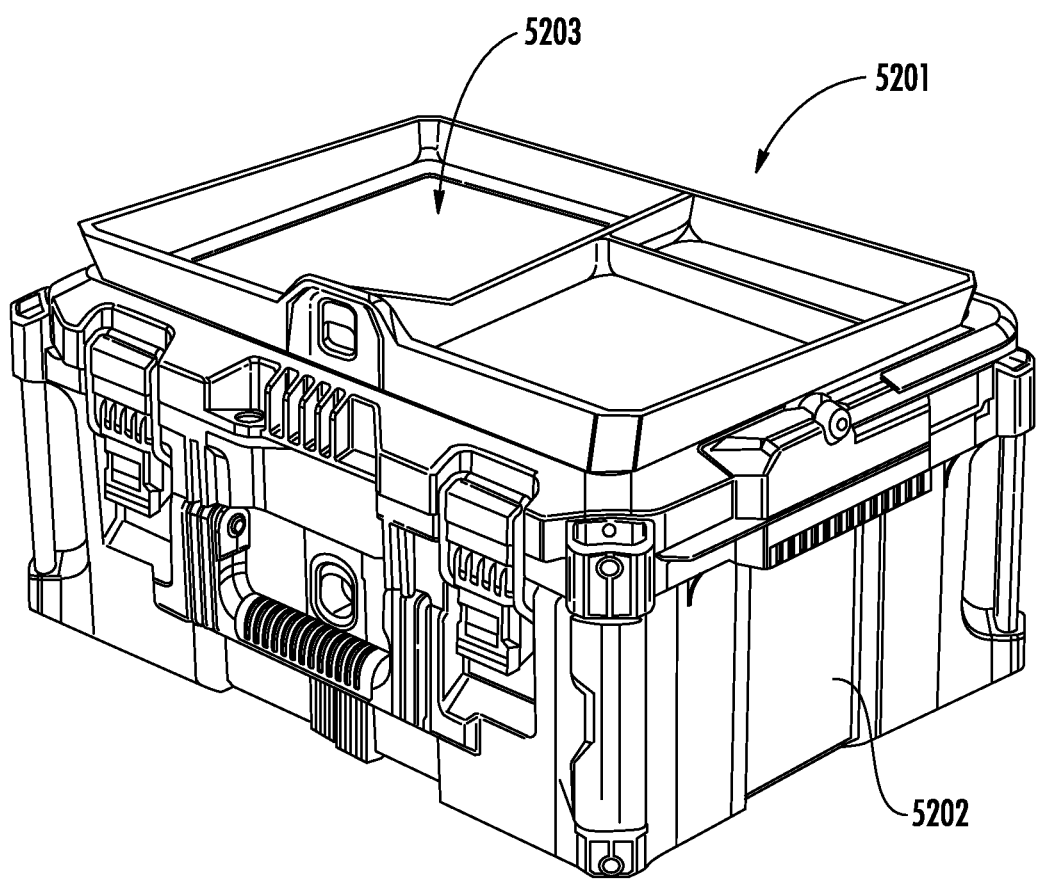
FIG. 52 illustrates an organizing tray attached to a modular storage box.

FIG. 52 illustrates an organizing tray 5201 attached to a modular storage box 5202. The tray includes a magnetic tray portion 5203. The tray includes cleats on the bottom of the tray that clips into the cleat receptacles (see FIG. 41) on the top of a modular storage box. At least a portion of the tray can be magnetic to prevent spillage of magnetic items such as bolts, tools, screws, etc.

FIG. 53 illustrates soft storage bags 5301 (e.g., totes or tool bags) having a hard (plastic) plate 5302 on the bottom that allows the soft bag to be secured to the systems described above. That is the plate includes cleats 5303 that can be received in cleat receptacles. The bottom plate may be removable or attached to existing bags with, for example, fasteners 5304 to retrofit the bags to be compatible with the storage system described above.

Figure 54:
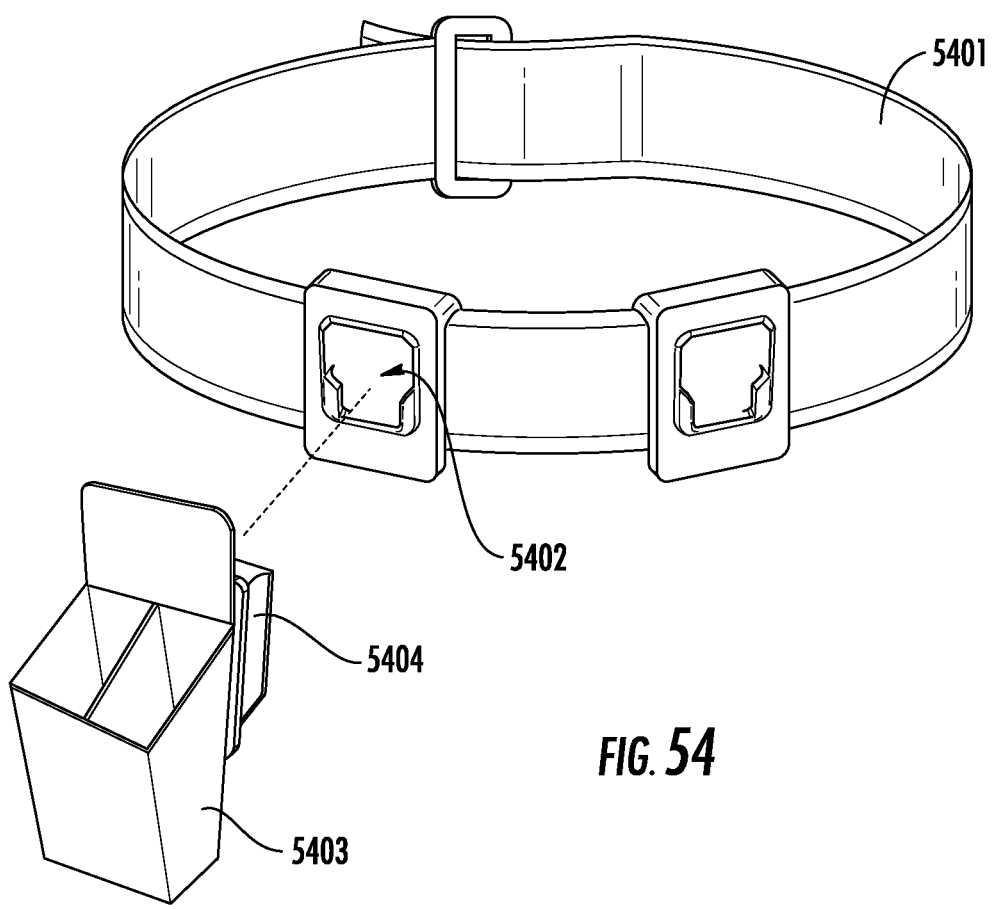
FIG. 54 illustrates a belt with a cleat receptacle that can receive any tool or bag that has a cleat, such as the cleats discussed above.

FIG. 54 illustrates a belt 5401 with a cleat receptacle 5402 that can receive any tool or bag 5403 that has a cleat 5404, such as the cleats discussed above. The tools/bags may be on a swivel such that when the wearer of the belt bends forward, the bag stays upright. For example, the user can strap various bags to his/her belt to transport tools/supplies from a truck to a work location and unload the tools/supplies at the work location.

Figure 55:
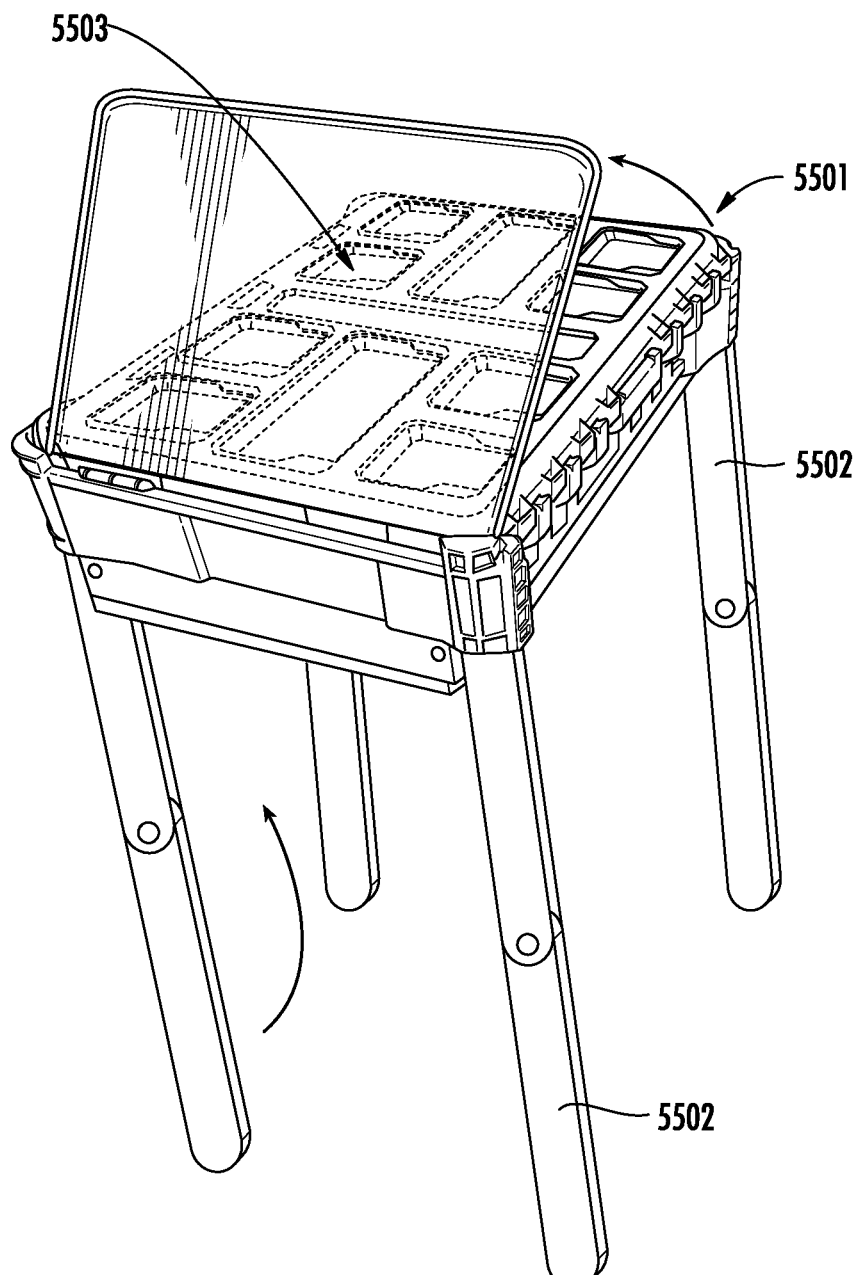
Figure 56:
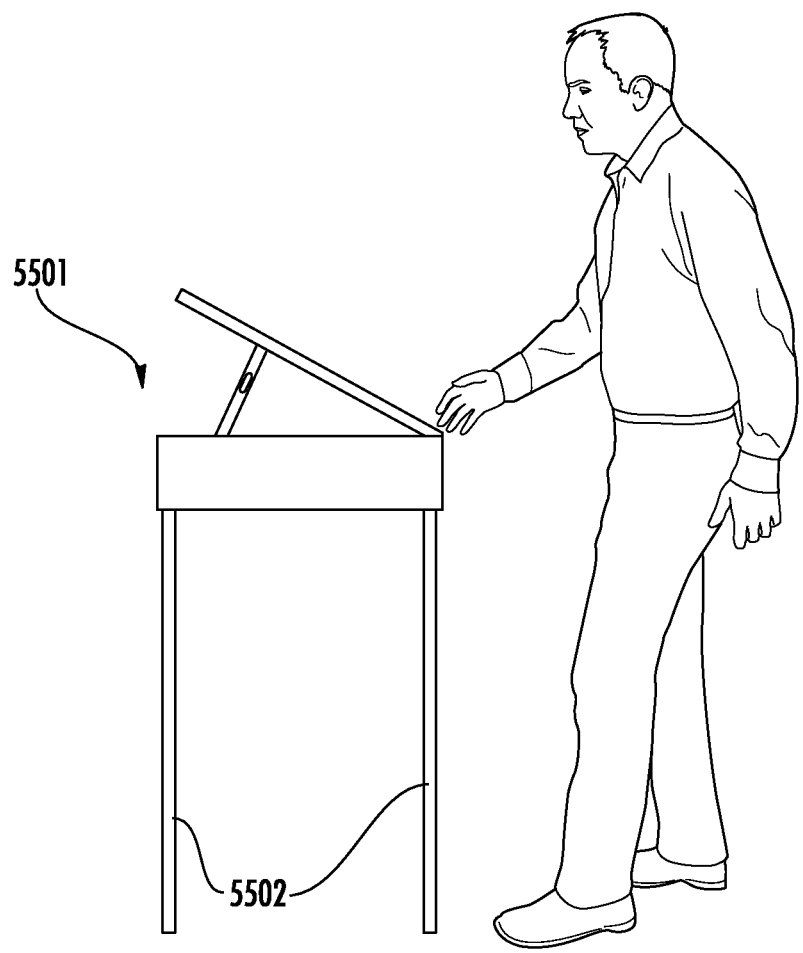
FIG. 56 illustrates the surface of FIG. 55 in a side elevation view.

FIGS. 55 and 56 illustrate that in another embodiment, a surface 5501 with retractable/foldable legs 5502 has cleat receptacles 5503 that can be used to snap a tool box having a cleat to. In an alternative embodiment, the foldable legs can be mounted directly to the bottom of a box, such as the box of FIG. 41.

Figure 57:
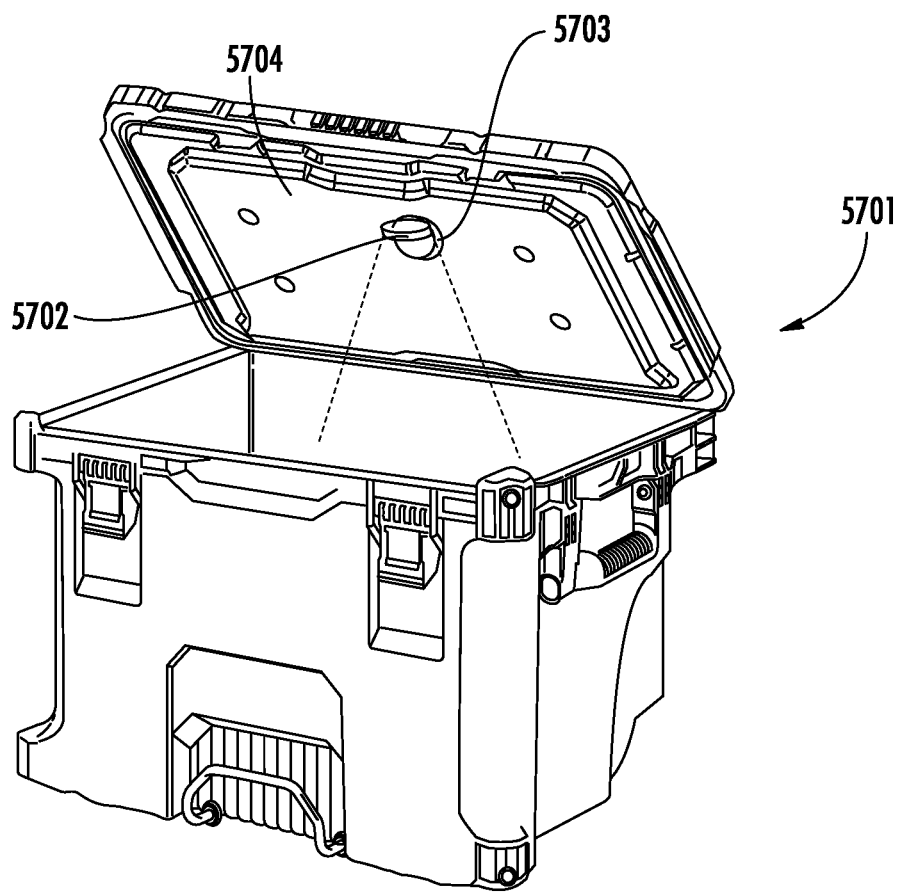
FIG. 57 illustrates a modular storage box having a light (e.g., LED) that is mounted to a boss in the lid of the modular storage box.

FIG. 57 illustrates a modular storage box 5701 having a light 5702 (e.g., LED) that is mounted to a boss 5703 in the lid 5704 of the modular storage box. The light can be adjustable to provide light to a desired portion of the box.

Figure 58:
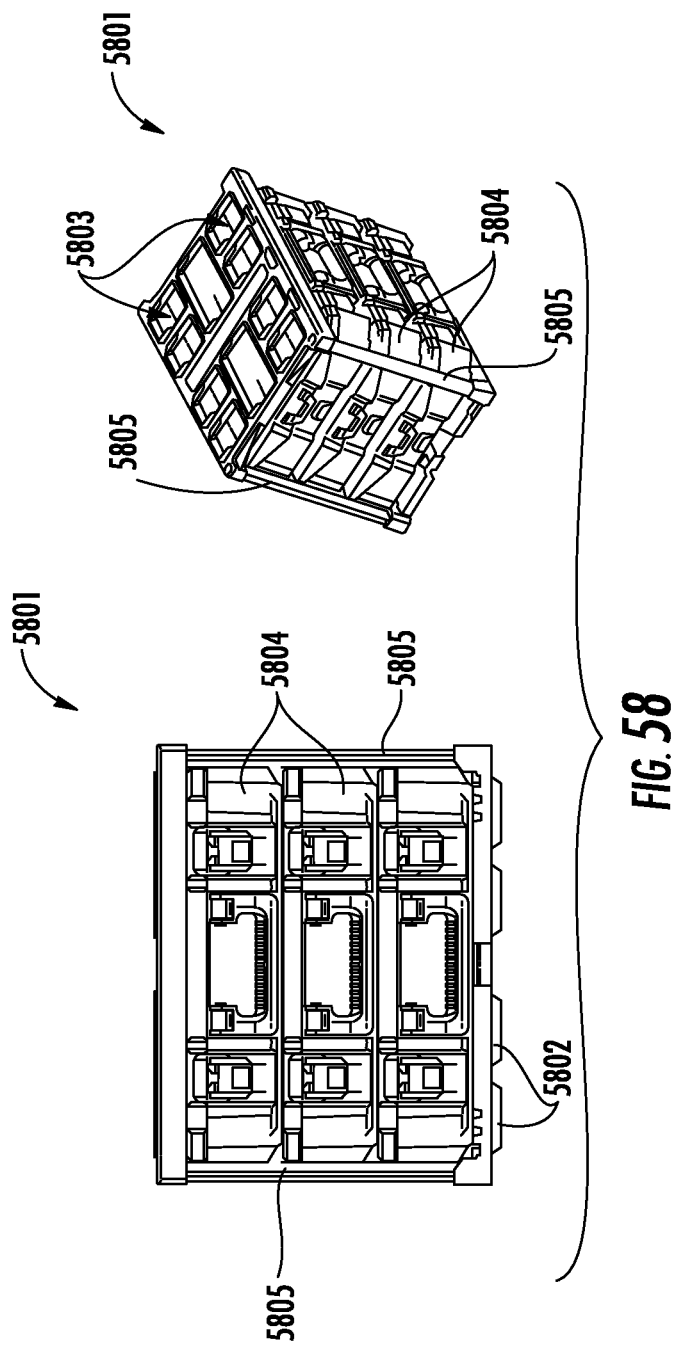
FIG. 58 illustrates an adaptor shelf having cleats and cleat receptacles that can be used with storages boxes that do not have cleats and/or cleat receptacles compatible with those discussed above.

FIG. 58 illustrates an adaptor shelf 5801 having cleats 5802 and cleat receptacles 5803 that can be used with storages boxes 5804 that do not have cleats and/or cleat receptacles compatible with those discussed above. The shelving unit includes a bottom plate and a top plate. The bottom surface of the bottom plate includes cleats to be attached to a receptacle surface having cleats. The top surface of the bottom plate is adapted to interact with a non-modular storage system (e.g., storage boxes without cleats and/or cleat receptacles). The top surface of the top plate can have the cleat receptacles such that the shelving unit can be loaded on top of and beneath boxes having the cleats and cleat receptacles (e.g., box of FIG. 41). Also, the rails 5805 that support the top and bottom plates to one another can be adjustable such that any suitable height of the shelving unit can be used.

Figure 59:
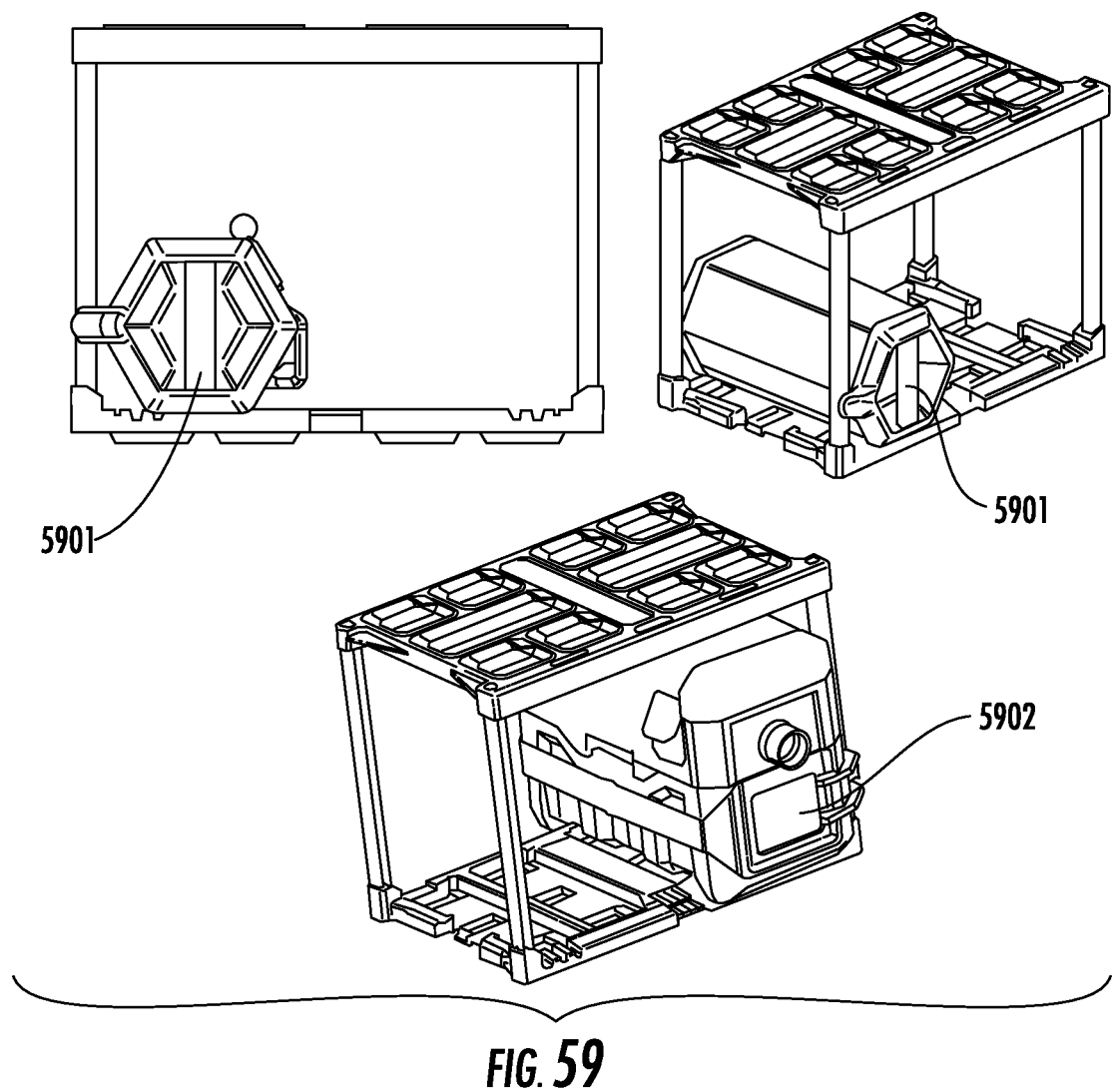
FIG. 59 illustrates the adaptor shelf of FIG. 58 with various items other than storage boxes.

Referring to FIG. 59, similar to FIG. 58, other tools can be adapted to be mounted between the top and bottom plates. For example, a speaker 5901 or vacuum 5902 having a cleat can be mounted to the bottom plate.

Figure 60:
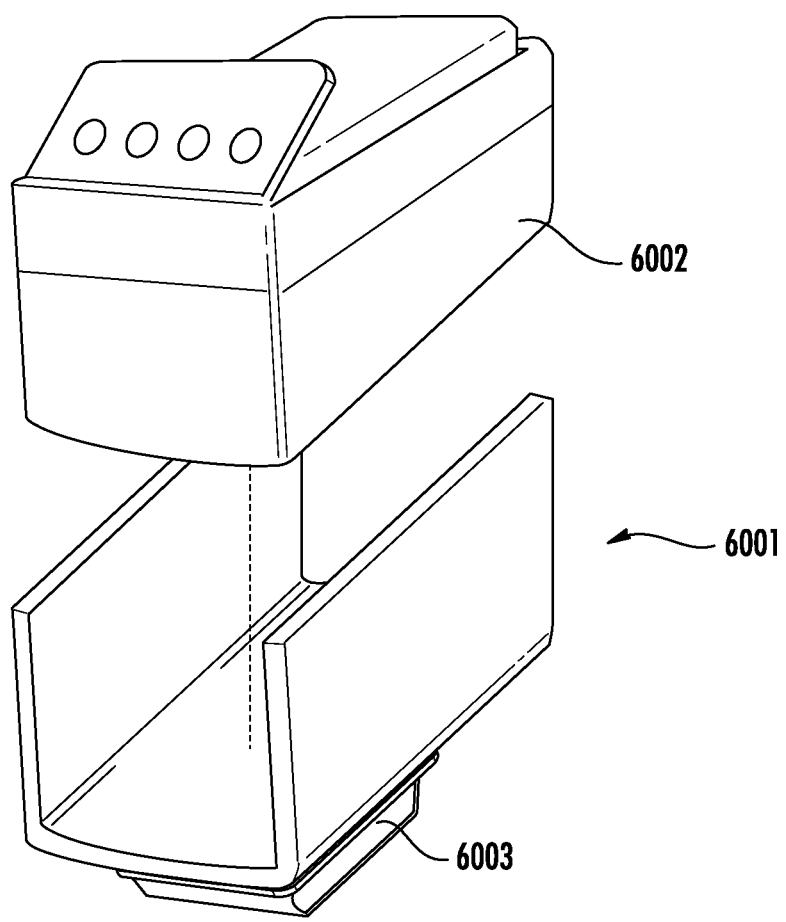
FIG. 60 illustrates a battery clamp can be used and can compress along the sides of a battery.

FIG. 60 illustrates a battery clamp 6001 that can be used and can compress along the sides of a battery 6002. The bottom of the clamp includes a cleat 6003 to secure the battery and clamp to a cleat receptacle.

Figure 61:
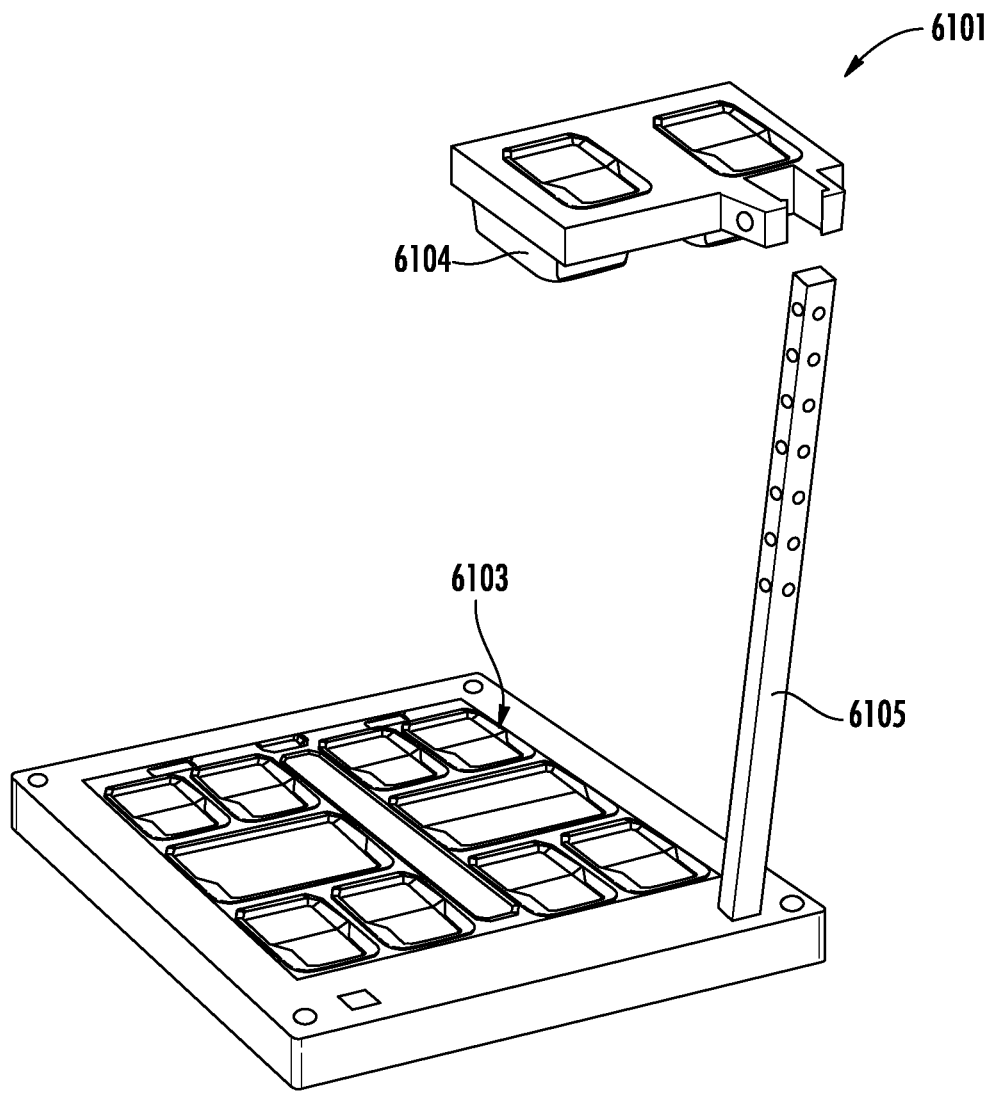
FIG. 61 illustrates a stack lock.
Figure 62:
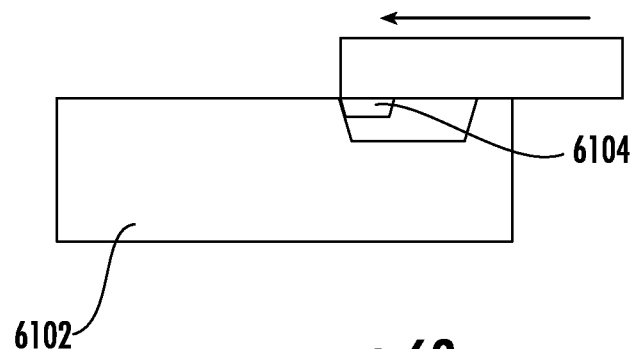
FIG. 62 illustrates an upper connection portion of the stack lock of FIG. 61.
Figure 63:
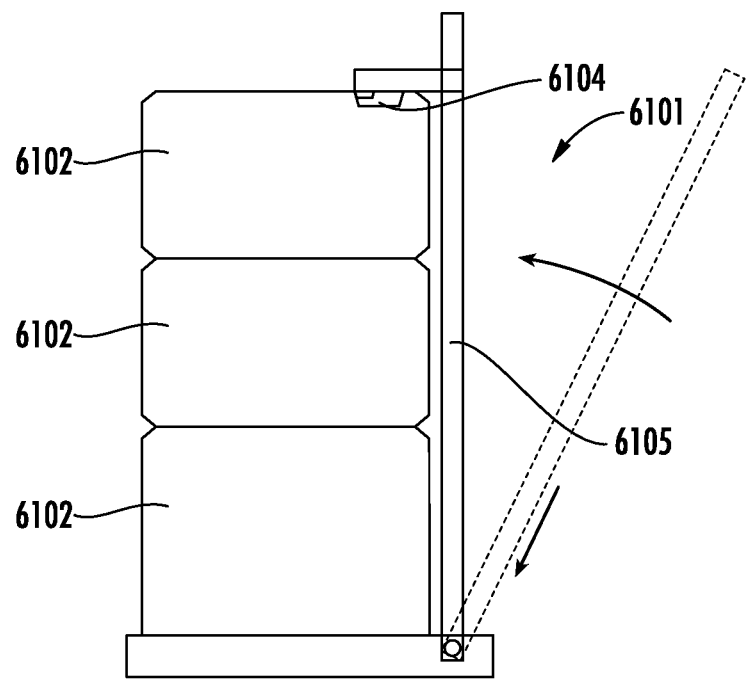
FIG. 63 illustrates the stack lock of FIG. 61 with storage boxes disposed thereon.
Figure 64:
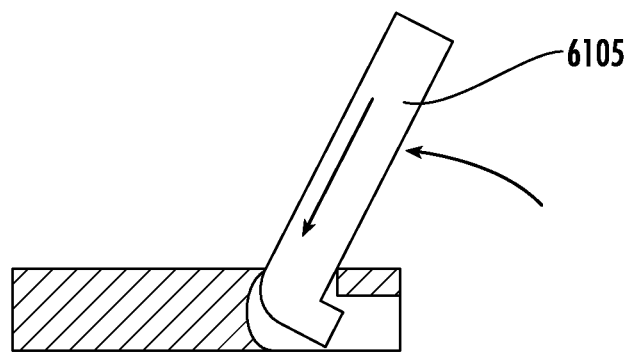
FIG. 64 illustrates a lower joint of the stack lock of FIG. 61.
Figure 65:
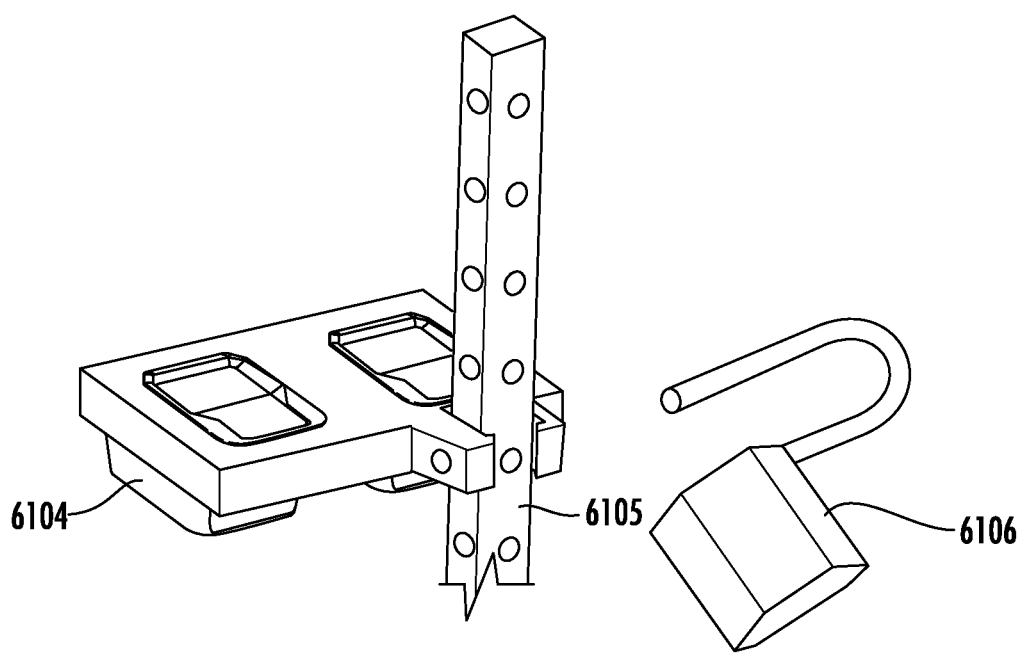
FIG. 65 illustrates an upper joint of the stack lock of FIG. 61.

FIG. 61 illustrates a stack lock assembly 6101. A stack of modular boxes 6102 (e.g., box of FIG. 41) can be locked together with the stack lock assembly 6101. A base cleat 6103 can be secured to the bottom surface of a bottom box (e.g., the base cleat can receive a cleat on the bottom of the bottom box). The top cleat, or adjustable cleat 6104, can be secured to the top surface of a top box (e.g., be slid into a cleat receptacle on the top of the top box). The base cleat 6103 may be permanently or removably connected to a rail 6105. The top cleat can slide along the rail 6105 into position. Stated another way, the adjustable cleat 6104 may be translatably disposed on the rail 6105. Once in position, the adjustable cleat can be locked into place with a lock mechanism, for instance, a padlock 6106 to prevent uncoupling of the top and bottom boxes (or others in between) and prevent opening of the boxes.

Figure 66:
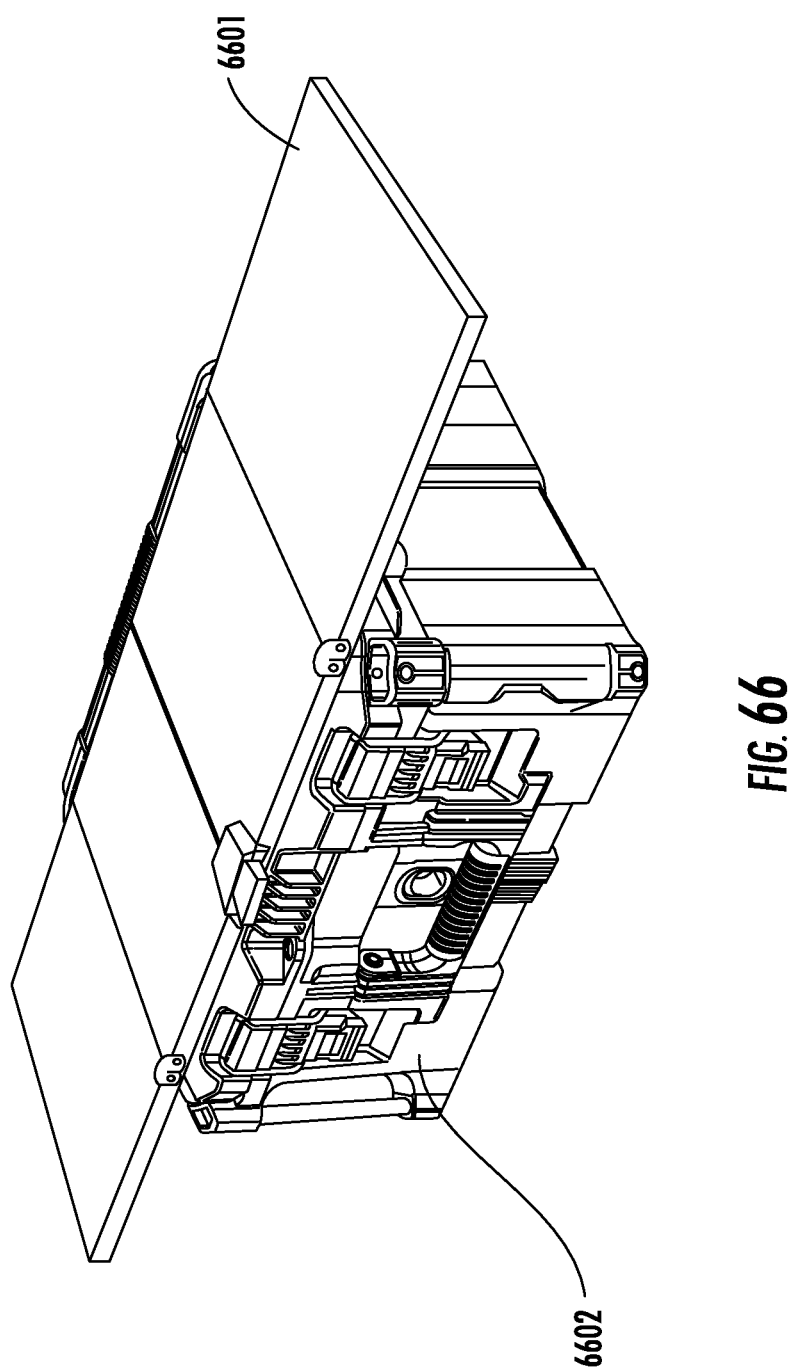
FIG. 66 illustrates a fold-out or slide out work surface has cleats that can be secured to the top of a box having cleat receptacles (e.g., box of FIG. 41) to create a mobile work station.

FIG. 66 illustrates a fold-out or slide out work surface 6601 has cleats that can be secured to the top of a box 6602 having cleat receptacles (e.g., box of FIG. 41) to create a mobile work station.

Figure 67:
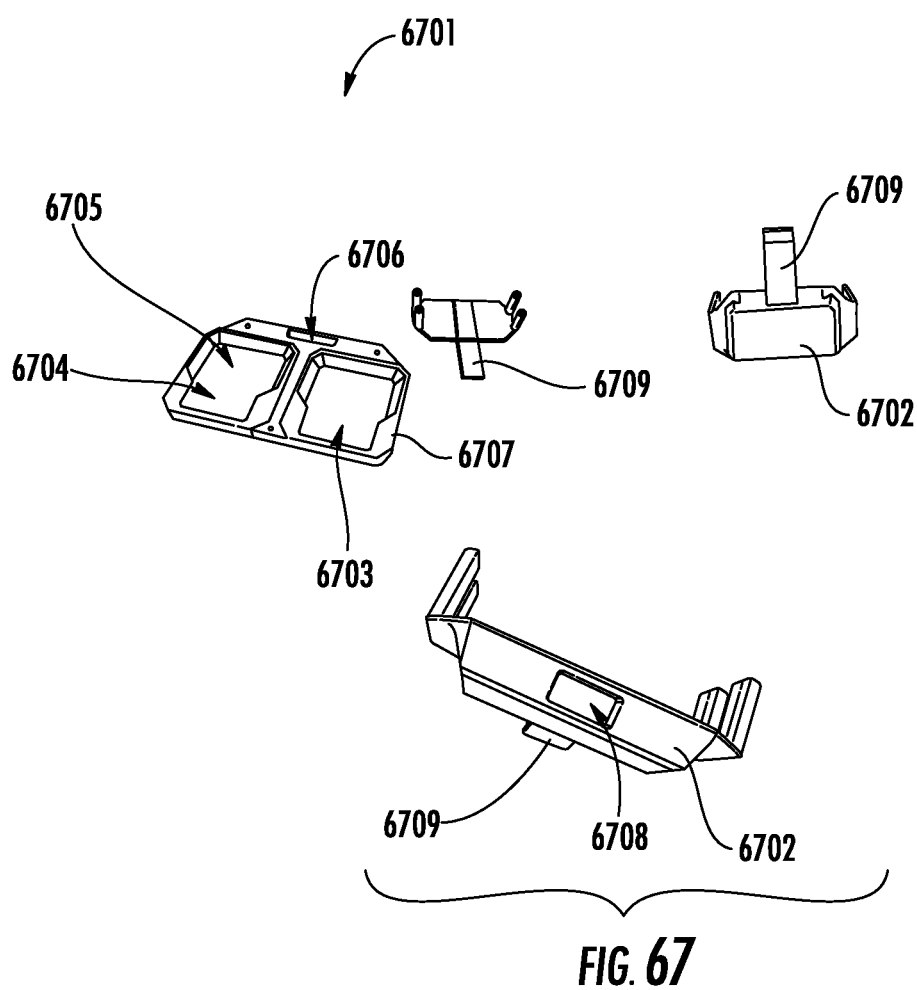
FIG. 67 illustrates a device that is used to lock devices with a cleat received in a cleat receptacle in place.

FIG. 67 illustrates a cleat assembly 6701 that is used to lock devices with a cleat 6702 received in a cleat receptacle 6703 defined in a receiver body 6707. The cleat receptacle 6703 may include a wide portion 6705 and a narrow portion 6704. In some embodiments, to lock the items in place, after sliding the cleat 6702 into the narrow portion 6704 of the cleat receptacle 6703, a latch may be inserted into a latch receptacle 6706. In other embodiments, however, this single cleat 6702 can lock an item into place without use of the latch or latch receptacle 6706. The body of the cleat 6702 includes a through hole 6708 that receives a slide 6709. The slide 6709 may include detents that interact with a spring loaded bearing. The slide 6709 may slide within the through hole 6708 and may be as long as the cleat receptacle 6703 (i.e., presses against the front and rear faces of the cleat receptacle. The cleat 6702 is inserted first into the wide portion 6705 and then slid toward the rear in a direction toward the narrow portion 6704 of the cleat receptacle 6703. During the insertion and sliding of the cleat 6702, the slide 6709 may stay in place with respect to the cleat receptacle 6703. The detent and spring loaded bearing may then secure the cleat 6702 along the slide 6709 and in the rearward position within the cleat receptacle 6703. In some embodiments, the slide 6709 may be freely translatable relative to the cleat 6702 in a first direction but not freely translatable in a second direction (opposite the first direction). In some embodiments, the slide 6709 interacts with walls of the cleat receptacle 6703, but in other embodiments, the slide may also interact with the latch.

Figure 68:
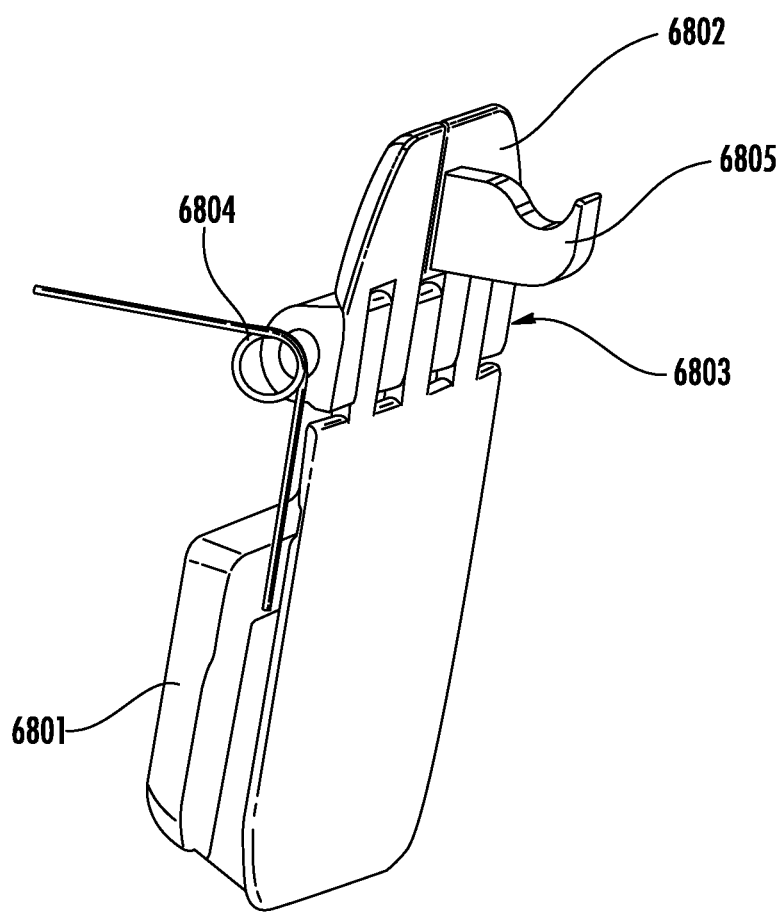
FIG. 68 illustrates a single cleat that can be used similar to the embodiment of FIG. 67.

FIG. 68 illustrates a single cleat 6801 can be used similar to the embodiment of FIG. 67. The cleat 6801 may be connected to a lock portion 6802 via a hinge 6803. The lock portion 6802 may be biased in a first rotational direction (e.g.—with a spring 6804). The lock portion rotates up (i.e., clockwise in FIG. 68) to move out of the way when the body is pressed into the opening/wide portion of the cleat receptacle and springs back into place (in the position as shown in FIG. 68) once the body is slid into the narrow portion of the cleat receptacle. To remove the cleat, the lock portion is rotated back toward the cleat (i.e., clockwise) to allow the cleat to be slid toward the wide portion of the cleat receptacle. The lock portion 6802 may include a hook 6805 that may engage the receiver body to prevent movement of the cleat 6801 when the cleat occupies the narrow portion of the cleat receptacle.

Figure 69:
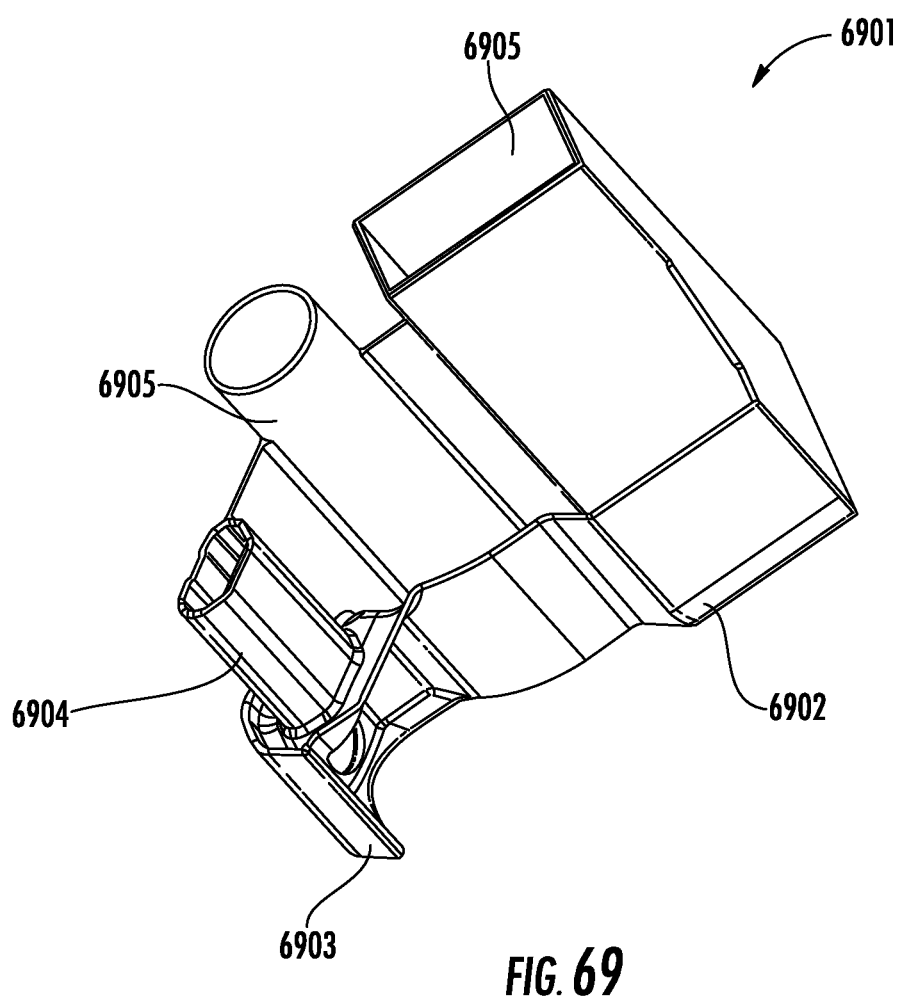
FIG. 69 illustrates an accessory holder that can be mounted to a box, such as the box of FIG. 41.

FIG. 69 illustrates an accessory holder 6901 that can be mounted to a box, such as the box of FIG. 41. The accessory holder 6901 may include a holder body 6902 including a mounting bracket portion 6903. An accessory attachment rail 6904 may be connected to the holder body 6902 adjacent the mounting bracket portion 6903. At least one tubular passage 6905 may extend from the holder body 6902. In many embodiments, the at least one tubular passage 6905 is configured to removably receive an elongate accessory. The side rail of this piece can replace the side rail of the modular storage box of FIG. 41. This holder may include a tubular passage 6905 with a circular cross-section to function as a handle holder (e.g., for holding a broom handle, a conduit bender handle, etc.) and may also include a tubular passage with a rectangular cross-section as a level holder. Alternative embodiments can be used to hold any accessory.

Figure 70:
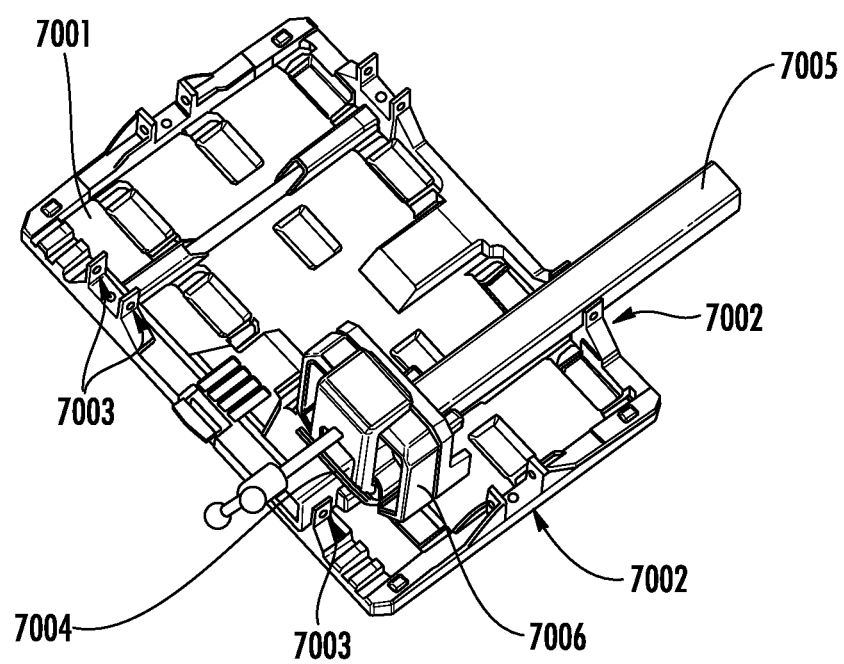
FIG. 70 illustrates a plate that includes cleats on the bottom surface (not shown) that mount to the top surface of a box having cleat receptacles (e.g., box of FIG. 41).

FIG. 70 illustrates a plate 7001 that includes cleats on the bottom surface (not shown) that mount to the top surface of a box having cleat receptacles (e.g., box of FIG. 3). Along the perimeter of the top surface are square tube holders 7002. The square tube includes pin holes 7003 that receive a pin 7004 to secure the square tube 7005 in place when in the square tube holder. In the illustrated embodiment, a vice 7006 is mounted and slides along the square tube to hold a workpiece. Any other suitable accessory can be mounted to the square tube.

Figure 71:
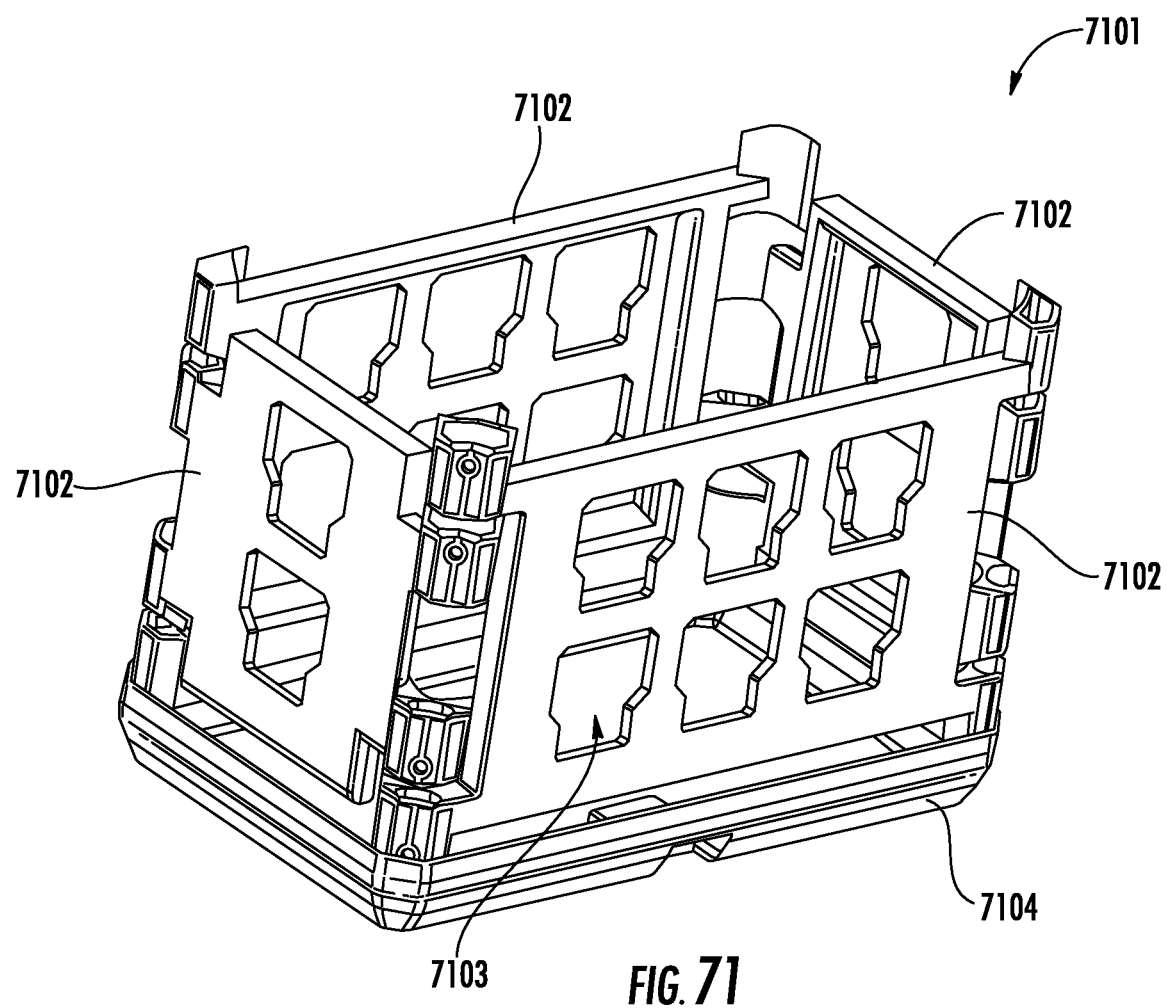
FIG. 71 illustrates a 5-piece crate that can be assembled by the user.

FIG. 71 illustrates a 5-piece crate 7101 that can be assembled by the user. The four sides 7102 include cut-outs 7103 that accept the cleat discussed above. The bottom piece 7104 includes cleats and latches to lock onto the top of other tool storage containers described above.

Figure 72:
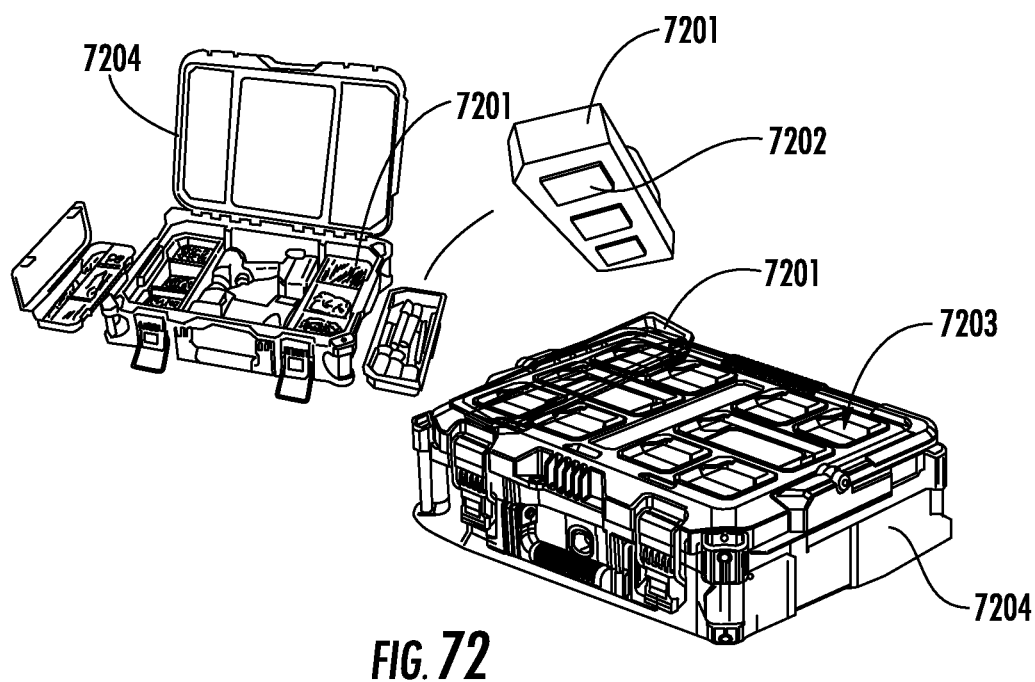
FIG. 72 illustrates trays including cleats on the bottom of the trays that interact with cleat receptacles on a top or lid of a tool box.
Figure 73:
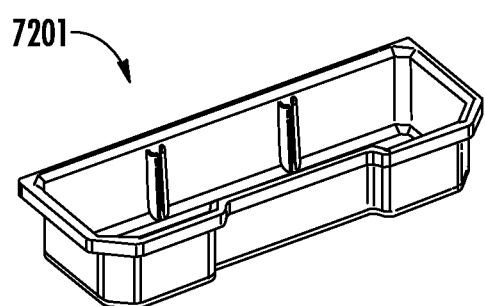
FIG. 73 illustrates an example tray of FIG. 72.
Figure 74:
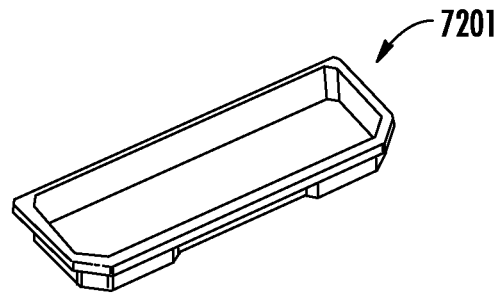
FIG. 74 illustrates another example tray of FIG. 72.

FIGS. 72-74 illustrate trays 7201 below including cleats 7202 on the bottom of the trays that interact with the cleat receptacles 7203 on a top or lid of tool box 7204. The outside shape of the trays also conforms to the inside surface of the toolbox. Thus, a user can travel with the trays secured inside the box and then secure the trays on the top of the box when being used.

Figure 75:
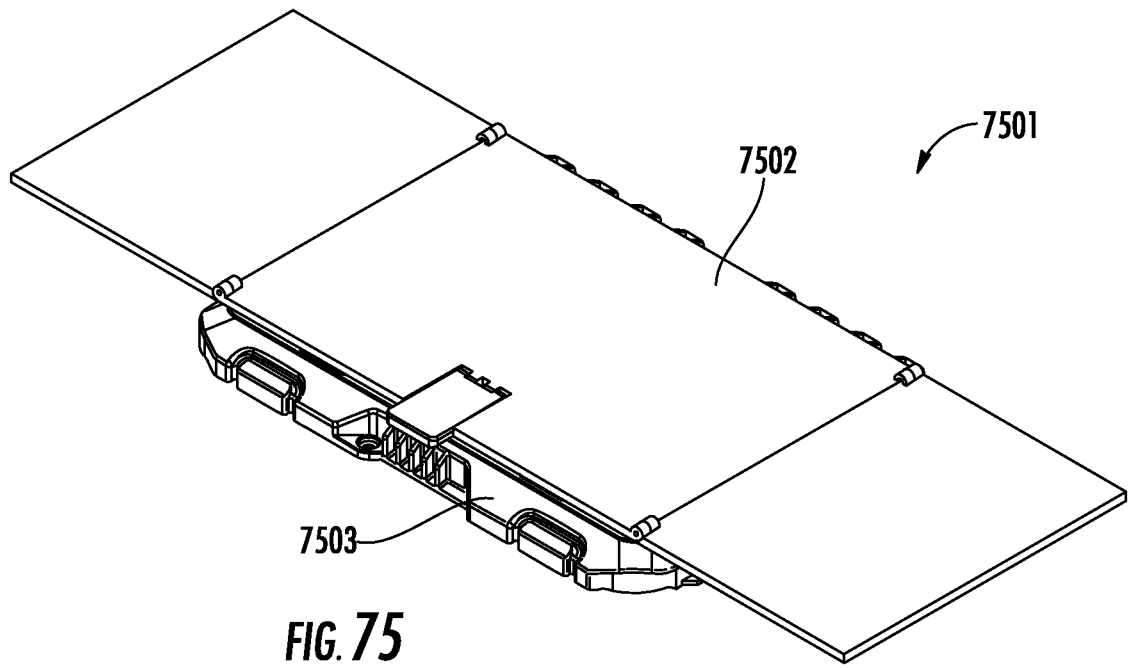
FIG. 75 illustrates the foldable table in the open position.
Figure 76:
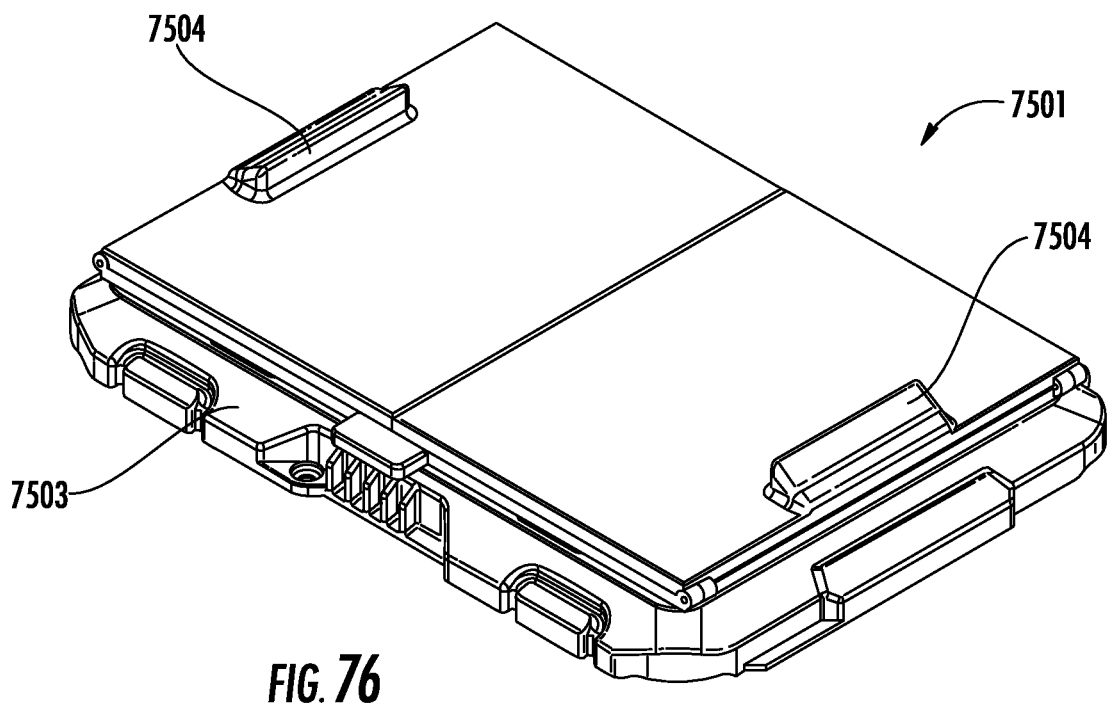
FIG. 76 illustrates the foldable table in the closed position.

FIGS. 75 and 76 illustrate a foldable table 7501 in the open (FIG. 75) and closed (FIG. 76) positions. The center section 7502 of the table includes cleats and a locking mechanism that secures the table to the top 7503 of a tool box. As shown in FIG. 76 (in the closed position), the bottom surface of the open table includes supports 7504 that engage the top surface of the tool box and limit travel of the table sides such that, in the open position, the three pieces are level to one another. In alternative embodiments, additional or different supports may be used, such as arms that engage with the side of the tool box, or other supporting means.

Figure 77:
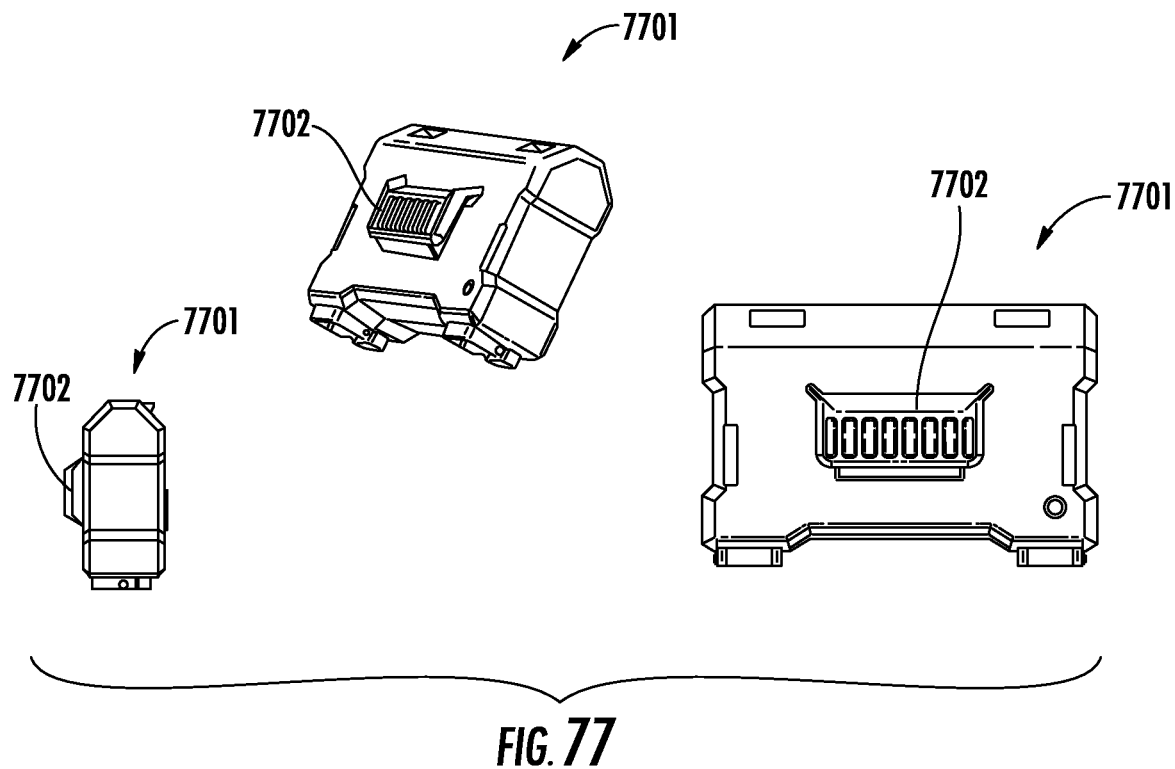
FIG. 77 illustrates an accessory case that secures to the system via a single cleat.

FIG. 77 illustrates an accessory case 7701 that secures to the system via a single cleat 7702. The small size of the case may be ideal for smaller items such as drill bits. Multiple individual cases may be stored on the top surface of a tool box.

Figure 78:
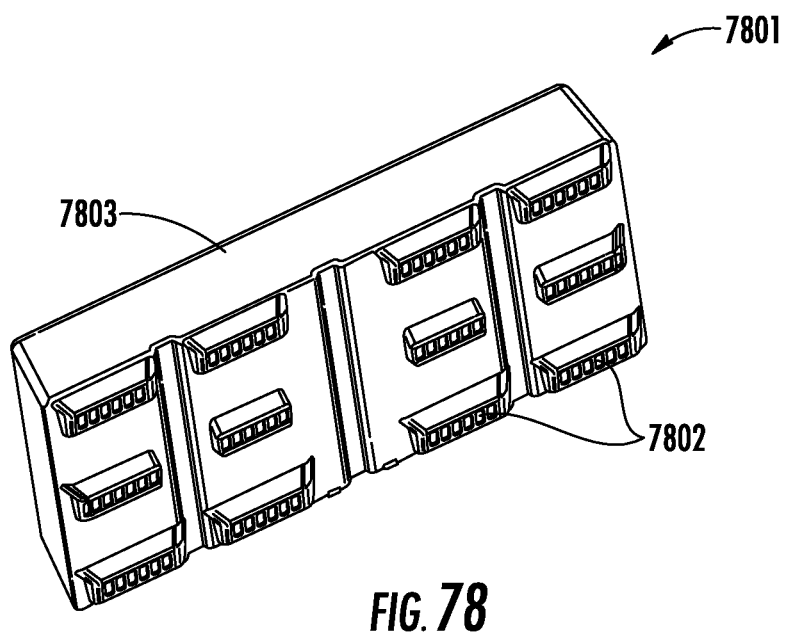
FIG. 78 illustrates a piece that can covert the top of a tool box to be a seat.

FIG. 78 illustrates a piece 7801 that can cover the top of a tool box to be a seat. The bottom of the piece includes cleats 7802, and the top piece can be a cushion 7803 that is comfortable for sitting. Additional pieces may include a backrest that attaches to the handles of the rolling box.

Figure 79:
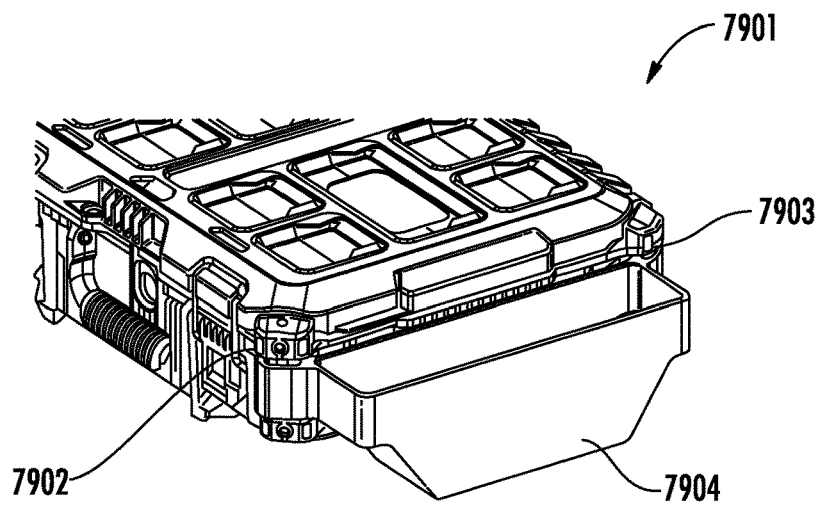
FIG. 79 illustrates a bin that mounts to the side of a tool box and may attach to the extruded metal supports located at the corners of the box.

FIG. 79 illustrates a storage container 7901. The storage container 7901 may include a first mounting rail 7902 and a second mounting rail 7903 spaced apart from the first mounting rail. The storage container 7901 may further include a bin 7904 connected to the first and second mounting rails 7902, 7903. Stated another way, the bin 7904 may mounts to the side of a tool box 7901 and may attach to the extruded metal supports 7902, 7903 located at the corners of the box. The bin may be removably attached or may surround the extruded metal to be permanently secured. Any size or shape bin can be used. In many embodiments, the bin 7904 may be configured to resiliently snap on and off of the respective first and second mounting rails 7902, 7903.

Figure 80:
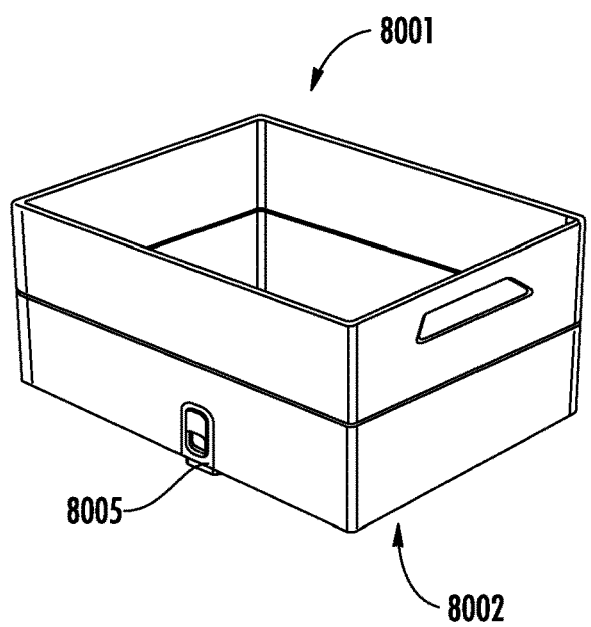
FIG. 80 illustrates a folding crate in the assembled position.
Figure 81:
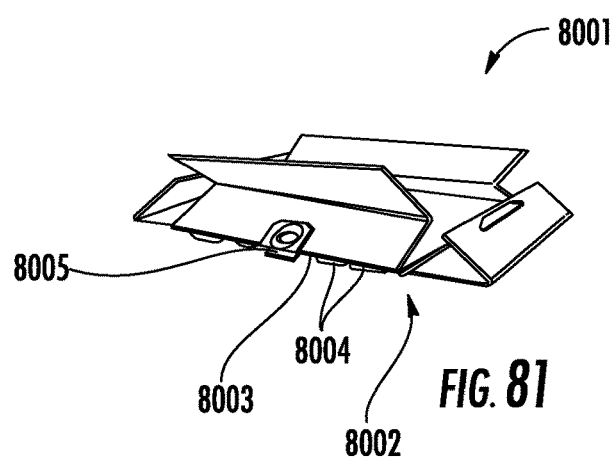
FIG. 81 illustrates the folding crate of FIG. 80 in the folded position.

FIGS. 80 and 81 illustrate a folding crate in the assembled and folded positions, respectively. The folding crate may also be called a collapsible storage crate 8001. The crate 8001 may include a crate bottom 8002 having a crate exterior surface 8003. The bottom 8002 of the crate 8001 may include at least one cleat 8004 (discussed above) to attach the crate to a corresponding cleat receptacle located on a receptacle surface (such as on a lid of a tool box with the cleats being received in cleat receptacles). The bottom surface of the crate (or a 5-piece flat pack/self-assembled crate) includes cleats that can be received in the cleat receptacles described above to secure the crate to a surface to which the cleat plate (e.g., plate of FIG. 45) is attached. To connect the crate 8001 to a receptacle surface, the at least one cleat 8004 is inserted into a corresponding cleat receptacle, and the crate is translated relative to the cleat receptacle, thereby locking the cleat in the corresponding cleat receptacle. The crate may further include a latch 8005 to attach the crate to a receptacle surface such as a lid of a tool box as discussed above. Although not shown, in some embodiments, the top half (portion) of the front and back sides may have cleat receptacles such that, when the crate is folded flat, another modular device may be attached to the top of the folded crate. Put another way, the inside surface of the assembled crate of FIG. 80 may include cleat receptacles such that the top surface of the folded crate of FIG. 81 can receive the cleats of another modular device (e.g., another folded crate). In some instances, the cleat receptacles may be cutouts in the sides of the crate (e.g., as in FIG. 71). In such embodiments, the cleat receptacles of one side of the assembled crate of FIG. 80 are rotated 180° from the cleat receptacles of the opposite side. Also, in some embodiments, the bottom half of the sides of the crate may have cleat receptacles corresponding to the respective top half such that each side can receive a modular device when the crate is assembled. In alternative embodiments, the bottom halves of the sides do not have cleats but rather have cutouts that provide adequate space for the cleat receptacles of the top halves to receive a cleat when the crate is in the folded position.

Figure 82:
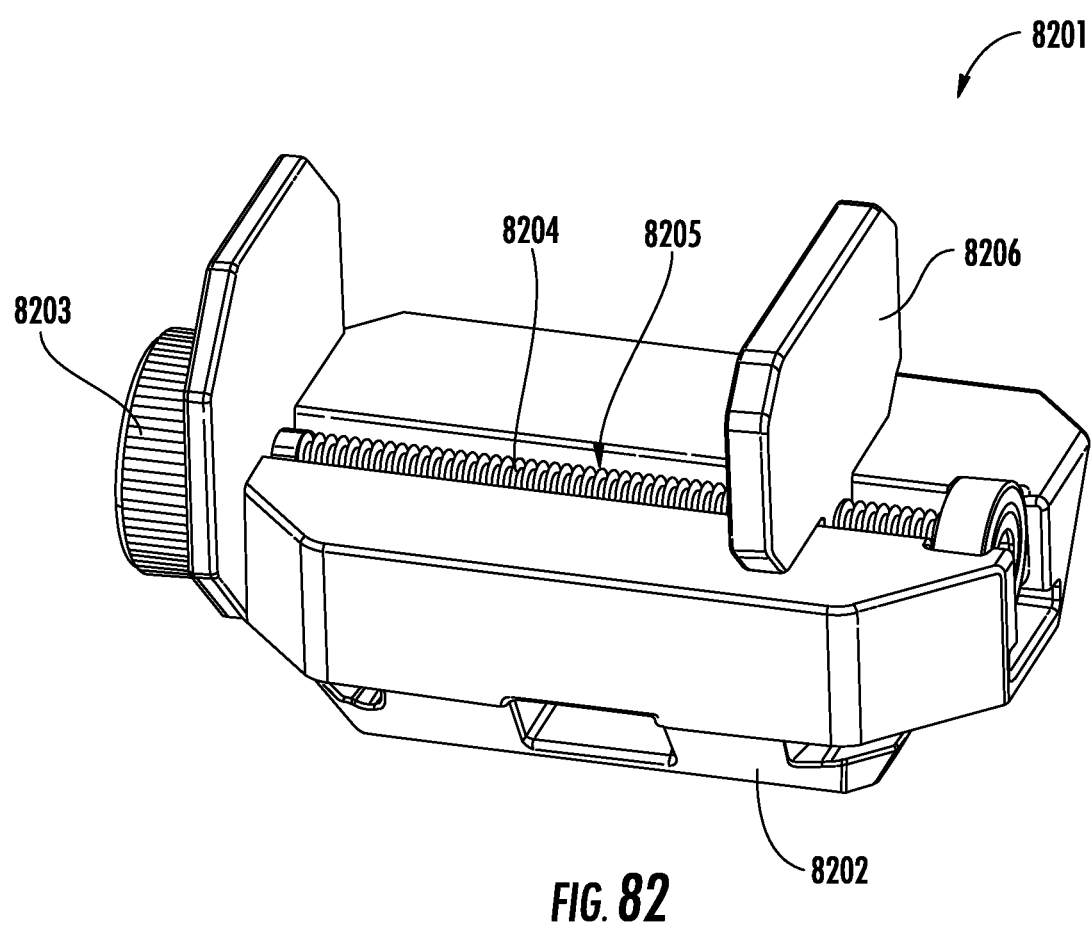
FIG. 82 illustrates a clamp that includes a cleat.

FIG. 82 illustrates a clamp 8201 that includes a cleat 8202. The single cleat can be used to clamp any suitable item (i.e., not just batteries). In the embodiment illustrated, a knob 8203 is attached to a threaded rod 8204 that rides in a slot 8205 in the cleat. The wall 8206 is threaded onto the threaded rod and moves along the rod as the knob is spun.

Figure 83:
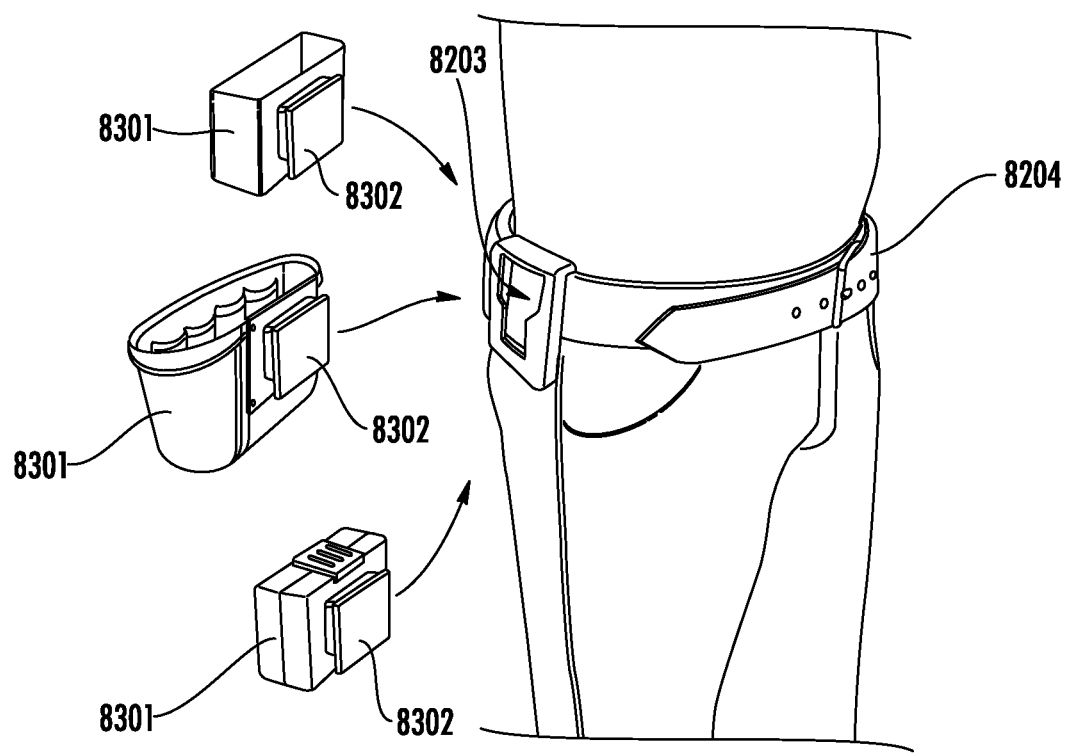
FIG. 83 illustrates a bag/box/item having a cleat that may be hinged or swiveled to a cleat receptacle on a user's belt such that the item remains upright even when the user bends over.

FIG. 83 illustrates a bag/box/item 8301 having a cleat 8302 may be hinged or swiveled to a cleat receptacle 8303 on a user's belt 8304 such that the item remains upright even when the user bends over.

Figure 84:
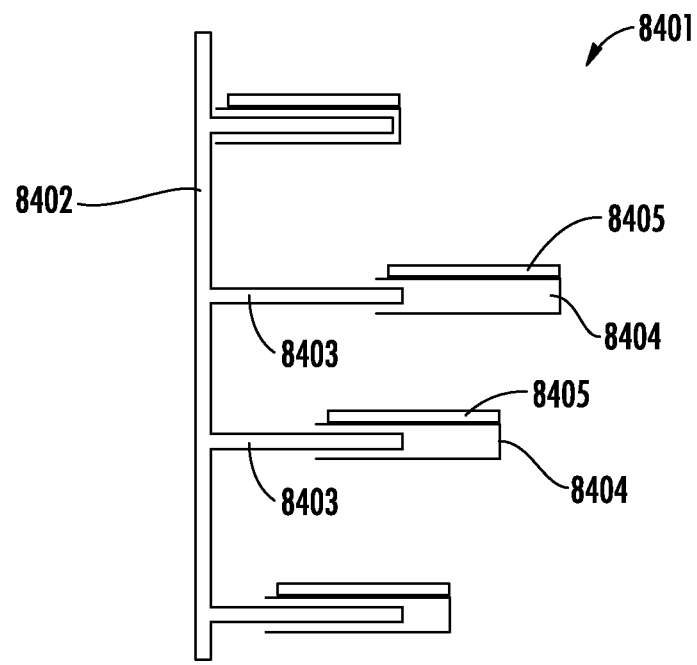
FIG. 84 is a side view of a shelving unit.

FIG. 84 is a side view of a shelving unit 8401. The vertical mounting rail 8402 may be fixed between the floor and the ceiling or fixed to a wall. The horizontal rails 8403 may be mounted along the vertical mount (e.g., using e-track or other means for selectively securing the horizontal rails along the vertical mount). The horizontal rails include a sliding rail 8404 that slides along the horizontal rail. Attached to the top of the (or in between two) sliding rails is a modular mounting plate 8405 that has receptacles for receiving the cleats. Once a box with the cleats is attached, the box may be pushed against the wall (as in the top mounting plate. To access the contents of the box with a lid that flips up, the box can be slid outward away from the wall, thereby giving the lid enough room to open without hitting the horizontal rails or box of the one above.

Figure 85:
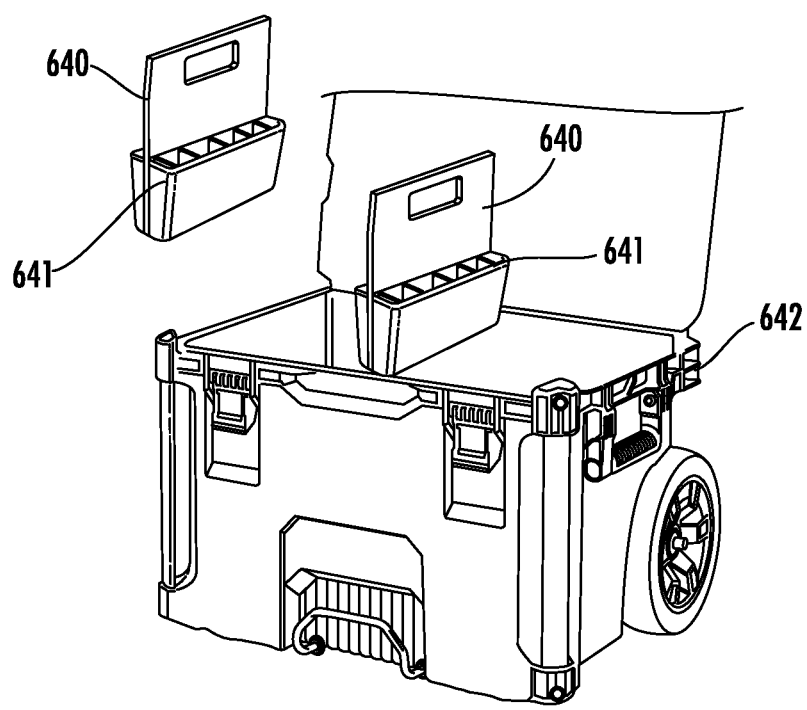
FIG. 85 illustrates a separator with pockets that may be used to separate the inside contents of a box.

FIG. 85 illustrates a separator 640 with pockets 641 that may be used to separate the inside contents of a box. The separator may slide into corresponding grooves on the inside of the box 642.

Figure 86:
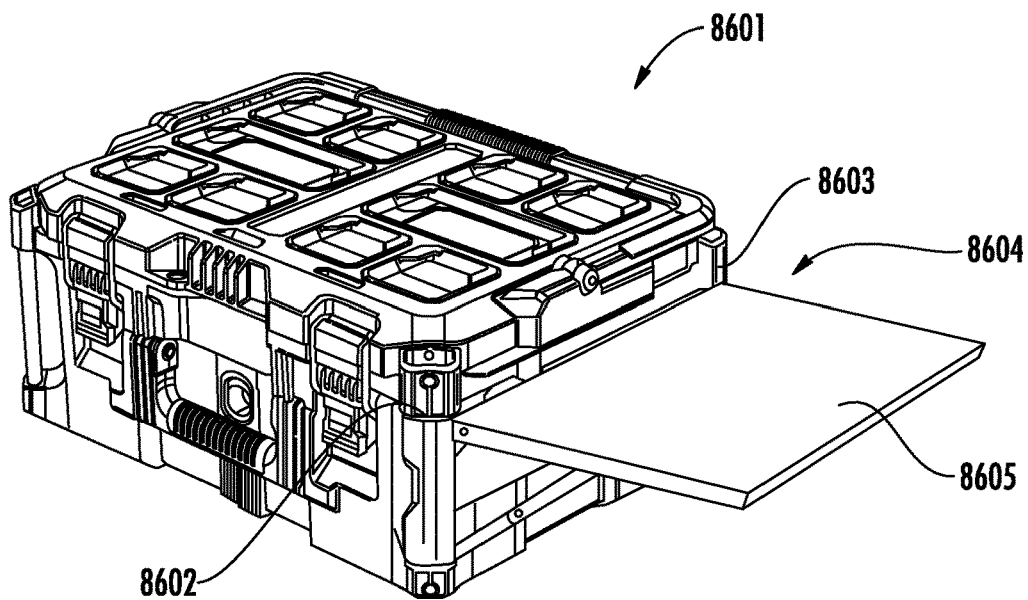
FIG. 86 illustrates a table that may be mounted to the side of a modular box and be hinged so that the table may flip up for use or down for storage.

FIG. 86 illustrates a storage container 8601. The storage container 8601 may include a first mounting rail 8602 and a second mounting rail 8603. The second mounting rail 8603 may be spaced apart from the first mounting rail 8602. A table assembly 8604 may be connected to the first and second mounting rails 8602, 8603. Stated another way, the table assembly 8604 may be mounted to the side of a modular box 8601. The table assembly 8604 may include a platform 8605, and the platform may be rotatable relative to the first and second mounting rails 8602, 8603. Stated another way, the platform 8605 may be hinged so that the platform may flip up for use or down for storage. In many embodiments, the table assembly 8604 is configured to resiliently snap on and off of the respective first and second mounting rails 8602, 8603.

Figure 87:
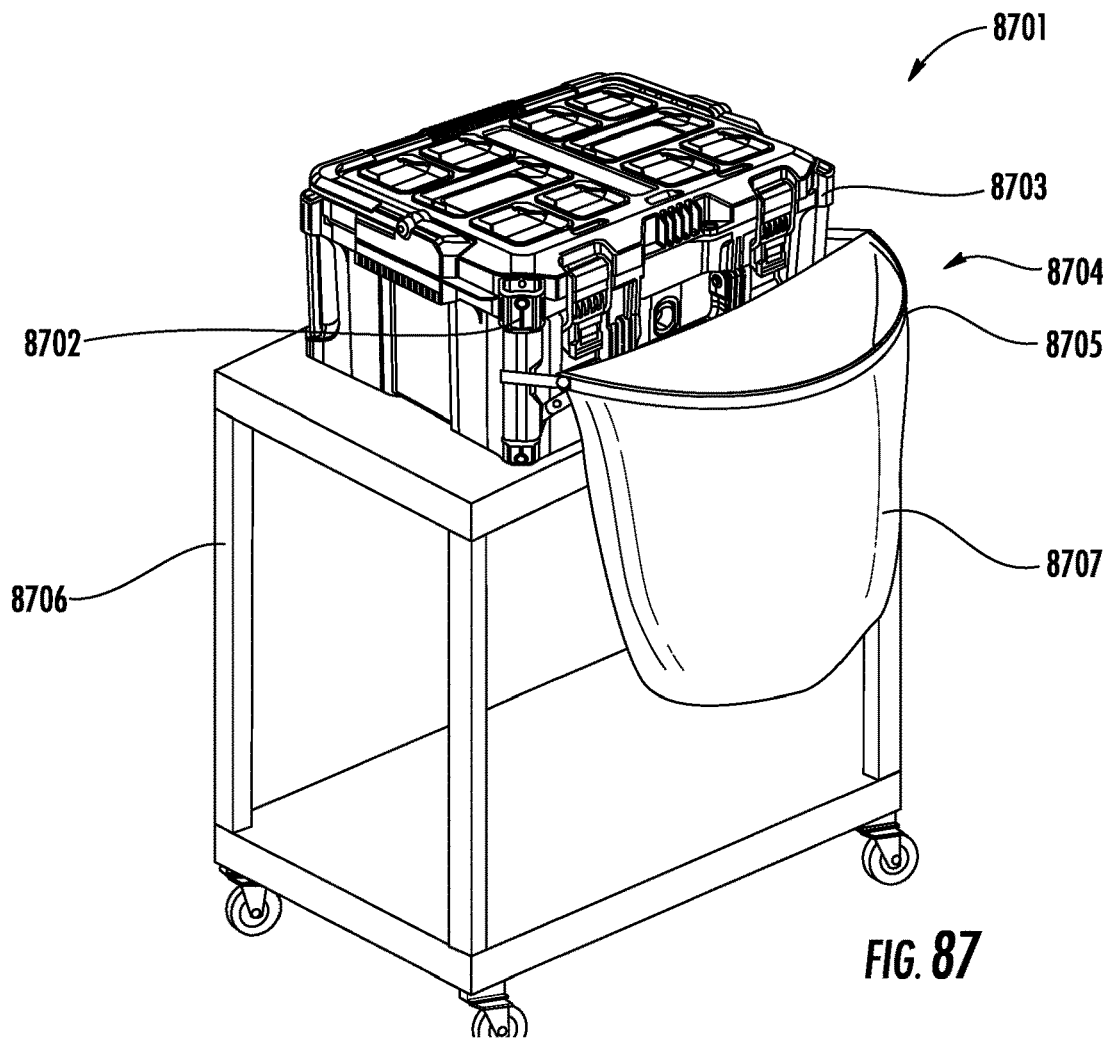
FIG. 87 illustrates a garbage bag holder that may be mounted to the side of a box and swung down when not in use.

FIG. 87 illustrates another embodiment of a storage container 8701. The storage container 8701 may include a first mounting rail 8702 and a second mounting rail 8703. The second mounting rail 8703 may be spaced apart from the first mounting rail 8702. A bag holder assembly 8704 may be connected to the first and second mounting rails 8702, 8703. Stated another way, the bag holder assembly 8704 (which may include a garbage bag holder holding a disposable garbage bag 8707) may be mounted to the side of a box. The bag holder assembly 8704 may include a bag receiving rod 8705. The bag receiving rod 8705 may span across an entire side of the storage container 8701 in some embodiments. The bag receiving rod 8705 may span in any appropriate way, but some embodiments include the bag receiving rod formed into a semi-circle as it spans from the first mounting rail 8702 to the second mounting rail 8703. The bag receiving rod 8705 may be swung down when not in use. In many embodiments, the bag holder assembly 8704 may be configured to resiliently snap on and off of the respective first and second mounting rails 8702, 8703. In still further embodiments, the storage container 8701 may further include a wheeled cart 8706 supporting the storage container.

Figure 88:
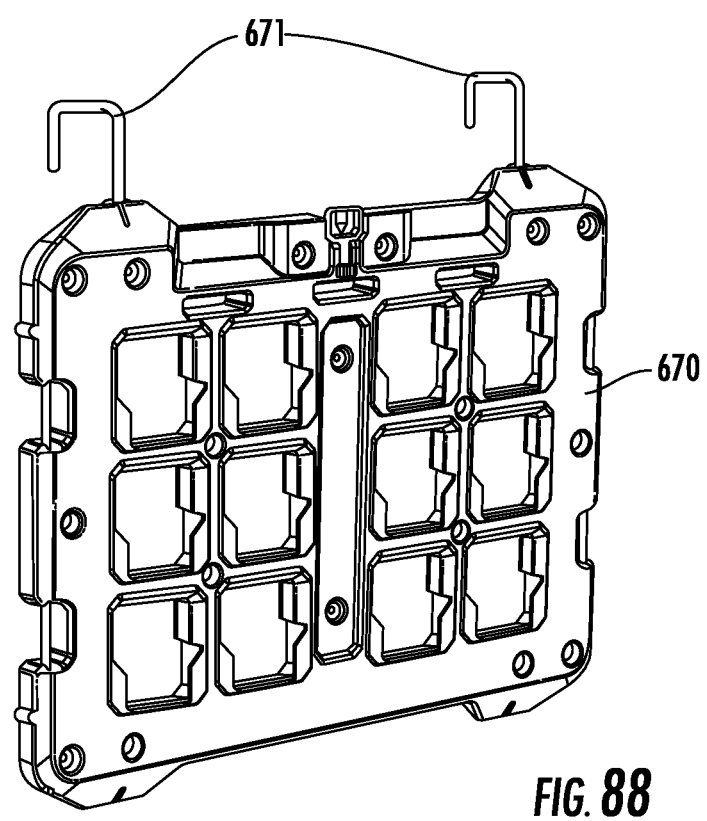
FIG. 88 illustrates a modular receptacle plate that includes hangers that allow the plate to be hung from the side of a truck, the side of a bucket (e.g., on a bucket lift truck), on a horizontal rail or 2×4, etc.

FIG. 88 illustrates a modular receptacle plate 670 that includes hangers 671 that allow the plate to be hung from the side of a truck, the side of a bucket (e.g., on a bucket lift truck), on a horizontal rail or 2×4, etc.

Figure 89:
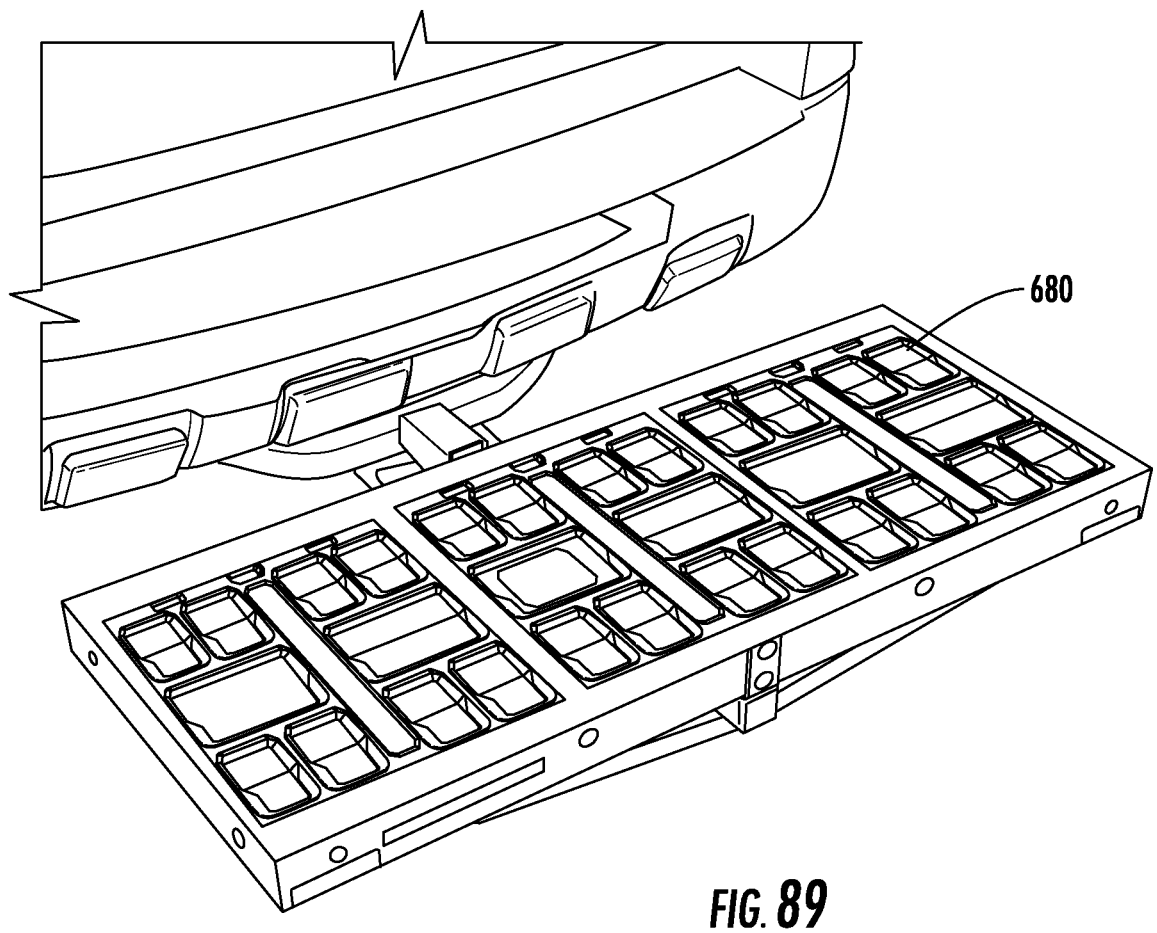
FIG. 89 illustrates one or more modular receptacle plates having cleats that may be mounted to a frame that includes a hitch for securing to a hitch receptacle of a truck.

FIG. 89 illustrates one or more modular receptacle plates having cleats 680 may be mounted to a frame that includes a hitch for securing to a hitch receptacle of a truck.

Figure 90:
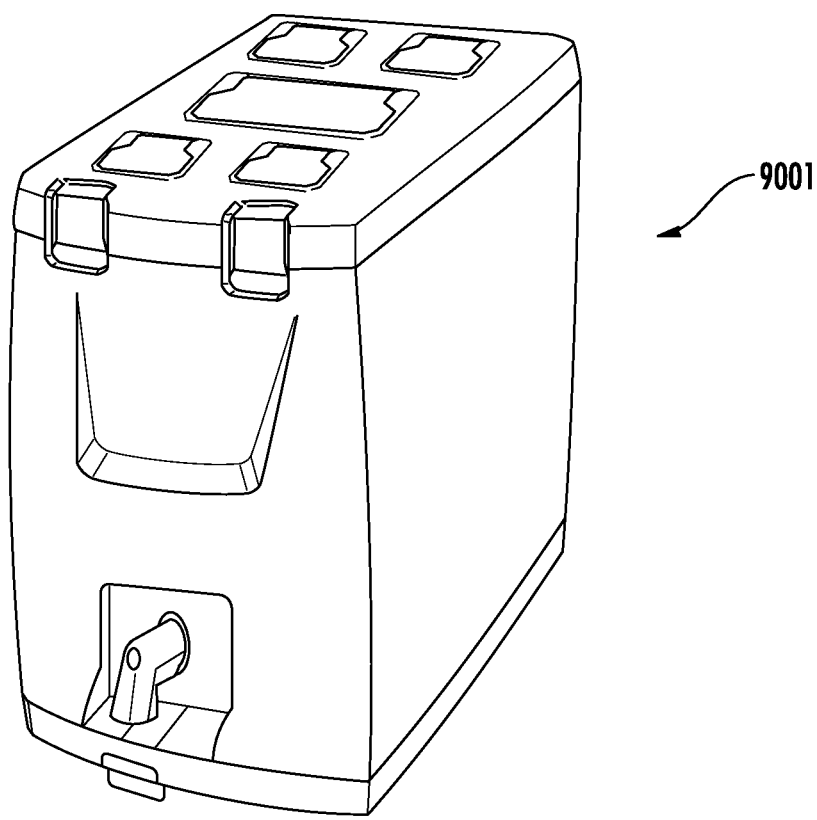
FIG. 90 illustrates a water cooler (or water bottle) having cleats on the bottom to be secured to a mobile tool box.
Figure 91:
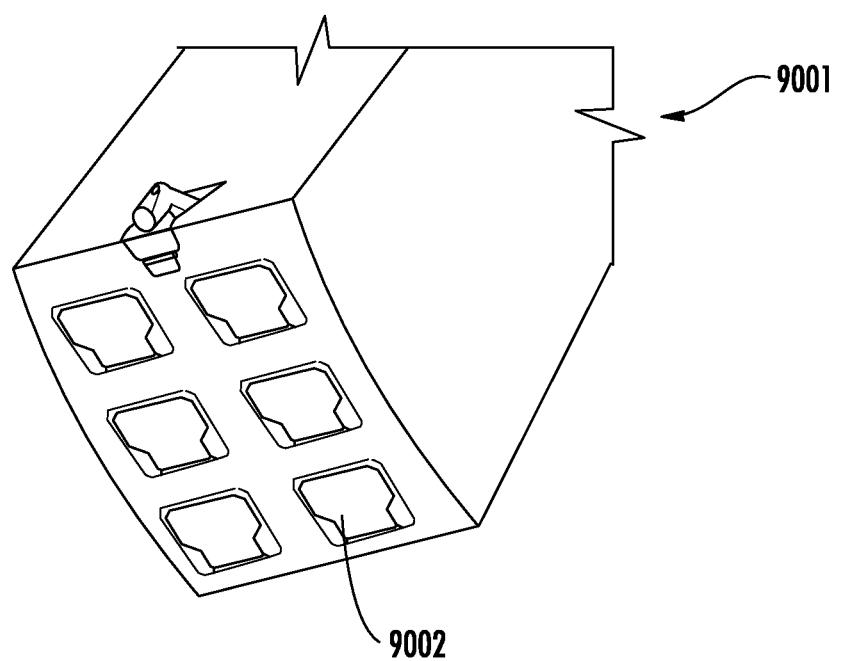
FIG. 91 illustrates a partial bottom perspective view of the water cooler of FIG. 90.

FIGS. 90 and 91 illustrate a water cooler 9001 (or water bottle) having cleats 9002 on the bottom to be secured to a mobile tool box.

Figure 92:
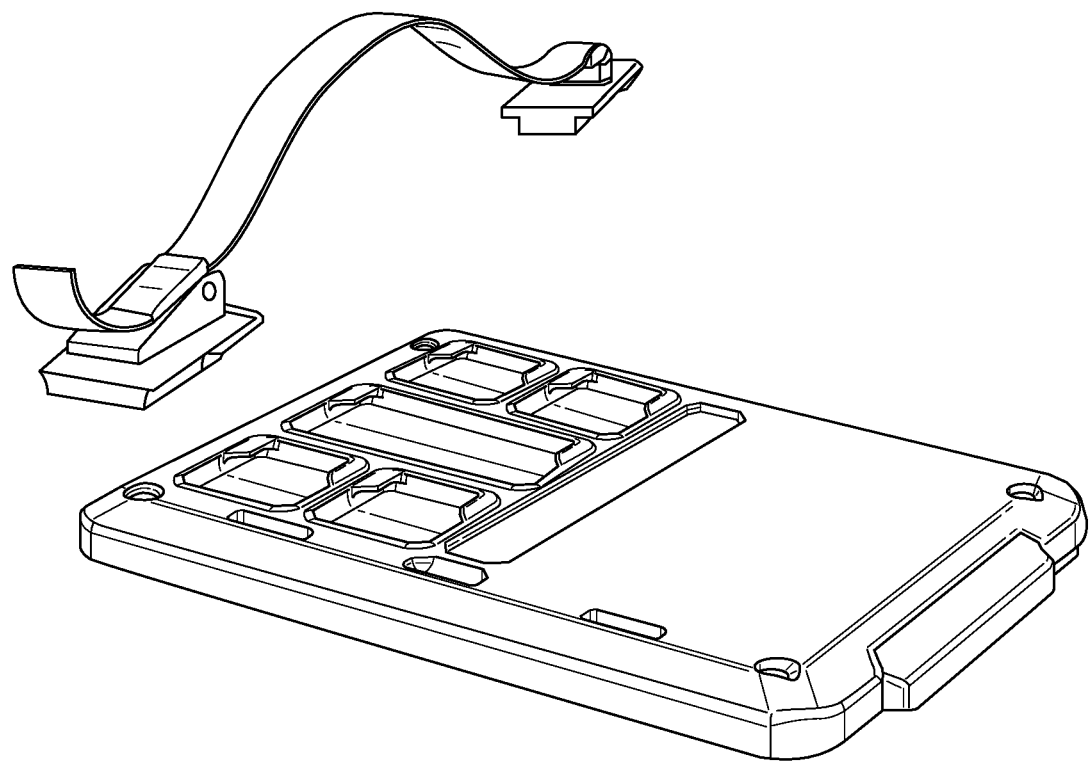
FIG. 92 illustrates two strap mounting portions (e.g., one with a fixed end, one with a lockable end; two lockable ends) may have cleats that slide into the cleat receptacles.

FIG. 92 illustrates two strap mounting portions (e.g., one with a fixed end, one with a lockable end; two lockable ends) may have cleats that slide into the cleat receptacles. A webbing strap may be secured to the strap mounting portions and selectively tightened to secure an item between the two strap mounting portions.

Figure 93:
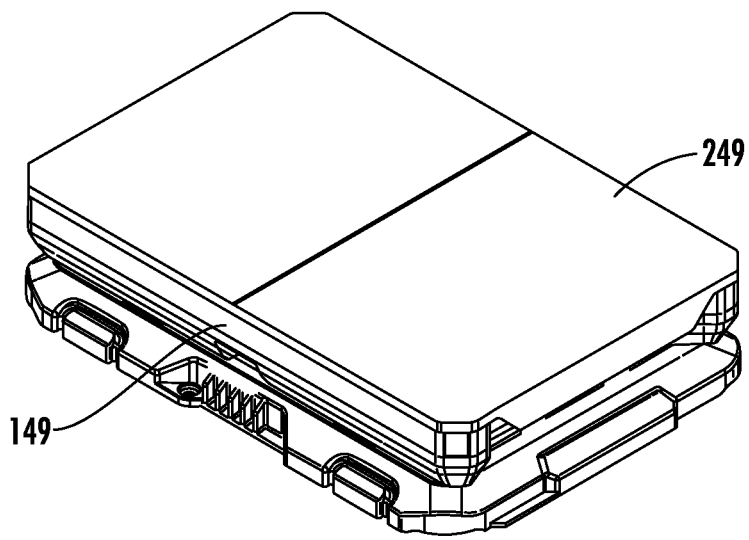
FIG. 93 shows a tray closed.
Figure 94:
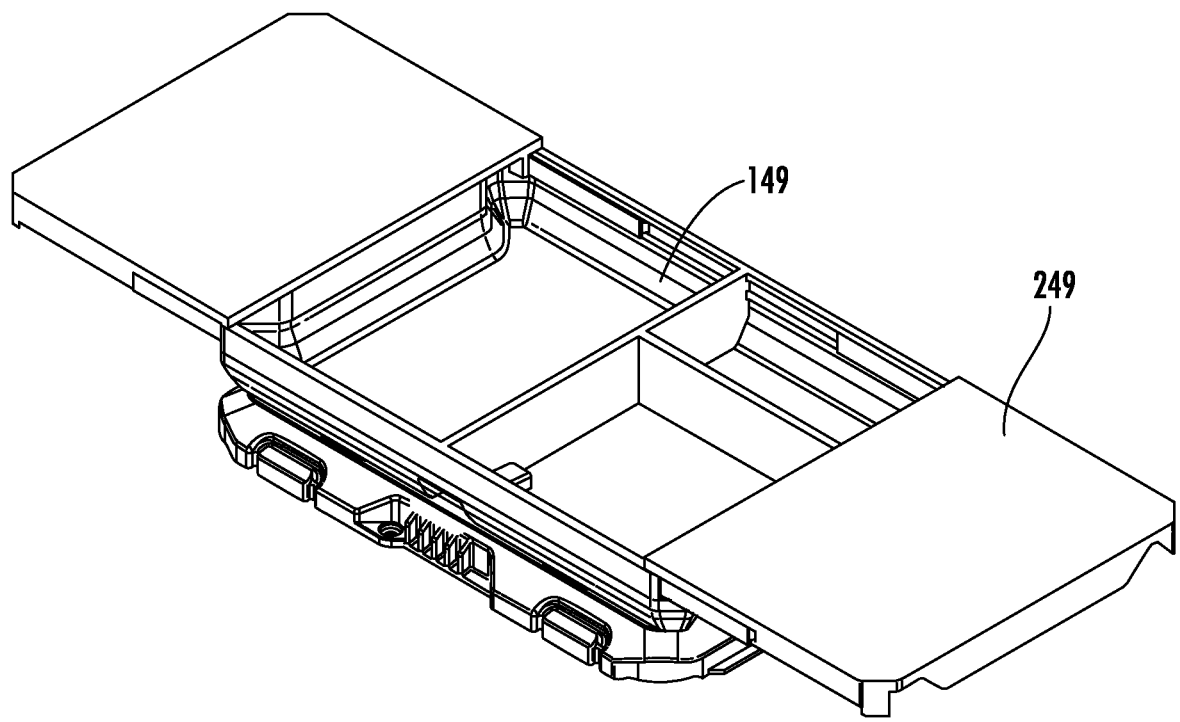
FIG. 94 shows the tray of FIG. 93 open.

FIG. 93 shows a tray 149 closed and FIG. 94 shows the tray 149 open. The tabletop 249 can slide (or fold) away to reveal the tray and its contents. When closed (or when open) the table top pieces can be used as a work station. The bottom of the tool tray/tabletop combo includes can interact with a compatible tool storages boxes such as the lid to the rolling box of FIG. 39.

Figure 95:
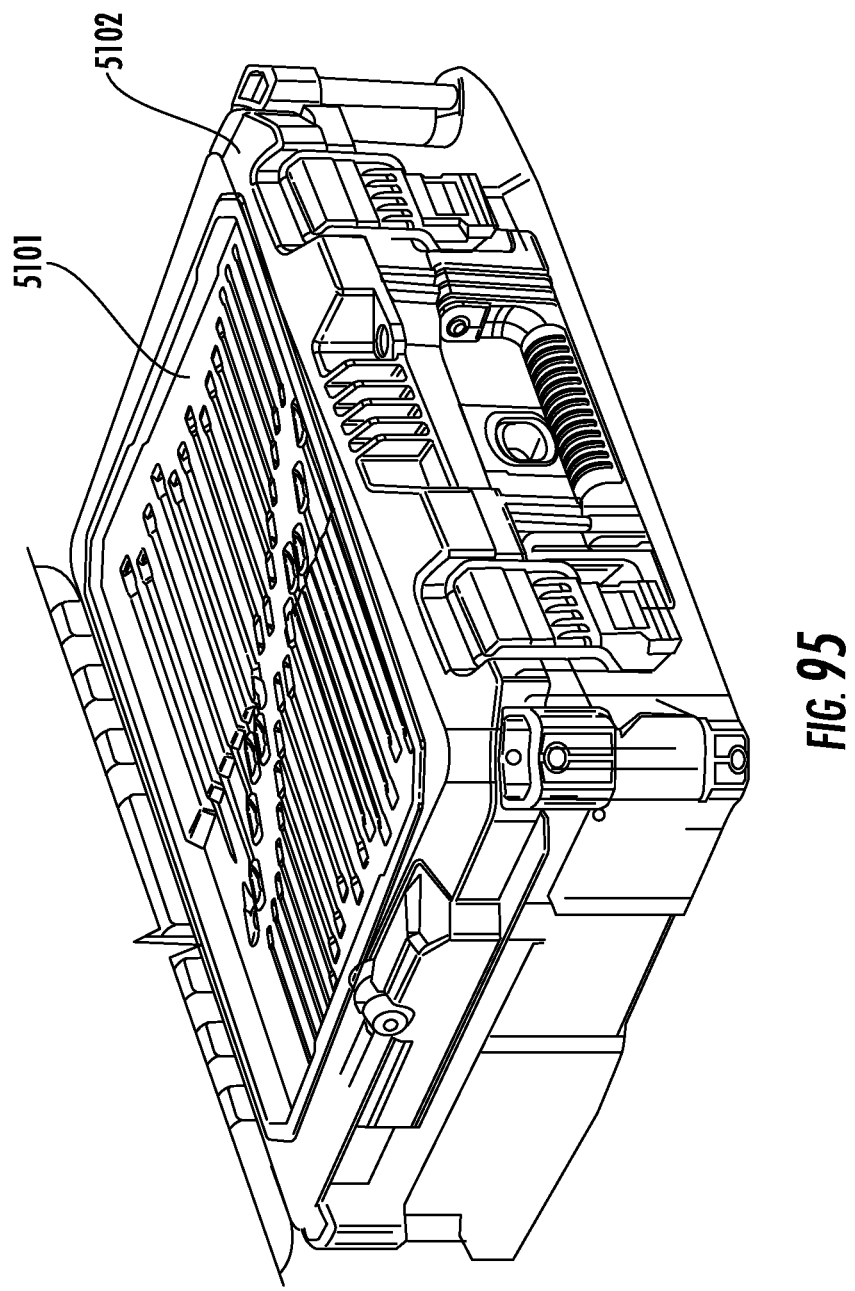
FIG. 95 illustrates an insert for a box that is configured to hold a combination wrench set (e.g., either fixed or ratcheting).
Figure 96:
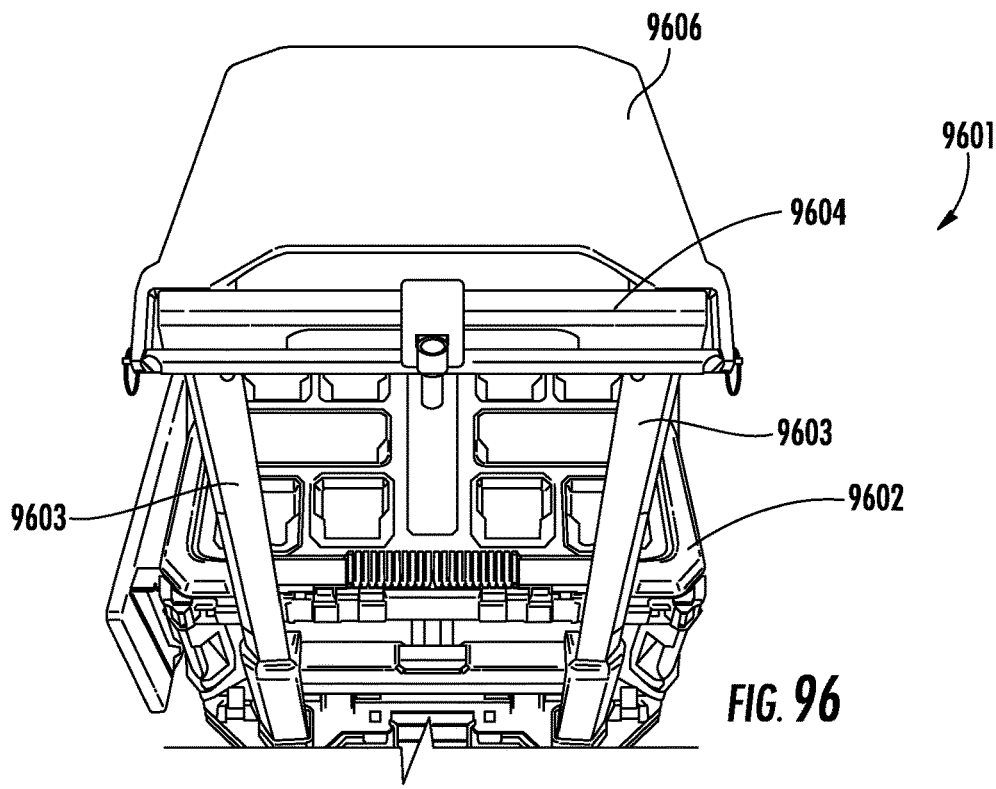
FIG. 96 illustrates a top perspective view of a working platform that is attached to the handle of the rolling toolbox (e.g., tool box of FIG. 39).
Figure 97:
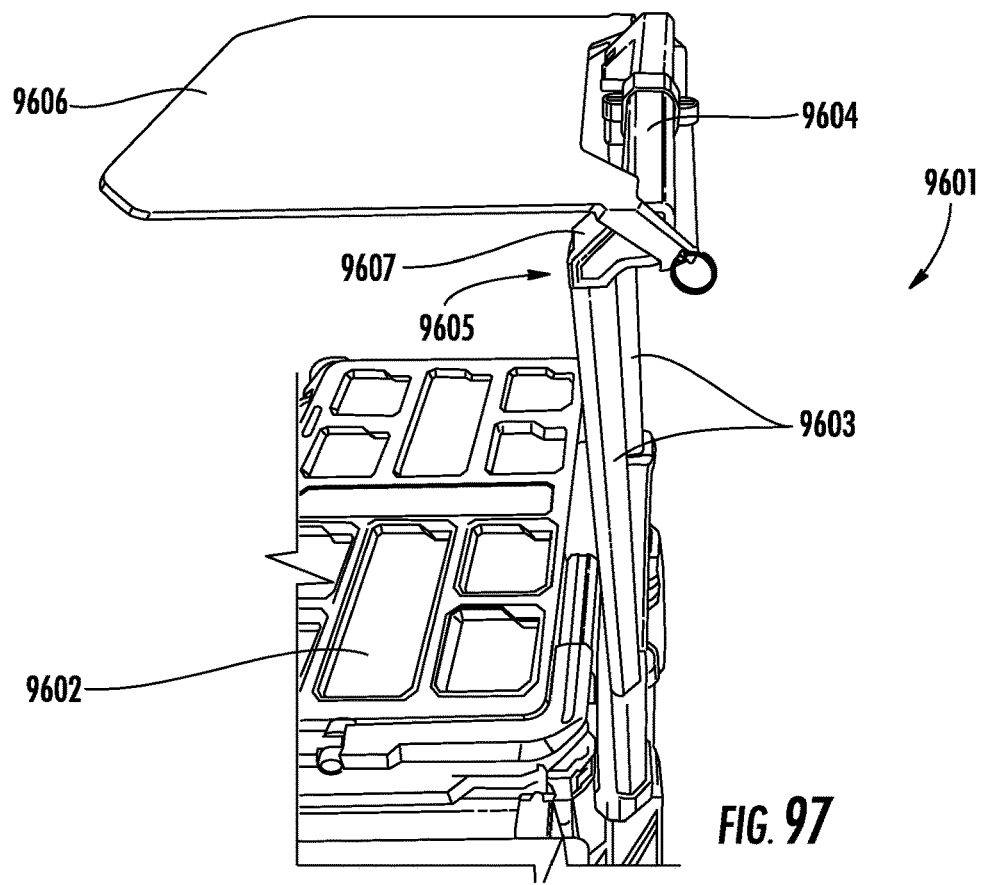
FIG. 97 illustrates a side perspective view of the working platform of FIG. 96.
Figure 98:
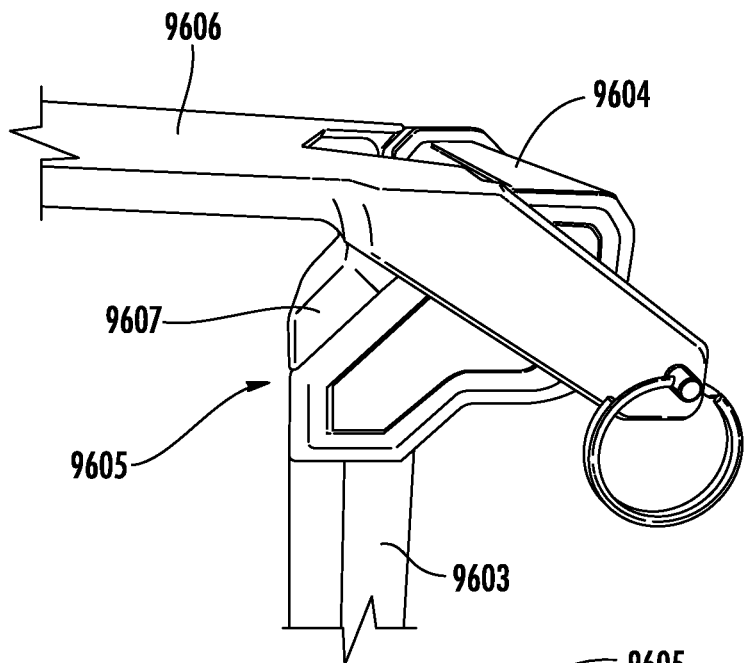
FIG. 98 illustrates a detailed side perspective view of the working platform of FIG. 96.
Figure 99:
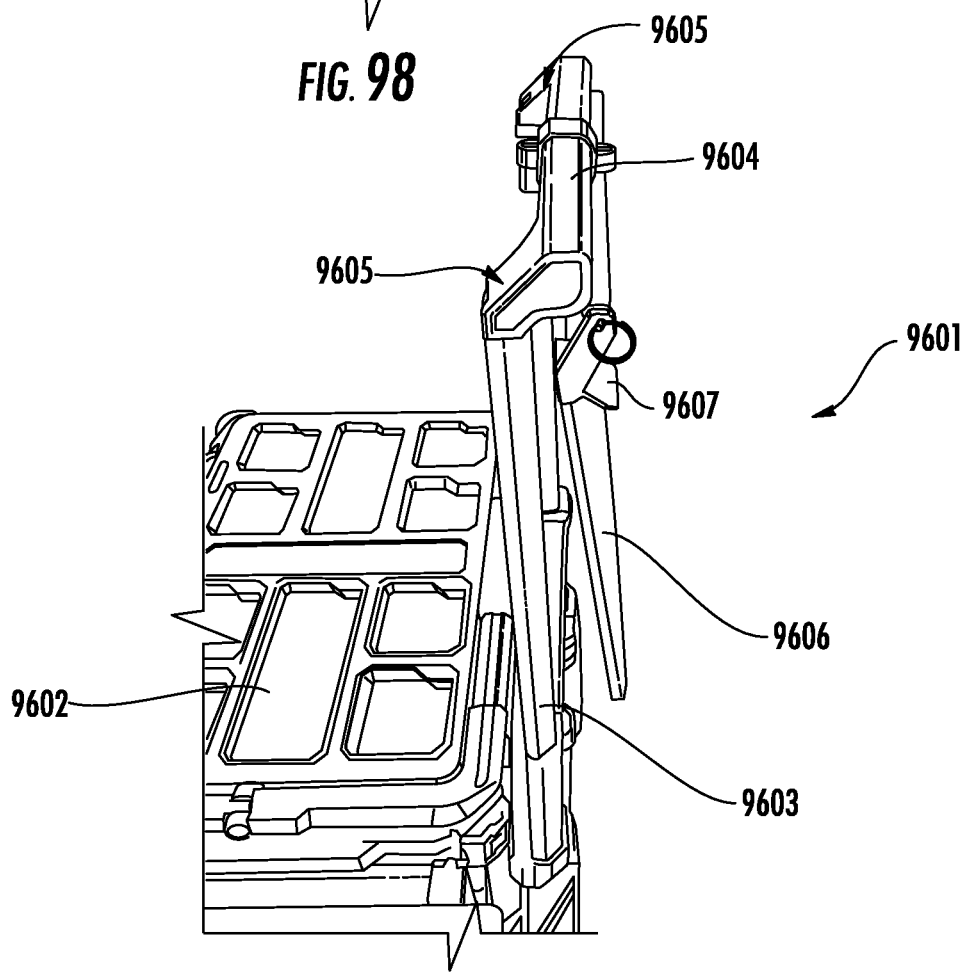
FIG. 99 illustrates a side perspective view of the working platform of FIG. 96 in the storage position.
Figure 100:
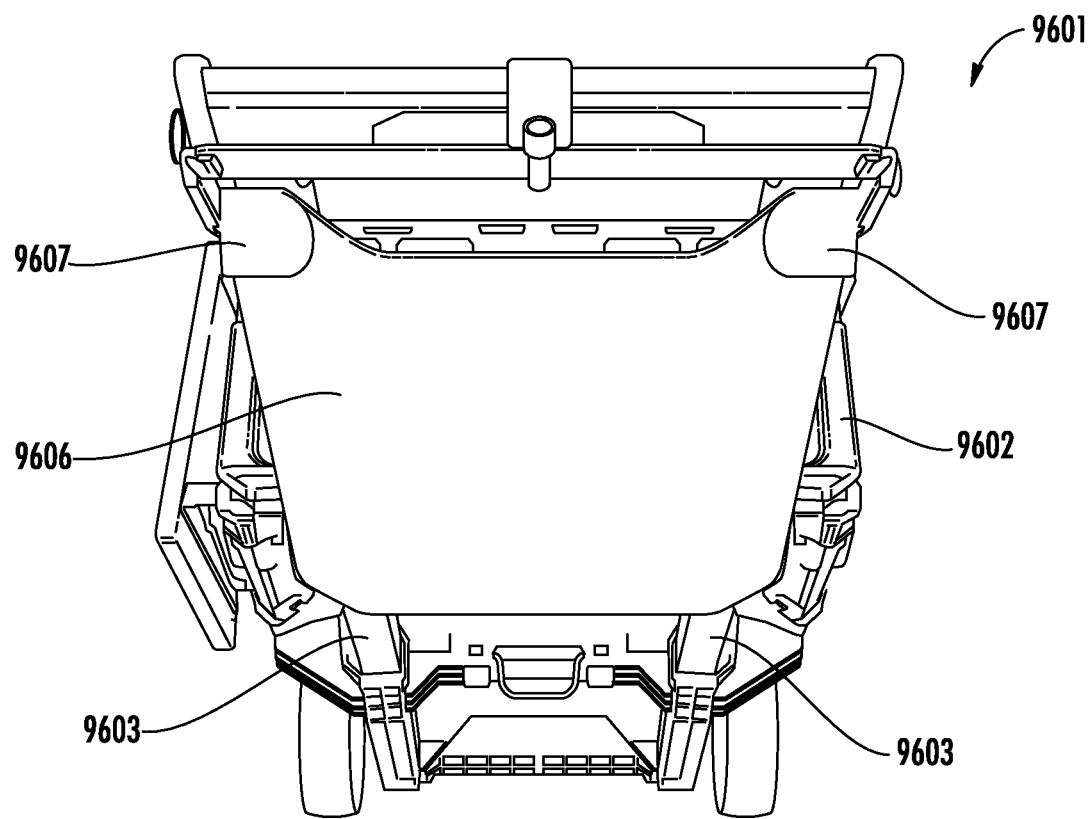
FIG. 100 illustrates a top perspective view of the working platform of FIG. 96 in the storage position.

FIG. 95 illustrates an insert 5101 for a box 5102 that is configured to hold a combination wrench set (e.g., either fixed or ratcheting). The insert may be easily removed from the box for convenience of the user.

FIGS. 96-100 illustrate a storage container 9601. The storage container 9601 may include a container body 9602. An upright member 9603 may extend upwardly from the container body 9602. A handle 9604 may be connected to the upright member 9603. The handle 9604 may include an angled portion 9605. A platform 9606 may be attached to the handle 9604 of the rolling toolbox (e.g., tool box of FIG. 39). In many embodiments, the platform 9606 is rotatably attached to the handle 9604. The platform can be placed in a use position and may also be folded away to a storage position when not in use. In the deployed state (FIGS. 96-98), a support arm 9607 may extend from the platform 9606 and rest on the angled portion 9605 of the handle 9604 (shown in FIG. 98). When in the undeployed state (FIGS. 99 and 100), the platform 9606 folds away to allow the user to use the handle 9604. A detent mechanism or a clip may be used to hold the platform 9606 in place (i.e., prevent the platform from flapping around).

Figure 101:
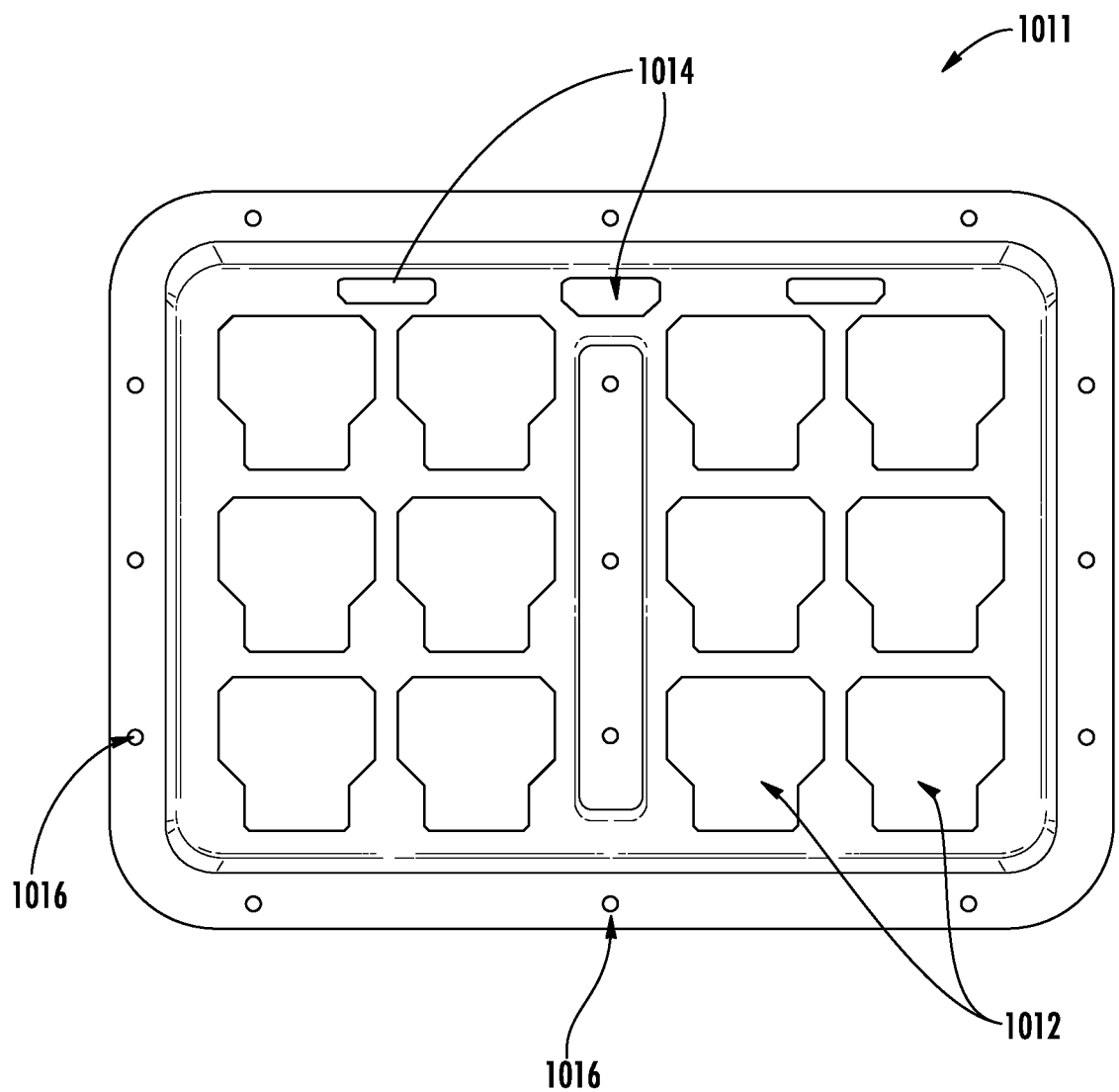
FIG. 101 illustrates a plate that can be secured in place.

FIG. 101 illustrates a plate 1011 that can be secured in place. For example, the plate includes holes or receptacles 1012 for locking feet of a tool storage container e.g., PACKOUT system by Milwaukee Electric Tool) and latch receptacles 1014 that interact with a modular storage system. The plate includes screw holes (or other fastening mechanisms) 1016 that can be used to secure the plate to, for example, a floor, a wall, the bed of a truck, the wall of a van, etc. The plate is made of metal (e.g., stamped steel) whereas the storage boxes (or other suitable compatible products) are typically made of plastic. Making the plate of metal increases the resilience to bumps, kicks, rattles, vibrations, etc. (such as in a vehicle or truck) compared to plastic. Stamping the steel to make the product also is likely to reduce manufacturing and materials cost.

Figure 102:
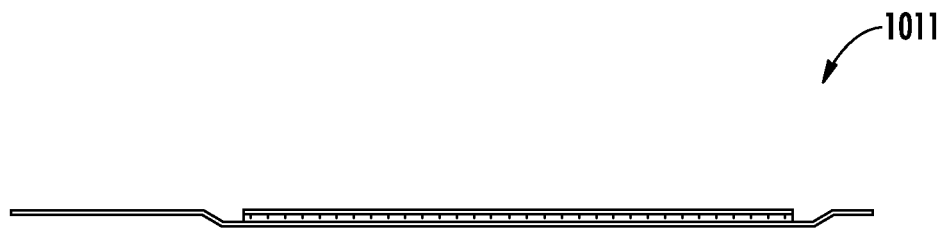
FIG. 102 illustrates a side elevation view of an alternative embodiment of the plate of FIG. 101.
Figure 103:
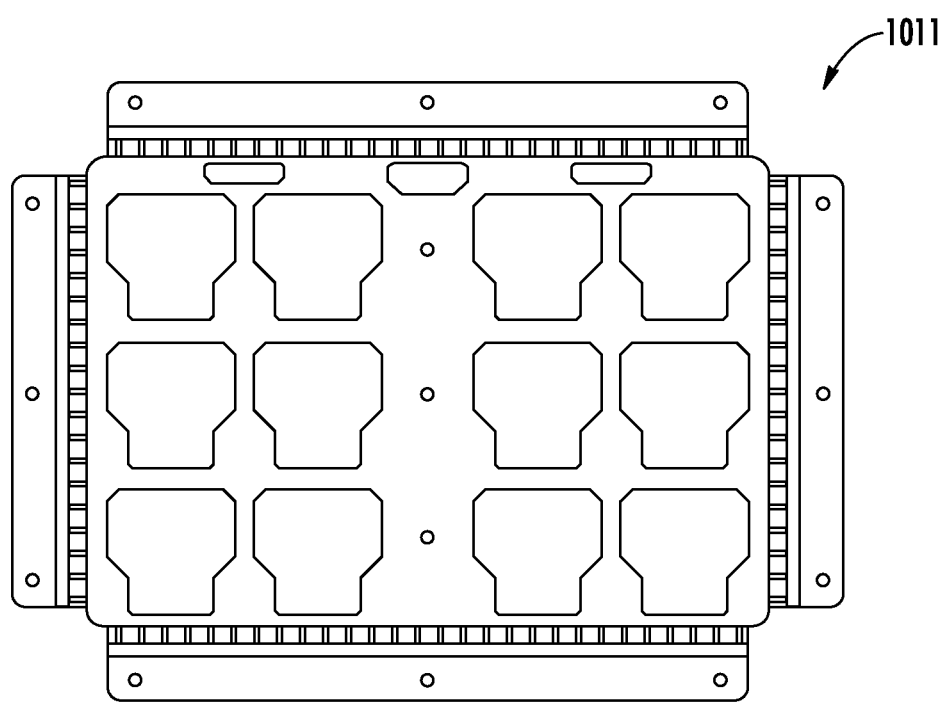
FIG. 103 illustrates a top plan view of the plate of FIG. 102.

FIGS. 102 and 103 illustrate an alternative embodiment of the plate 1011 of FIG. 101. The plate of FIGS. 102 and 103 may be less expensive and easier to manufacture in some embodiments than the plate of FIG. 101.

Figure 104:
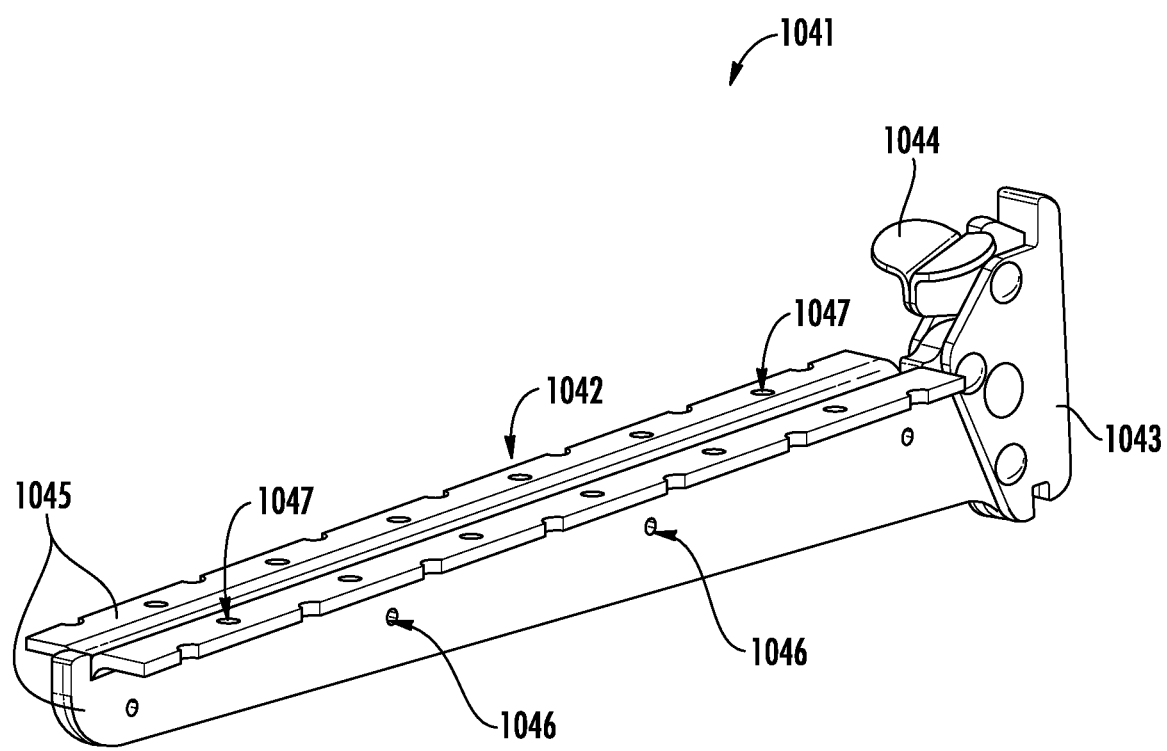
FIG. 104 illustrates a modular connection system for a tool storage container to a shelving use.

FIG. 104 illustrates a modular connection system 1041 for a tool storage container to a shelving use. E tracks or X tracks are typically mounted to a wall and brackets are used to secure hooks, brackets, latches, loops, etc. to the e-tracks. FIG. 104 illustrates an E-track compatible arm 1042 that can be used to support tool storage containers and the like. While the illustrated arm is configured for use with an E-track, in other embodiments, the arm can be configured to attach to other wall mount devices (e.g., Unistrut, slatwall, pegboard, or the like). In yet other embodiments, the arm may attached directly to a wall, such as by fasteners.

The arm 1042 includes engaging feet 1043 that are compatible with e-track and a locking mechanism (latch) 1044 for securing the arm in place along the e-track (or x track). Extending from the e-track engaging portion is a two-piece arm 1045 that is held together via rivets through the rivet holes 1046 (or other attachment means such as welding, screws, bolts, clips, etc.). In alternative embodiments, the two-piece arm can be made of a single piece of metal that is bent at the bottom portion of the arm.

The top side of the arm 1042 includes attachment holes 1047 that are used to attach the arm to a piece compatible with a tool storage modular attachment system (e.g., PACKOUT system by Milwaukee Electric Tool). For example, a single row of securing feet receptacles from the plate discussed and shown above can be used. The e-track arm can be made of metal, plastic, a combination of metal and plastic, or other suitable materials.

This shelving concept allows a user to adapt a wall to accept compatible products (tool boxes, storage boxes, work stations, etc.) using e-track, which is commonly used in vans, trucks, shop walls, etc. The user can place the e-track in any suitable location along the wall, and then move the arms along the e-track whenever he/she sees fit. This concept allows the modular securing system to be adapted to the e-track modular securing system.

Figure 105:
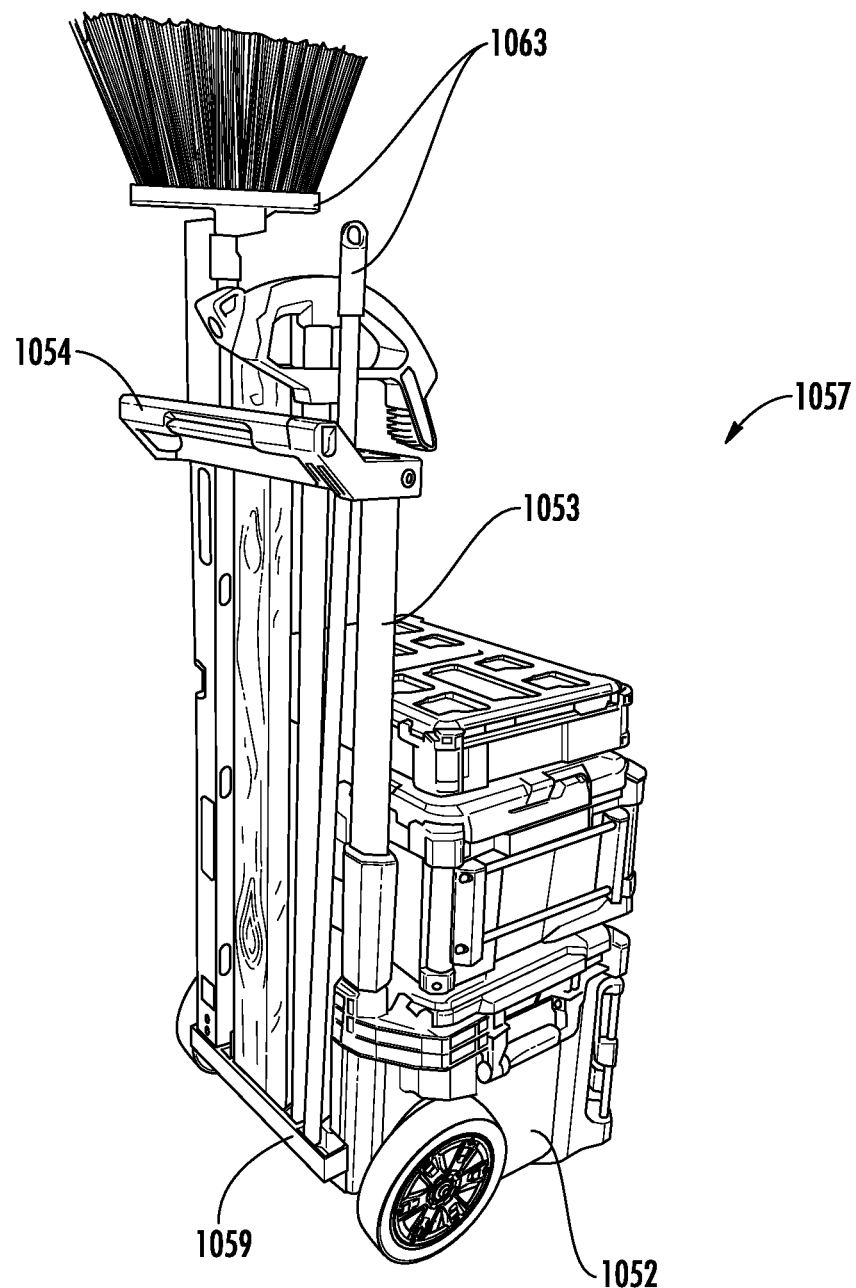
FIG. 105 illustrates a top perspective view of a storage container with the telescopic member extended.
Figure 106:
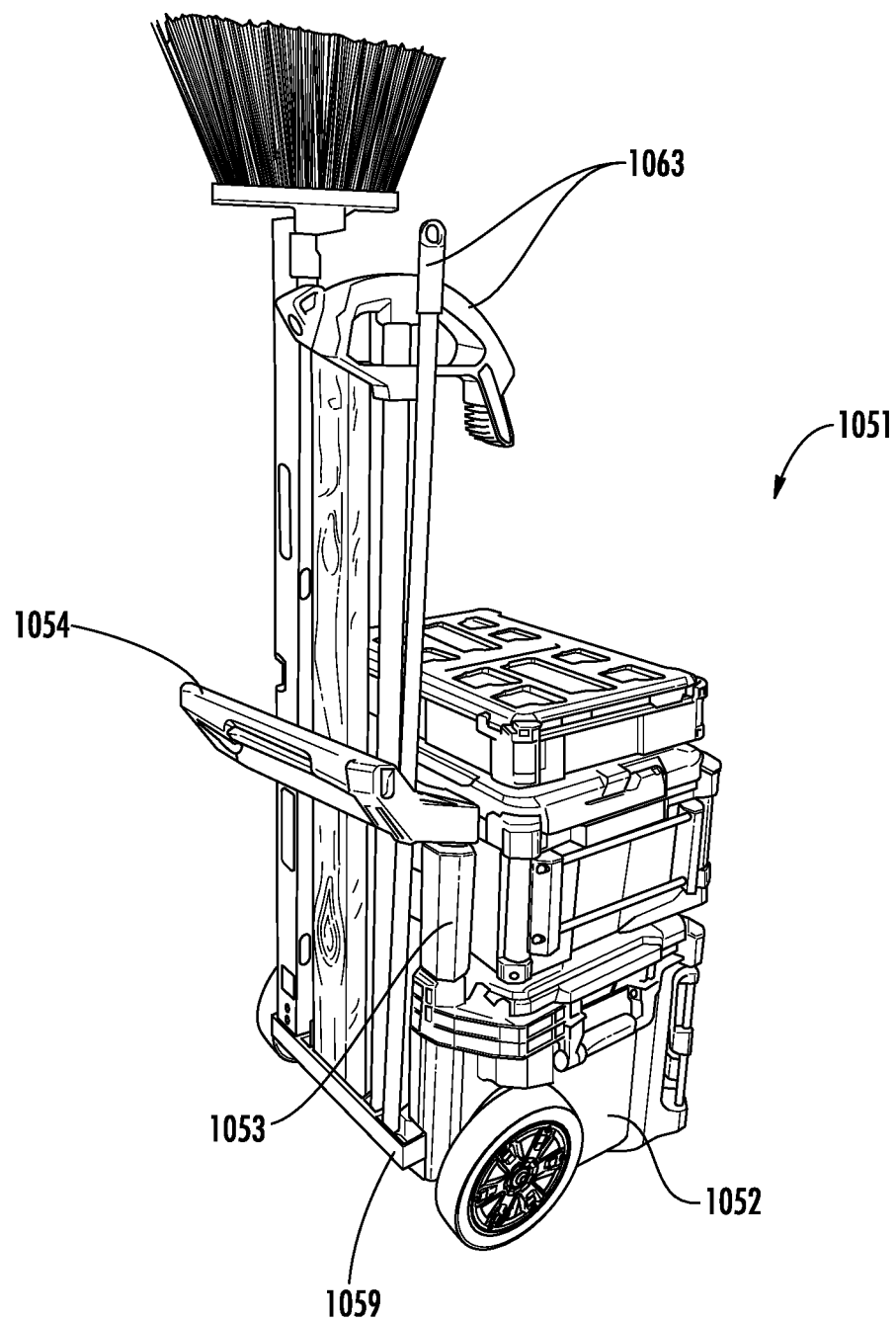
FIG. 106 illustrates a top perspective view of the storage container of FIG. 105 with the telescopic member retracted.
Figure 107:
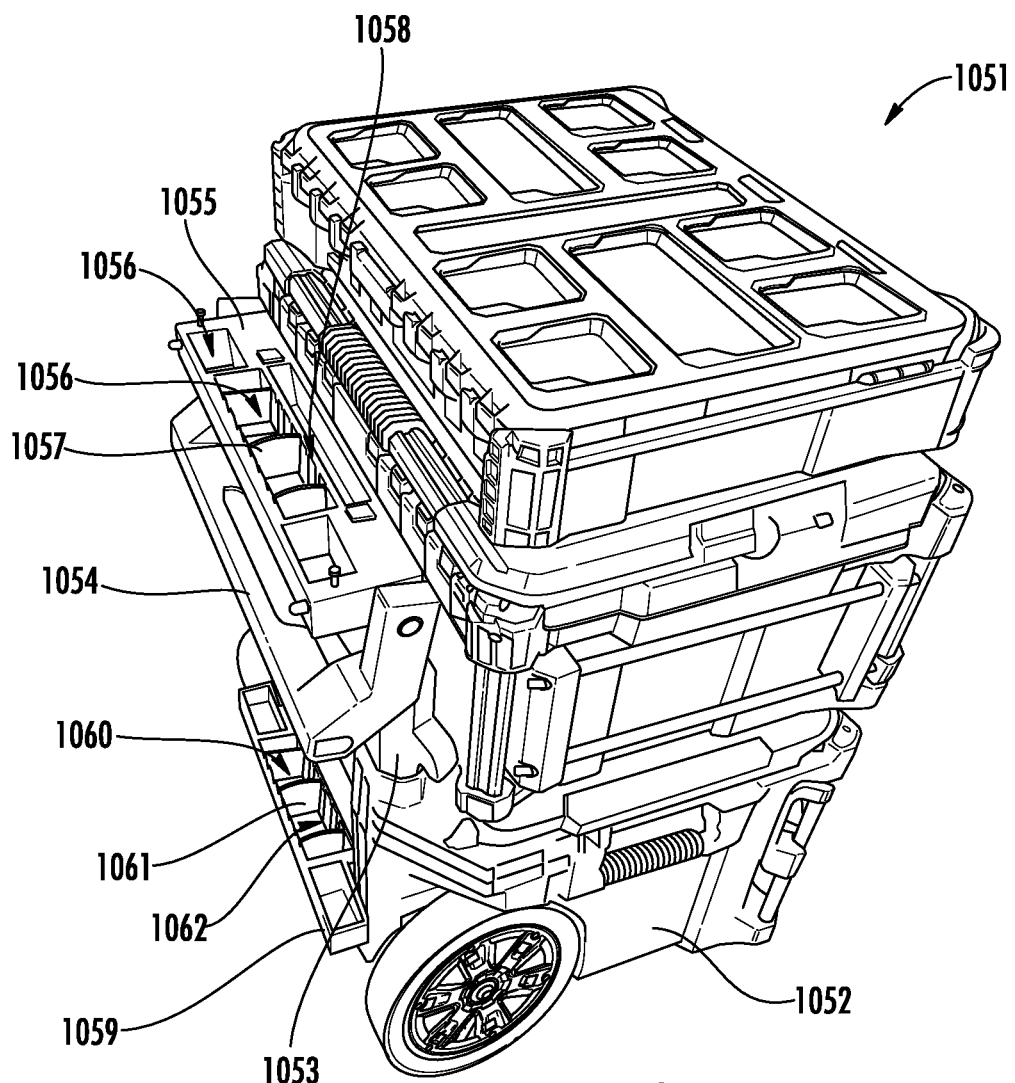
FIG. 107 illustrates a top perspective view of the storage container of FIG. 105 with the telescopic member retracted and the handle pivoted to the storage position.

FIG. 105-107 illustrate a storage container 1051. The storage container 1051 includes a container body 1052. At least one telescopic upright member 1053 extends upwardly from the container body 1052. A handle 1054 may be pivotable relative to the upright member 1053 from a storage position (shown in FIG. 107) to a use position (shown in FIG. 106). The handle 1054 may be disposed closer to the container body 1052 in the storage position than in the use position. The storage container 1051 may further include an upper chassis 1055 connected to the upright member 1053.

In such embodiments, the handle 1054 may be pivotably connected to the upper chassis 1055. The upper chassis 1055 may include at least one upper aperture 1056 defined therein. In some embodiments, the upper chassis 1055 may further include an upper adjustable partition 1057 disposed in the upper aperture 1056 to divide the aperture into variable sized openings. In such embodiments, the upper adjustable partition 1057 may be a removable card and the upper chassis 1055 may include a series of spaced upper slots 1058 configured to receive the card. A detent mechanism may be disposed between the upper chassis 1055 and the handle 1054 to lock the handle in the use position. The storage container 1051 may further include a lower chassis 1059. The lower chassis 1059 may be connected to the container body 1052, and the lower chassis may be generally aligned with the upper chassis 1055. The lower chassis 1059 may include at least one lower aperture 1060 defined therein. In many embodiments, the lower aperture 1060 may be a recess and not a through hole in the lower chassis 1059. The lower chassis 1059 may also include a lower adjustable partition 1061 disposed in the lower aperture 1060. The lower adjustable partition 1061 may also be a removable card insertable in a series of lower slots 1062. With this configuration, various tools and other items 1063 are able to be contained by the upper and lower chassis 1055, 1059.

Figure 108:
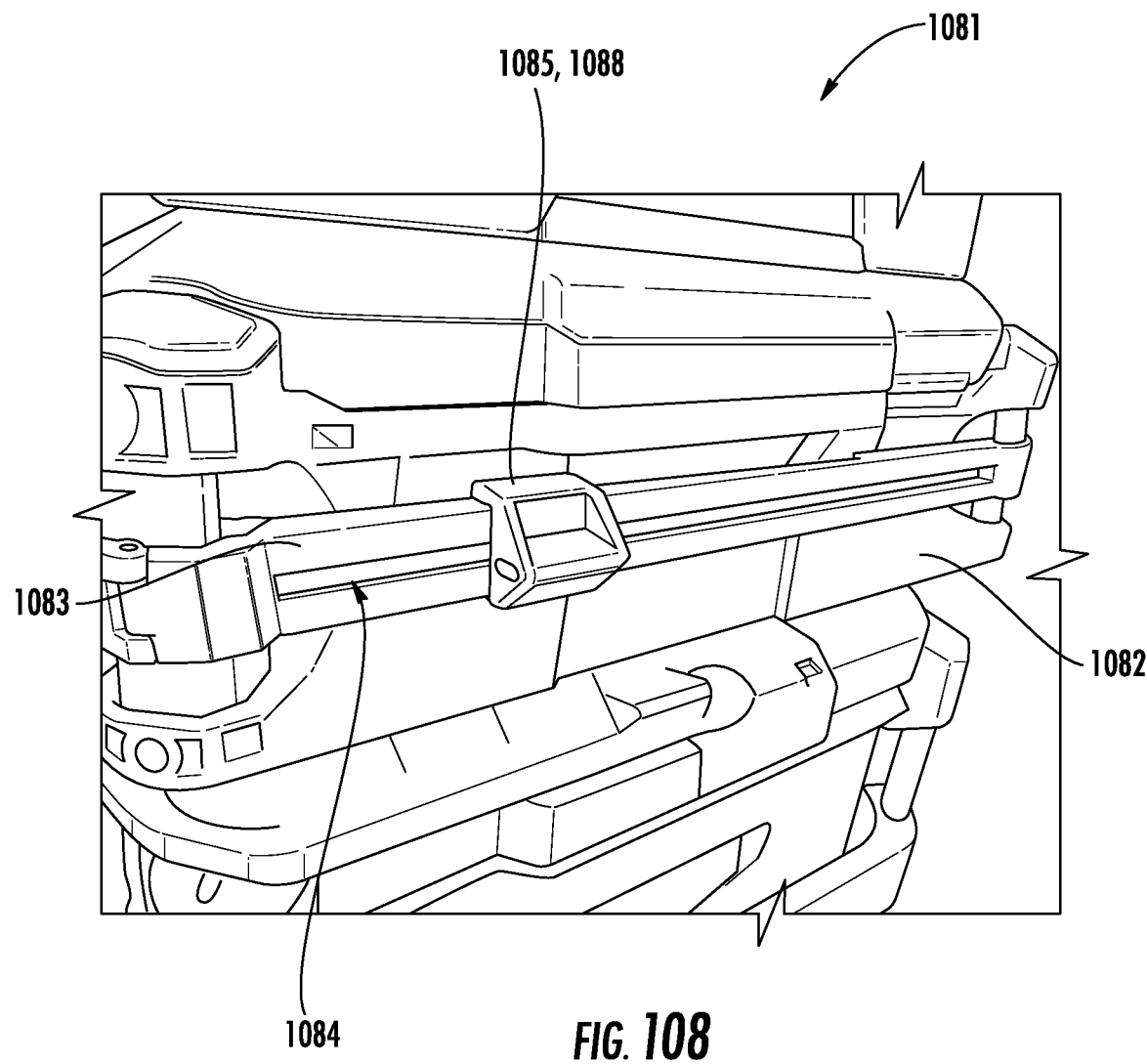
FIG. 108 illustrates a storage container with the accessory attachment insert connected thereto.
Figure 109:
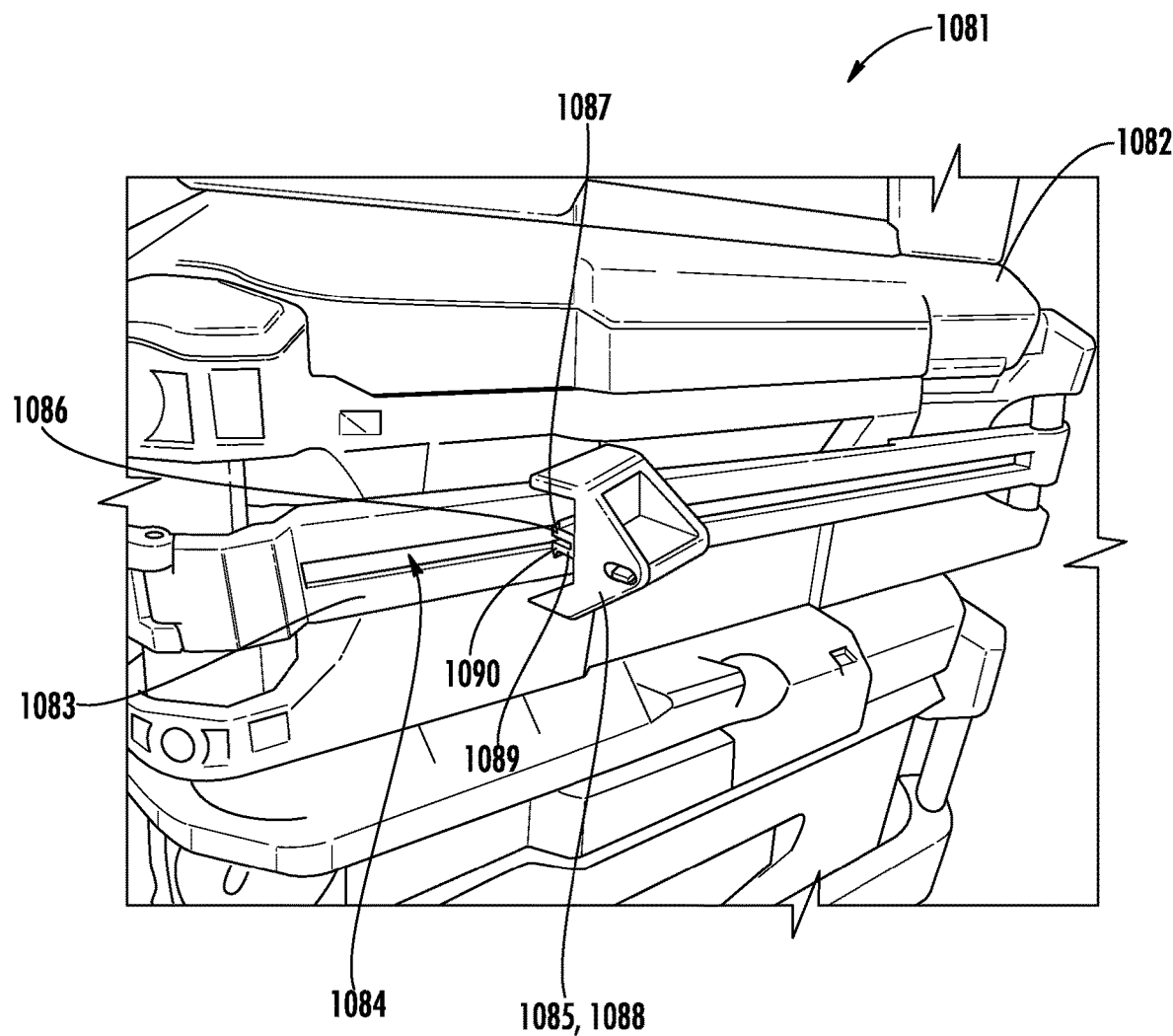
FIG. 109 illustrates the storage container of FIG. 108 with the accessory attachment insert partially removed.
Figure 110:
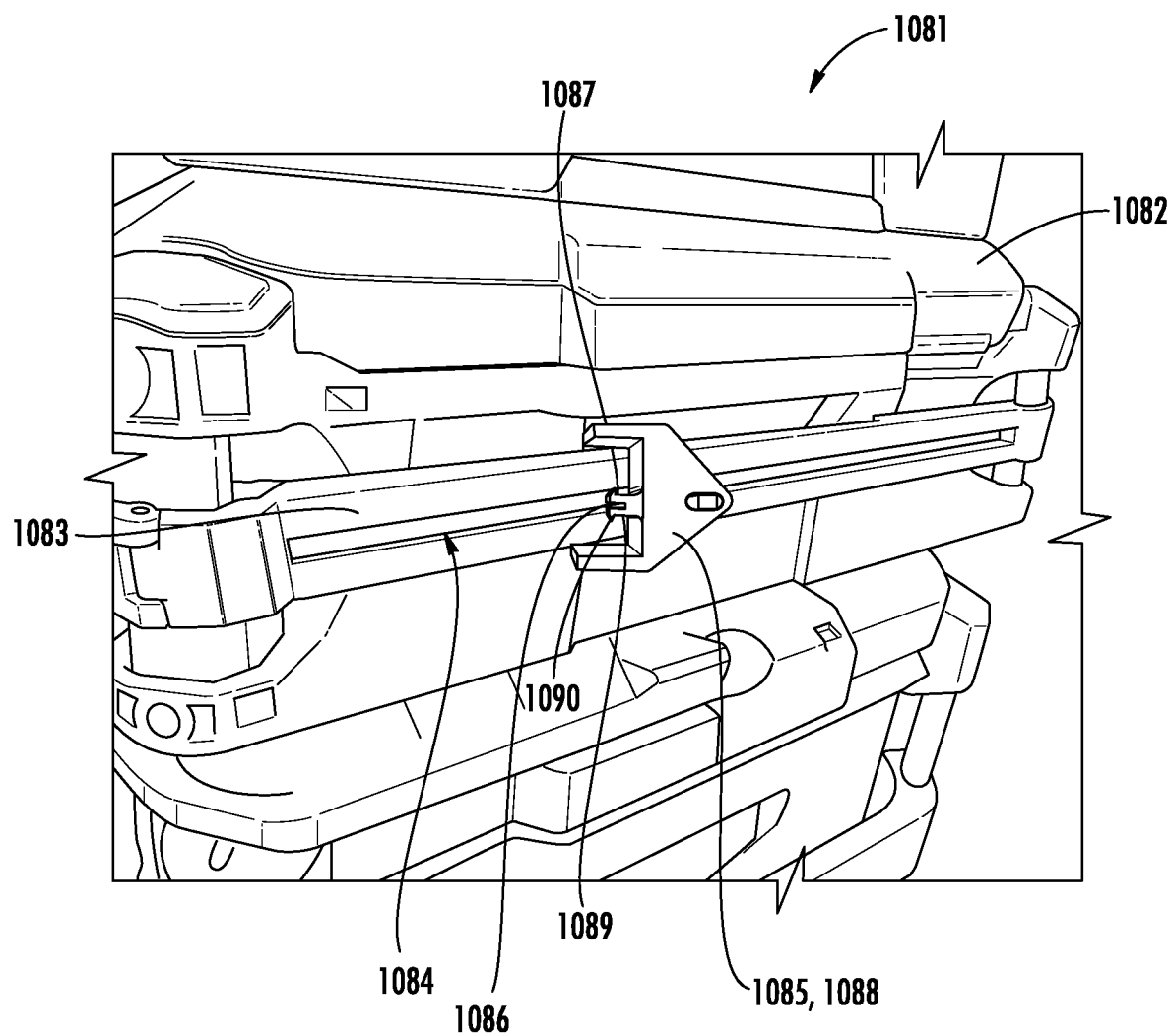
FIG. 110 illustrates the storage container of FIG. 108 with the accessory attachment insert fully removed.
Figure 111:
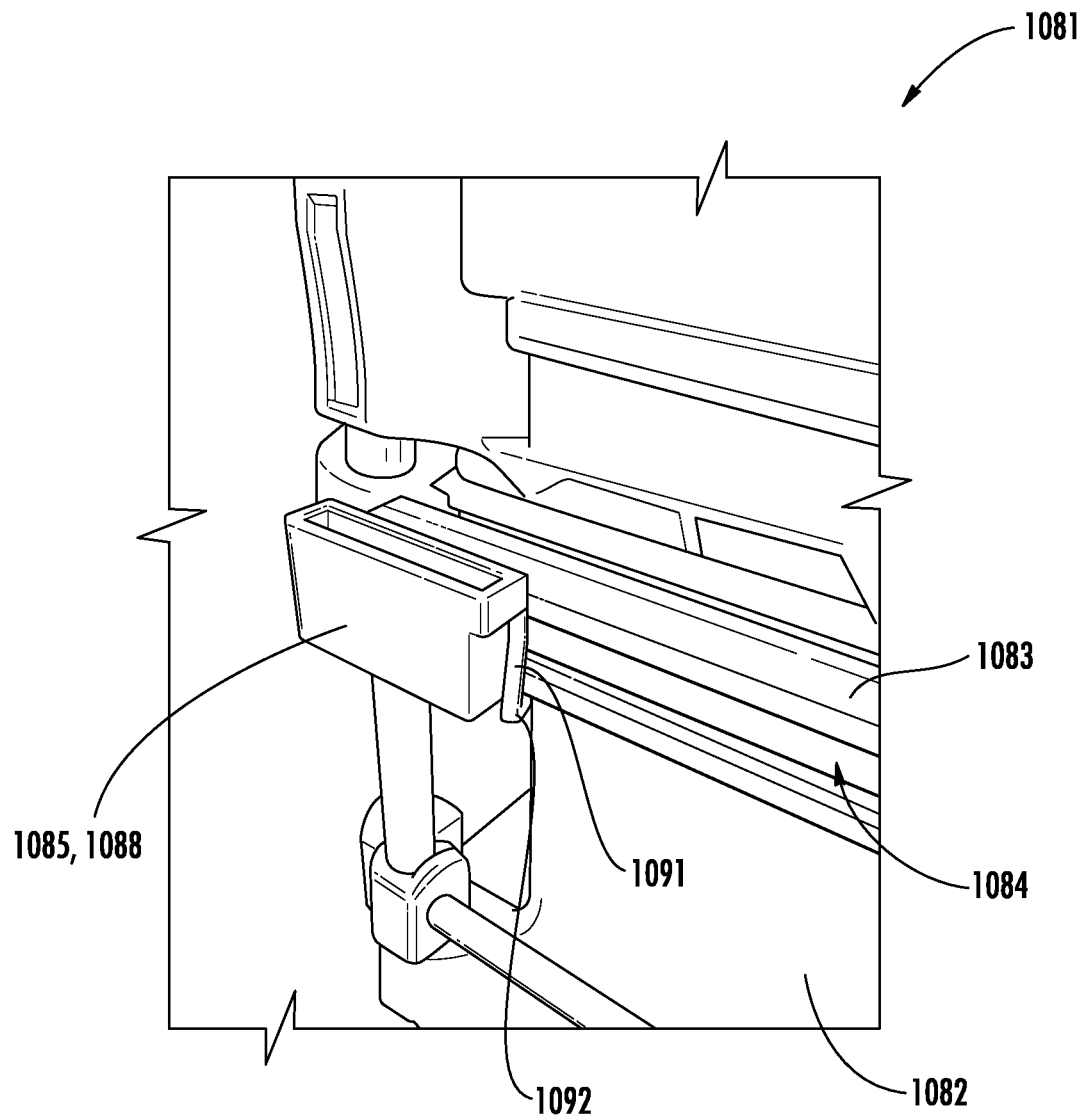
FIG. 111 illustrates a storage container with another embodiment of an accessory attachment insert connected thereto.
Figure 112:
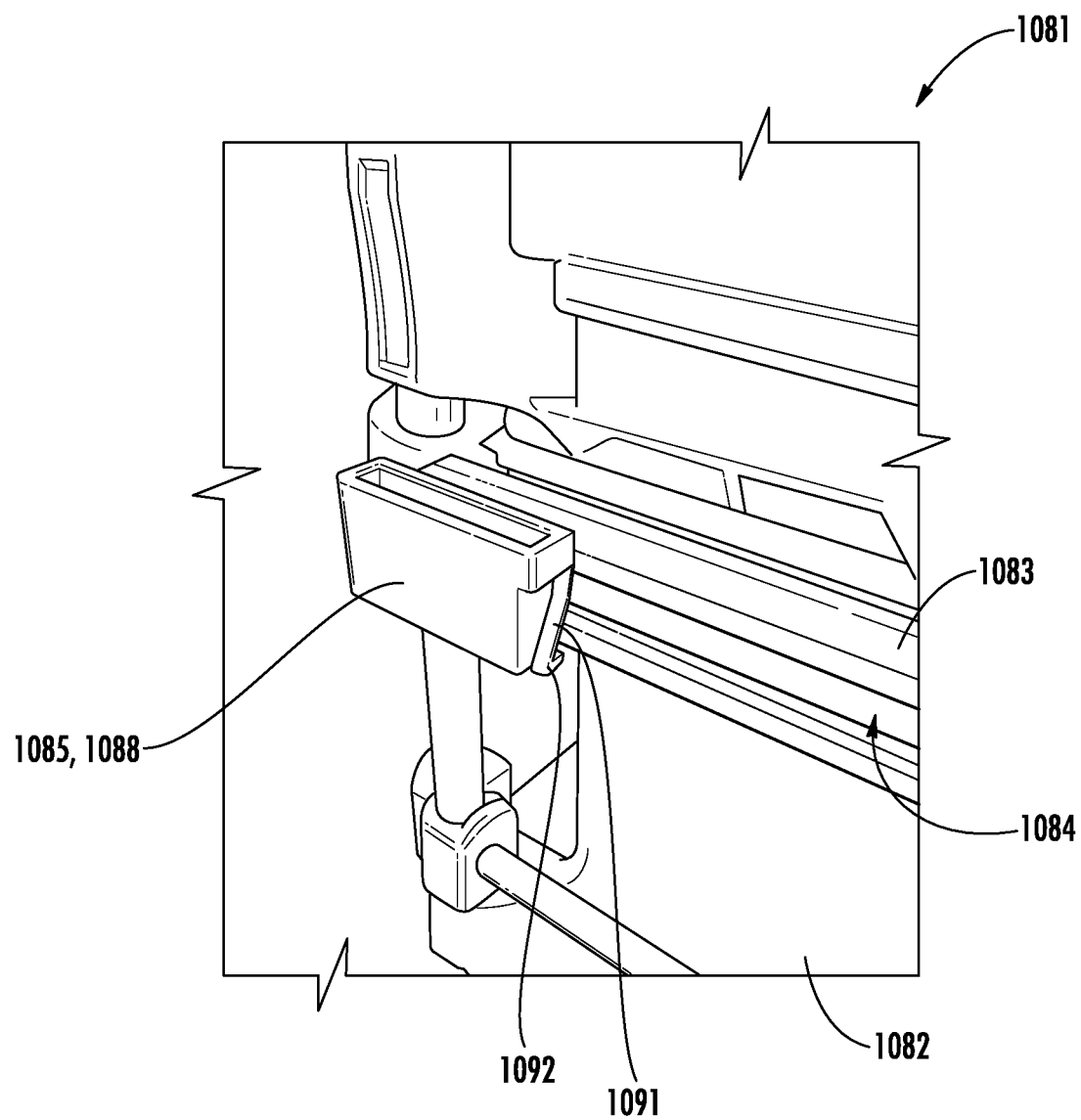
FIG. 112 illustrates the storage container of FIG. 111 with a lock lever bent partially away from the storage container.
Figure 113:
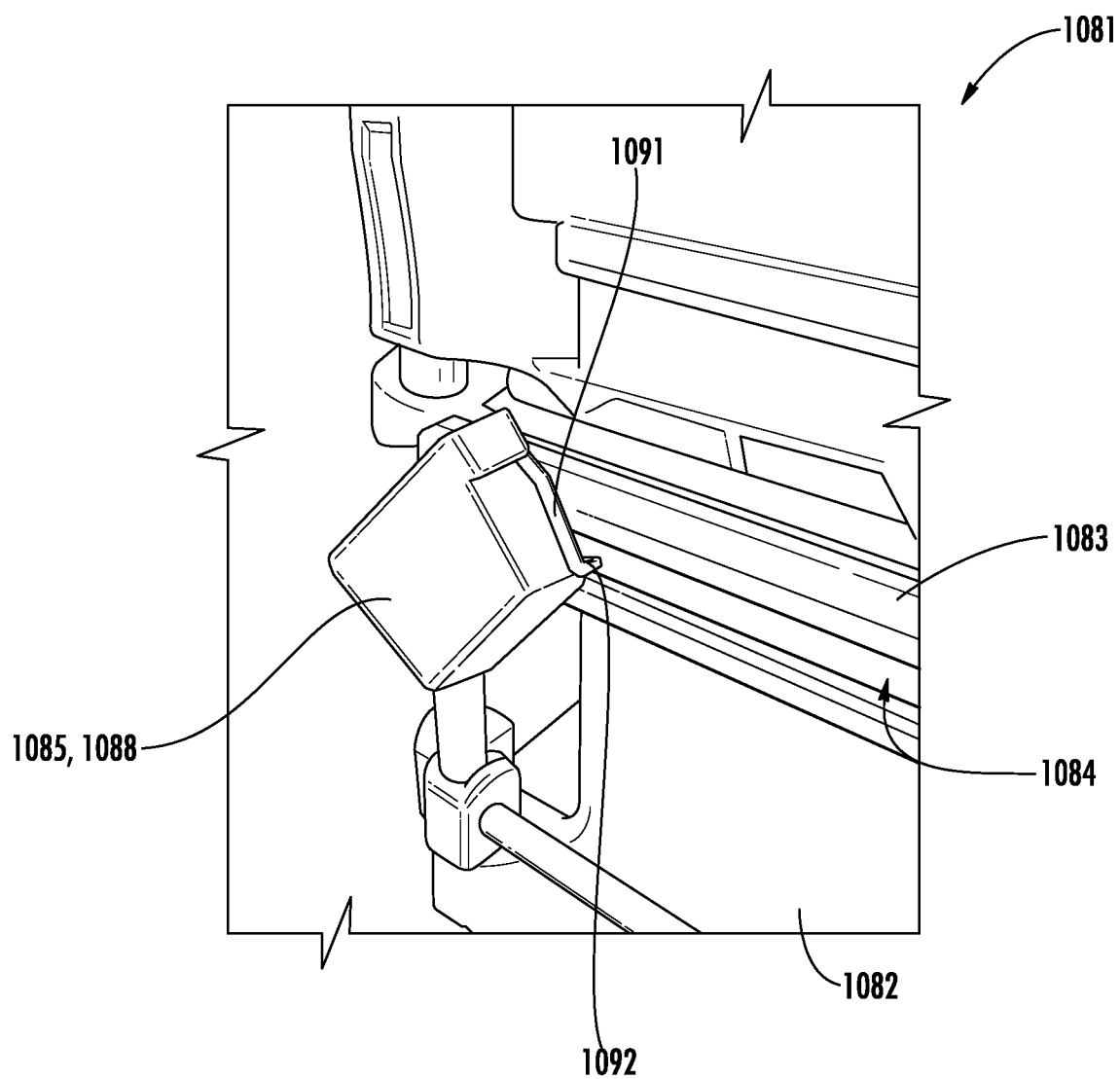
FIG. 113 illustrates the storage container of FIG. 111 with the accessory attachment insert twisted in a removal process.
Figure 114:
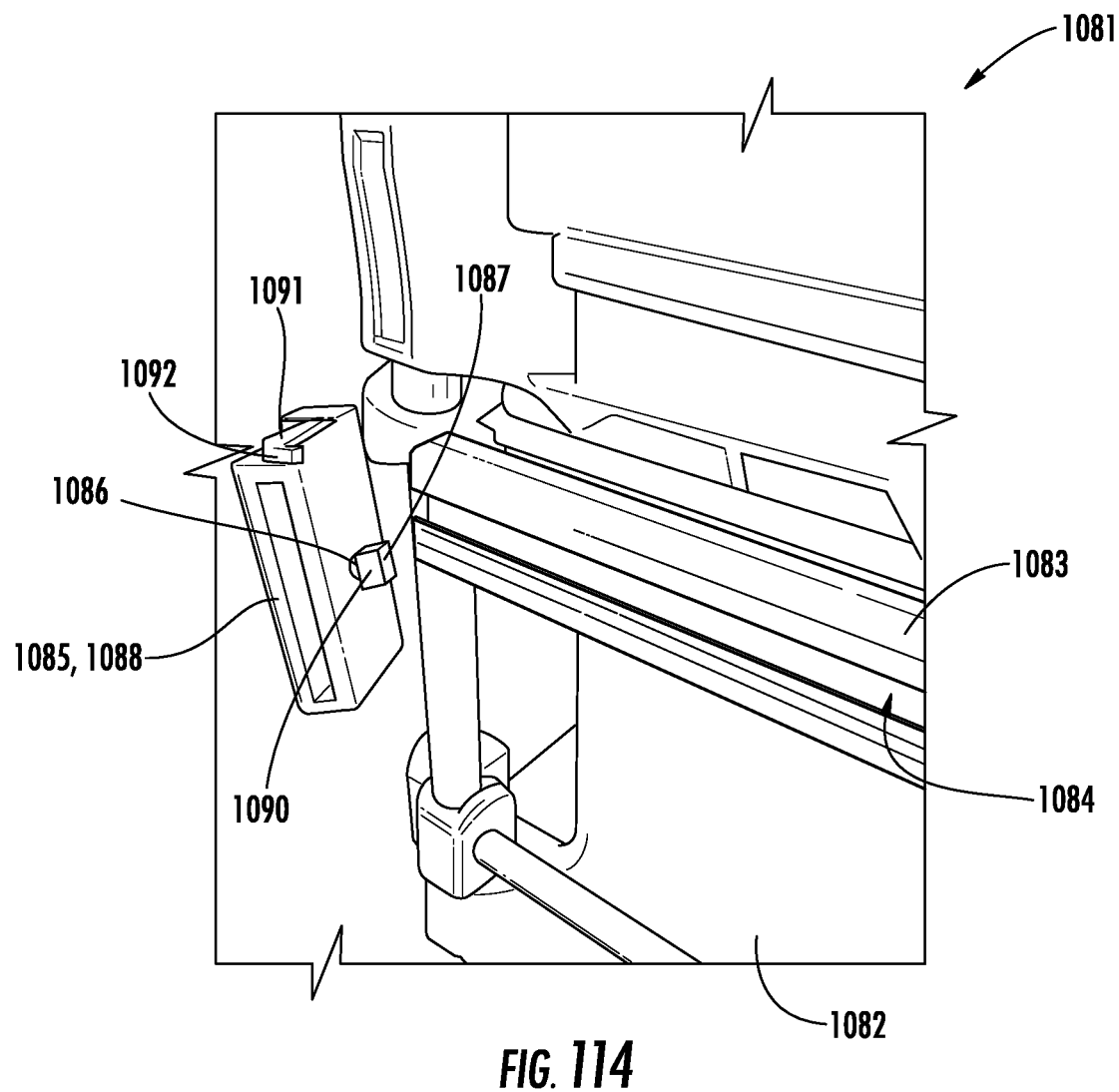
FIG. 114 illustrates the storage container of FIG. 111 with the accessory attachment insert fully removed.

FIGS. 108-110 illustrate a storage container 1081. The storage container 1081 includes a container body 1082. An elongate member 1083 may be connected to the container body 1082. The elongate member 1083 may include a longitudinal slot 1084 defined therein. In many embodiments, this longitudinal slot 1084 may be a T-slot. An accessory attachment insert 1085 may be removably attached to the elongate member 1083. The accessory attachment insert 1085 may include a first insert finger 1086 having a first laterally extending ridge 1087. The first insert finger 1086 may be removably disposed in the longitudinal slot 1084. The accessory attachment insert 1085 further includes an insert body 1088 connected to the insert finger 1086. The insert finger 1086 may be flexible relative to the insert body 1088. The accessory attachment insert 1085 may further include a second insert finger 1089 connected to the insert body 1088 and spaced apart from the first insert finger 1086. The second insert finger 1089 may include a second laterally extending ridge 1090. The first and second insert fingers 1086, 1089 may be flexed inward toward each other to remove the accessory attachment insert 1085 from the elongate member 1083. In many embodiments, the laterally extending ridges 1087, 1090 may be tapered such that the accessory attachment insert 1085 may be forced onto the elongate member 1083 to insert the fingers 1086, 1089 without flexing them toward each other.

With reference to FIGS. 111-114, the first insert finger 1086 may include both the first laterally extending ridge 1087 and the second laterally extending ridge 1090. The second laterally extending ridge 1090 may be disposed on the first insert finger 1086 opposite the first laterally extending ridge 1087. In such embodiments, the accessory attachment insert 1085 may be rotated to lock the accessory attachment insert to the elongate member 1083 by occupying the T-shaped cross section of the longitudinal slot 1084 with the laterally extending ridges 1086, 1090. Similarly, the accessory attachment insert 1085 may be rotated to unlock the accessory attachment insert from the elongate member 1083. The accessory attachment insert 1085 may further include a lock lever 1091 connected to the insert body 1088. The lock lever 1091 may include a catch 1092 configured to engage the elongate member 1083 to prevent rotation of the accessory attachment insert 1085. The lock lever 1091 may be flexible relative to the insert body 1088 such that the lock lever may be flexed away from the elongate member 1083 to allow rotation of the accessory attachment insert 1085. To remove the accessory attachment insert 1085 from the elongate member 1083, a user may manually flex the lock lever 1091 away from the elongate member. To install the accessory attachment insert 1085 on the elongate member 1083, the rigidity of the elongate member relative to the flexible lock lever 1091 may force the lock lever out of the elongate member's way while the user rotates the accessory attachment insert. In such embodiments, the catch 1092 may be tapered to allow for smooth flexing in one rotational direction of the accessory attachment insert 1085 but not in the opposite rotational direction.

Although the invention has been described in detail with reference to certain preferred embodiments, variations and modifications exist within the scope and spirit of one or more independent aspects of the invention as described.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless U otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A storage system comprising:
 a first storage container comprising:
  a first cleat receptacle configured at a first top face of the first storage container, the first cleat receptacle comprising two sidewalls, a back wall, and a wing, the back wall extending between the two sidewalls, the two sidewalls and the back wall projecting from a first coupling surface of the first top face, and the wing extending away from the back wall in a first direction above the first coupling surface;
  a first lid pivotally attached to the first storage container; and
  a first toggle locking latch configured to latch the first lid in a closed position; and
 a second storage container comprising:
  a first projection extending from a bottom surface of the second storage container, the first projection comprising a projection portion extending in a second direction opposite the first direction, the projection portion of the second storage container is engageable with the wing such that the projection portion engages between the wing and the first coupling surface, wherein attaching engagement between the second storage container and the first storage container takes place when the projection portion and the wing are engaged, thereby restricting separation between the second storage container and the first storage container;
  a second lid pivotally attached to the second storage container;
  a second toggle locking latch configured to latch the second lid in a closed position;
  a front face;
  a rear face opposite the front face;
  a first side face;
  a second side face opposite the first side face;
  a first mounting rail coupled to the second storage container and extending between the front face and the first side face, the first mounting rail defining a first outer surface that faces away from each of the front face and the first side face, wherein the first mounting rail is formed from a first material comprising metal; and
  a second mounting rail coupled to the second storage container and extending between the rear face and the first side face, and the second mounting rail defining a second outer surface that faces away from each of the rear face and the first side face, wherein the second mounting rail is formed from the first material;
 a locking aperture defined by the first storage container; and
 a latch member coupled to the second storage container, the locking aperture configured to receive the latch member, wherein disconnecting the second storage container from the first storage container can be performed only after disengaging the latch member from the locking aperture.

2. The storage system of claim 1, comprising a mount resiliently snapped to the first mounting rail and the second mounting rail such that the mount extends along the first side face between the first mounting rail and the second mounting rail.

3. The storage system of claim 2, comprising a first storage bin slidably and removably coupled to the mount, the first storage bin comprising a first storage area configured to receive and store one or more objects.

4. The storage system of claim 3, wherein the latch member is spring biased to engage with the locking aperture.

5. The storage system of claim 4, the first storage container comprising a plurality of cleat receptacles including the first cleat receptacle, each of the plurality of cleat receptacles comprising two sidewalls, a back wall, and a wing, the back wall extending between the two sidewalls, the two sidewalls and the back wall projecting from the first coupling surface, and the wing extending away from the back wall in a first direction above the first coupling surface.

6. The storage system of claim 5, the second storage container comprising:
 a second cleat receptacle configured at a second top face of the second storage container, the second cleat receptacle comprising two sidewalls, a back wall, and a wing, the back wall extending between the two sidewalls, the two sidewalls and the back wall projecting from the second coupling surface, and the wing extending away from the back wall in the first direction above the second coupling surface.

7. The storage system of claim 5, the second storage container comprising:
 a first handle pivotally coupled to the front face of the second storage container.

8. The storage system of claim 3, comprising a second storage bin slidably and removably coupled to the mount, the second storage bin comprising a second storage area configured to receive and store one or more objects.

9. The storage system of claim 8, wherein the second storage area is larger than the first storage area.

10. The storage system of claim 2, wherein the mount includes a plurality of hooks.

11. The storage system of claim 2, comprising a plurality of hooks integrally molded with the mount.

12. The storage system of claim 2, comprising a storage bin removably attached to the mount.

13. The storage system of claim 12, the storage bin comprising a storage compartment area configured to receive and store one or more objects.

14. The storage system of claim 1, comprising:
 a first clip removably mounted to the first mounting rail; and
 a second clip removably mounted to the second mounting rail, wherein the first clip and the second clip are configured to collectively receive a cord that is wrapped around the first clip and the second clip.

15. The storage system of claim 14, wherein the cord is a power cord.

* * * * *